US010565734B2

(12) United States Patent
Bevensee et al.

(10) Patent No.: US 10,565,734 B2
(45) Date of Patent: Feb. 18, 2020

(54) VIDEO CAPTURE, PROCESSING, CALIBRATION, COMPUTATIONAL FIBER ARTIFACT REMOVAL, AND LIGHT-FIELD PIPELINE

(71) Applicant: GOOGLE LLC, Mountain View, CA (US)

(72) Inventors: Brendan Bevensee, San Jose, CA (US); Tingfang Du, San Jose, CA (US); Jon Karafin, Morgan Hill, CA (US); Joel Merritt, Sunnyvale, CA (US); Duane Petrovich, San Francisco, CA (US); Gareth Spor, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 137 days.

(21) Appl. No.: 15/451,831

(22) Filed: Mar. 7, 2017

(65) Prior Publication Data

US 2017/0243373 A1 Aug. 24, 2017

Related U.S. Application Data

(63) Continuation-in-part of application No. 15/098,674, filed on Apr. 14, 2016, now abandoned.
(Continued)

(51) Int. Cl.
*G06T 7/80* (2017.01)
*H04N 5/225* (2006.01)
(Continued)

(52) U.S. Cl.
CPC .............. *G06T 7/80* (2017.01); *G01S 7/4817* (2013.01); *G01S 17/023* (2013.01); *G01S 17/08* (2013.01);
(Continued)

(58) Field of Classification Search
CPC .......... H04N 5/2258; H04N 5/23293–232939; H04N 13/239; H04N 13/243;
(Continued)

(56) References Cited

U.S. PATENT DOCUMENTS

| 725,567 A | 4/1903 | Ives |
| 4,383,170 A | 5/1983 | Takagi et al. |

(Continued)

FOREIGN PATENT DOCUMENTS

| CN | 101226292 | 7/2008 |
| CN | 101309359 | 11/2008 |

(Continued)

OTHER PUBLICATIONS

U.S. Appl. No. 15/967,076, filed Apr. 30, 2018 listing Jiantao Kuang et al. as inventors, entitled "Automatic Lens Flare Detection and Correction for Light-Field Images".

(Continued)

*Primary Examiner* — Paul M Berardesca

(57) ABSTRACT

An image capture system includes a plurality of image sensors arranged in a pattern such that gaps exist between adjacent image sensors of the plurality of image sensors. Each of the image sensors may be configured to capture sensor image data. The image capture system may also have a main lens configured to direct incoming light along an optical path, a microlens array positioned within the optical path, and a plurality of tapered fiber optic bundles. Each tapered fiber optic bundle may have a leading end positioned within the optical path, and a trailing end positioned proximate one of the image sensors. The leading end may have a larger cross-sectional area than the trailing end. Sensor data from the image sensors may be combined to generate a single light-field image that is substantially unaffected by the gaps.

43 Claims, 98 Drawing Sheets

Related U.S. Application Data

(60) Provisional application No. 62/305,917, filed on Mar. 9, 2016, provisional application No. 62/200,804, filed on Aug. 4, 2015, provisional application No. 62/148,055, filed on Apr. 15, 2015.

(51) Int. Cl.
| | | |
|---|---|---|
| *G06T 7/557* | (2017.01) | |
| *G06T 5/50* | (2006.01) | |
| *H04N 17/00* | (2006.01) | |
| *G02B 6/08* | (2006.01) | |
| *H04N 13/282* | (2018.01) | |
| *G06T 7/13* | (2017.01) | |
| *G06T 7/521* | (2017.01) | |
| *G01S 17/08* | (2006.01) | |
| *G01S 17/02* | (2006.01) | |
| *G01S 7/481* | (2006.01) | |

(52) U.S. Cl.
CPC .................. *G02B 6/08* (2013.01); *G06T 5/50* (2013.01); *G06T 7/13* (2017.01); *G06T 7/521* (2017.01); *G06T 7/557* (2017.01); *H04N 5/2258* (2013.01); *H04N 13/282* (2018.05); *H04N 17/002* (2013.01); *G06T 2207/10052* (2013.01)

(58) Field of Classification Search
CPC ...... H04N 13/282; H04N 13/25; H04N 5/247; H04N 9/09–097; G02B 6/04–08
See application file for complete search history.

(56) References Cited

U.S. PATENT DOCUMENTS

| | | |
|---|---|---|
| 4,661,986 A | 4/1987 | Adelson |
| 4,694,185 A | 9/1987 | Weiss |
| 4,920,419 A | 4/1990 | Easterly |
| 5,076,687 A | 12/1991 | Adelson |
| 5,077,810 A | 12/1991 | D'Luna |
| 5,157,465 A | 10/1992 | Kronberg |
| 5,251,019 A | 10/1993 | Moorman et al. |
| 5,282,045 A | 1/1994 | Mimura et al. |
| 5,499,069 A | 3/1996 | Griffith |
| 5,572,034 A * | 11/1996 | Karellas ................ G01T 1/2018 250/367 |
| 5,610,390 A | 3/1997 | Miyano |
| 5,748,371 A | 5/1998 | Cathey, Jr. et al. |
| 5,757,423 A | 5/1998 | Tanaka et al. |
| 5,818,525 A | 10/1998 | Elabd |
| 5,835,267 A | 11/1998 | Mason et al. |
| 5,907,619 A | 5/1999 | Davis |
| 5,949,433 A | 9/1999 | Klotz |
| 5,974,215 A | 10/1999 | Bilbro et al. |
| 6,005,936 A | 12/1999 | Shimizu et al. |
| 6,021,241 A | 2/2000 | Bilbro et al. |
| 6,023,523 A | 2/2000 | Cohen et al. |
| 6,028,606 A | 2/2000 | Kolb et al. |
| 6,034,690 A | 3/2000 | Gallery et al. |
| 6,061,083 A | 5/2000 | Aritake et al. |
| 6,061,400 A | 5/2000 | Pearlstein et al. |
| 6,069,565 A | 5/2000 | Stern et al. |
| 6,075,889 A | 6/2000 | Hamilton, Jr. et al. |
| 6,091,860 A | 7/2000 | Dimitri |
| 6,097,394 A | 8/2000 | Levoy et al. |
| 6,115,556 A | 9/2000 | Reddington |
| 6,137,100 A | 10/2000 | Fossum et al. |
| 6,169,285 B1 | 1/2001 | Pertrillo et al. |
| 6,201,899 B1 | 3/2001 | Bergen |
| 6,221,687 B1 | 4/2001 | Abramovich |
| 6,320,979 B1 | 11/2001 | Melen |
| 6,424,351 B1 | 7/2002 | Bishop et al. |
| 6,448,544 B1 | 9/2002 | Stanton et al. |
| 6,466,207 B1 | 10/2002 | Gortler et al. |
| 6,476,805 B1 | 11/2002 | Shum et al. |
| 6,479,827 B1 | 11/2002 | Hamamoto et al. |
| 6,483,535 B1 | 11/2002 | Tamburrino et al. |
| 6,529,265 B1 | 3/2003 | Henningsen |
| 6,577,342 B1 | 6/2003 | Webster |
| 6,587,147 B1 | 7/2003 | Li |
| 6,597,859 B1 | 7/2003 | Leinhardt et al. |
| 6,606,099 B2 | 8/2003 | Yamada |
| 6,658,168 B1 | 12/2003 | Kim |
| 6,674,430 B1 | 1/2004 | Kaufman et al. |
| 6,687,419 B1 | 2/2004 | Atkin |
| 6,768,980 B1 | 7/2004 | Meyer et al. |
| 6,785,667 B2 | 8/2004 | Orbanes et al. |
| 6,833,865 B1 | 12/2004 | Fuller et al. |
| 6,842,297 B2 | 1/2005 | Dowski, Jr. et al. |
| 6,900,841 B1 | 5/2005 | Mihara |
| 6,924,841 B2 | 8/2005 | Jones |
| 6,927,922 B2 | 8/2005 | George et al. |
| 7,015,954 B1 | 3/2006 | Foote et al. |
| 7,025,515 B2 | 4/2006 | Woods |
| 7,034,866 B1 | 4/2006 | Colmenarez et al. |
| 7,079,698 B2 | 7/2006 | Kobayashi |
| 7,102,666 B2 | 9/2006 | Kanade et al. |
| 7,164,807 B2 | 1/2007 | Morton |
| 7,206,022 B2 | 4/2007 | Miller et al. |
| 7,239,345 B1 | 7/2007 | Rogina |
| 7,286,295 B1 | 10/2007 | Sweatt et al. |
| 7,304,670 B1 | 12/2007 | Hussey et al. |
| 7,329,856 B2 | 2/2008 | Ma et al. |
| 7,336,430 B2 | 2/2008 | George |
| 7,417,670 B1 | 8/2008 | Linzer et al. |
| 7,469,381 B2 | 12/2008 | Ording |
| 7,477,304 B2 | 1/2009 | Hu |
| 7,587,109 B1 | 9/2009 | Reininger |
| 7,620,309 B2 | 11/2009 | Georgiev |
| 7,623,726 B1 | 11/2009 | Georgiev |
| 7,633,513 B2 | 12/2009 | Kondo et al. |
| 7,683,951 B2 | 3/2010 | Aotsuka |
| 7,687,757 B1 | 3/2010 | Tseng et al. |
| 7,723,662 B2 | 5/2010 | Levoy et al. |
| 7,724,952 B2 | 5/2010 | Shum et al. |
| 7,748,022 B1 | 6/2010 | Frazier |
| 7,847,825 B2 | 12/2010 | Aoki et al. |
| 7,936,377 B2 | 5/2011 | Friedhoff et al. |
| 7,936,392 B2 | 5/2011 | Ng et al. |
| 7,941,634 B2 | 5/2011 | Georgi |
| 7,945,653 B2 | 5/2011 | Zuckerberg et al. |
| 7,949,252 B1 | 5/2011 | Georgiev |
| 7,982,776 B2 | 7/2011 | Dunki-Jacobs et al. |
| 8,013,904 B2 | 9/2011 | Tan et al. |
| 8,085,391 B2 | 12/2011 | Machida et al. |
| 8,106,856 B2 | 1/2012 | Matas et al. |
| 8,115,814 B2 | 2/2012 | Iwase et al. |
| 8,155,456 B2 | 4/2012 | Babacan |
| 8,155,478 B2 | 4/2012 | Vitsnudel et al. |
| 8,189,089 B1 | 5/2012 | Georgiev et al. |
| 8,228,417 B1 | 7/2012 | Georgiev et al. |
| 8,248,515 B2 | 8/2012 | Ng et al. |
| 8,259,198 B2 | 9/2012 | Cote et al. |
| 8,264,546 B2 | 9/2012 | Witt |
| 8,279,325 B2 | 10/2012 | Pitts et al. |
| 8,289,440 B2 | 10/2012 | Knight et al. |
| 8,290,358 B1 | 10/2012 | Georgiev |
| 8,310,554 B2 | 11/2012 | Aggarwal et al. |
| 8,315,476 B1 | 11/2012 | Georgiev et al. |
| 8,345,144 B1 | 1/2013 | Georgiev et al. |
| 8,400,533 B1 | 3/2013 | Szedo |
| 8,400,555 B1 | 3/2013 | Georgiev et al. |
| 8,427,548 B2 | 4/2013 | Lim et al. |
| 8,442,397 B2 | 5/2013 | Kang et al. |
| 8,446,516 B2 | 5/2013 | Pitts et al. |
| 8,494,304 B2 | 7/2013 | Venable et al. |
| 8,531,581 B2 | 9/2013 | Shroff |
| 8,542,933 B2 | 9/2013 | Venkataraman et al. |
| 8,559,705 B2 | 10/2013 | Ng |
| 8,570,426 B2 | 10/2013 | Pitts et al. |
| 8,577,216 B2 | 11/2013 | Li et al. |
| 8,581,998 B2 | 11/2013 | Ohno |
| 8,589,374 B2 | 11/2013 | Chaudhri |

(56) References Cited

U.S. PATENT DOCUMENTS

| | | |
|---|---|---|
| 8,593,564 B2 | 11/2013 | Border et al. |
| 8,605,199 B2 | 12/2013 | Imai |
| 8,614,764 B2 | 12/2013 | Pitts et al. |
| 8,619,082 B1 | 12/2013 | Ciurea et al. |
| 8,629,930 B2 | 1/2014 | Brueckner et al. |
| 8,665,440 B1 | 3/2014 | Kompaniets et al. |
| 8,675,073 B2 | 3/2014 | Aagaard et al. |
| 8,724,014 B2 | 5/2014 | Ng et al. |
| 8,736,710 B2 | 5/2014 | Spielberg |
| 8,736,751 B2 | 5/2014 | Yun |
| 8,749,620 B1 | 6/2014 | Pitts et al. |
| 8,750,509 B2 | 6/2014 | Renkis |
| 8,754,829 B2 | 6/2014 | Lapstun |
| 8,760,566 B2 | 6/2014 | Pitts et al. |
| 8,768,102 B1 | 7/2014 | Ng et al. |
| 8,797,321 B1 | 8/2014 | Bertolami et al. |
| 8,811,769 B1 | 8/2014 | Pitts et al. |
| 8,831,377 B2 | 9/2014 | Pitts et al. |
| 8,860,856 B2 | 10/2014 | Wetzstein et al. |
| 8,879,901 B2 | 11/2014 | Caldwell et al. |
| 8,903,232 B1 | 12/2014 | Caldwell |
| 8,908,058 B2 | 12/2014 | Akeley et al. |
| 8,948,545 B2 | 2/2015 | Akeley et al. |
| 8,953,882 B2 | 2/2015 | Lim et al. |
| 8,971,625 B2 | 3/2015 | Pitts et al. |
| 8,976,288 B2 | 3/2015 | Ng et al. |
| 8,988,317 B1 | 3/2015 | Liang et al. |
| 8,995,785 B2 | 3/2015 | Knight et al. |
| 8,997,021 B2 | 3/2015 | Liang et al. |
| 9,001,226 B1 | 4/2015 | Ng et al. |
| 9,013,611 B1 | 4/2015 | Szedo |
| 9,106,914 B2 | 8/2015 | Doser |
| 9,184,199 B2 | 11/2015 | Pitts et al. |
| 9,201,193 B1 | 12/2015 | Smith |
| 9,210,391 B1 | 12/2015 | Mills |
| 9,214,013 B2 | 12/2015 | Venkataraman et al. |
| 9,294,662 B2 | 3/2016 | Vondran, Jr. et al. |
| 9,300,932 B2 | 3/2016 | Knight et al. |
| 9,305,375 B2 | 4/2016 | Akeley |
| 9,305,956 B2 | 4/2016 | Pittes et al. |
| 9,386,288 B2 | 7/2016 | Akeley et al. |
| 9,392,153 B2 | 7/2016 | Myhre et al. |
| 9,419,049 B2 | 8/2016 | Pitts et al. |
| 9,467,607 B2 | 10/2016 | Ng et al. |
| 9,497,380 B1 | 11/2016 | Jannard et al. |
| 9,607,424 B2 | 3/2017 | Ng et al. |
| 9,628,684 B2 | 4/2017 | Liang et al. |
| 9,635,332 B2 | 4/2017 | Carroll et al. |
| 9,639,945 B2 | 5/2017 | Oberheu et al. |
| 9,647,150 B2 | 5/2017 | Blasco Claret |
| 9,681,069 B2 | 6/2017 | Ei-Ghoroury et al. |
| 9,774,800 B2 | 9/2017 | Ei-Ghoroury et al. |
| 9,858,649 B2 | 1/2018 | Liang et al. |
| 9,866,810 B2 | 1/2018 | Knight et al. |
| 9,900,510 B1 | 2/2018 | Karafin et al. |
| 9,979,909 B2 | 5/2018 | Kuang et al. |
| 2001/0048968 A1 | 12/2001 | Cox et al. |
| 2001/0053202 A1 | 12/2001 | Mazess et al. |
| 2002/0001395 A1 | 1/2002 | Davis et al. |
| 2002/0015048 A1 | 2/2002 | Nister |
| 2002/0061131 A1 | 5/2002 | Sawhney |
| 2002/0109783 A1 | 8/2002 | Hayashi et al. |
| 2002/0159030 A1 | 10/2002 | Frey et al. |
| 2002/0199106 A1 | 12/2002 | Hayashi |
| 2003/0081145 A1 | 5/2003 | Seaman et al. |
| 2003/0103670 A1 | 6/2003 | Schoelkopf et al. |
| 2003/0117511 A1 | 6/2003 | Belz et al. |
| 2003/0123700 A1 | 7/2003 | Wakao |
| 2003/0133018 A1 | 7/2003 | Ziemkowski |
| 2003/0147252 A1 | 8/2003 | Fioravanti |
| 2003/0156077 A1 | 8/2003 | Balogh |
| 2004/0002179 A1 | 1/2004 | Barton et al. |
| 2004/0012688 A1 | 1/2004 | Tinnerinno et al. |
| 2004/0012689 A1 | 1/2004 | Tinnerinno et al. |
| 2004/0101166 A1 | 5/2004 | Williams et al. |
| 2004/0114176 A1 | 6/2004 | Bodin et al. |
| 2004/0135780 A1 | 7/2004 | Nims |
| 2004/0189686 A1 | 9/2004 | Tanguay et al. |
| 2004/0257360 A1 | 12/2004 | Sieckmann |
| 2005/0031203 A1 | 2/2005 | Fukuda |
| 2005/0049500 A1 | 3/2005 | Babu et al. |
| 2005/0052543 A1 | 3/2005 | Li et al. |
| 2005/0080602 A1 | 4/2005 | Snyder et al. |
| 2005/0162540 A1 | 7/2005 | Yata |
| 2005/0212918 A1 | 9/2005 | Serra et al. |
| 2005/0276441 A1 | 12/2005 | Debevec |
| 2006/0023066 A1 | 2/2006 | Li et al. |
| 2006/0050170 A1 | 3/2006 | Tanaka |
| 2006/0056040 A1 | 3/2006 | Lan |
| 2006/0056604 A1 | 3/2006 | Sylthe et al. |
| 2006/0072175 A1 | 4/2006 | Oshino |
| 2006/0082879 A1 | 4/2006 | Miyoshi et al. |
| 2006/0130017 A1 | 6/2006 | Cohen et al. |
| 2006/0208259 A1 | 9/2006 | Jeon |
| 2006/0248348 A1 | 11/2006 | Wakao et al. |
| 2006/0256226 A1 | 11/2006 | Alon et al. |
| 2006/0274210 A1 | 12/2006 | Kim |
| 2006/0285741 A1 | 12/2006 | Subbarao |
| 2007/0008317 A1 | 1/2007 | Lundstrom |
| 2007/0019883 A1 | 1/2007 | Wong et al. |
| 2007/0030357 A1 | 2/2007 | Levien et al. |
| 2007/0033588 A1 | 2/2007 | Landsman |
| 2007/0052810 A1 | 3/2007 | Monroe |
| 2007/0071316 A1 | 3/2007 | Kubo |
| 2007/0081081 A1 | 4/2007 | Cheng |
| 2007/0097206 A1 | 5/2007 | Houvener |
| 2007/0103558 A1 | 5/2007 | Cai et al. |
| 2007/0113198 A1 | 5/2007 | Robertson et al. |
| 2007/0140676 A1 | 6/2007 | Nakahara |
| 2007/0188613 A1 | 8/2007 | Norbori et al. |
| 2007/0201853 A1 | 8/2007 | Petschnigg |
| 2007/0229653 A1 | 10/2007 | Matusik et al. |
| 2007/0230944 A1 | 10/2007 | Georgiev |
| 2007/0269108 A1 | 11/2007 | Steinberg et al. |
| 2008/0007626 A1 | 1/2008 | Wernersson |
| 2008/0012988 A1 | 1/2008 | Baharav et al. |
| 2008/0018668 A1 | 1/2008 | Yamauchi |
| 2008/0031537 A1 | 2/2008 | Gutkowicz-Krusin et al. |
| 2008/0049113 A1 | 2/2008 | Hirai |
| 2008/0056569 A1 | 3/2008 | Williams et al. |
| 2008/0122940 A1 | 5/2008 | Mori |
| 2008/0129728 A1 | 6/2008 | Satoshi |
| 2008/0144952 A1 | 6/2008 | Chen et al. |
| 2008/0152215 A1 | 6/2008 | Horie et al. |
| 2008/0168404 A1 | 7/2008 | Ording |
| 2008/0180792 A1 | 7/2008 | Georgiev |
| 2008/0187305 A1 | 8/2008 | Raskar et al. |
| 2008/0193026 A1 | 8/2008 | Horie et al. |
| 2008/0205871 A1 | 8/2008 | Utagawa |
| 2008/0226274 A1 | 9/2008 | Spielberg |
| 2008/0232680 A1 | 9/2008 | Berestov et al. |
| 2008/0253652 A1 | 10/2008 | Gupta et al. |
| 2008/0260291 A1 | 10/2008 | Alakarhu et al. |
| 2008/0266688 A1 | 10/2008 | Errando Smet et al. |
| 2008/0277566 A1 | 11/2008 | Utagawa |
| 2008/0309813 A1 | 12/2008 | Watanabe |
| 2008/0316301 A1 | 12/2008 | Givon |
| 2009/0027542 A1 | 1/2009 | Yamamoto et al. |
| 2009/0041381 A1 | 2/2009 | Georgiev et al. |
| 2009/0041448 A1 | 2/2009 | Georgiev et al. |
| 2009/0070710 A1 | 3/2009 | Kagaya |
| 2009/0128658 A1 | 5/2009 | Hayasaka et al. |
| 2009/0128669 A1 | 5/2009 | Ng et al. |
| 2009/0135258 A1 | 5/2009 | Nozaki |
| 2009/0140131 A1 | 6/2009 | Utagawa |
| 2009/0102956 A1 | 7/2009 | Georgiev |
| 2009/0185051 A1 | 7/2009 | Sano |
| 2009/0185801 A1 | 7/2009 | Georgiev et al. |
| 2009/0190022 A1 | 7/2009 | Ichimura |
| 2009/0190024 A1 | 7/2009 | Hayasaka et al. |
| 2009/0195689 A1 | 8/2009 | Hwang et al. |
| 2009/0202235 A1 | 8/2009 | Li et al. |
| 2009/0204813 A1 | 8/2009 | Kwan |
| 2009/0273843 A1 | 11/2009 | Raskar et al. |

(56) References Cited

U.S. PATENT DOCUMENTS

| | | |
|---|---|---|
| 2009/0295829 A1 | 12/2009 | Georgiev et al. |
| 2009/0309973 A1 | 12/2009 | Kogane |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277617 A1 | 11/2010 | Hollinger |
| 2010/0277629 A1 | 11/2010 | Tanaka |
| 2010/0303288 A1 | 12/2010 | Malone |
| 2010/0328485 A1 | 12/2010 | Imamura et al. |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0261164 A1 | 10/2011 | Olesen et al. |
| 2011/0261205 A1 | 10/2011 | Sun |
| 2011/0267263 A1 | 11/2011 | Hinckley |
| 2011/0273466 A1 | 11/2011 | Imai et al. |
| 2011/0133649 A1 | 12/2011 | Bales et al. |
| 2011/0292258 A1 | 12/2011 | Adler |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0050562 A1 | 3/2012 | Perwass et al. |
| 2012/0056889 A1 | 3/2012 | Carter et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0271115 A1 | 10/2012 | Buerk |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222606 A1* | 8/2013 | Pitts .............. H04N 5/2254 348/187 |
| 2013/0222656 A1 | 8/2013 | Kaneko |
| 2013/0234935 A1 | 9/2013 | Griffith |
| 2013/0242137 A1 | 9/2013 | Kirkland |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0176540 A1 | 6/2014 | Tosic et al. |
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |

(56) References Cited

U.S. PATENT DOCUMENTS

| | | |
|---|---|---|
| 2014/0240463 A1 | 8/2014 | Pitts et al. |
| 2014/0240578 A1 | 8/2014 | Fishman et al. |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0029386 A1 | 1/2015 | Pitts et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0146051 A1* | 5/2015 | Abe .................... H04N 5/2254 348/262 |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0237273 A1 | 8/2015 | Sawadaishi |
| 2015/0104101 A1 | 10/2015 | Bryant et al. |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0370011 A1 | 12/2015 | Ishihara |
| 2015/0370012 A1 | 12/2015 | Ishihara |
| 2016/0029017 A1 | 1/2016 | Liang |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight |
| 2016/0191823 A1 | 6/2016 | El-Ghoroury |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0353026 A1 | 12/2016 | Blonde et al. |
| 2016/0381348 A1 | 12/2016 | Hayasaka |
| 2017/0059305 A1 | 3/2017 | Nonn et al. |
| 2017/0067832 A1 | 3/2017 | Ferrara, Jr. et al. |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0237971 A1 | 8/2017 | Pitts et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0358092 A1 | 12/2017 | Bleibel et al. |
| 2017/0365068 A1 | 12/2017 | Tan et al. |
| 2018/0012397 A1 | 1/2018 | Carothers |
| 2018/0020204 A1 | 1/2018 | Pang et al. |
| 2018/0033209 A1 | 2/2018 | Akeley et al. |
| 2018/0034134 A1 | 2/2018 | Pang et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0158198 A1 | 6/2018 | Kamad |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

U.S. Appl. No. 15/666,298, filed Aug. 1, 2017 listing Yonggang Ha et al. as inventors, entitled "Focal Reducer With Controlled Optical Properties for Interchangeable Lens Light-Field Camera".

U.S. Appl. No. 15/590,808, filed May 9, 2017 listing Alex Song et al. as inventors, entitled "Adaptive Control for Immersive Experience Delivery".

U.S. Appl. No. 15/864,938, filed Jan. 8, 2018 listing Jon Karafin et al. as inventors, entitled "Motion Blur for Light-Field Images".

U.S. Appl. No. 15/703,553, filed Sep. 13, 2017 listing Jon Karafin et al. as inventors, entitled "4D Camera Tracking and Optical Stabilization".

U.S. Appl. No. 15/590,841, filed May 9, 2017 listing Kurt Akeley et al. as inventors, entitled "Vantage Generation and Interactive Playback".

U.S. Appl. No. 15/590,951, filed May 9, 2017 listing Alex Song et al. as inventors, entitled "Wedge-Based Light-Field Video Capture".

U.S. Appl. No. 15/944,551, filed Apr. 3, 2018 listing Zejing Wang et al. as inventors, entitled "Generating Dolly Zoom Effect Using Light Field Image Data".

U.S. Appl. No. 15/874,723, filed Jan. 18, 2018 listing Mark Weir et al. as inventors, entitled "Multi-Camera Navigation Interface".

U.S. Appl. No. 15/897,994, filed Feb. 15, 2018 listing Trevor Carothers et al. as inventors, entitled "Generation of Virtual Reality With 6 Degrees of Freesom From Limited Viewer Data".

U.S. Appl. No. 15/605,037, filed May 25, 2017 listing Zejing Wang et al. as inventors, entitled "Multi-View Back-Projection to a Light-Field".

U.S. Appl. No. 15/897,836, filed Feb. 15, 2018 listing Francois Bleibel et al. as inventors, entitled "Multiview Contour Tracking".

U.S. Appl. No. 15/897,942, filed Feb. 15, 2018 listing Francois Bleibel et al. as inventors, entitled "Multi-View Contour Tracking With Grabcut".

Adelsberger, R. et al., "Spatially Adaptive Photographic Flash," ETH Zurich, Department of Computer Science, Technical Report 612, 2008, pp. 1-12.

Adelson et al., "Single Lens Stereo with a Plenoptic Camera" IEEE Translation on Pattern Analysis and Machine Intelligence, Feb. 1992. vol. 14, No. 2, pp. 99-106.

Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.

Adobe Systems Inc, "XMP Specification", Sep. 2005.

Adobe, "Photoshop CS6 / in depth: Digital Negative (DNG)", http://www.adobe.com/products/photoshop/extend.displayTab2html. Retrieved Jan. 2013.

Agarwala, A., et al., "Interactive Digital Photomontage," ACM Transactions on Graphics, Proceedings of SIGGRAPH 2004, vol. 32, No. 3, 2004.

Andreas Observatory, Spectrograph Manual: IV. Flat-Field Correction, Jul. 2006.

Apple, "Apple iPad: Photo Features on the iPad", Retrieved Jan. 2013.

Bae, S., et al., "Defocus Magnification", Computer Graphics Forum, vol. 26, Issue 3 (Proc. of Eurographics 2007), pp. 1-9.

Belhumeur, Peter et al., "The Bas-Relief Ambiguity", International Journal of Computer Vision, 1997, pp. 1060-1066.

Belhumeur, Peter, et al., "The Bas-Relief Ambiguity", International Journal of Computer Vision, 1999, pp. 33-44, revised version.

Bhat, P. et al. "GradientShop: A Gradient-Domain Optimization Framework for Image and Video Filtering," SIGGRAPH 2010; 14 pages.

Bolles, R., et al., "Epipolar-Plane Image Analysis: An Approach to Determining Structure from Motion", International Journal of Computer Vision, 1, 7-55 (1987).

(56) References Cited

OTHER PUBLICATIONS

Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.
Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, 2 (Mar. 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Wikipedia—Extensible Metadata Platform: http://en.wikipedia.org/wiki/Extensible_Metadata_Plafform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.
Nimeroff, J., et al., "Efficient rendering of naturally illuminatied environments" in Fifth Eurographics Workshop on Rendering, 359-373, 1994.
Nokia, "City Lens", May 2012.
Ogden, J., "Pyramid-Based Computer Graphics", 1985.
Okano et al., "Three-dimensional video system based on integral photography" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.

(56) References Cited

OTHER PUBLICATIONS

Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics(SIGGRAPH Proceedings), 2006.
Sokolov, "Autostereoscopy and Integral Photography by Professor Lippmann's Method" , 1911, pp. 23-29.
Sony Corp, "Interchangeable Lens Digital Camera Handbook", 2011.
Stensvold, M., "Hybrid AF: A New Approach to Autofocus is Emerging for both Still and Video", Digital Photo Magazine, Nov. 13, 2012.
Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/Expeed. Retrieved Jan. 15, 2014.
Georgiev, T., et al., "Suppersolution with Plenoptic 2.0 Cameras," Optical Society of America 2009; pp. 1-3.
Georgiev, T., et al., "Unified Frequency Domain Analysis of Lightfield Cameras" (2008).
Georgiev, T., et al., Plenoptic Camera 2.0 (2008).
Girod, B., "Mobile Visual Search", IEEE Signal Processing Magazine, Jul. 2011.
Gortler et al., "The lumigraph" SIGGRAPH 96, pp. 43-54.
Groen et al., "A Comparison of Different Focus Functions for Use in Autofocus Algorithms," Cytometry 6:81-91, 1985.
Haeberli, Paul "A Multifocus Method for Controlling Depth of Field" GRAPHICA Obscura, 1994, pp. 1-3.
Heide, F. et al., "High-Quality Computational Imaging Through Simple Lenses," ACM Transactions on Graphics, SIGGRAPH 2013; pp. 1-7.
Heidelberg Collaboratory for Image Processing, "Consistent Depth Estimation in a 4D Light Field," May 2013.
Hirigoyen, F., et al., "1.1 um Backside Imager vs. Frontside Image: an optics-dedicated FDTD approach", IEEE 2009 International Image Sensor Workshop.
Huang, Fu-Chung et al., "Eyeglasses-free Display: Towards Correcting Visual Aberrations with Computational Light Field Displays," ACM Transaction on Graphics, Aug. 2014, pp. 1-12.
Isaksen, A., et al., "Dynamically Reparameterized Light Fields," SIGGRAPH 2000, pp. 297-306.
Ives H., "Optical properties of a Lippman lenticulated sheet," J. Opt. Soc. Am. 21, 171 (1931).
Ives, H. "Parallax Panoramagrams Made with a Large Diameter Lens", Journal of the Optical Society of America; 1930.
Jackson et al., "Selection of a Convolution Function for Fourier Inversion Using Gridding" IEEE Transactions on Medical Imaging, Sep. 1991, vol. 10, No. 3, pp. 473-478.
Kautz, J., et al., "Fast arbitrary BRDF shading for low-frequency lighting using spherical harmonics", in Eurographic Rendering Workshop 2002, 291-296.
Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , Mar. 4, 1908, pp. 821-825.
Lumsdaine et al., "Full Resolution Lightfield Rendering" Adobe Technical Report Jan. 2008, pp. 1-12.

(56) References Cited

OTHER PUBLICATIONS

Maeda, Y. et al., "A CMOS Image Sensor with Pseudorandom Pixel Placement for Clear Imaging," 2009 International Symposium on Intelligent Signal Processing and Communication Systems, Dec. 2009.

Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.

Mallat, Stephane, "A Wavelet Tour of Signal Processing", Academic Press 1998.

Malzbender, et al., "Polynomial Texture Maps", Proceedings SIGGRAPH 2001.

Marshall, Richard J. et al., "Improving Depth Estimation from a Plenoptic Camera by Patterned Illumination," Proc. of SPIE, vol. 9528, 2015, pp. 1-6.

Masselus, Vincent, et al., "Relighting with 4D Incident Light Fields", SIGGRAPH 2003.

Meynants, G., et al., "Pixel Binning in CMOS Image Sensors," Frontiers in Electronic Imaging Conference, 2009.

Moreno-Noguer, F. et al., "Active Refocusing of Images and Videos," ACM Transactions on Graphics, Aug. 2007; pp. 1-9.

Munkberg, J. et al., "Layered Reconstruction for Defocus and Motion Blur" EGSR 2014, pp. 1-12.

Naemura et al., "3-D Computer Graphics based on Integral Photography" Optics Express, Feb. 12, 2001. vol. 8, No. 2, pp. 255-262.

Nakamura, J., "Image Sensors and Signal Processing for Digital Still Cameras" (Optical Science and Engineering), 2005.

National Instruments, "Anatomy of a Camera," pp. 1-5, Sep. 6, 2006.

Nayar, Shree, et al., "Shape from Focus", IEEE Transactions on Pattern Analysis and Machine Intelligence, vol. 16, No. 8, pp. 824-831, Aug. 1994.

Ng, R., et al. "Light Field Photography with a Hand-held Plenoptic Camera," Stanford Technical Report, CSTR 2005-2, 2005.

Ng, R., et al., "All-Frequency Shadows Using Non-linear Wavelet Lighting Approximation. ACM Transactions on Graphics," ACM Transactions on Graphics; Proceedings of SIGGRAPH 2003.

Ng, R., et al., "Triple Product Wavelet Integrals for All-Frequency Relighting", ACM Transactions on Graphics (Proceedings of SIGGRAPH 2004).

Ng, Yi-Ren, "Digital Light Field Photography," Doctoral Thesis, Standford University, Jun. 2006; 203 pages.

Ng., R., "Fourier Slice Photography," ACM Transactions on Graphics, Proceedings of SIGGRAPH 2005, vol. 24, No. 3, 2005, pp. 735-744.

Nguyen, Hubert. "Practical Post-Process Depth of Field." GPU Gems 3. Upper Saddle River, NJ: Addison-Wesley, 2008.

Roper Scientific Germany, "Fiber Optics", 2012.

Sony's First Curved Sensor Photo: http://www.engadget.com. Jul. 2014.

\* cited by examiner

| Parameter | Spec | Notes |
|---|---|---|
| Diameter (large end) | >= 75.0 mm | Final part is >= 60.0 mm x 45.0 mm, rect |
| Diameter (small end) | 28.1 mm | Final part is 22.5 x 16.9 mm, rect |
| Magnification | 2.67 | |
| Fiber size (small end) | <= 3.0 um | |
| NA (small end) | 1.0 | |
| Transmission spectrum | 450 – 750nm | Visible spectrum for CMOS imager |
| Transmission% (in fiber) | >80% | Across transmission spectrum |
| Transmission% (total, e to e) | >50% | Across transmission spectrum |
| Distortion | <2% | |
| AR coating | Yes | |
| Length | Any | |

FIG. 8b

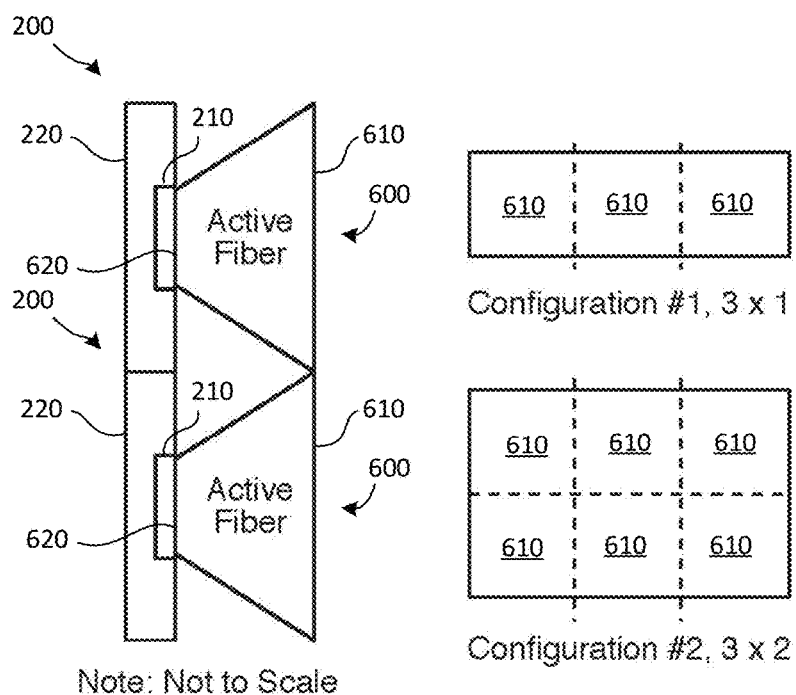

FIG. 9

Design:

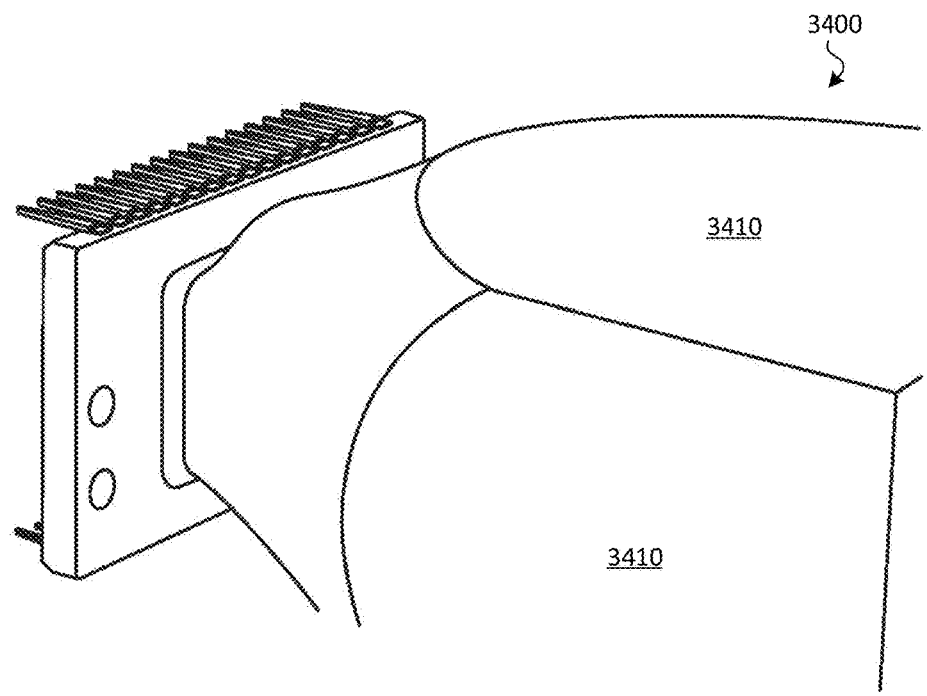
FIG. 34
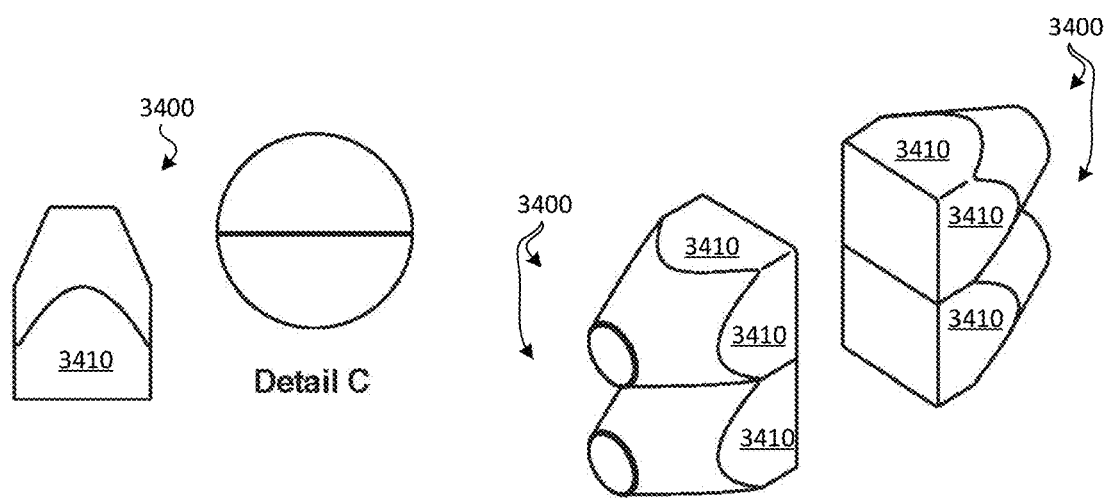
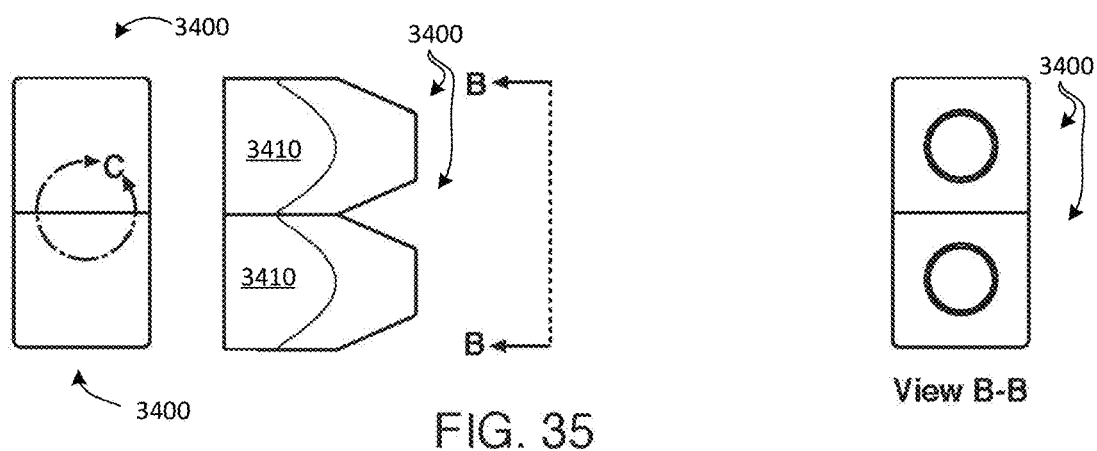
FIG. 35

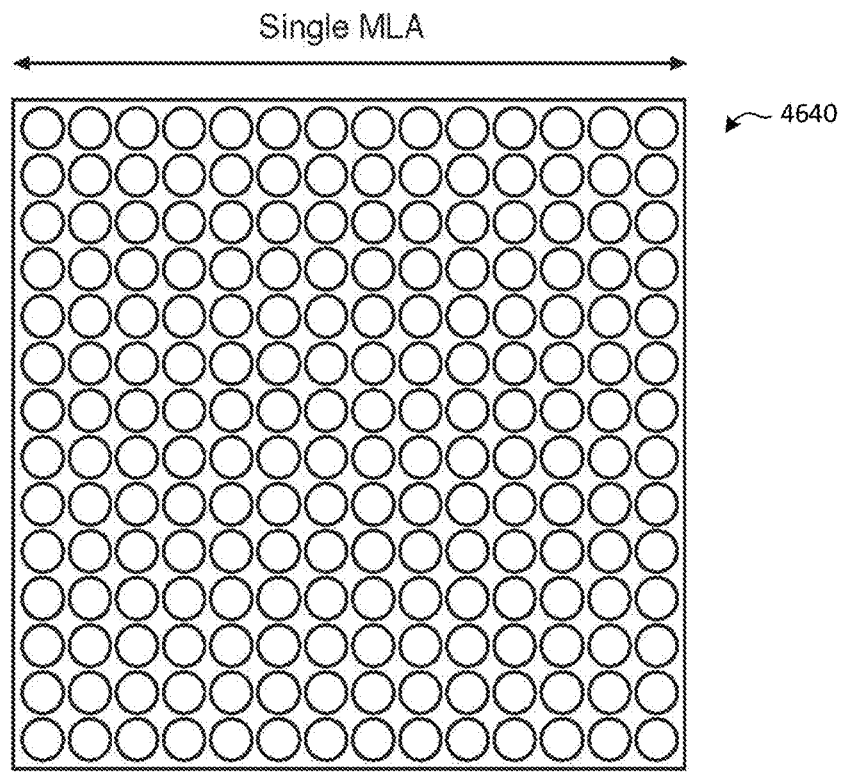
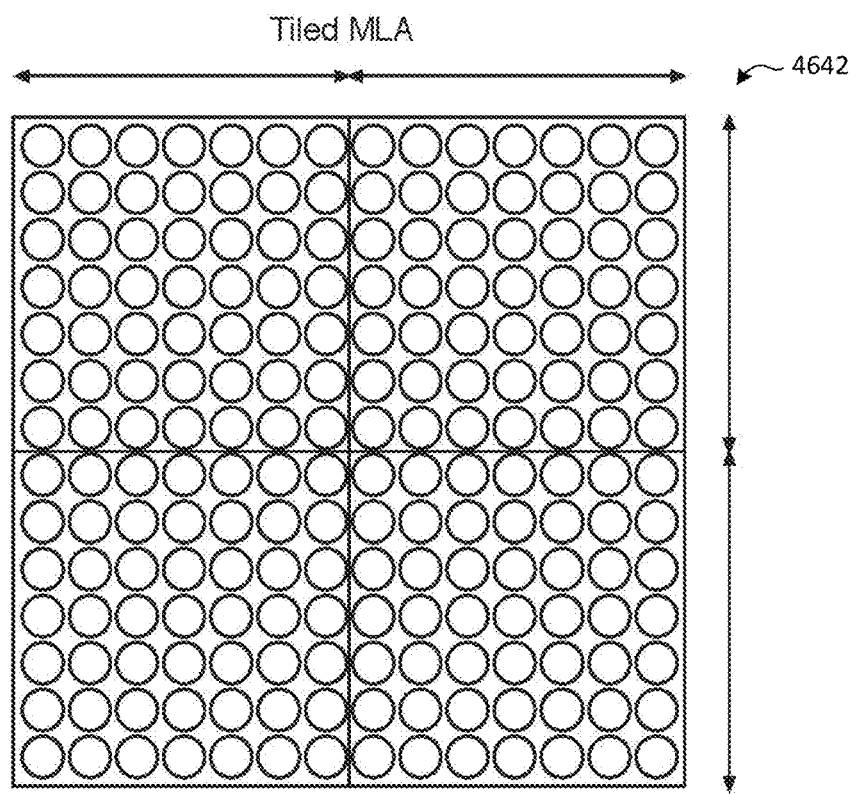
FIG. 46b

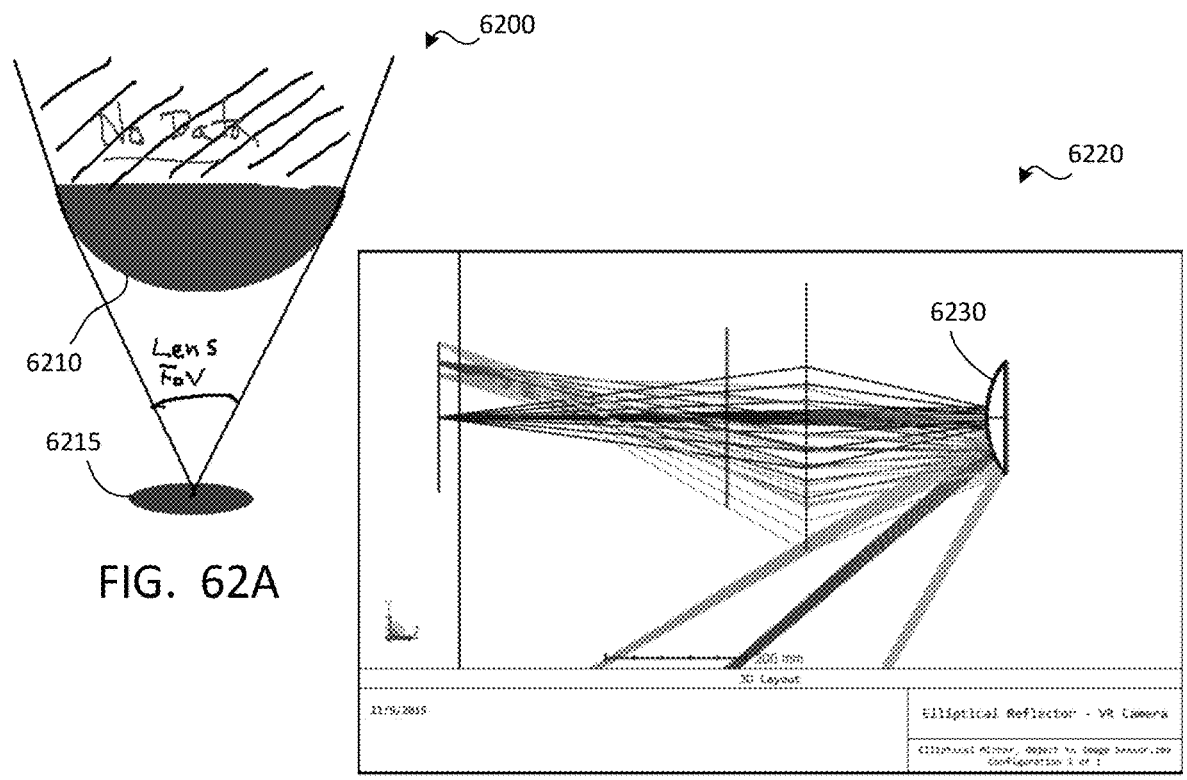
FIG. 62A
FIG. 62B
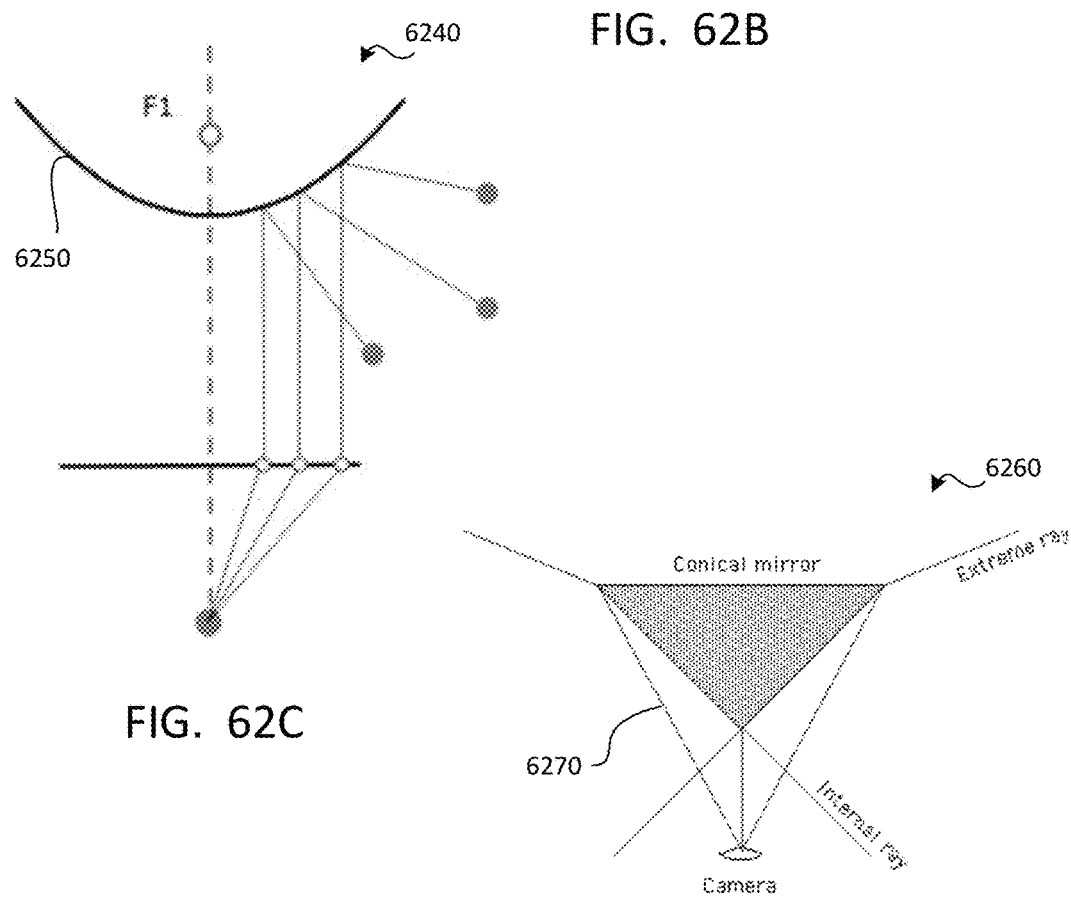
FIG. 62C
FIG. 62D

3D View
Conic Design

3D View
Pyramid Design

Output confined to 30 deg (+/-15 deg) circular emission. Note: extremes of laser (1, -1, 15, -15 deg) traced. Laser rotated through 360 degrees.

Output: 90 deg x 60 deg (+/-45 x +/-30).

VIDEO CAPTURE, PROCESSING, CALIBRATION, COMPUTATIONAL FIBER ARTIFACT REMOVAL, AND LIGHT-FIELD PIPELINE

CROSS-REFERENCE TO RELATED APPLICATIONS

The present application claims the benefit of U.S. Provisional Patent Application Ser. No. 62/305,917 for "Video Capture, Processing, Calibration, Computational Fiber Artifact Removal, and Light-field Pipeline," filed Mar. 9, 2016, the disclosure of which is incorporated herein by reference in its entirety.

The present application is also a continuation-in-part of U.S. patent application Ser. No. 15/098,674 for "Light Guided Image Plane Tiled Arrays with Dense Fiber Optic Bundles for Light-Field and High Resolution Image Acquisition," filed Apr. 14, 2016, the disclosure of which is incorporated herein by reference in its entirety.

U.S. patent application Ser. No. 15/098,674 claims the benefit of U.S. Provisional Application Ser. No. 62/148,055 for "Light Guided Image Plane Tiled Arrays with Dense Fiber Optic Bundles for Light-Field and High Resolution Image Acquisition", filed Apr. 15, 2015, the disclosure of which is incorporated herein by reference in its entirety.

U.S. patent application Ser. No. 15/098,674 also claims the benefit of U.S. Provisional Application Ser. No. 62/200,804 for "Light Guided Image Plane Tiled Arrays with Dense Fiber Optic Bundles for Light-Field Display", filed Aug. 4, 2015, the disclosure of which is incorporated herein by reference in its entirety.

U.S. patent application Ser. No. 15/098,674 also claims the benefit of U.S. Provisional Application Ser. No. 62/305,917 for "Video Capture, Processing, Calibration, Computational Fiber Artifact Removal, and Light-field Pipeline", filed Mar. 9, 2016, the disclosure of which is incorporated herein by reference in its entirety.

TECHNICAL FIELD

The present document relates to various techniques for improving image capture from a high-resolution light guided image plane tiled array system leveraging dense fiber optic bundles.

BACKGROUND

CMOS, CCD and other image acquisition technologies are traditionally manufactured based upon 2D, industrial and/or other traditionally (potentially) mass-produced consumer requirements. This results in the need for custom silicon, sensors, electronics, and the like for niche markets, including light-field and ultra-high-resolution image acquisition.

The digital imaging industry continues to push the boundaries of bleeding edge acquisition technologies, with particular focus on higher resolutions, higher dynamic range, and a wider gamut of still and video capture formats. Accordingly, it is becoming increasingly challenging to achieve the imaging requirements for sensor pixel density, sensitivity, pixel counts, electronics, pixel pitch, data throughput, bandwidth, and the like. Some of these requirements, when used with traditional optical pathways, would require extremely complex custom silicon advances and other electronic developments that are typically beyond the current capabilities of manufacturing. Such solutions, when they are attainable with current technology, are typically expensive and time-consuming to implement.

The limitation to sensor array density involves the package and electronics size of each imaging/sensor device. Generally, these packages represent more than half of the size of the active imaging area of the individual sensor. Thus, these sensors cannot be arrayed without causing large gaps between images produced by the sensors, or overly complex and problematic optical systems to compensate for the presence of these gaps. Further, this problem is exacerbated by the electronics requirements for the interface and processing boards required to capture or transmit the data to a storage device. These gaps present a challenge that has not been successfully addressed by prior art attempts to provide higher-resolution digital image capture.

SUMMARY

According to various embodiments, the system and method described herein provide an image capture device with a plurality of image sensors and a plurality of tapered fiber optic bundles. The tapered fiber optic bundles may convey light to the image sensors in a manner that minimizes or negates the effects of gaps between the image sensors.

In order to generate high frame rate capture from a high-resolution light guided image plane tiled array system leveraging dense fiber optic bundles, a complex architectural system in combination with a computational fiber artifact removal process can be used. In at least one embodiment, a high performance data management and processing system can be implemented in support of such an architecture. Various calibration techniques may be performed on the individual image sensors before and after positioning of the microlens array. The described system can be used with state-of-the-art image processing techniques in order to achieve compelling high resolution still, video, and light-field content.

According to one embodiment, an image capture system may include a plurality of image sensors arranged in a pattern such that gaps exist between adjacent image sensors of the plurality of image sensors. Each of the image sensors may be configured to capture sensor image data. The image capture system may also have a main lens configured to direct incoming light along an optical path, a microlens array positioned within the optical path, and a plurality of tapered fiber optic bundles. Each tapered fiber optic bundle may have a leading end positioned within the optical path, and a trailing end positioned proximate one of the image sensors. The leading end may have a larger cross-sectional area than the trailing end.

According to one exemplary method, sensor data from the image sensors may be combined to generate a single light-field image that is substantially unaffected by the gaps. In some embodiments, some of the incoming light may be directed to a preview camera, which may generate a preview image representative of the single light-field image. The image capture device and/or the preview camera may be calibrated in various ways prior to image capture. The image sensor data may be transmitted to a plurality of servers for processing to generate the single light-field image. Various image processing steps may be applied to facilitate generation of the single light-field image.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

FIG. 8B is a table illustrating exemplary parameters and specifications that may be used in the construction of a camera with multiple image sensors and fiber optic bundles, according to certain embodiments.

FIG. 9 includes a side view and a front view, depicting exemplary arrangements of modules and fiber optic bundles, according to certain embodiments.

FIG. 34 is a perspective view depicting an example of a tapered fiber optic bundle with cut and polished edges, according to one embodiment.

FIG. 35 is a series of views depicting two of the tapered fiber optic bundles of FIG. 34, arranged in a 2×1 array, according to one embodiment.

FIG. 46B is a top-down view depicting an MLA as a single sheet, and an MLA as a tiled, planar array, according to certain embodiments.

FIGS. 62A through 62D depict various systems that use shaped mirrors, according to certain embodiments.

FIG. 87 is a diagram depicting an example of a line chart before fault line correction, according to one embodiment.

FIG. 88 is a diagram depicting an example of a line chart after application of the automated fault line correction process, according to one embodiment.

FIG. 89 is a diagram depicting an example of a coordinate system for a fiber mosaic array, according to one embodiment.

FIG. 90 is a diagram depicting a checkerboard chart according to one embodiment.

FIG. 91 is an example of a light-field image before lens shading is applied, according to one embodiment.

FIG. 92 is an example of a light-field image after lens shading is applied, according to one embodiment.

FIG. 93 is an example of a light-field image before standardization, after lens shading has been applied, according to one embodiment.

FIG. 94 is an example of a light-field image after standardization, according to one embodiment.

FIG. 95 is an example of tiles before a merge operation, according to one embodiment.

FIG. 96 is an example of tiles after a merge operation to define a single image, according to one embodiment.

FIG. 97 is a diagram depicting an exemplary close-up view of an influence map, according to one embodiment.

FIG. 98 is a diagram depicting exemplary disk-centers, according to one embodiment.

DEFINITIONS

Figure 1:
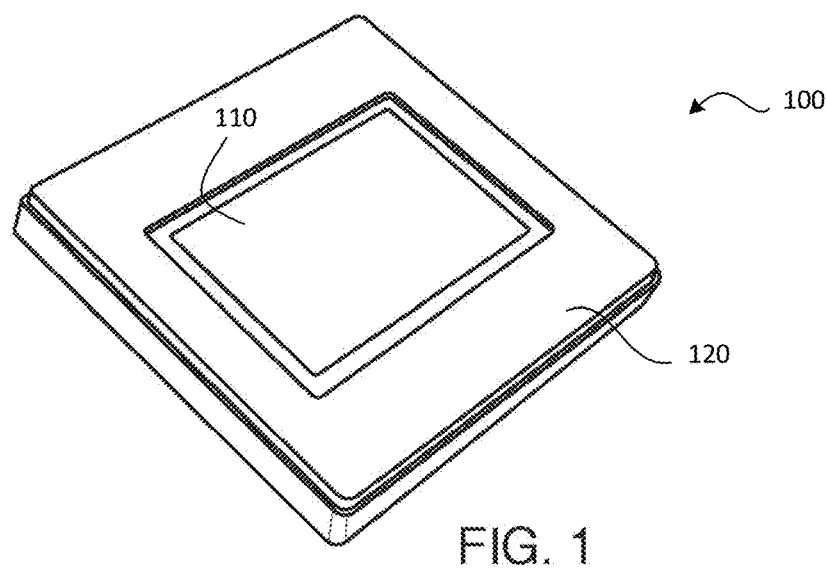
FIG. 1 is a perspective view depicting an example of an image sensor, according to one embodiment.

For purposes of the description provided herein, the following definitions are used:
   Active area: the portion of a module that receives light to be provided as image data by the module
   Beam splitter: an optical component that divides incoming light into at least two portions emitted along different vectors.
   Conventional image: an image in which the pixel values are not, collectively or individually, indicative of the angle of incidence at which light is received by a camera.
   Cylindrical shape: a shape resembling either the outward-facing (convex) shape of a cylinder, or the inward-facing (concave) shape of a cylindrical hole.
   Cylindrical pattern: a pattern of surfaces arranged in a cylindrical shape.
   Depth: a representation of distance between an object and/or corresponding image sample and a microlens array of a camera.
   Disk: a region in a light-field image that is illuminated by light passing through a single microlens; may be circular or any other suitable shape.
   Fiber optic bundle: a set of aligned optical fibers capable of transmitting light.
   Image: a two-dimensional array of pixel values, or pixels, each specifying a color.
   Input device: any device that receives input from a user.
   Leading end: the end of a fiber optic bundle that receives light.
   Light-field camera: any camera capable of capturing light-field images.
   Light-field data: data indicative of the angle of incidence at which light is received by a camera.
   Light-field image: an image that contains a representation of light-field data captured at the sensor.
   Main lens: a lens or set of lenses that directs light from a scene toward an image sensor.
   Microlens: a small lens, typically one in an array of similar microlenses.
   Microlens array: an array of microlenses arranged in a predetermined pattern.
   Module: an image sensor, including packaging.
   Optical path: the pathway followed by light after entry into an image capture device.
   Packaging: The housing, electronics, and any other components of an image sensor that reside outside the active area.
   Preview lens: a lens capable of directing at least a portion of incoming light to a preview sensor.
   Preview sensor: an image sensor capable of gathering image data that can be used to provide a real-time (or small-delay) preview image indicative of an actual image that may be generated based on the incoming light.
   Reflector: an object, such as a mirror, that has a surface that is at least partially reflective of light.
   Sensor, or "image sensor": a light detector in a camera capable of generating electrical signals based on light received by the sensor.
   Sensor image data: the data generated by an individual image sensor in response to capture of incoming light by the image sensor.
   Spherical shape: a shape resembling either the outward-facing (convex) shape of a sphere, or the inward-facing (concave) shape of a spherical cavity.
   Spherical pattern: a pattern of surfaces arranged in a spherical shape.
   Tapered fiber optic bundle, or "taper": a fiber optic bundle that is larger at one end than at the other.
   Trailing end: the end of a fiber optic bundle that emits light.

In addition to the foregoing, additional terms will be set forth and defined in the description below. Terms not explicitly defined are to be interpreted, primarily, in a manner consistently with their usage and context herein, and, secondarily, in a manner consistent with their use in the art.

For ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another. Further, many of the configurations and techniques described herein are applicable to conventional imaging as well as light-field imaging. Thus, although the following description focuses on light-field imaging, all of the following systems and methods may additionally or alternatively be used in connection with conventional digital imaging systems. In some cases, the needed modification is as simple as removing the microlens array from the configuration described for light-field imaging to convert the example into a configuration for conventional image capture.

Architecture

Figure 59:
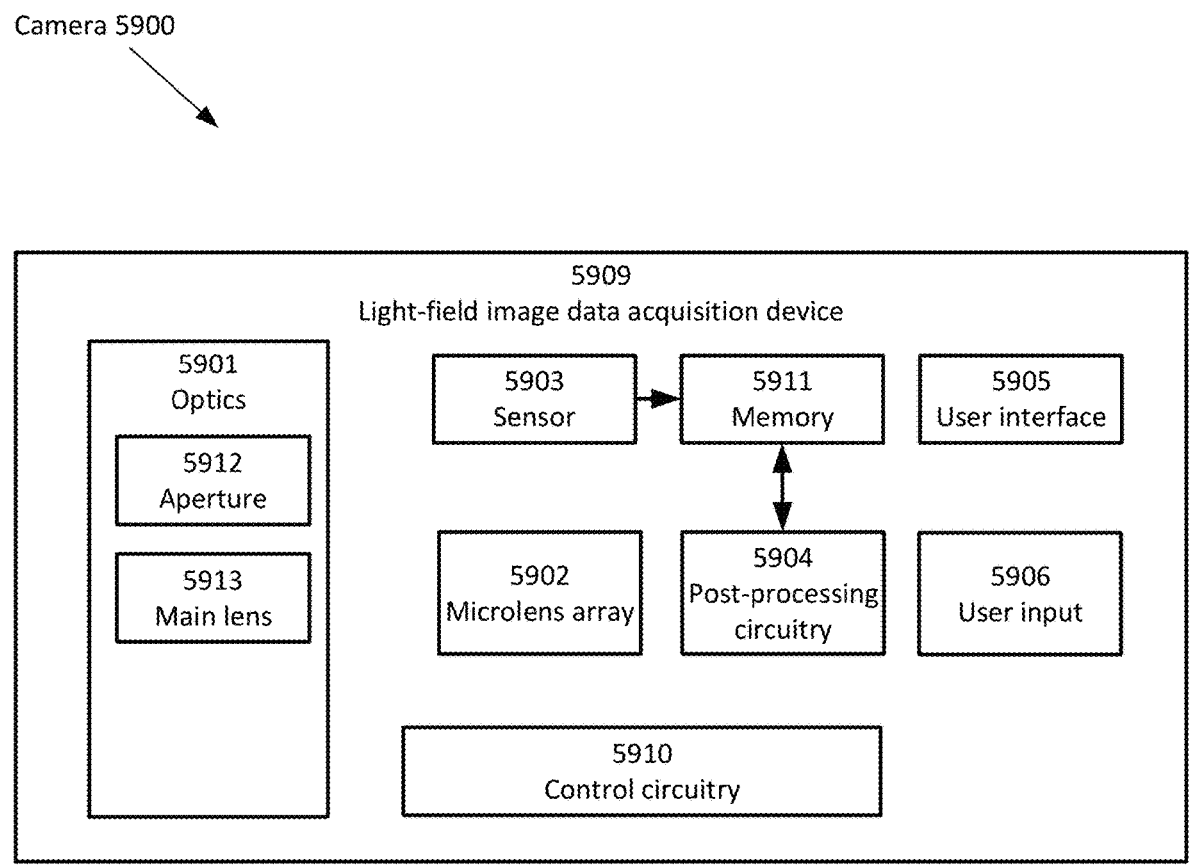
FIG. 59 depicts an example of an architecture for implementing the methods of the present disclosure in a light-field capture device, according to one embodiment.
Figure 60:
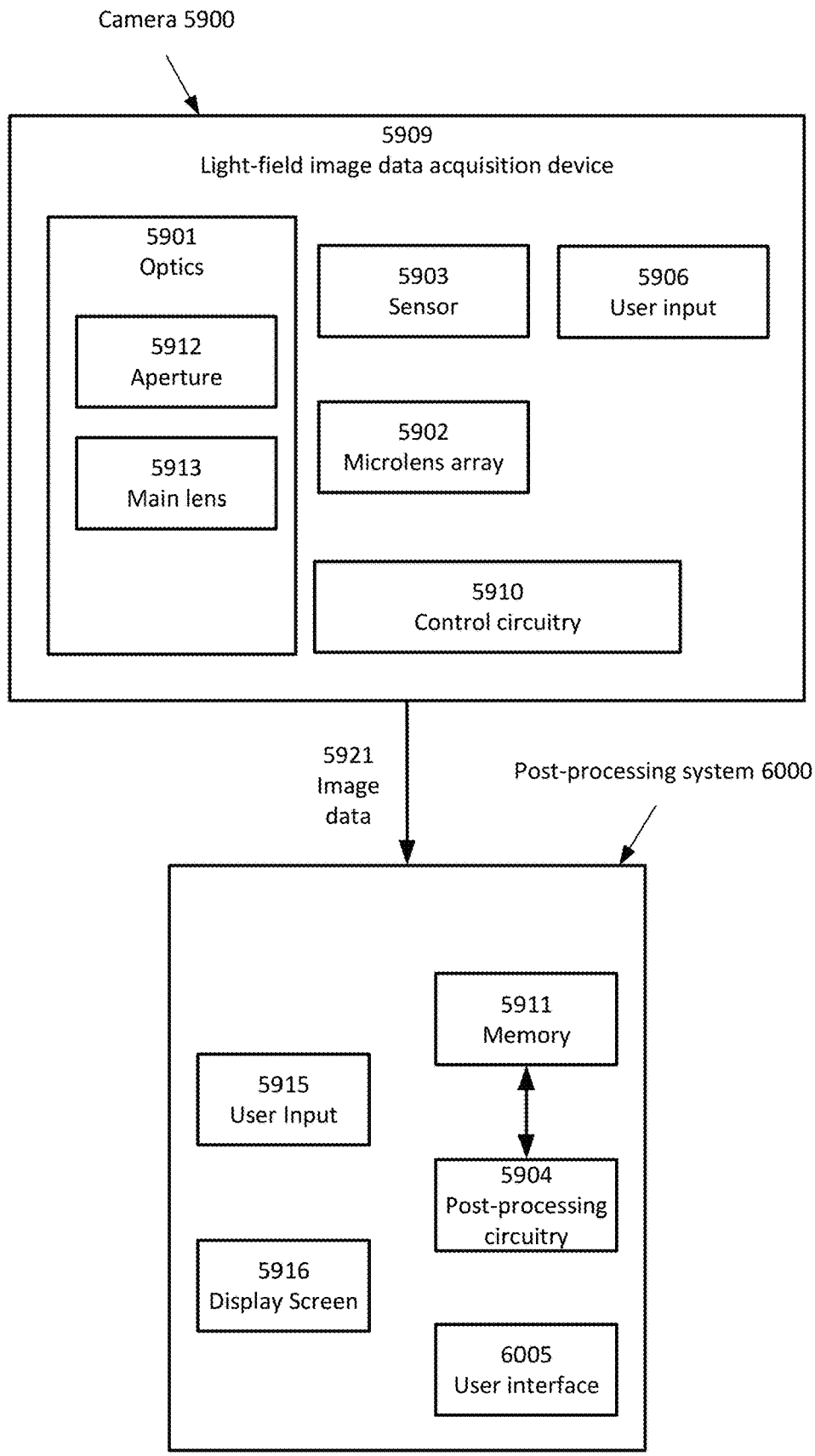
FIG. 60 depicts an example of an architecture for implementing the methods of the present disclosure in a post-processing system communicatively coupled to a light-field capture device, according to one embodiment.

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 59, there is shown a block diagram depicting an architecture for implementing the method of the present disclosure in a light-field capture device such as a camera 5900. Referring now also to FIG. 60, there is shown a block diagram depicting an architecture for implementing the method of the present disclosure in a post-processing system 6000 communicatively coupled to a light-field capture device such as a camera 5900, according to one embodiment. One skilled in the art will recognize that the particular configurations shown in FIGS. 59 and 60 are merely exemplary, and that other architectures are possible for camera 5900. One skilled in the art will further recognize that several of the components shown in the configurations of FIGS. 59 and 60 are optional, and may be omitted or reconfigured.

Figure 61:
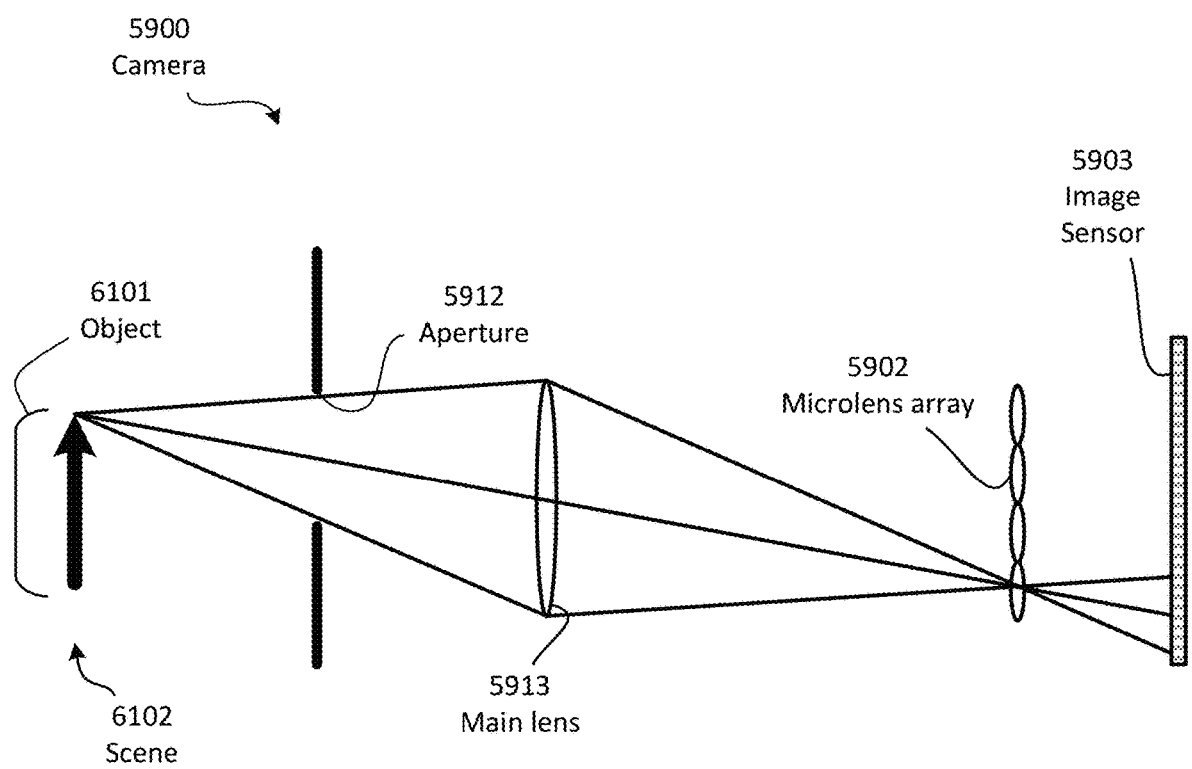
FIG. 61 depicts an example of an architecture for a light-field camera for implementing the methods of the present disclosure according to one embodiment.

In at least one embodiment, camera 5900 may be a light-field camera that includes light-field image data acquisition device 5909 having optics 5901, image sensor 5903 (including a plurality of individual sensors for capturing pixels), and microlens array 5902. Optics 5901 may include, for example, aperture 5912 for allowing a selectable amount of light into camera 5900, and main lens 5913 for focusing light toward microlens array 5902. In at least one embodiment, microlens array 5902 may be disposed and/or incorporated in the optical path of camera 5900 (between main lens 5913 and image sensor 5903) so as to facilitate acquisition, capture, sampling of, recording, and/or obtaining light-field image data via image sensor 5903. Referring now also to FIG. 61, there is shown an example of an architecture for a light-field camera, or camera 5900, for implementing the method of the present disclosure according to one embodiment. The Fig. is not shown to scale. FIG. 61 shows, in conceptual form, the relationship between aperture 5912, main lens 5913, microlens array 5902, and image sensor 5903, as such components interact to capture light-field data for one or more objects, represented by an object 6101, which may be part of a scene 6102.

In at least one embodiment, camera 5900 may also include a user interface 5905 for allowing a user to provide input for controlling the operation of camera 5900 for capturing, acquiring, storing, and/or processing image data. The user interface 5905 may receive user input from the user via an input device 5906, which may include any one or more user input mechanisms known in the art. For example, the input device 5906 may include one or more buttons, switches, touch screens, gesture interpretation devices, pointing devices, and/or the like.

Similarly, in at least one embodiment, post-processing system 6000 may include a user interface 6005 that allows the user to provide input to switch image capture modes, as will be set forth subsequently. The user interface 6005 may additionally or alternatively facilitate the receipt of user input from the user to establish one or more other image capture parameters.

In at least one embodiment, camera 5900 may also include control circuitry 5910 for facilitating acquisition, sampling, recording, and/or obtaining light-field image data. The control circuitry 5910 may, in particular, be used to switch image capture configurations in response to receipt of the corresponding user input. For example, control circuitry 5910 may manage and/or control (automatically or in response to user input) the acquisition timing, rate of acquisition, sampling, capturing, recording, and/or obtaining of light-field image data.

In at least one embodiment, camera 5900 may include memory 5911 for storing image data, such as output by image sensor 5903. Such memory 5911 can include external and/or internal memory. In at least one embodiment, memory 5911 can be provided at a separate device and/or location from camera 5900.

For example, when camera 5900 is in a light-field image capture configuration, camera 5900 may store raw light-field image data, as output by image sensor 5903, and/or a representation thereof, such as a compressed image data file. In addition, when camera 5900 is in a conventional image capture configuration, camera 5900 may store conventional image data, which may also be stored as raw, processed, and/or compressed output by the image sensor 5903.

In at least one embodiment, captured image data is provided to post-processing circuitry 5904. The post-processing circuitry 5904 may be disposed in or integrated into light-field image data acquisition device 5909, as shown in FIG. 59, or it may be in a separate component external to light-field image data acquisition device 5909, as shown in FIG. 60. Such separate component may be local or remote with respect to light-field image data acquisition device 5909. Any suitable wired or wireless protocol can be used for transmitting image data 5921 to circuitry 5904; for example, the camera 5900 can transmit image data 5921 and/or other data via the Internet, a cellular data network, a Wi-Fi network, a Bluetooth communication protocol, and/or any other suitable means.

Such a separate component may include any of a wide variety of computing devices, including but not limited to computers, smartphones, tablets, cameras, and/or any other device that processes digital information. Such a separate component may include additional features such as a user input 5915 and/or a display screen 5916. If desired, light-field image data may be displayed for the user on the display screen 5916.

Overview

Light-field images often include a plurality of projections (which may be circular or of other shapes) of aperture 5912 of camera 5900, each projection taken from a different vantage point on the camera's focal plane. The light-field image may be captured on image sensor 5903. The interposition of microlens array 5902 between main lens 5913 and image sensor 5903 causes images of aperture 5912 to be formed on image sensor 5903, each microlens in microlens array 5902 projecting a small image of main-lens aperture 5912 onto image sensor 5903. These aperture-shaped projections are referred to herein as disks, although they need not be circular in shape. The term "disk" is not intended to be limited to a circular region, but can refer to a region of any shape.

Figure 58:
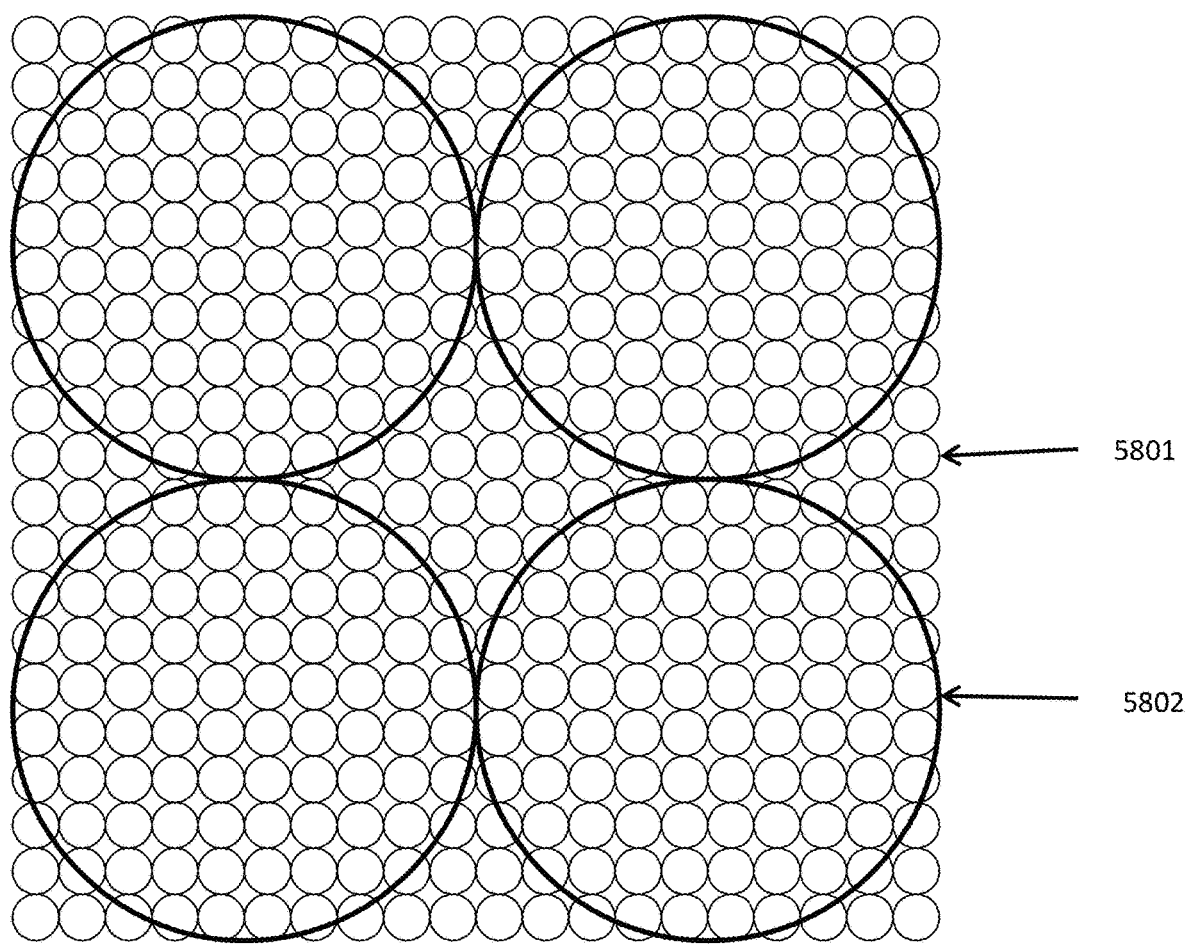
FIG. 58 depicts a portion of a light-field image.

Light-field images include four dimensions of information describing light rays impinging on the focal plane of camera 5900 (or other capture device). Two spatial dimensions (herein referred to as x and y) are represented by the disks themselves. For example, the spatial resolution of a light-field image with 120,000 disks, arranged in a Cartesian pattern 400 wide and 300 high, is 400×300. Two angular dimensions (herein referred to as u and v) are represented as the pixels within an individual disk. For example, the angular resolution of a light-field image with 100 pixels within each disk, arranged as a 10×10 Cartesian pattern, is 10×10. This light-field image has a 4-D (x,y,u,v) resolution of (400,300,10,10). Referring now to FIG. 58, there is shown an example of a 2-disk by 2-disk portion of such a light-field image, including depictions of disks 5802 and individual pixels 5801; for illustrative purposes, each disk 5802 is ten pixels 5801 across.

In at least one embodiment, the 4-D light-field representation may be reduced to a 2-D image through a process of projection and reconstruction. As described in more detail in related U.S. Utility application Ser. No. 13/774,971 for "Compensating for Variation in Microlens Position During Light-Field Image Processing," filed Feb. 22, 2013, the disclosure of which is incorporated herein by reference in its entirety, a virtual surface of projection may be introduced, and the intersections of representative rays with the virtual surface can be computed. The color of each representative ray may be taken to be equal to the color of its corresponding pixel.

Image Sensors and Packaging

The image sensor 5903 of a light-field camera, such as the camera 5900, may be of any known type. According to some embodiments, the image sensor 5903 may be of a type commonly used for digital imaging, in both light-field and conventional imaging devices. In alternative embodiments, the image sensor 5903 may be specifically designed for use in a light-field camera.

FIG. 1 is a perspective view depicting an example of an image sensor 100, according to one embodiment. The image sensor 100 has an active area 110 encircled by packaging 120. As shown, the active area 110 may be much smaller than the overall minimum size of the packaging 120.

Figure 2:
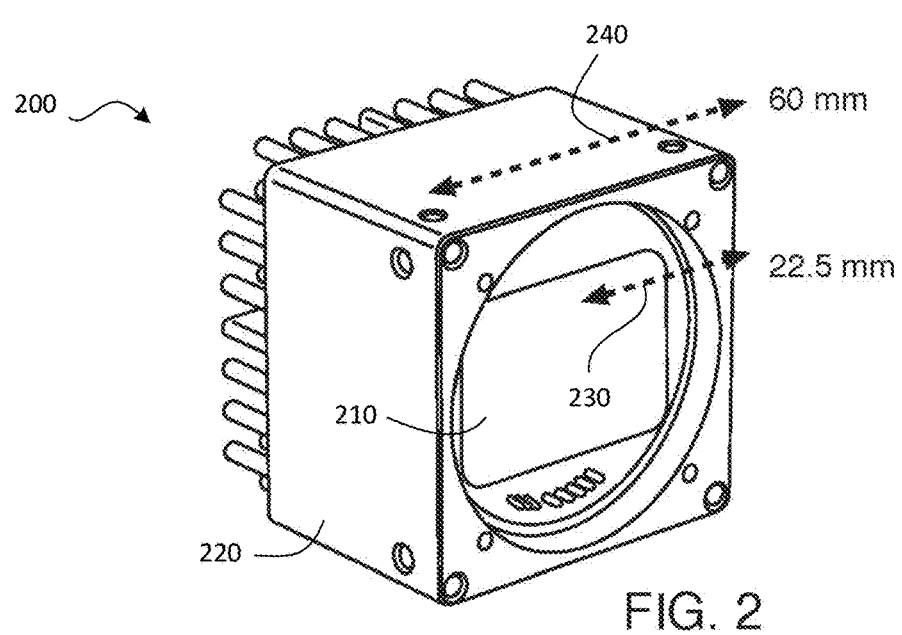
FIG. 2 is a perspective view depicting an example of a machine vision camera module, or module, that may be used in an array configuration, according to one embodiment.

FIG. 2 is a perspective view depicting an example of a machine vision camera module, or module 200, that may be used in an array configuration, according to one embodiment. The module 200 may have an active area 210 and packaging 220. The module 200 has a relatively small form factor that may provide a favorable ratio of package-to-active-area sizing, as indicated by the exemplary width 230 of the active area and width 240 of the package.

Figure 3:
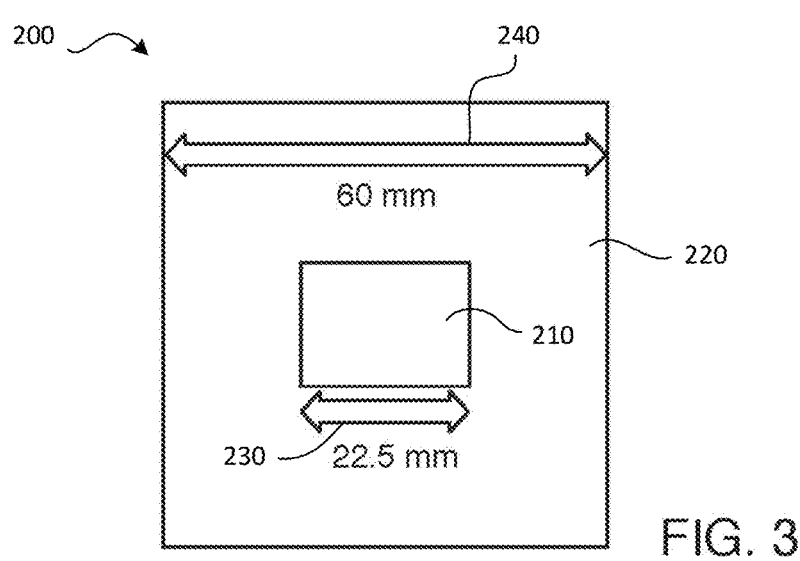
FIG. 3 is a front view of the module of FIG. 2, according to one embodiment.

FIG. 3 is a front view of the module 200 of FIG. 2, according to one embodiment. FIG. 3 depicts the width 230 and the width 240 to illustrate the footprint of the active area 210 and that of the packaging 220, which may define a sensor enclosure around the active area 210.

Figure 4A:
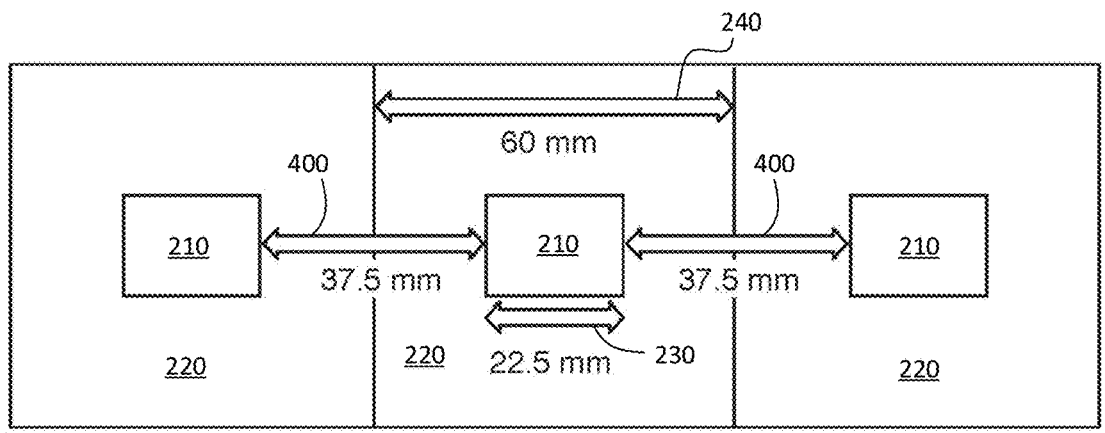
FIG. 4A is a front view of multiple modules stacked side-by-side, according to one embodiment.

FIG. 4A is a front view of multiple modules 200 stacked side-by-side, according to one embodiment. FIG. 4A illustrates the evident challenge of simply stacking sensors next to each other. The result of such stacking is the presence of gaps 400 between the active areas 210 of adjacent modules 200. Such gaps 400, if not accounted for, may cause the captured image to show corresponding discontinuities, and may also result in the inefficient capture of light, as some of the light received would not be captured by an active area 210, but would instead impinge against the package 220 of one of the modules 200.

Figure 4B:
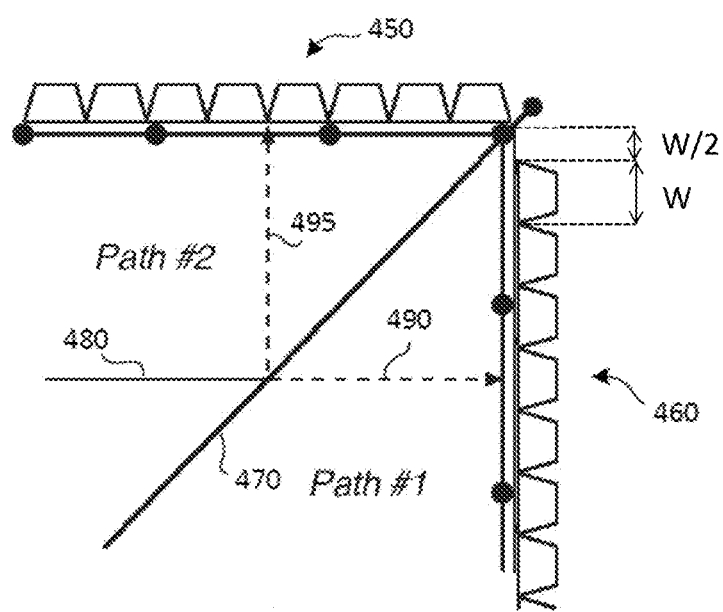
FIG. 4B is a side view depicting an example configuration in which modules are arranged into a first array and a second array, including a beam splitter, according to one embodiment.

FIG. 4B is a side view depicting an example configuration in which modules 200 are arranged into a first array 450 and a second array 460, including a beam splitter 470, according to one embodiment. The first array 450 and the second array 460 may each be generally planar, with the planes angled at 90° relative to each other. The beam splitter 470 may be positioned to divide incoming light 480 into a first beam 490 directed toward the first array 450 and a second beam 495 directed toward the second array 460.

Figure 5:
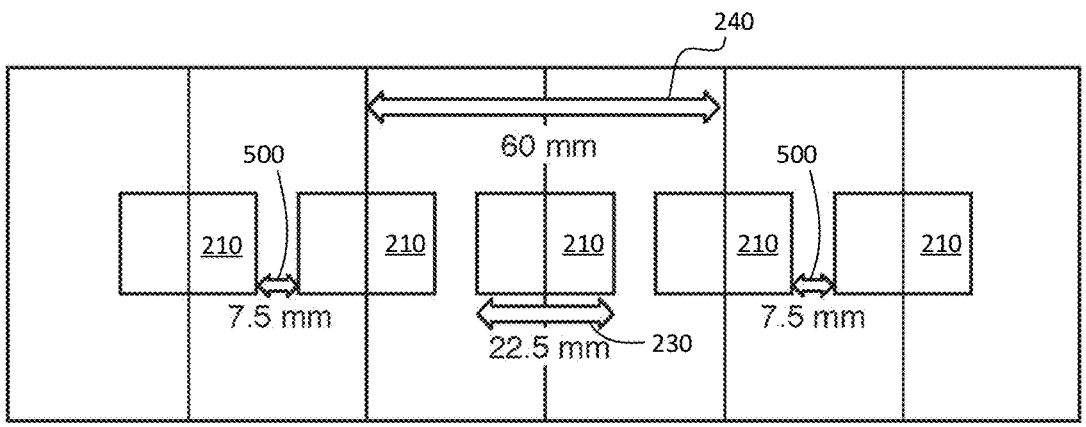
FIG. 5 is a front view depicting the arrangement of active areas and packaging that results from use of the beam splitter as shown in FIG. 4B, according to one embodiment.

FIG. 5 is a front view depicting the arrangement of active areas 210 and packaging 220 that results from use of the beam splitter 470 as shown in FIG. 4B, according to one embodiment. The beam splitter 470 may increase the density of the active areas 210 receiving light by a factor of two. FIG. 5 illustrates the virtual imaging plane that would result, although the two planes would be separated on two or more separate axes. Gaps 500 still remain between the active areas 210. Gaps 500 are smaller than the gap 400 of FIG. 4A, but may still cause the resulting image to have discontinuities.

Additional beam splitters can be added, at the expense of light efficiency. In the particular configuration depicted in FIG. 5, approximately twelve to sixteen beam split image surfaces could be used, which could correspond to six to eight beam splitters, depending on mechanical configuration, to result in a virtually contiguous image surface. However, in such a configuration, only approximately 10% of the available light would hit each pixel, which may have a detrimental effect on efficiency and image quality.

Tapered Fiber Optic Bundles

In at least one embodiment, the described system makes use of recent breakthroughs in fiber optic technologies that allow extremely dense fiber bundles to be manufactured efficiently and enable light to be rerouted and/or focused over the distance of the fiber bundle with more than 50% and, possibly even 80% or more, light transmission with very low image distortion. In particular, by modifying how these fiber bundles are manufactured, compelling advances for light-field computational imaging may be achieved. Such advances may have particular utility for video applications.

Further, in at least one embodiment, a fiber bundle manufacturing process can be used that allows for magnification or demagnification by stretching the fibers through a heat process, resulting in the ability to create an image plane at the 'magnified' end of a fiber bundle that is physically larger than the active area of a coupled image sensor at the opposite end of the fiber bundle. The image sensor may be directly mounted to the compressed and demagnified end of the fiber bundle. Each fiber can have a dimension smaller than the size of a pixel, resulting in a highly accurate averaging of light at the opposite end of the bundle, and further resulting in highly accurate light collection at the pixel level of the sensor. Further, the demagnification process may maintain an exact fiber-for-fiber alignment between the fibers at the compressed side and at the unmodified side. In this manner, the image may be magnified or demagnified with a little warping but virtually no loss of content.

In at least one embodiment, the system is implemented by optically stitching the active area of each individual image sensor so as to scale each pixel to a ratio equivalent to the required increase in active area size that is large enough to meet or exceed the minimum dimensions of the packaging. As a result, the gaps caused by image sensor packaging may be negated so that multiple image sensors may cooperate to capture an image without any optical seams (within a predetermined tolerance) between each of the discrete image sensors.

Figure 6:
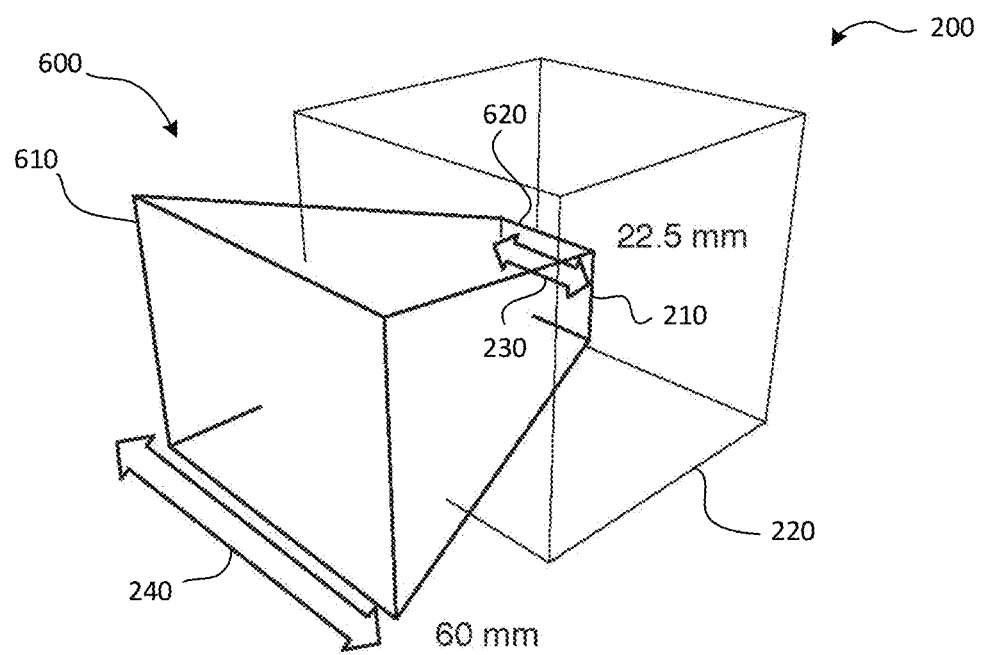
FIG. 6 is a perspective view depicting an example of an individual camera module with the narrow end of a tapered fiber optic bundle attached to the active area of the sensor, and the wide end of the tapered optical fiber bundle dimensioned to be the same width as the camera module, according to one embodiment.

FIG. 6 is a perspective view depicting an example of an individual image sensor, or module 200, with an active area 210 and packaging 220, according to one embodiment. A tapered fiber optic bundle 600, such as a bonded fiber bundle, may direct light into the active area 210. The fiber optic bundle 600 may have approximately 3× magnification along an optical axis. Thus, the fiber optic bundle 600 may have a leading end 610 that dimensionally matches the width 240 of the package 220, and a trailing end 620 that dimensionally matches the width 230 of the active area 210.

Figure 7:
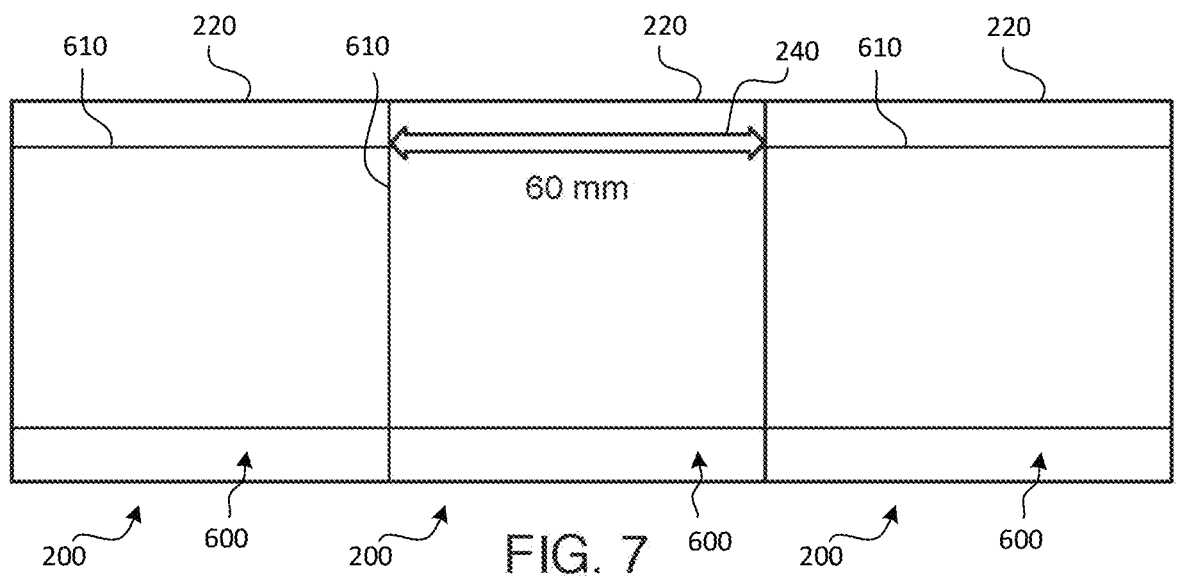
FIG. 7 is a front view depicting a 3×1 array of modules and fiber optic bundles, according to one embodiment.

FIG. 7 is a front view depicting a 3×1 array of modules 200 and tapered fiber optic bundles 600, according to one embodiment. The magnified end (i.e., the leading end 610) of each fiber optic bundle may have a width equal to or greater than the width 240 of the package 220 of each of the modules 200. The leading ends 610 of the tapered fiber optic bundles 600 may cooperate to define a single, seamless surface at the image plane. As a result, the modules 200 may cooperate to capture a single, seamless image.

Figure 8A:
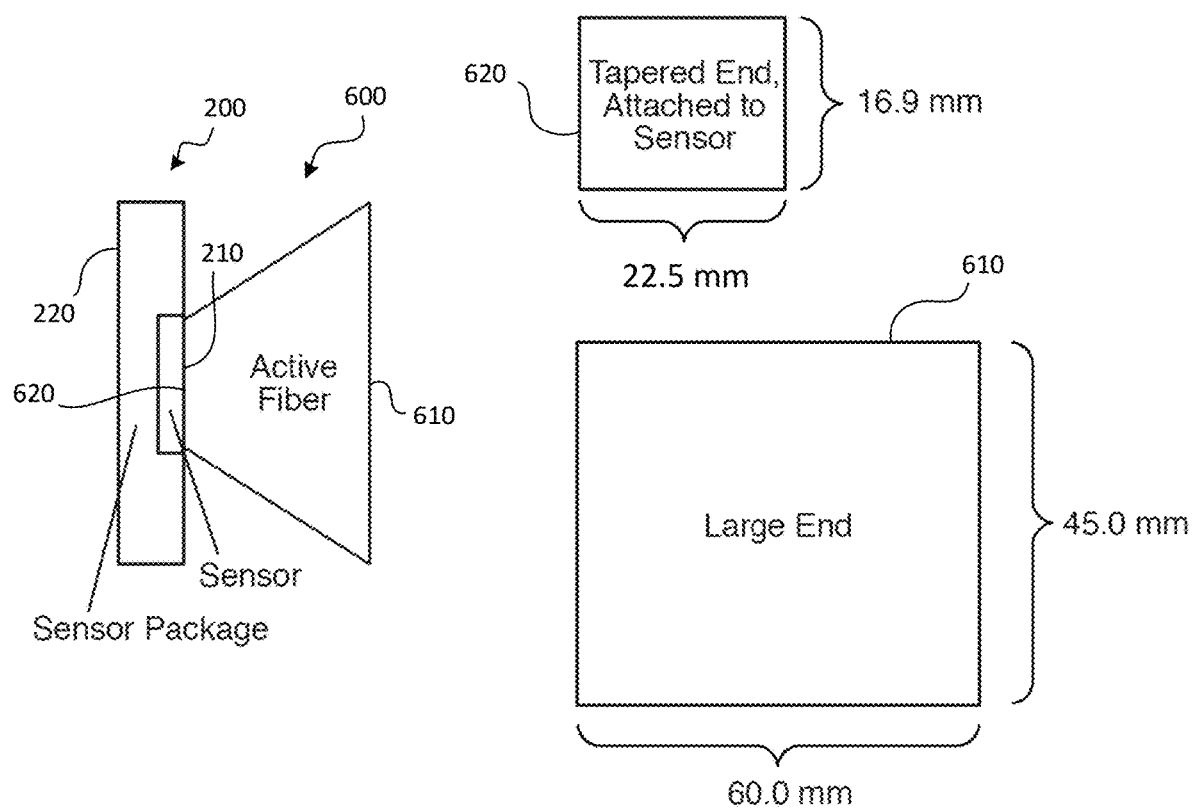
FIG. 8A includes a side view of the module and the fiber optic bundle 600 of FIG. 6, and front and rear views of the fiber optic bundle in isolation, according to one embodiment.

FIG. 8A includes a side view of the module 200 and the tapered fiber optic bundle 600 of FIG. 6, and front and rear views of the fiber optic bundle 600 in isolation, according to one embodiment. The dimensions and other values shown in FIG. 8 are merely exemplary. The "large end" may be the leading end 610 of the fiber optic bundle 600, while the "tapered end" may be the trailing end 620.

FIG. 8B is a table 850 illustrating exemplary parameters and specifications that may be used in the construction of a camera with multiple image sensors and fiber optic bundles, according to certain embodiments. The values shown in the table 850 are merely exemplary; many other configurations may be used within the scope of the present disclosure.

FIG. 9 includes a side view and a front view, depicting exemplary arrangements of modules 200 and fiber optic bundles 600, according to certain embodiments. A 3×1 configuration and a 3×2 configuration are illustrated. These particular configurations are merely exemplary; other configurations are possible to provide a wide variety of image resolutions and aspect ratios. For example, a 5×11 configuration may be used in one alternative configuration (not shown). In any case, the example shown in FIG. 9 can be used to illustrate how the modules 200 can be effectively stitched by aligning the leading ends 610 of the corresponding fiber optic bundles 600 to provide a larger overall imaging plane.

The systems and methods described herein may provide a way to use light-field customized dense fiber bundle technologies to couple multiple image sensors of existing types and sensor technologies together. These techniques may thus avoid problems with seams that may otherwise be present in the final image due to sensor package size and electronics footprint. Further, these techniques may avoid the limitations that can otherwise exist when light splitting is used to optically seam arrays together, which can reduce light transmission to a level that adds significant noise.

Further, the systems and methods described herein can improve data throughput capabilities for video applications so that they exceed the transmission capabilities of most commercially available interfaces. The ability to receive image data from multiple image sensors, in parallel, may provide such enhanced throughput rates. The system can thereby transfer and store data from array segments independently, in a manner that is beneficial and efficient from a manufacturing standpoint.

Additionally, the ability to stack professionally leveraged image sensors to form sensor arrays may allow for higher quality imaging without the need of custom silicon fabrication. The system can thereby avoid the need for a large imaging plane that could otherwise exceed full frame formats.

The described system and method may provide the ability to mount commercially available image sensors, including dies, packaging, electronics, interfaces, and/or the like, at the compressed end of the fiber bundle element. Such an arrangement may provide a virtually unlimited pixel count as well as an extremely large and seamless highly efficient imaging plane through the use of an array of fiber optic bundles and sensors, as described previously. No custom image sensor fabrication is required.

Additionally, the cost of materials for the fiber optic bundles may be very low. Process costs can be reduced by constructing a dedicated manufacturing pipeline and process by which tapered fiber optic bundles can be rapidly and inexpensively manufactured.

Various embodiments include additional enhancements. One such enhancement relates to the fact that light may exit a tapered fiber optic bundle with an increased angle, relative to the angle at which the light entered the tapered fiber optic bundle. The ratio of exit angle to entry angle may be proportional to the ratio of magnification provided by the tapered fiber optic bundle. For example, if light enters the fiber at an angle of 10 degrees relative to the axis of the fiber, and the magnification of the fiber is approximately 3:1, the angle of exit will be approximately 30 degrees.

Figure 10:
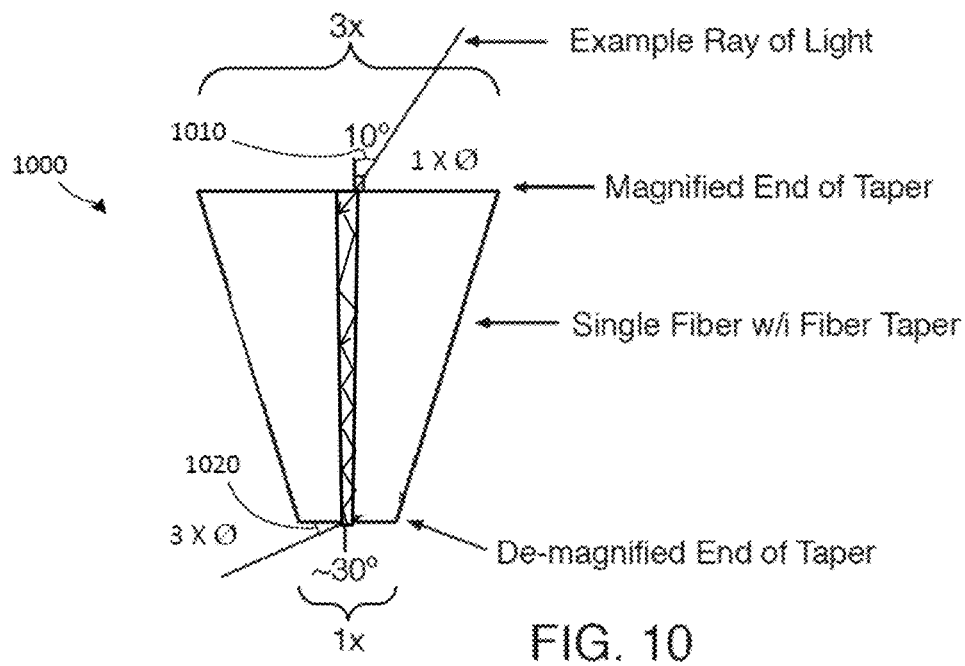
FIG. 10 is a side view depicting a single fiber within a tapered fiber optic bundle, such as the fiber optic bundle of FIG. 6.

FIG. 10 is a side view depicting a single fiber 1000 within a tapered fiber optic bundle, such as the fiber optic bundle 600 of FIG. 6. The angles at which the light reflects within the interior of the fiber 1000 provide an angle of exit 1020 that is approximately three times an angle of entry 1010, demonstrating how light exits at a potentially increased exit angle. The angle of entry 1010 and the angle of exit 1020 are exaggerated in FIG. 10 to illustrate the change.

This change in angle of incidence of the light can have a beneficial effect on image sensor efficiency. Certain image sensors respond best when receiving more collimated light, such as light entering the sensor at an angle of about 15°. Accordingly, in at least one embodiment, the system redirects light entering the camera such that the light impinges on the active area of each image sensor at an angle that optimizes the light collection efficiency of the system. Various aspects of the camera, such as the length and magnification of the tapered fiber optic bundles, may be configured in a manner that optimizes the light collection efficiency.

In at least one embodiment, the active area of one or more of each image sensor may not be square. The magnification of each of the tapered fiber optic bundles may be limited to have a magnified dimension that is greater than or equal to the largest mechanical dimension for the larger active sensor area dimension. For example, if the packaging of each module is 60 mm×60 mm, and the sensor is 20 mm×15 mm, the magnified end (i.e., the leading end) of the optical fiber bundle may be configured to be at least 60 mm, resulting in an approximate magnification factor of 3×, and an imaging area of approximately 60 mm×45 mm. The imaging area can be split multiple times to allow for decreased magnification factors per tapered fiber optic bundle, at the expense of decreased light transmission and increased overall system size, but with decreased angular magnification of each fiber.

In the architecture described herein, there are two ends of each fiber optic bundle: a large, leading end (magnified, used at the imaging plane) and a small, trailing end (minimized, used at the sensor). In at least one embodiment, the leading end of the tapered fiber optic bundle is magnified so that its minimum dimension is at least as large as the maximum dimension of the packaging of the corresponding image sensor. In this manner, when incorporating the packaging behind the tapered fiber optic bundle, there is more than sufficient mechanical spacing without the need to stagger the fiber optic bundles and/or the image sensors to increase density.

For example, suppose the packaging of each module is 60 mm×60 mm, and the sensor is 20 mm×15 mm. A magnification factor of 4 may be applied, so that the smallest dimension of the sensor (15 mm) is magnified to include the maximum dimension of the enclosure (60 mm). The aspect ratio is preserved, so that the leading end of the tapered fiber optic bundle is 80 mm×60 mm in size.

As another example, if the packaging of each module is 60 mm×60 mm, and the sensor is 20 mm×15 mm, the leading end of each fiber optic bundle can be about 80 mm×60 mm, resulting in the ability to stitch all packaging without any staggering or beam splitters (or the like), at the expense of an increased taper in the fiber optic bundles, and thus a larger overall imaging plane.

Figure 11:
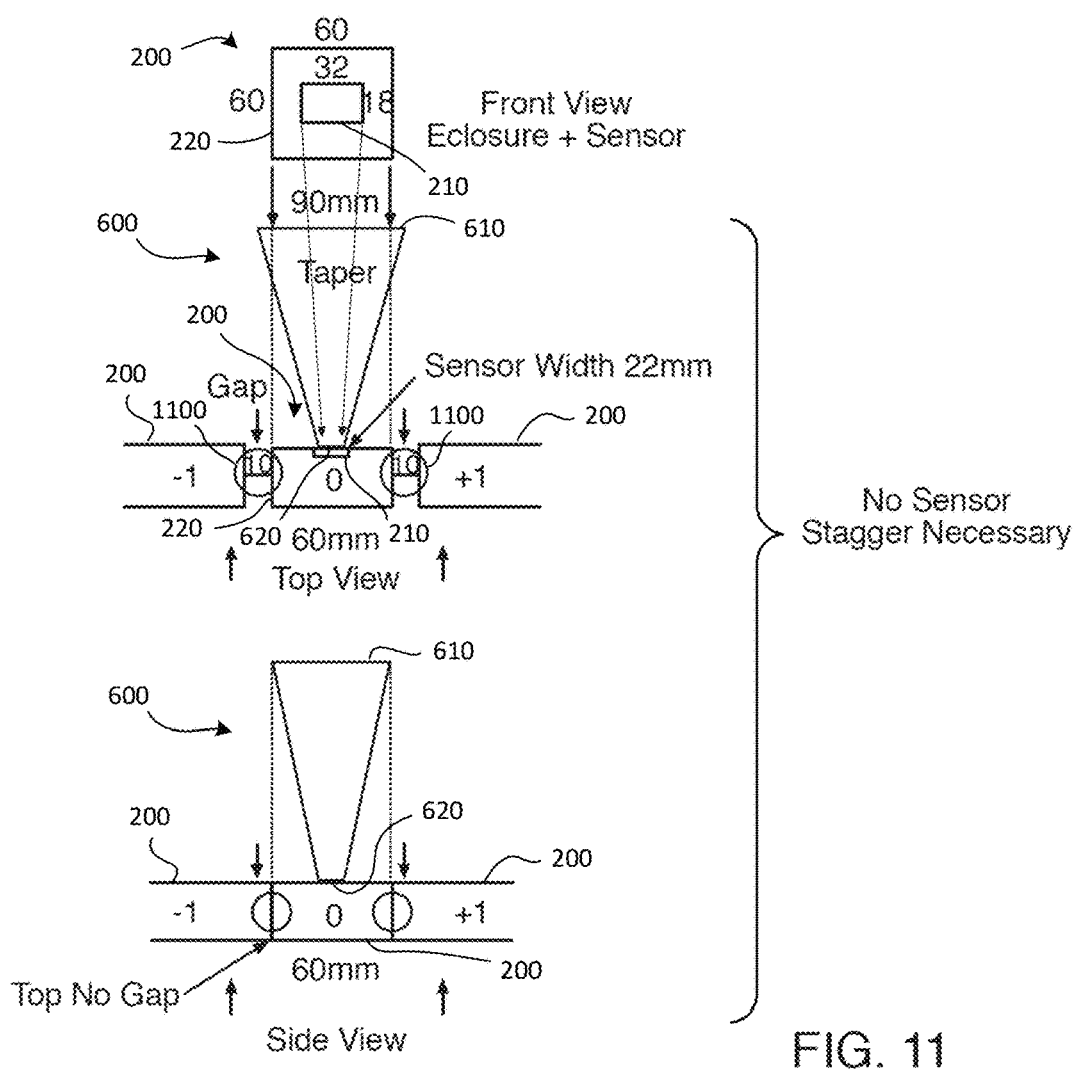
FIG. 11 includes front and side views depicting an array of image sensors, or modules, and tapered fiber optic bundles, or fiber optic bundles, according to one embodiment.

FIG. 11 includes front, top, and side views depicting an array of image sensors, or modules 200, and tapered fiber optic bundles, or fiber optic bundles 600, according to one embodiment. The leading end 610 of each tapered fiber optic bundle 600 may be wider than the width 240, the largest side of the packaging 220 of the corresponding module 200. This may result in increased magnification and imaging area without the need to stagger the electronics. Such an approach may facilitate the use of a beam splitter (or multiple beam splitters, depending on the system configuration) and configuration of each of the rows of modules 200 into two aligned imaging planes. The top view illustrates the presence of gaps 1100 between the modules 200. In the side view, the modules 200 may be positioned to abut each other such that no gaps are present.

Figure 12:
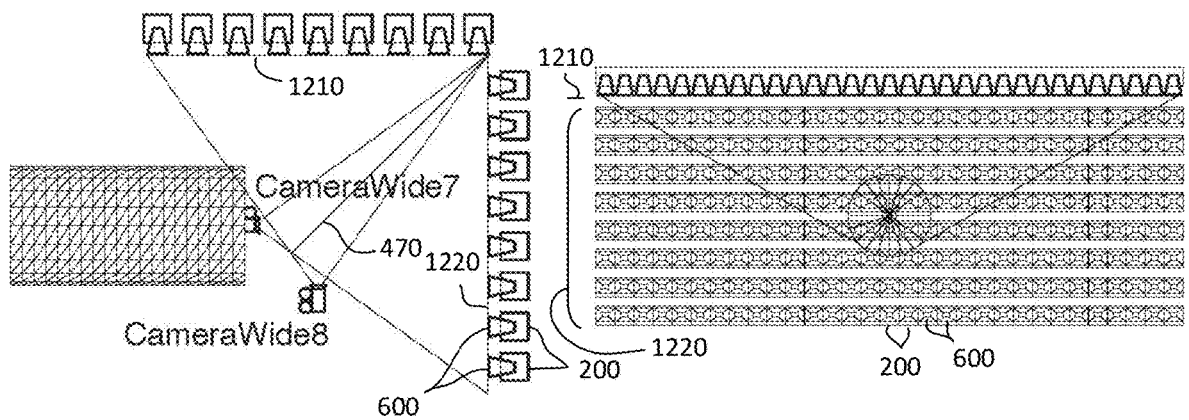
FIG. 12 includes a side view and a front view depicting a configuration that uses a beam splitter in conjunction with modules that receive light through tapered fiber optic bundles, or fiber optic bundles, according to one embodiment.

FIG. 12 includes a side view and a front view depicting a configuration that uses a beam splitter in conjunction with modules 200 that receive light through tapered fiber optic bundles, or fiber optic bundles, 600, according to one embodiment. The left side of the FIG. 12 depicts a side view, wherein the design for the beam splitter 470 can be seen dividing the optical path into a first plane 1210 and a second plane 1220, allowing for additional package spacing. The right side of the FIG. 12 depicts a front view, wherein the rows of the modules 200 can be seen; the virtual imaging plane that results from the combination of the top and bottom paths intersecting with one another may result in a contiguous imaging surface. Any suitable arrangement can be used that allows for increased electronics dimensions through the use of scaled pixels with tapered fiber optic bundles, including for example a horizontal arrangement, a vertical arrangement, a checkerboard arrangement, and/or the like.

Use of the beam splitter 470 may allow further increased resolution by capturing light at surfaces displaced from each other by 90° (or in alternative embodiments, a different angle). Some light transmission may be sacrificed due to the fact that each surface may only receive about half of the incoming light received through the aperture. However, greater mechanical configuration flexibility may be obtained by rotation of the planes.

In alternative embodiments, any other optical method can be used for directing light in multiple optical paths. Thus, reference herein to a "beam splitter" can be considered to include any such alternatives, including for example, but not limited to, polarizers, birefringent materials, prisms, various optical coatings, mirrors, and/or the like.

Figure 13:
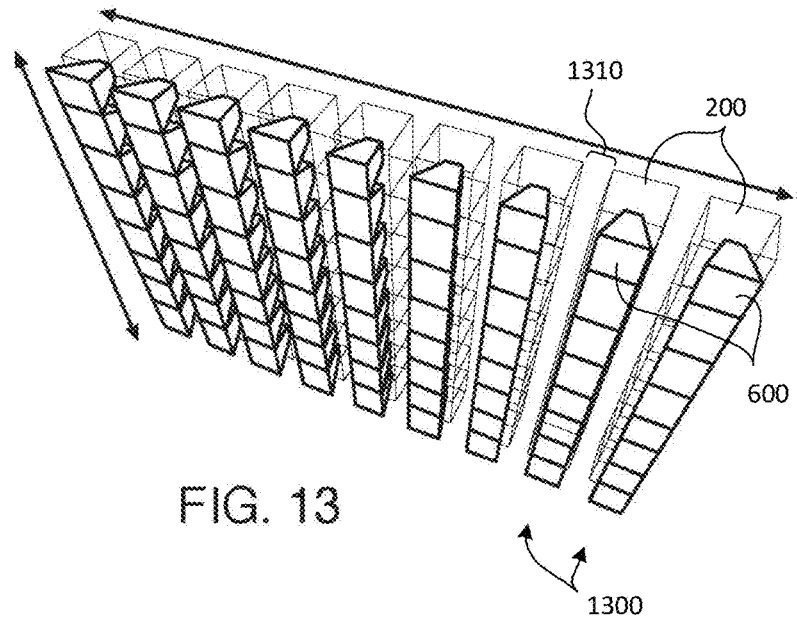
FIG. 13 is a perspective view depicting an example of a configuration for the modules and fiber optic bundles of the first plane of FIG. 12, according to one embodiment.

FIG. 13 is a perspective view depicting an example of a configuration for the modules 200 and fiber optic bundles 600 of the first plane 1210 of FIG. 12, according to one embodiment. The first plane 1210 may receive light from along a first path. The modules 200 may be arranged in nine vertically-oriented columns 1300 of eight modules 200 each, for a total of seventy-two modules 200. A gap 1310 may be present between each adjacent pair of the columns 1300.

Figure 14:
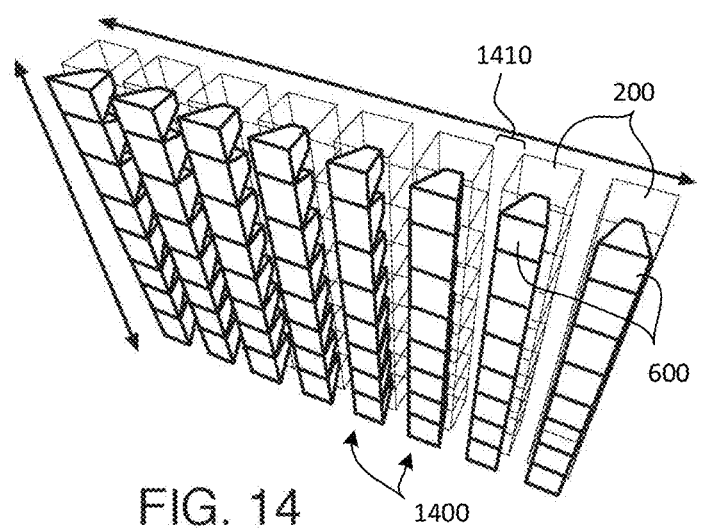
FIG. 14 is a perspective view depicting an example of a configuration for the modules and fiber optic bundles of the second plane of FIG. 12, according to one embodiment.

FIG. 14 is a perspective view depicting an example of a configuration for the modules 200 and fiber optic bundles 600 of the second plane 1220 of FIG. 12, according to one embodiment. The second plane 1220 may receive light from along a second path. The modules 200 may be arranged in eight vertically-oriented columns 1400 of eight modules 200 each, for a total of sixty-four modules 200. A gap 1410 may be present between each adjacent pair of the columns 1400.

Figure 15:
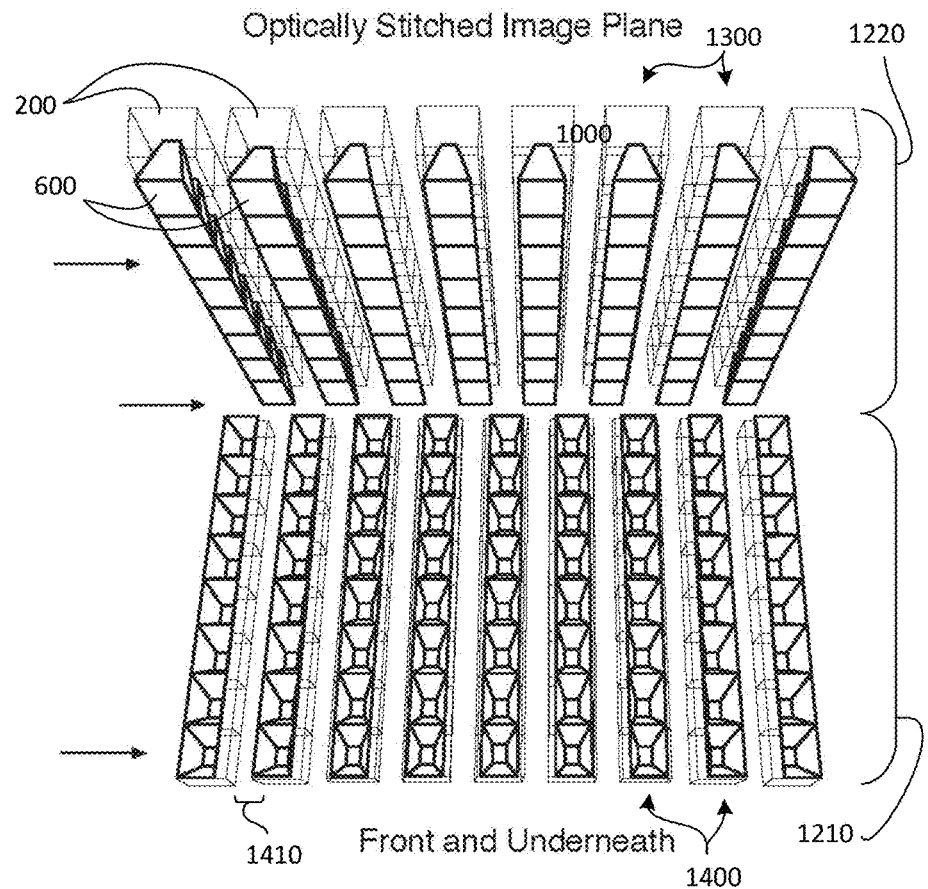
FIG. 15 is a perspective view depicting how the first plane and the second plane may be aligned with each other, according to one embodiment.

FIG. 15 is a perspective view depicting how the first plane 1210 and the second plane 1220 may be aligned with each other, according to one embodiment. As shown, the columns 1300 of the first plane 1210 may be staggered relative to the columns 1400 of the second plane 1220, such that the light received by the modules 200 of the second plane 1220 negates the gaps 1310 between the columns 1300, and the light received by the modules of the first plane 1210 negates the gaps 1410 between the columns 1400.

Figure 16:
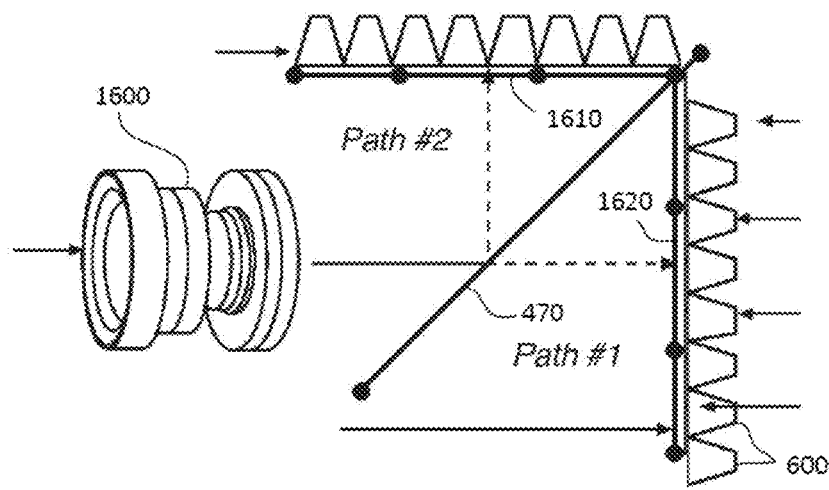
FIG. 16 is a side view depicting an example configuration of tapered fiber optic bundles, or fiber optic bundles, that may be used to direct light to image sensors (not shown), according to another embodiment.

FIG. 16 is a side view depicting an example configuration of tapered fiber optic bundles, or fiber optic bundles 600, that may be used to direct light to image sensors (not shown), according to another embodiment. A beam splitter 470 may again be used to direct light from a main lens 1600 to fiber optic bundles 600 arranged along a first plane 1610 and a second plane 1620.

Figure 17:
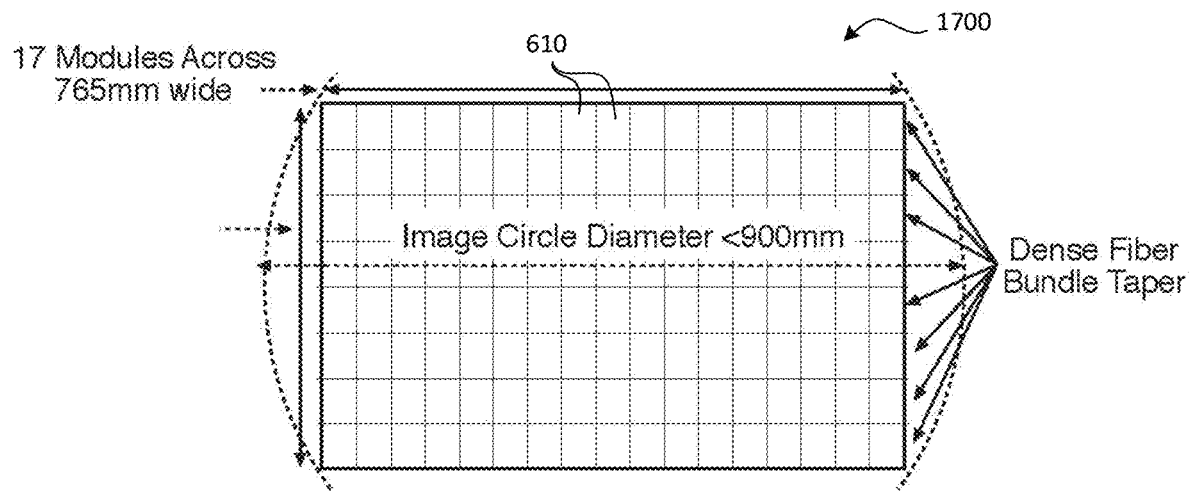
FIG. 17 is a virtual view depicting a tiled imaging plane according to one embodiment.

FIG. 17 is a virtual view depicting a tiled imaging plane 1700 according to one embodiment. The leading ends 610 of fiber optic bundles 600 may be tiled to define the imaging plane 1700. The various values and numerical labels in FIG. 17 are merely exemplary; other dimensions and numbers of modules 200 and fiber optic bundles 600 may be used.

The above-described configurations may provide additional benefits. For example, such configurations may allow for a spherically curved imaging plane without the requirement of trapezoidal fiber customizations, as discussed in more detail below. In addition, these configurations provide the ability to orient each row or column independently, and/or to install custom rows and/or columns of the microlens array in strips without seams when viewed as the virtual complete sensor. Furthermore, these configurations may facilitate improved mechanical design.

Figure 18:
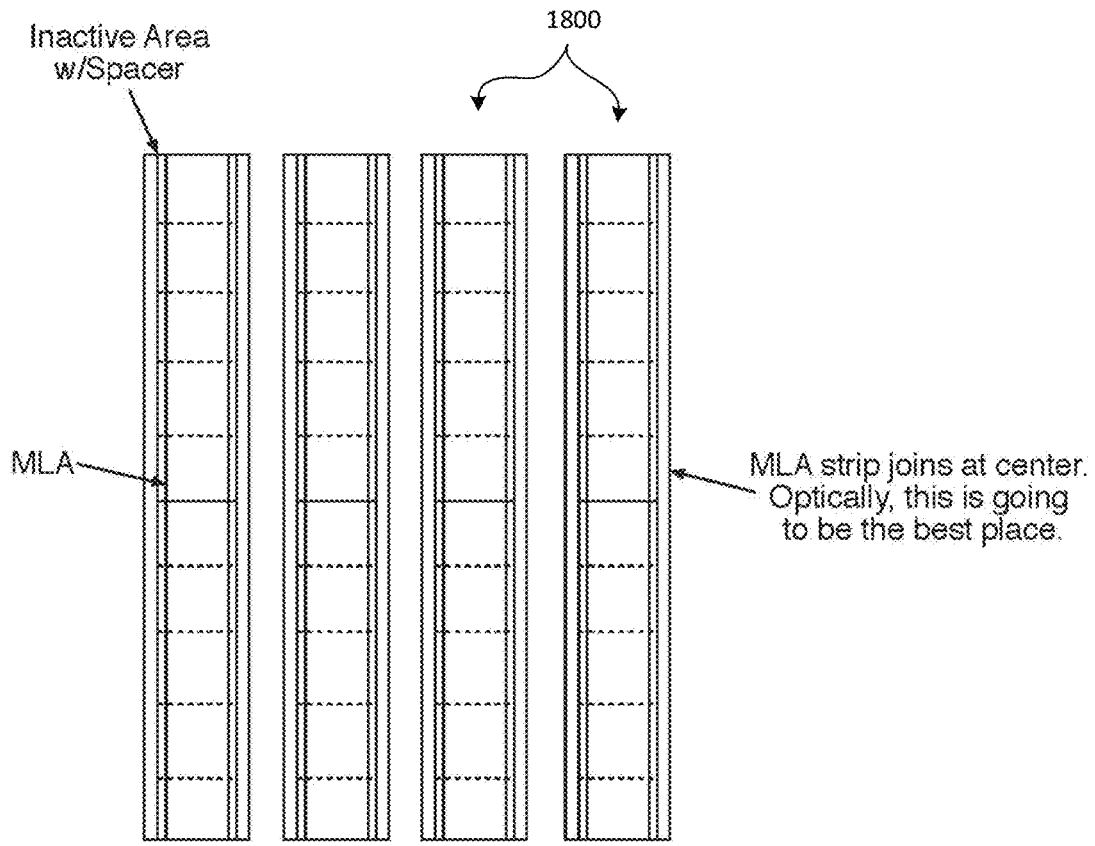
FIG. 18 is a front view depicting an example of strips for mounting micro lens optics to the rows or columns of fiber optic bundles and sensors, according to one embodiment.

FIG. 18 is a front view depicting an example of strips 1800 for mounting micro lens optics to the rows or columns of fiber optic bundles and sensors, according to one embodiment. In various embodiments, the microlens array may be positioned in any of various locations, including but not limited to between the module 200 and the fiber optic bundle 600, and between the main lens 1600 and the fiber optic bundle 600. The microlens array may be divided into strips 1800 and secured to the fiber optic bundles 600 and/or modules 200 of the columns, as shown in FIG. 18, providing additional mechanical clearance for other adjustments and design.

In at least one embodiment, in order to allow for increased sensor density without the use of multiple imaging planes (or in combination with other applications such as HDR, depth, and/or the like), a multi-length face plate approach may be employed. By mounting two or more faceplates with offsets between them, or by incorporating fiber tapers at different lengths, and staggering at a minimum of every other row and/or column, it is possible to allow for increased package size with increased sensor density, while gaining increased light transmission efficiency by eliminating additional beam splitter paths.

Figure 19:
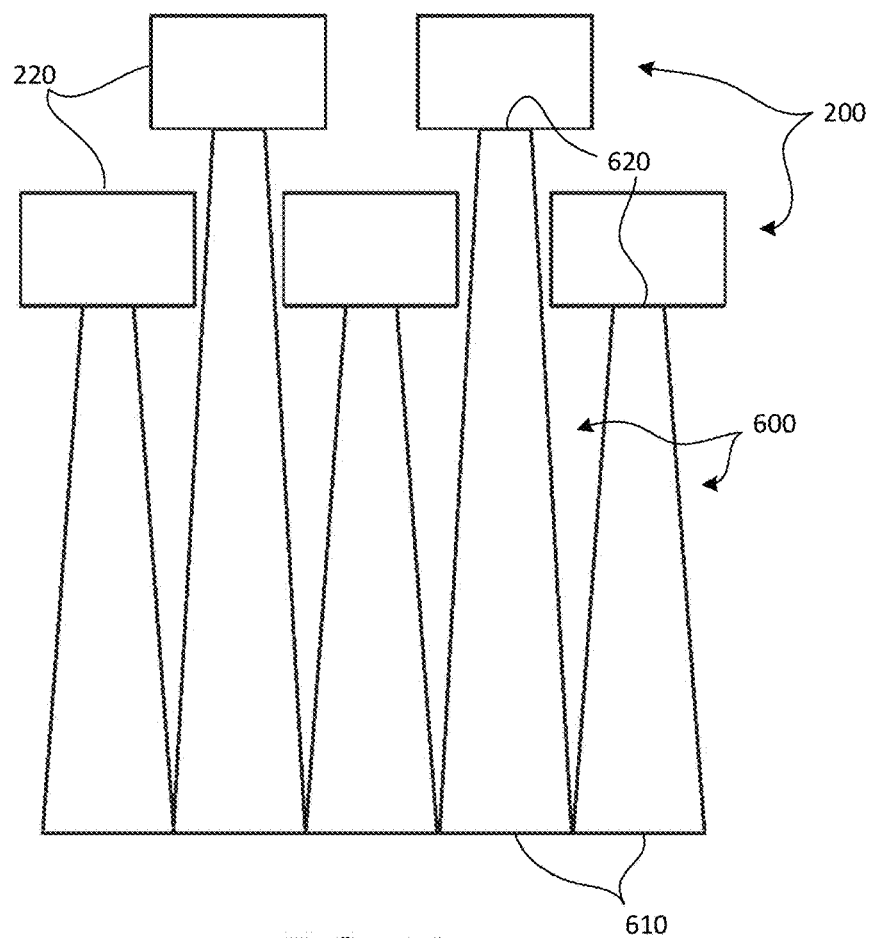
FIG. 19 is a side view depicting an example of a multi-length tapered fiber optic bundle solution, according to one embodiment.

FIG. 19 is a top view depicting an example of a multi-length tapered fiber optic bundle solution, according to one embodiment. By staggering the lengths of multiple tapered fiber optic bundles, the mechanical spacing required along X and Y (from the front) may decrease to the minimum dimension of the packaging 220 of each module 200. This may achieve a continuous imaging plane without the necessity of a beam splitter. a A fiber optic faceplate may be used to attach each camera module to each tapered fiber optic bundle 600, where one side of the faceplate is bonded to the small trailing end of the tapered fiber optic bundle, and the other side of the faceplate is bonded to the sensor module. A continuous imaging plane may be achieved by using an arrangement of equal-length tapers with staggered face plate lengths, staggered-length tapers with equal-length faceplates, or a combination of staggered taper lengths and staggered face place lengths. As mentioned previously, in the architecture described herein, there are two ends of each tapered fiber optic bundle, or fiber optic bundle 600: a large, leading end 610 (magnified, used at the imaging plane) and a small, trailing end 620 (minimized, used at the module). In at least one embodiment, the leading end 610 of the fiber optic bundle 600 is magnified so that the largest dimension of the leading end 610 is at least as large as the maximum dimension of the packaging 220 of the module 200.

For example, suppose the electronics/enclosure of each module 200 is 60 mm×60 mm, and the active area 210 is 20 mm×15 mm. A magnification factor of 3 is applied, so that the largest dimension of the active area 210 (20 mm) is magnified to include the maximum dimension of the packaging 220 (60 mm). The aspect ratio is preserved, so that the resulting leading end 610 becomes 60 mm×45 mm.

In this manner, when incorporating the packaging 220 behind the fiber optic bundle 600, in at least one embodiment, the lengths of the faceplates/fiber optic bundles 600 are staggered to provide an overlap between the packaging 220 of the modules 200. In the example described above, an overlap of 15 mm is provided in one dimension, with no overlap in the other dimension (since the large dimension of the leading end 610 is matched to the largest side of the packaging 220). Staggering the lengths of the fiber optic bundles 600 in this manner may provide increased mechanical density and decreased active imaging area. Further, such staggering may provide higher light transmission by enabling the use of a lower magnification ratio in the fiber optic bundles.

Such a configuration may allow for any number of staggered tiers, given certain mechanical requirements to include two or more lengths. For example, in one embodiment, five to seven lengths can be provided for five to seven tiers of modules 200 that are staggered from each other.

Figure 20:
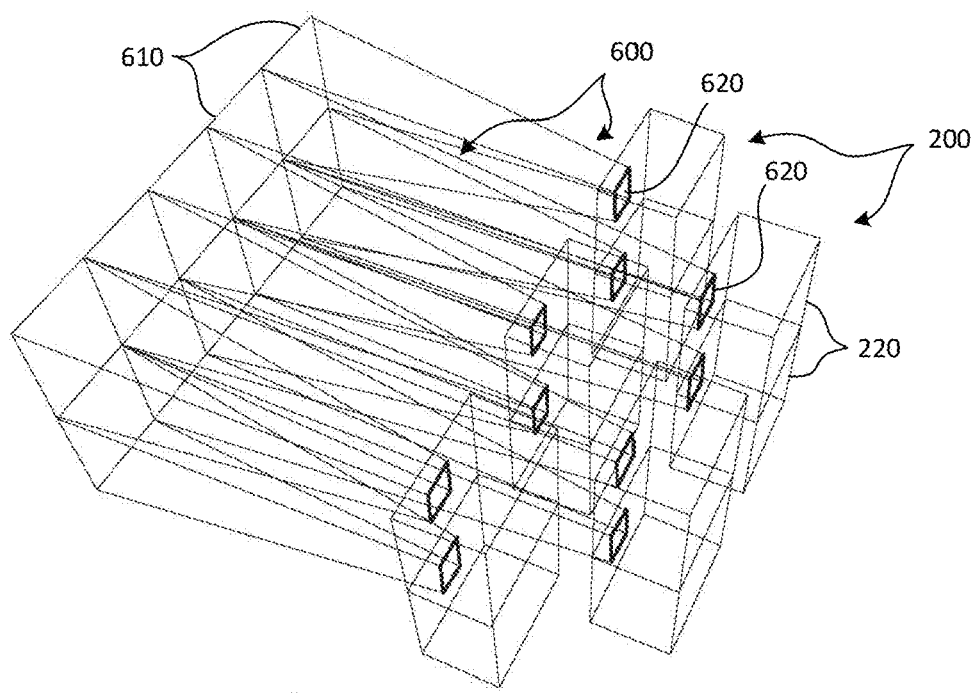
FIG. 20 is a perspective, wireframe view from the rear of the tiered approach of FIG. 19.

FIG. 20 is a perspective, wireframe view from the rear of the tiered approach of FIG. 19. In this example, the arrangement produces a contiguous imaging plane with two lengths of tapered fiber optic bundles 600. The leading ends 610 of the fiber optic bundles 600 may be aligned and positioned coplanar to each other to define the imaging plane.

In at least one embodiment 9 μm fiber pitch optics can be used at the leading ends 610 of the fiber optic bundles 600, and an approximately 3× magnification ratio/factor can be used to provide an approximately 3 μm pitch fiber at the trailing end 620. However, any suitable size of optical fibers can be used. In other embodiments, other fiber technologies can be used as well as any statistical or interstitial EMA design, and/or any material, refractive index, numerical aperture, and/or the like.

In at least one embodiment, the modules 200 are tiled, faceted, or stepped (terms that may be used interchangeably) in a cylindrical fashion, angling the normal of the leading end 610 of each fiber optic bundle 600 to be perpendicular to the chief ray angle. In at least one embodiment, this approach may be modified to increase or decrease this angle depending on certain optical system components or mechanical design considerations. The fiber optic bundle 600 in this approach may be polished at the required angle to allow for simplified mechanical design, and/or an enclosure can be provided to accommodate these angles. Similar techniques can be used for the beam splitter or other optically splitting solution.

Figure 21:
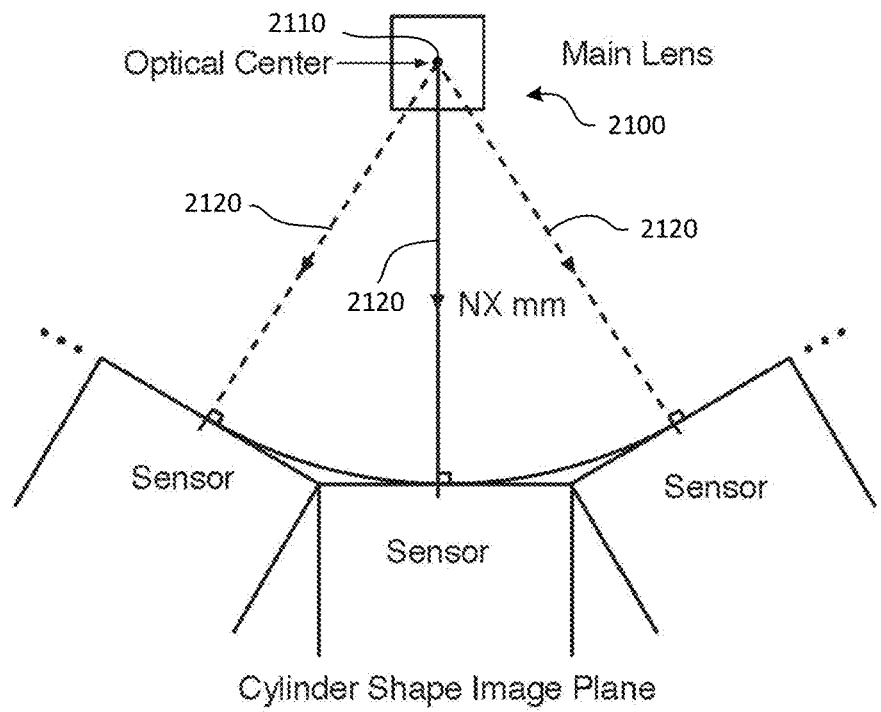
FIG. 21 is a top view depicting a cylindrically faceted approach, wherein the image sensors and/or fiber optic bundles are arced about the optical center of the main lens, according to one embodiment.

FIG. 21 is a top view depicting a cylindrically faceted approach, wherein the image sensors and/or fiber optic bundles 600 are arced about the optical center 2110 of the main lens 2100, according to one embodiment. The center of the imaging surface may thus be kept perpendicular to the corresponding ray 2120 leading to the optical center 2110. In at least one embodiment, this arrangement may be constructed on a variable approach, where the ability to curve these tiles or return to a flat imaging plane is possible. This may allow the optical center of the main lens to drift depending on the requirements for focal length, focus, and/or calibration. This may result in a single axis exhibiting a cylindrical form (with step functions at each image sensor). Illumination and aberration may become more computationally intensive without a contiguous cylindrical surface.

In at least one embodiment, an additional fiber face plate is added with a single surface that matches the faceted function of the leading end 610 of each fiber optic bundle 600, with a polished exterior surface. This design may eliminate the face plate. This surface may be directly polished in this configuration with each fiber optic bundle individually or as a whole mechanical apparatus.

Figure 22A:
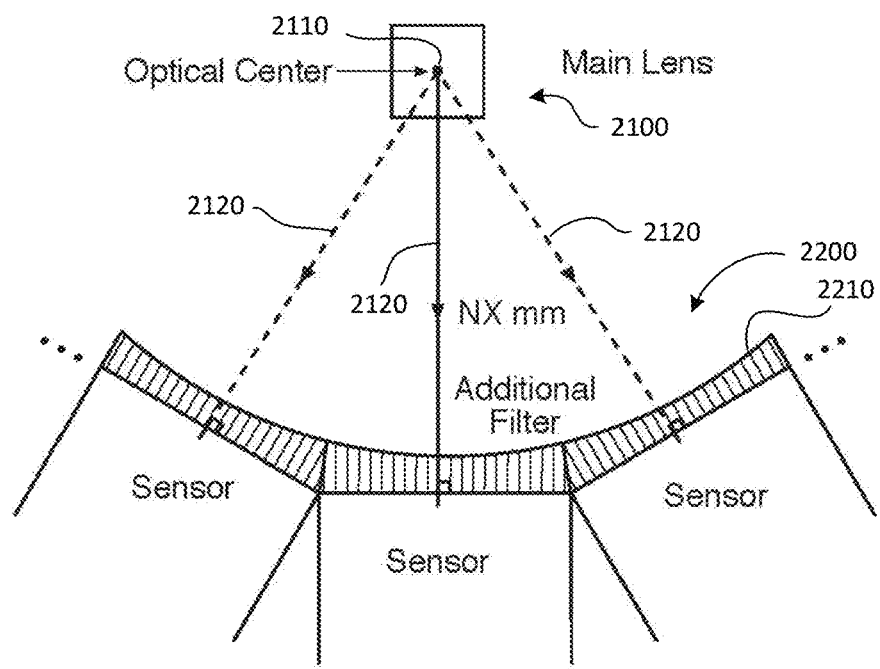
FIG. 22A is a top view depicting a cylindrically faceted approach, according to another embodiment.

FIG. 22A is a top view depicting a cylindrically faceted approach, according to another embodiment. A polished fiber face plate 2200 may be added to match the faceted surface of the leading ends 610 of the fiber optic bundles. The polished fiber face plate 2200 may be manufactured to include an accurately cylindrical surface 2210.

In at least one embodiment, these fibers, and all of the components in the system that are bonded to or between additional fibers, are bonded using a matched refractive indexed epoxy, UV cure or other appropriate adhesive. Alternatively, these bonds may be made in a temporary fashion (such as by mechanical bonds and gaskets) or with other adhesives that may be removable. Such attachment methods are not limited to the embodiment of FIG. 22A, but may be used to facilitate the attachment of any combination of fiber structures, faceplates, and/or other optical components, including but not limited to those in the other embodiments set forth in this disclosure.

In at least one embodiment, a polished fiber face plate surface may additionally or alternatively be fabricated by bonding the fiber surfaces together, and then directly polishing the surface into the desired cylindrical or spherical shape without orienting the centers of each respective leading end 610 to be perpendicular to the optical center. Alternatively, some hybrid of the two options can be used, blending the partially angled and partially polished approaches.

Figure 22B:
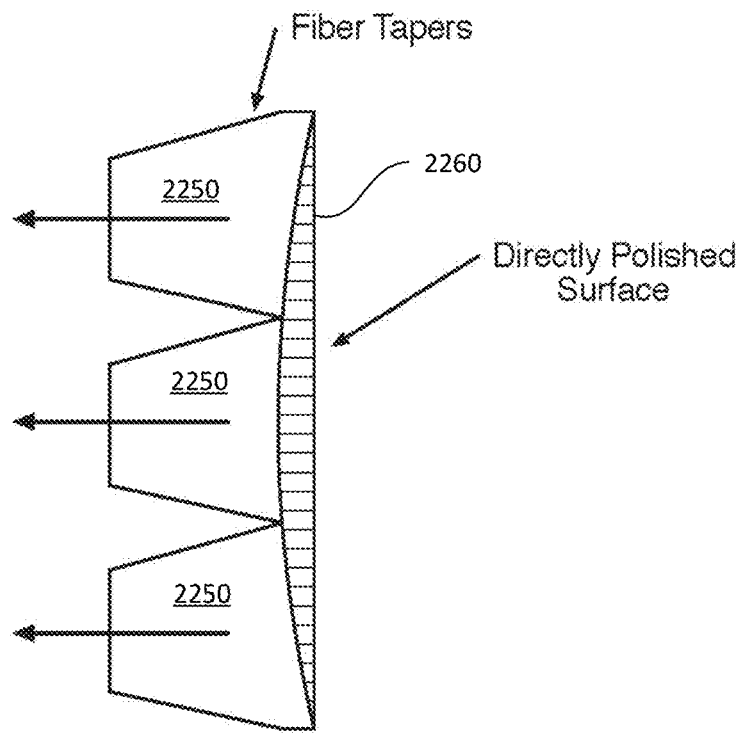
FIG. 22B is a side view illustrating an arrangement of fiber optic bundles that have been bonded together and polished to provide a polished fiber face plate surface, according to one embodiment.

FIG. 22B is a side view illustrating an arrangement of fiber optic bundles 2250 that have been bonded together and polished to provide a polished fiber face plate surface 2260, according to one embodiment. The fiber face plate surface may thus be formed from the fibers of the fiber optic bundles 2250, rather than from the attachment of an additional element to the fiber optic bundles 2250.

With the cylindrical surface approach, it is possible that the alternate axis (for example, cylindrical along x, the alternate axis being y) will exceed the ideal angles for entry and exit. Thus, in at least one embodiment, a cylindrical (stepped) approach is used, wherein an additional faceplate is added to a spherical imager in a stepped or smooth approach. The cylindrical (x axis) may remain stepped with either approach. This is beneficial as all shapes may remain linear, and thus may not require trapezoidal distortion. The above description is merely exemplary; for example, x and y can be interchanged as the dominant axis (so that cylindrical would be along y instead of x). This may be directly manufactured into the leading ends of the fiber optic bundles as in FIG. 22B, without the attachment of separate face plates as mentioned in the previous cylindrical face plate section.

Figure 23:
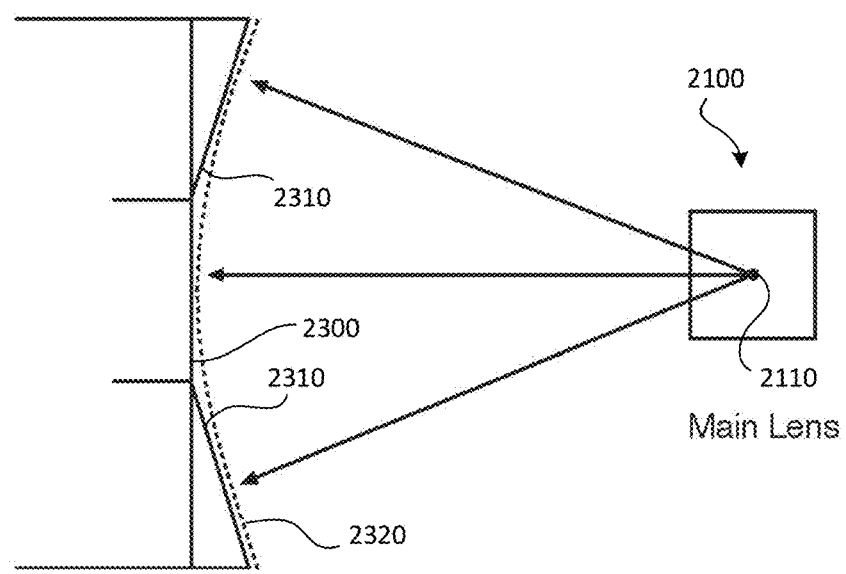
FIG. 23 is a side view depicting a single column of the faceted cylindrical imaging surface, which may be a section of a spherical imaging surface, according to one embodiment.

FIG. 23 is a side view depicting a single column 2300 of the faceted cylindrical imaging surface, which may be a section of a spherical imaging surface, according to one embodiment. The faceted cylindrical imaging surface may appear to be completely flat from the side view, although from the top it may appear cylindrical. Additional face plates are manufactured to include faceted surfaces 2310 and/or or smooth/polished surfaces 2320 along the opposite dimension, causing the resulting shape to be faceted or polished spherical.

In at least one embodiment (not shown), fiber optic bundles may be formed with trapezoidal shapes for greater accuracy in configuring the tiled spherical shape. In this design, the center of the leading end of each fiber optic bundle, including any offset from the flat surface, may be perpendicular to the optical center 2110 of the main lens 2100, as in FIG. 21.

Figure 24:
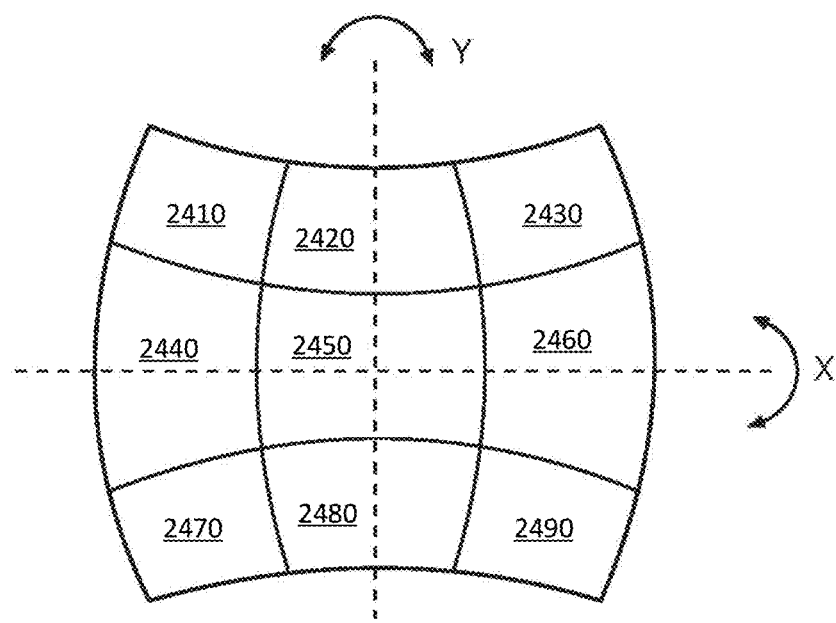
FIG. 24 is a front view depicting an example of trapezoidal faceted fiber taper surfaces that result when generating a spherical faceted surface, according to one embodiment.

FIG. 24 is a front view depicting an example of trapezoidal faceted fiber taper surfaces that result when generating a spherical faceted surface, according to one embodiment. As shown, leading ends 2410, 2420, 2430, 2440, 2450, 2460, 2470, 2480, and 2490 of tapered fiber optic bundles may be angled and arranged to define a generally spherical, concave shape.

In another embodiment, fiber surfaces may be bonded together, and then a spherical surface may be directly polished into the adjoining leading ends of the fiber optic bundles that define the resulting fiber structure, without orienting each leading end to be perpendicular to the optical center. In yet another embodiment, some hybrid solution may be performed that combines the angled and polished approaches.

In at least one embodiment, as a further advance, a polished fiber faceplate is bonded or otherwise secured to the leading ends of the fiber optic bundles. The polished fiber faceplate may have the tile shape on the side adjoining the leading ends, and a spherical surface on the alternate (imaging) side.

Figure 25A:
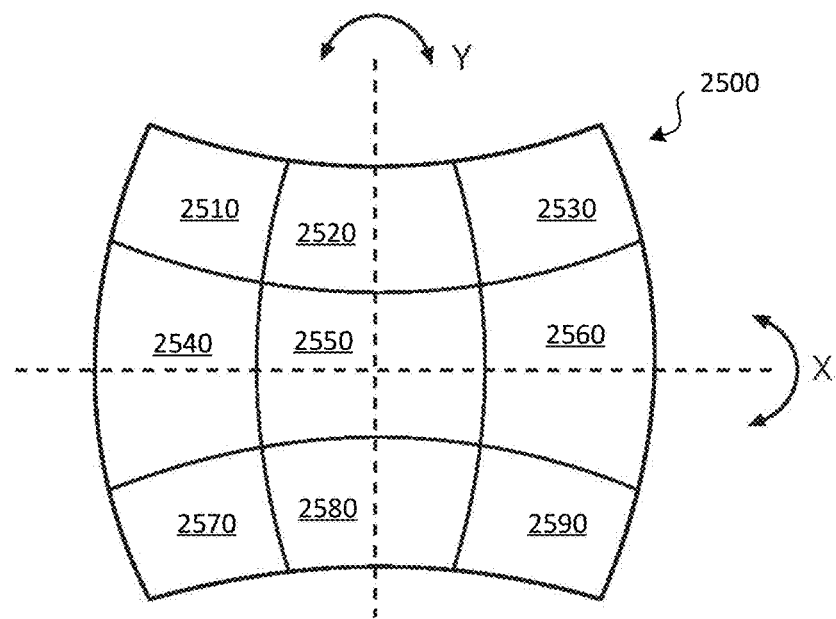
FIG. 25A is a front view depicting the use of a polished fiber faceplate to provide a generally spherical concave surface on the imaging side, according to one embodiment.

FIG. 25A is a front view depicting the use of a polished fiber faceplate 2500 to provide a generally spherical concave surface on the imaging side, according to one embodiment. The leading ends 2510, 2520, 2530, 2540, 2550, 2560, 2570, 2580, and 2590 of the fiber optic bundles 600 may be covered by the polished fiber faceplate 2500, which may be shaped, at its trailing end, to match the profile of the combined leading ends 2510, 2520, 2530, 2540, 2550, 2560, 2570, 2580, and 2590. Such an approach may additionally provide the ability to produce non-trapezoidal fiber optic bundles (resulting in gaps between the fiber optic bundles themselves) with the added trapezoidal and tapered polished faceplates to fill in the gaps and produce the desired spherical surface.

Figure 25B:
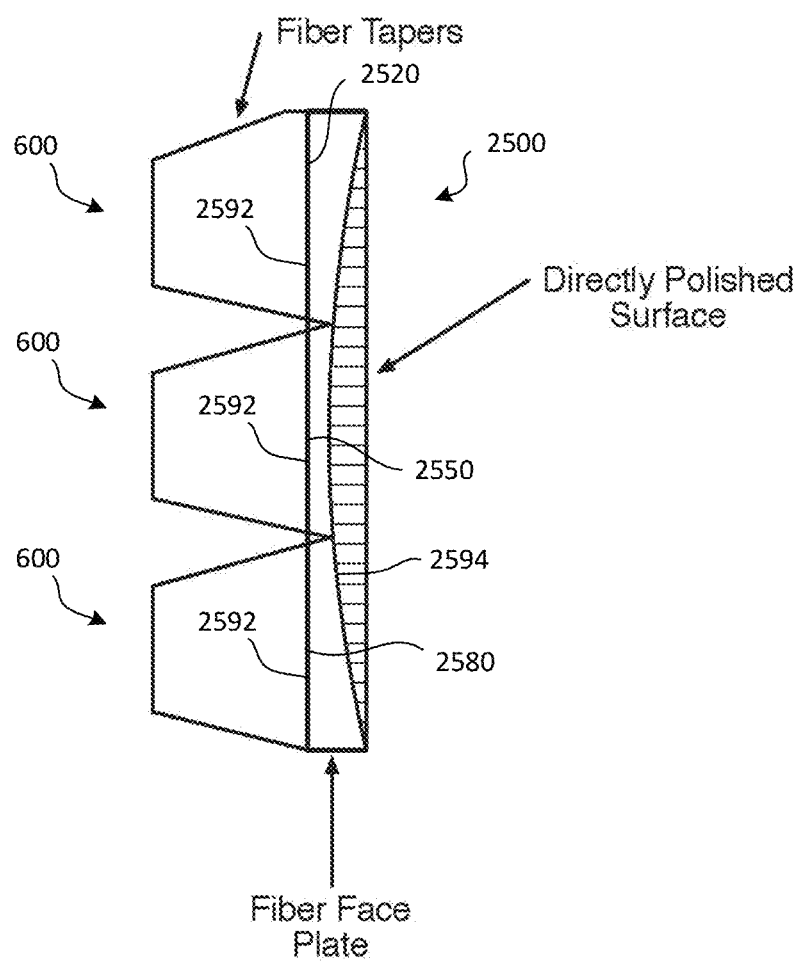
FIG. 25B is a side, section view depicting the use of the polished fiber faceplate of FIG. 25B.

FIG. 25B is a side, section view depicting the use of the polished fiber faceplate 2500 of FIG. 25B. As shown, the fiber optic bundles 600 may have non-trapezoidal shapes. The trailing end of the polished fiber faceplate 2500 may provide interfacing shapes 2592, and may have a spherical surface 2594 at its leading end.

In at least one embodiment, the modules 200 and fiber optic bundles 600 are mounted in a configuration wherein each of the modules 200 is angled, with a commensurate angle to the cut and polish of the trailing end 620 of the fiber optic bundle 600. This may provide additional mechanical flexibility and/or alternative design options.

Figure 26:
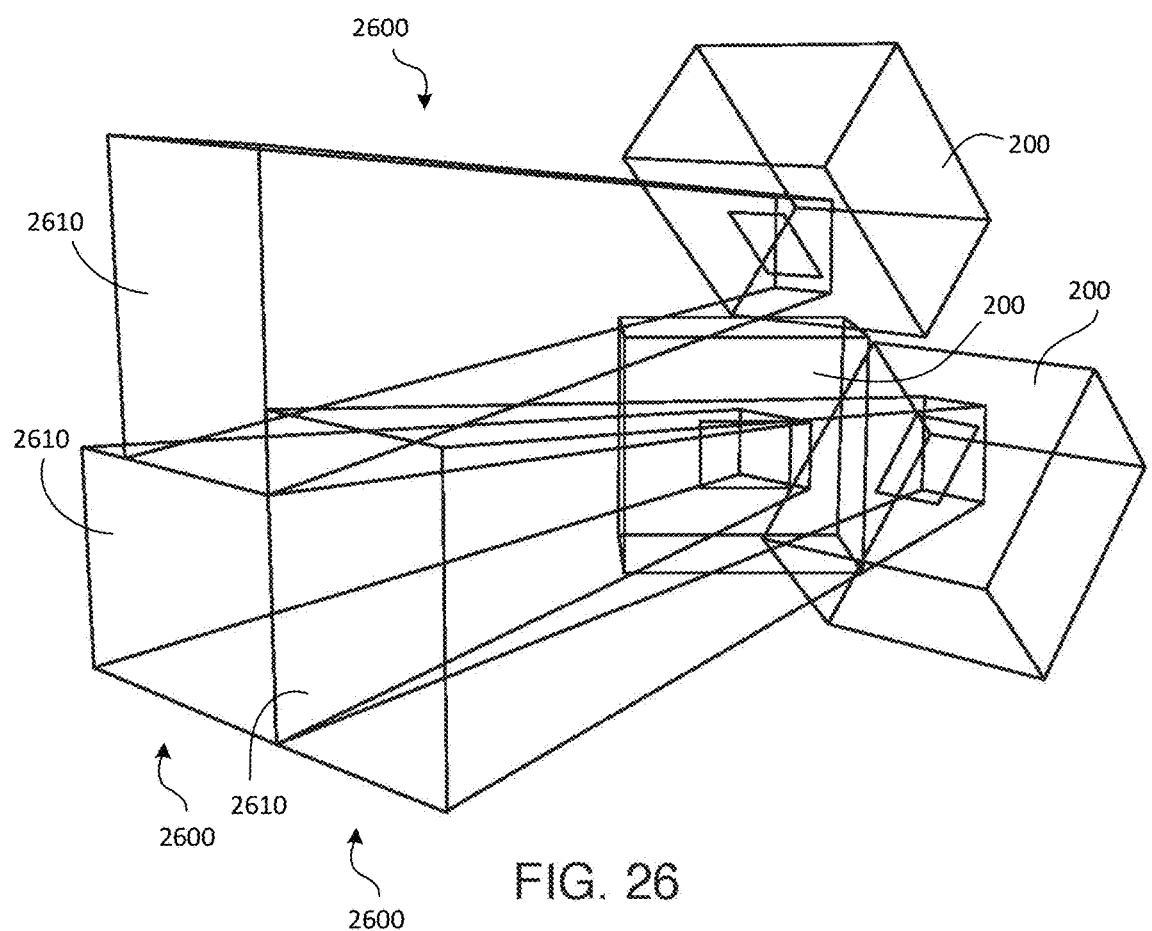
FIG. 26 is a perspective, wireframe view depicting exemplary asymmetrical stacking of modules and fiber optic bundles, according to one embodiment.

FIG. 26 is a perspective, wireframe view depicting exemplary asymmetrical stacking of modules 200 and fiber optic bundles 2600, according to one embodiment. The leading ends 2610 of the fiber optic bundles 2600 may be arranged asymmetrically, and the fiber optic bundles 2600 may be angled to provide for mounting of the modules 200 at various orientations.

In any of the described configurations, the image sensors may be bonded to a fiber face plate or taper, and/or temporarily bonded without an adhesive via a pressure mounted system. This may be done with or without removing the sensor's CFA or pixel MLA (not referring to plenoptic MLA), with the cover glass removed. For example, the image sensor, including the active area, can be mounted to a structural plate, the fiber can be attached to a second structural plate, a gasket can be placed between the two plates, and then the plates can be machine-screwed together to form a semi-permanent bond between the components. The tapered fiber optic bundles may or may not be bonded to a faceplate between the fiber optic bundle and image sensor.

Figure 27:
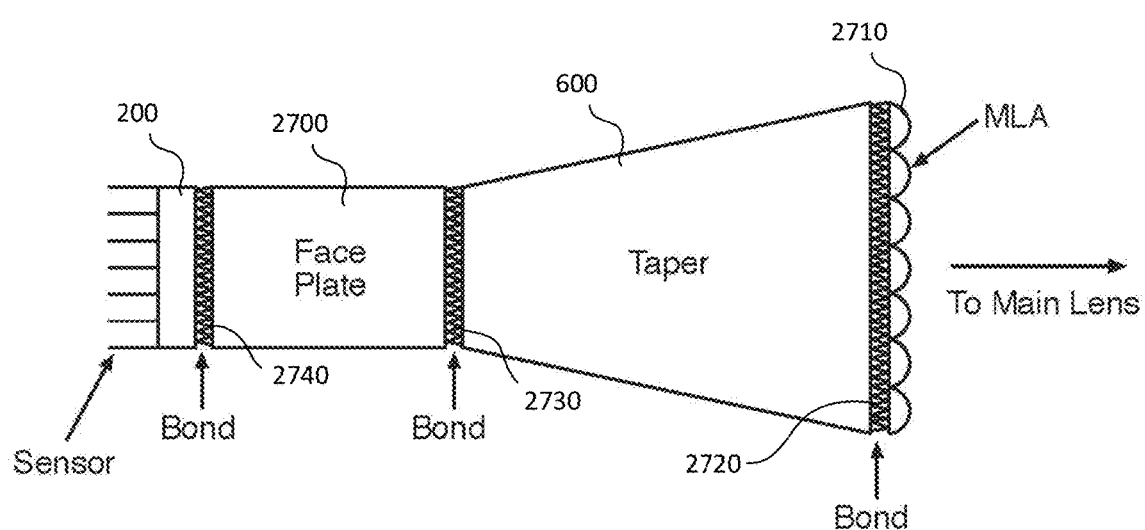
FIG. 27 is a side view depicting an example of a fiber optic bundle bonding configuration with a faceplate bonded on one side to the sensor and on the other side to the narrow end of a tapered fiber optic bundle, with an MLA bonded to the wide end of the tapered fiber optic bundle, according to one embodiment.

FIG. 27 is a side view depicting an example of a fiber optic bundle bonding configuration with a faceplate 2700 between the microlens array, or MLA 2710, fiber optic bundle 600, and image sensor, or module 200, according to one embodiment. Bonds 2720, 2730, and 2740 may be formed between the MLA 2710 and the fiber optic bundle 600, between the fiber optic bundle 600 and the faceplate 2700, and between the faceplate 2700 and the module 200, respectively. The bond 2720 between the MLA 2710 and the fiber optic bundle 600 may be replaced with an air-gap, depending on the configuration of the MLA 2710.

Tolerances and Mechanical Design

In at least one embodiment, each module in the array is mounted with a permanent mechanical alignment stage, or with a temporary mechanical alignment mechanism that is calibrated and then removed after initial manufacture. Any suitable mechanism can be used to ensure that tolerances are maintained for appropriate alignment and reconstruction of the larger imaging plane.

Figure 28:
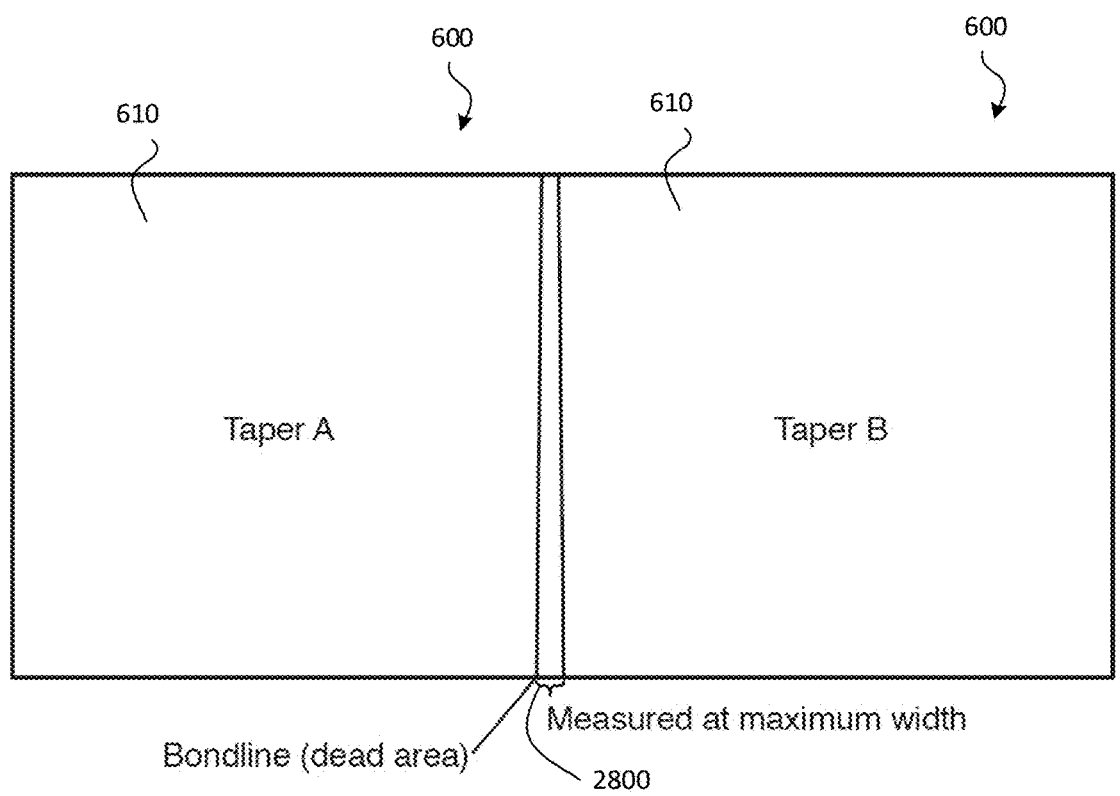
FIG. 28 is a front view depicting an example of bondline tolerances between the leading ends of two exemplary fiber optic bundles separated by a bondline, according to one embodiment.

FIG. 28 is a front view depicting an example of bondline tolerances between the leading ends 610 of two exemplary fiber optic bundles 600 separated by a bondline 2800, according to one embodiment. The bondline 2800 may advantageously be as thin as possible to prevent seams from appearing in the final image. In at least one embodiment, the tolerance in the bondline 2800 is a maximum of 30 μm.

Figure 29:
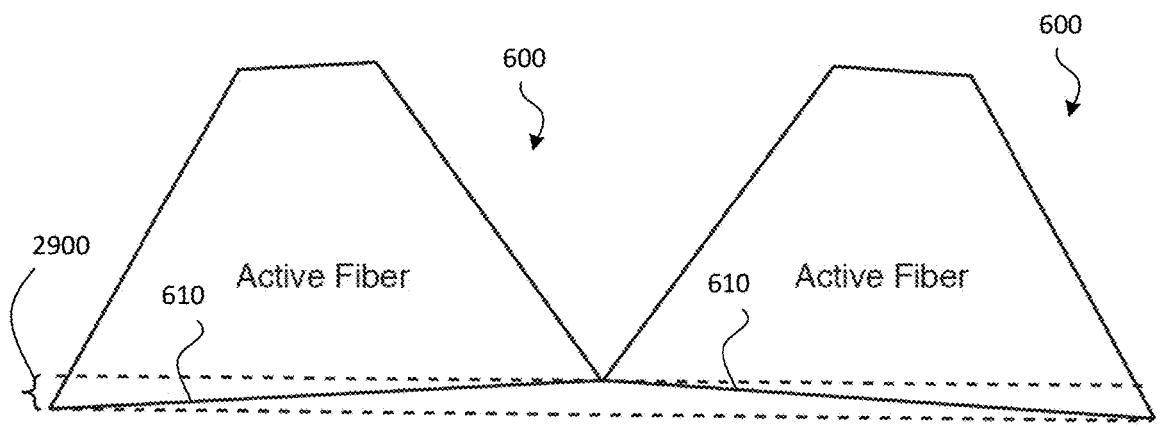
FIG. 29 is a top view depicting an exemplary technique for measurement of tolerance for image plane flatness between the leading ends of two exemplary fiber optic bundles, according to one embodiment.

FIG. 29 is a top view depicting an exemplary technique for measurement of tolerance for image plane flatness between the leading ends 610 of two exemplary fiber optic bundles 600, according to one embodiment. The design specification in this embodiment may have the leading ends 610 coplanar; however, manufacturing limitations may cause the presence of a departure 2900 from coplanarity. In at least one embodiment, the tolerance for this departure 2900 is a maximum of 100 µm.

Figure 30A:
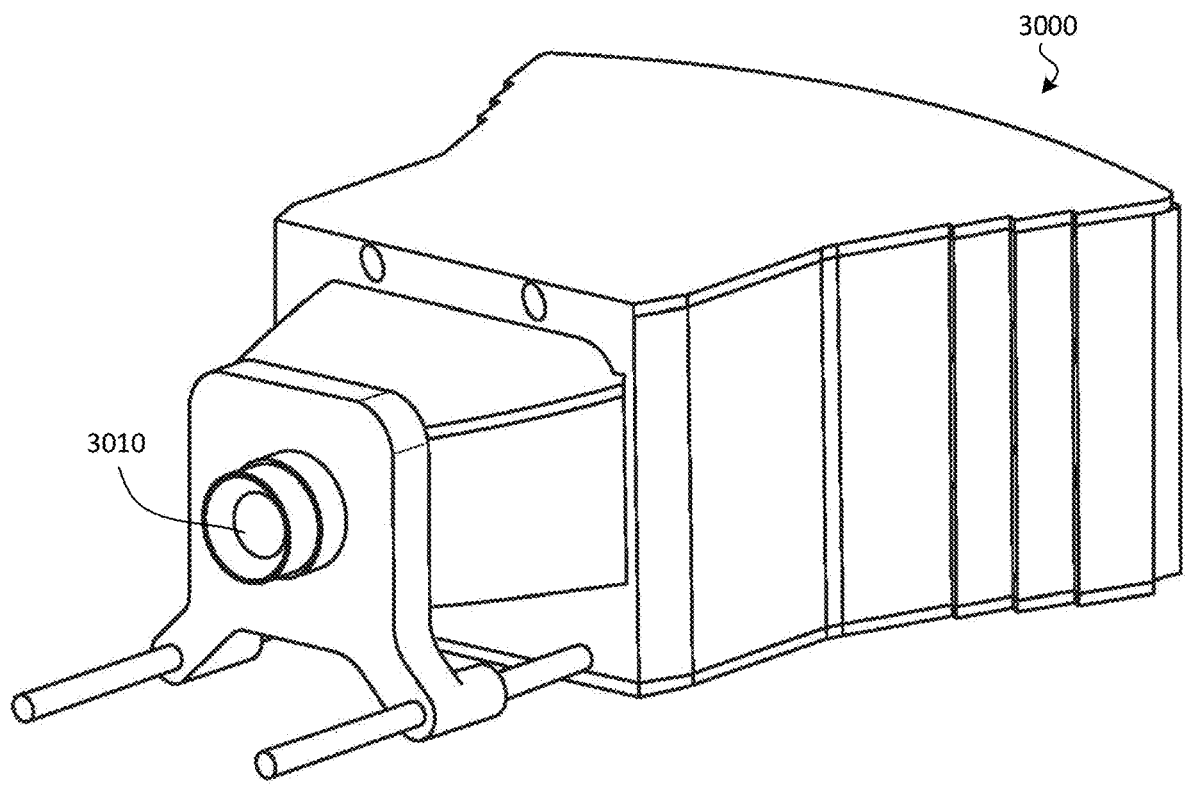
FIG. 30A is a perspective view depicting a camera using multiple modules and fiber optic bundles as described herein, according to one embodiment.

FIG. 30A is a perspective view depicting a camera 3000 using multiple modules 200 and fiber optic bundles 600 as described herein, according to one embodiment. The camera 3000 may have a main lens 3010 through which light is directed into the interior of the camera 3000 to the leading ends 610 of the fiber optic bundles 600 (not shown in FIG. 30A).

Figure 30B:
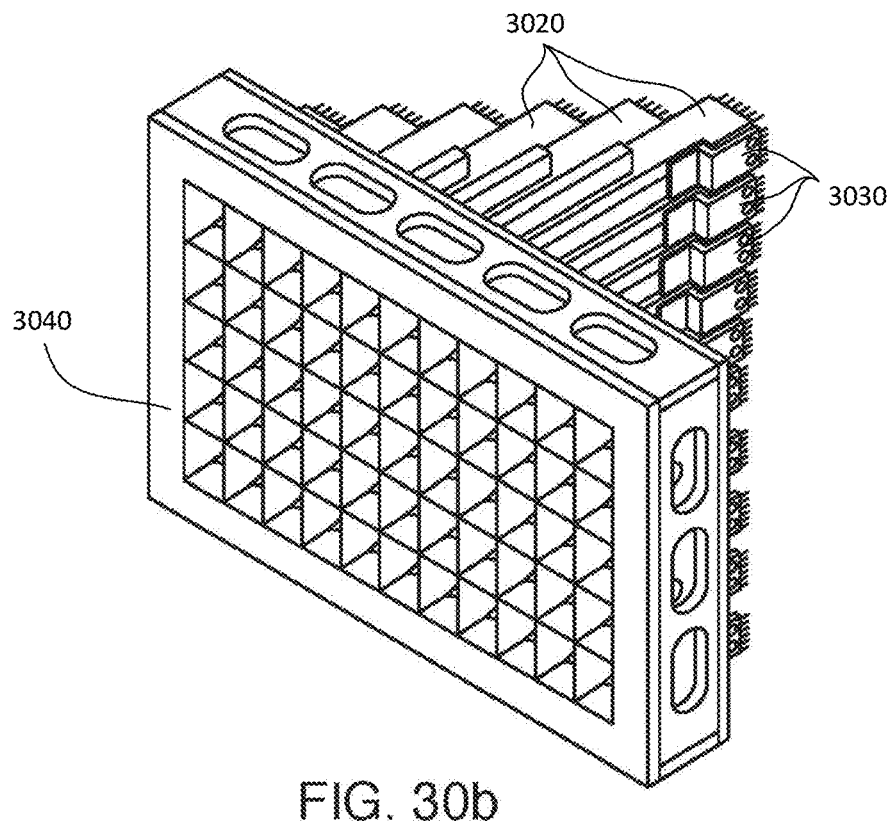
FIG. 30B is a perspective view depicting an example of an internal mechanical design of an array of fiber optic bundles and modules, according to one embodiment.

FIG. 30B is a perspective view depicting an example of an internal mechanical design of an array of fiber optic bundles 3020 and modules 3030, according to one embodiment. In this example, five face plate lengths are included. A grid 3040 may retain the leading ends (not shown) of the fiber optic bundles 3020.

With certain focal length and imaging plane dimensions, in at least one embodiment, the main lens may not require any internally moving parts for focus. Rather, the lens may move on a bellows system to provide accurate focus and a less complex, yet higher optical quality, lens design. Further, removal of the aperture blade requirements may have additional cost reduction benefits. The lens movement system may be motorized for additional efficiencies.

Figure 31:
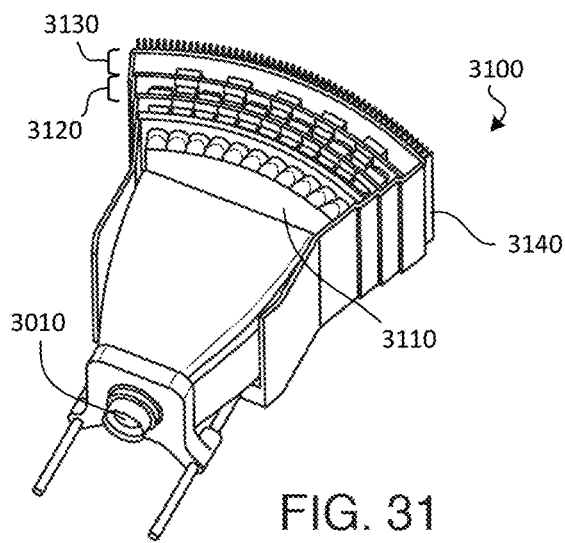
FIG. 31 is a perspective view depicting a camera according to one embodiment.

FIG. 31 is a perspective view depicting a camera 3100 according to one embodiment. The top panel of the enclosure of the camera 3100 has been removed to expose internal parts. A main lens 3010 may be similar to that of FIG. 30A. In this configuration, there is a cylindrically curved (step function) fiber image plane 3110, with two staggered image sensor layers 3120, 3130, with a heat sink 3140 on the rear.

Figure 32:
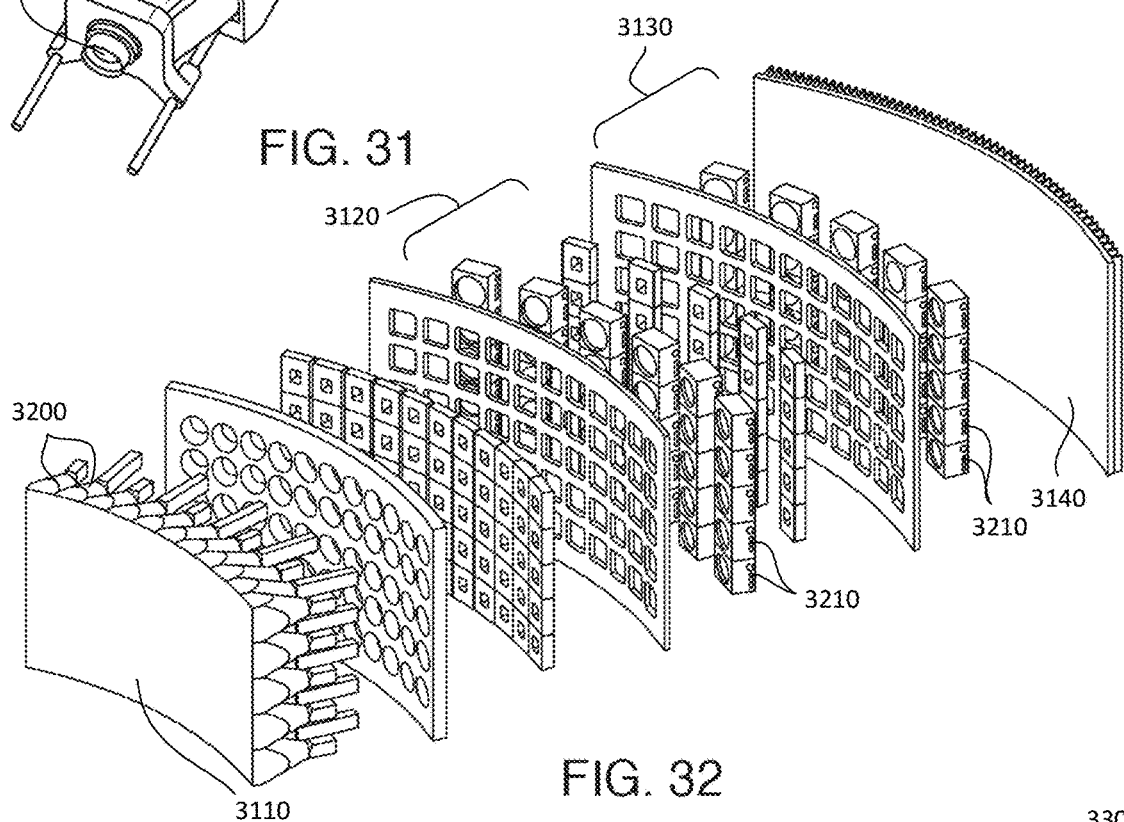
FIG. 32 is an exploded view of a portion of the camera of FIG. 31.

FIG. 32 is an exploded view of a portion of the camera 3100 of FIG. 31. Many of the internal components of the camera 3100 are shown, including the fiber image plane 3110, which may be defined by the leading ends of the fiber optic bundles 3200. The fiber image plane 3110 is depicted as a cylindrical surface in this example, although it can be planar, spherical, and/or faceted. The fiber optic bundles 3200 may have fiber faceplates with two separate lengths to convey image data to the modules 3210 of the image sensor layers 3120, 3130. Mechanical design of the fiber optic bundles 3200, the fiber face plate, modules 3210, and module mounting systems is also shown for each of the image sensor layers 3120, 3130, along with the heat sink 3140. The depicted architecture is merely an example; many other variants can be constructed.

The heat sink 3140 may serve to cool the array. In at least one embodiment, further cooling of a dense array system may be provided, for example through the use of Peltier units (thermo-electric coolers) at each image sensor. Other approaches can be used, including for example alternative heat sinks, fans, liquid cooling systems, and/or the like.

A dense fiber array structure may provide the ability to scale the product design for any number of markets/products with the same components. For example, the architecture can be implemented in any suitable dimensions, such as a 2×5 array or a 200×500 array. Depending on the dimensions, certain components may be changed, such as the main lens and mechanical design to accommodate the larger system. The physical sensor parts can be stacked together in a manner similar to Lego blocks.

In at least one embodiment, each sensor in the system may be attached to the electronics with a socket such as a zero-insertion force (ZIF) connector, to provide simplified installation and maintenance of the system. In at least one embodiment, certain electronic components within the system can be mounted or tethered on flexible or flexi-rigid cable technologies (such as for PCI boards or other cables to/from servers/storage, and/or the like), and/or any other methodology that provides the ability to stack the electronics and/or mechanical requirements as deeply as desired.

In another implementation, where only four fiber optic bundles and image sensors are used, a single tapered fiber optic bundle can be cut vertically into four equal quadrants. Each quadrant can be rotated and rearranged to provide a continuous image plane at the magnified end with almost no loss of data at the seam boundaries, and four offset demagnified sensor planes with increased mechanical separation as depicted in FIG. 33.

Figure 33:
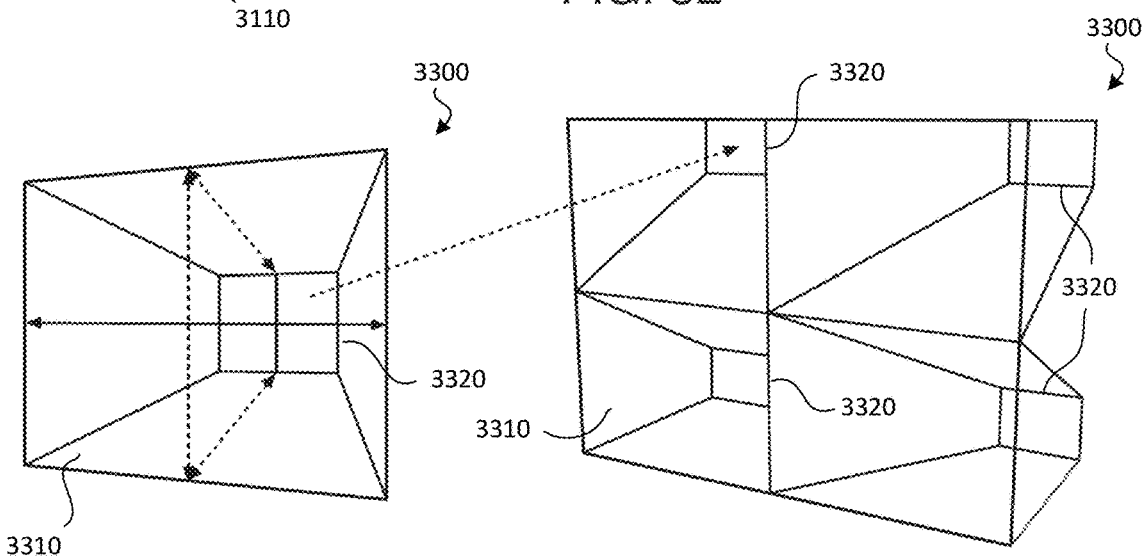
FIG. 33 is a perspective view depicting the division of fiber optic bundle into four fiber optic bundles, according to one embodiment.

FIG. 33 is a perspective view depicting the division of fiber optic bundle 3300 into four fiber optic bundles, according to one embodiment. The left-hand side depicts the fiber optic bundle 3300, which may have a leading end 3310 and a trailing end 3320. On the right-hand side, the fiber optic bundle 3300 is rotated along the y-axis and reconfigured for mechanical separation at the trailing end 3320. The arrow on the right-hand side points to a bonding point for an image sensor to the corresponding portion of the divided trailing end 3320. The image sensor and electronics can be bonded to the associated portions of the trailing end 3320. The leading end 3310 may remain undivided, providing a single planar imaging plane.

In this configuration, a single, larger, tapered fiber optic bundle may be divided into four (or more) equal sections. Those sections may then be used to mount the required modules, including packaging, with appropriate mechanical spacing. To allow for the required mechanical spacing, it may be advantageous not to put the four (or more) segments back together in the same fashion as originally produced prior to the cut. Each segment may have its own distinct shape, and may include a specific inward angle. For example, in the depicted example, the top-right quadrant may minimize inward scaling by the magnification factor into the center of the trailing end 3320. If this quadrant taper is turned up-side-down and repositioned in the location of the top-left quadrant, the resulting trailing end may then be positioned at the furthest location away from the center of the original fiber optic bundle 3300, not positioned at the top left of the large end of the segment, as shown in FIG. 33. If this is performed for all of the segments respectively, the resulting shape may provide a near-seamless imaging plane at the leading end 3310 and simultaneously provide the maximum mechanical spacing for the packaging of the image sensors through the production and division of a single tapered fiber optic bundle.

Such a design may provide significant cost reductions for the tapered fiber optic bundle manufacturing process. Production of only a single fiber optic bundle (in an embodiment that only requires four image sensors) may be less expensive than the production of four separate fiber optic bundles. In other embodiments, the configuration described above can be leveraged in configurations with multiple fiber optic bundles to provide light to more than four image sensors. This may facilitate the implementation of higher resolution and/or custom configurations.

In the above-described embodiments, it is assumed that the fiber optic bundles are cut and polished at angles that are viable for the mechanical design, including cubed edges at the image plane (at the leading end) as well as the sensor (minimized) end, so as to ensure that fiber optic bundles can be bonded together with sufficient surface area. In an alternative embodiment, the system can be implemented using a mechanical design that eliminates the bonding process. In at least one embodiment, the shape of the fiber optic bundle is made broad enough to cover an installation or process for optical image plane stitching.

FIG. 34 is a perspective view depicting an example of a tapered fiber optic bundle 3400 with cut and polished edges 3410, according to one embodiment. When multiple tapered fiber optic bundles are bonded together, the polished edges 3410 may provide the surfaces required for the bonding process.

FIG. 35 is a series of views depicting two of the tapered fiber optic bundles 3400 of FIG. 34, arranged in a 2×1 array, according to one embodiment. The polished edges 3410 of adjoining tapered fiber optic bundles 3400 may be secured together.

Advantages

Use of the tapered fiber optic bundles described herein may have many advantages. These advantages may include more flexibility and compactness in system geometry, which may result in greatly increased accuracy of depth estimation from a computational imaging standpoint. Further, obtaining high optical quality and/or a high F-number may be accomplished at a comparatively smaller cost.

For example, a system leveraging a 35 mm optical format can have an F/2 lens and a 50 mm focal length. This system may provide, assuming 1 GP resolution requirements, about a 0.9 µm pixel pitch and a 25 mm entrance pupil (EP). Increased entrance pupil size provides increased parallax, and therefore (generally speaking) more accuracy for all aspects of depth computation, motion/vector tracking, and computational imaging.

In general, a 0.9 µm pixel pitch and 25 mm EP is a very challenging design, requiring greater than state-of-the-art optical design in order to achieve 550 pixels/mm, not to mention the increased QE of small pixel design (due to less physical area for photon collection), decreased photons available at video rates per pixel (due to potentially less integration time), scatter of wavelengths of light in silicon (particularly red, about a 7.6 µm diffusion potential) and diffraction limitations (due to the airy disc as determined by the lens parameters and resulting pixel size requirements), all resulting in significant reduced image quality for a light-field imaging system, as well as for any standard 2D imaging system.

For the above-described 0.9 µm pixel system, the diffraction limitations would suggest a lens of less than F/0.5 design to help avoid diffraction limitations, although the color diffusion in silicon may continue to exist and other aberrations or distortions may occur due to such a challenging lens design. Using conventional techniques, designing such a lens with high quality imaging is extremely challenging, if not impossible. For example, if a 100 mm focal length is desired with an F/0.5 design, the theoretical entrance pupil required may exceed 400 mm, which is an extraordinarily large optical apparatus with huge potential cost, size, and weight implications, and a significant mechanical challenge.

The approach described herein may address such limitations of existing systems. One may leverage existing pixels used for existing professional applications (e.g. 5.5 µm) with a 3:1 magnification fiber taper ratio to allow for electronics/mechanical design, resulting in an approximate 16.5 µm virtual pixel. This pixel size may provide a significantly increased photon collection area (even in exchange for the transmission loss through the fiber bundles), with nearly 0 pixels of color diffusion. Further, this pixel size may be well below diffraction limitations, even at larger F-numbers (i.e., smaller apertures).

Using the techniques described herein, a system may be designed with an imaging plane greater than about 600 mm in width, as opposed to a 35 mm wide imaging plane as mentioned above, to result in the same pixel resolution, with a lens producing an equivalent field of view (FOV) as a standard 50 mm lens (approximately a 900 mm lens) with an F/9. The result may be a 100 mm entrance pupil with a readily available optical design. The imaging qualities of such a system are vastly superior to conventional designs.

In another embodiment, geared at the same increase in system geometry but requiring an increase in system transmission and/or where mechanical enclosure requirements are potentially larger, the system can be implemented in a manner wherein the main lens projects an image onto the MLA (micro lens array), followed by a single or tiled fiber faceplate (or other transmissive surface). This may result in a viewed image at the rear of the fiber face plate, with high transmission as the fiber elements have very high efficiency when used as a relay alone. The image may appear similar to viewing an image on ground glass, yet may retain higher overall MTF/image quality.

In at least one embodiment, behind this arrangement, N/resolution cameras can be arranged in an array to re-photograph the image as projected onto the fiber face plate surface. Each sensor may use a focal length that is matched across the array and to the corresponding FOV of required coverage. Some overlap may be desirable as well. The lenses may have extremely wide F numbers (such as 0.5, for example), as the total range of depth-of field (DOF) to be captured per lens is very shallow. However, the overall FOV acquired through the computational system may be extremely wide. One advantage to this approach may be simplified system design.

Use of a non-planar surface for imaging, as described above, may help to reduce the effects of aberrations in the main lens of a camera. Known methods often utilize software correction efforts and/or extensive calibration routines to correct for lens aberration. Such aberration effects may not be as apparent in the image derived from a non-planar surface such as a cylindrical or spherical surface, as described herein.

Alternative Sensors and Transmissive Surfaces

Figure 36:
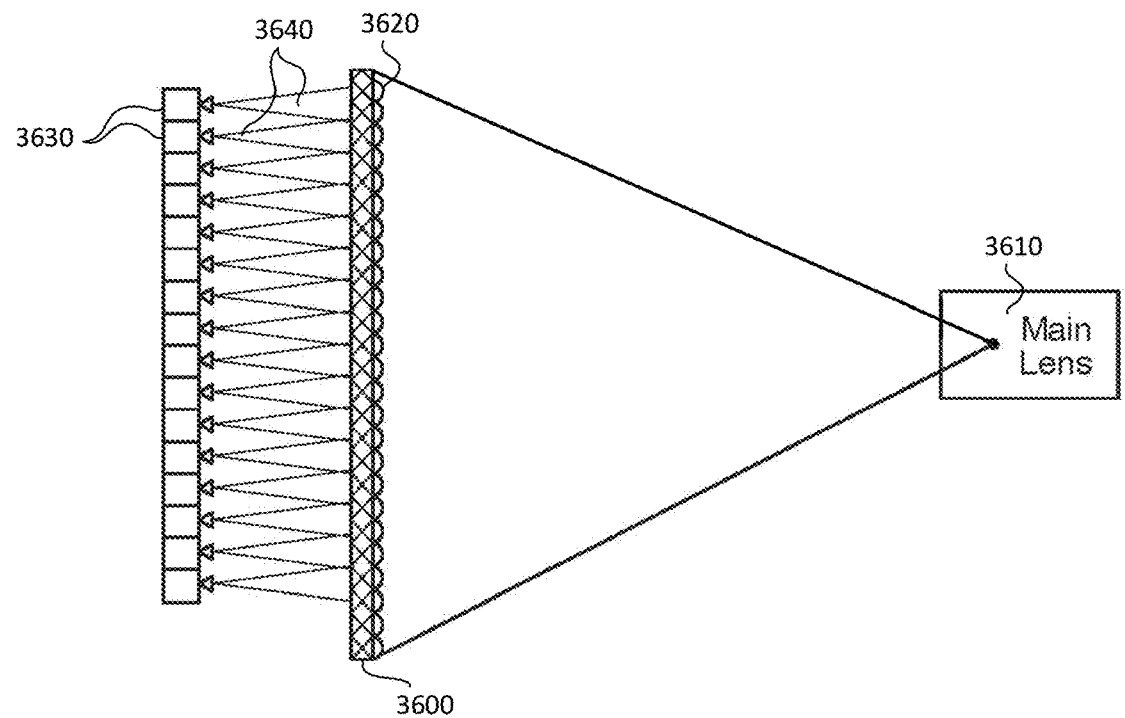
FIG. 36 is a side view depicting an example of an alternative structure utilizing a transmissive surface, according to one embodiment.

FIG. 36 is a side view depicting an example of an alternative structure utilizing a transmissive surface 3600 as described above, according to one embodiment. A main lens 3610 may transmit images onto the microlens array, or MLA 3620, followed by the transmissive surface 3600. The transmissive surface 3600 may be a fiber face plate, ground glass, or the like. The image may be re-imaged by a series of image sensors, or modules 3630, and lenses with or without overlapping fields of view. The image may be conveyed from the transmissive surface 3600 to the modules 3630 by tapered fiber optic bundles 3640.

In at least one embodiment, between the MLA 3620 and the tapered fiber optic bundles 3640 and/or face plate, an additional fiber plate may be interjected to further diffuse the transmission of light and provide increased angular sensitivity or altered directionality to the modules 3630. With a demagnification of the image plane to the modules 3630 (such as an arrangement wherein the plane behind the MLA 3620 is at 1×, and the sensor side is 3× magnified), the angles of exit may be ⅓ the angles of entry, which may produce increased sensitivity for the modules 3630, and provide the ability to use extremely large apertures (e.g. F/0.5 on a <APS-C system) without decreased sensitivity at the high incident angles of entry. Such an approach can applied in many different architectures and applications, not limited to light-field capture, such as for example traditional capture as well as projection technologies.

Figure 37:
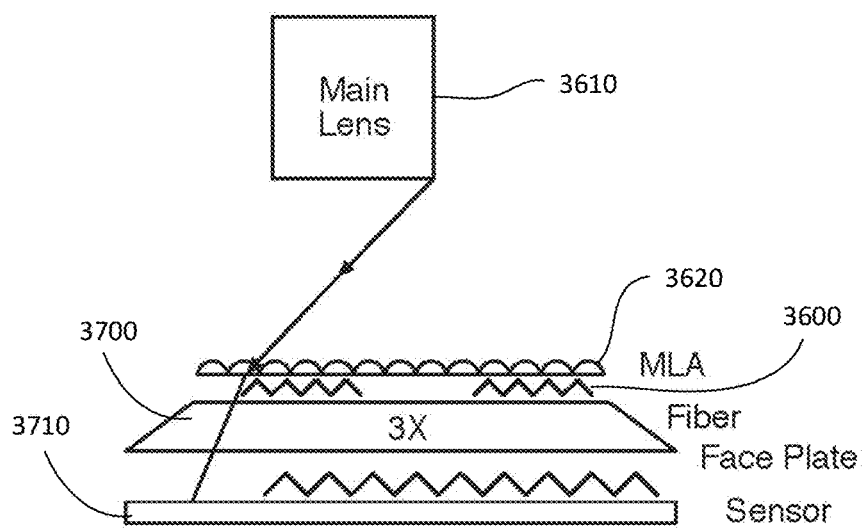
FIG. 37 is a top view depicting an example of inclusion of a tapered fiber optic bundle that magnifies light to the imaging sensor, according to one embodiment.

FIG. 37 is a top view depicting an example of inclusion of a tapered fiber optic bundle 3700 that magnifies light to the imaging sensor, according to one embodiment. Such magnification may reduce the angles of exit from the MLA 3620 to the image sensor, or module 3710 (or in the alternative, modules), according to one embodiment.

In at least one embodiment, the module 3710 may be replaced with one or more scanline sensors for non-moving or other forms of imagery. Scanline sensors, including flatbed scanners, are commercially available and may be used behind the main lens 3610 and MLA 3620, with or without the fiber bundle technologies and/or with or without the beam splitting technologies described herein. For volume capture applications, the use of the scanline illumination system may be left active if desired.

Figure 38:
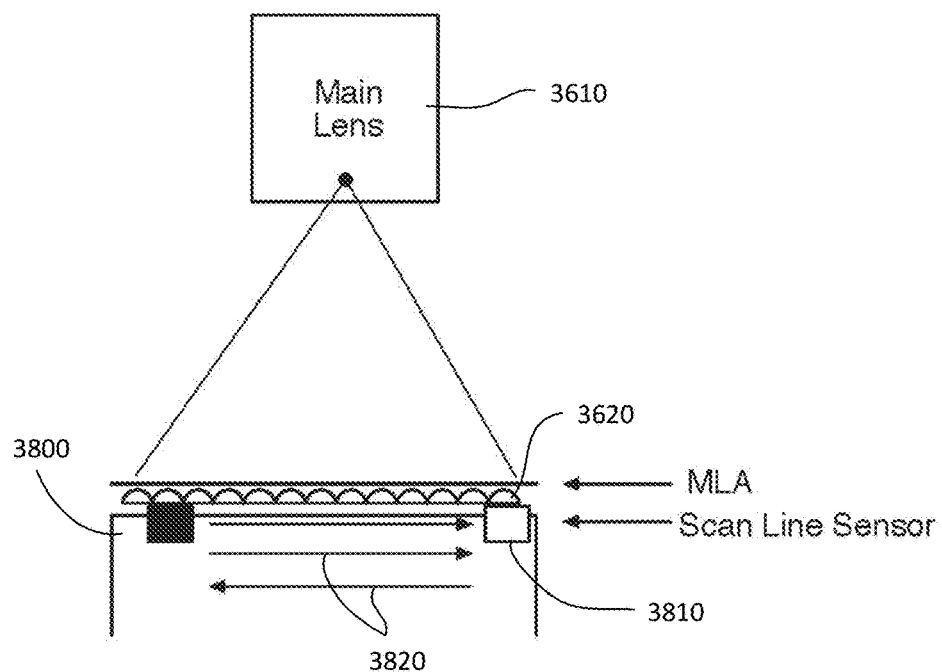
FIG. 38 is a top view depicting exemplary use of a scanline imager imaging the entire area according to one embodiment.

FIG. 38 is a top view depicting exemplary use of a scanline imager 3800 imaging the entire area according to one embodiment. The scanline imager 3800 may be of any known type, and may be used in conjunction with other components described previously, including but not limited to the main lens 3610 and MLA 3620. As shown in FIG. 38, the scanline imager 3800 may have a scanline sensor 3810, which may move along a linear pathway indicated by the arrows 3820.

In at least one embodiment, global shutters can be used. Alternatively, mechanical shutters plus a rolling shutter may be used. As yet another alternative, rolling shutters can be used alone.

System Calibration

In at least one embodiment, each sensor and microlens is carefully calibrated and aligned, so as to ensure high quality imaging and reconstruction of the light-field. In at least one embodiment, the process to perform such calibration includes, in no particular order, two-dimensional calibration steps/processes as well as light-field calibration.

Such calibrations can be performed in hardware/manufacturing or in software, or in any combination thereof. In at least one embodiment, calibration is performed in hardware as close to the ideal specifications as possible, and further corrections are made in software as needed. In some environments, a combination of hardware and software calibration processes can be used. In further refinement of the technology into mass-production markets, the software calibration process can, in some cases, be a higher percentage of the calibration process due to more lax tolerances for lower price point markets.

Two-dimensional calibrations may include, but are not limited to, standard image sensor optimization and calibration. This may include, but is not limited to, hot spot removal, dead pixel removal, ADC optimizations, dark time/noise calibration, and/or the like. Array calibrations may include, but are not limited to, standardization of all image sensors in the array to an ideal state. Additionally or alternatively, image sensors may be adjusted to match an average or single image sensor within the array to ensure continuity and consistency between each of the imaging elements. Light-field calibrations may include, for example, alignment of each microlens and the standardization of the pixels captured within the light-field, as well as computational adjustments for lens distortion, vignetting, and/or other aberrations produced within the optical system.

In some cases, use of fiber optic technologies can produce additional static noise artifacts that can be described as fixed noise patterns, "chicken wire" artifacts, seam gap distortions, and/or other artifacts arising from use of the fiber optic bundles. Other calibrations can be performed to alleviate these artifacts, including but not limited to static fiber noise removal and seam gap removal.

In at least one embodiment, within the current tolerances provided in the image plane reconstruction, given the large magnified pixel structures, the seam gap accounts for approximately one pixel per image sensor. A gap of this magnitude may easily be accounted for within light-field image reconstruction so that the resulting image does not display any visible seams.

Figure 39:
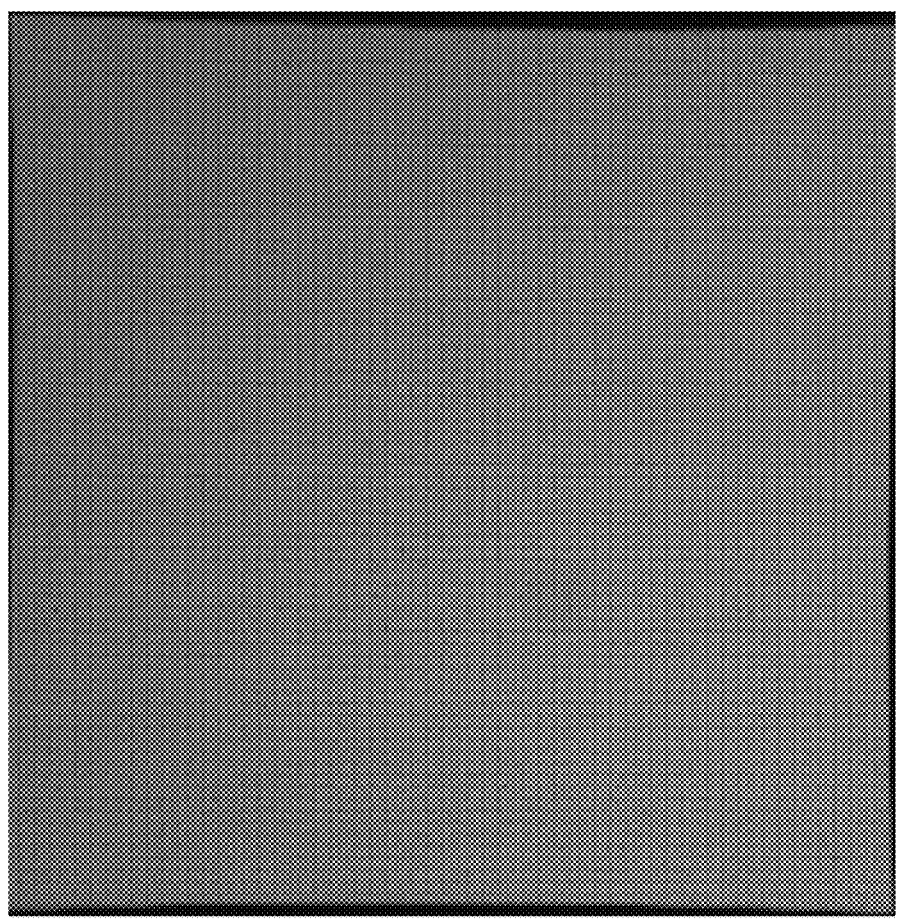
FIG. 39 is a front view depicting an example of 10% tolerance on an imaging sensor, plus pre-distortion correction from a fiber taper, according to one embodiment.

FIG. 39 is a front view depicting an example 3900 of 10% tolerance on an imaging sensor, plus pre-distortion correction from a fiber taper, according to one embodiment. The black pixels represent the area where no light is present due to the alignment of the active fiber surface. In at least one embodiment, the system achieves 1% tolerance of lost pixels, although the exact tolerances are determined by the calibration and alignment process.

MLA Considerations and Design

In at least one embodiment, the MLA (micro lens array) is directly mounted (with appropriate spacing, focal length (FL), and/or the like) to the leading end of each fiber optic bundle. In various embodiments, the MLA may be front-facing with thick glass/substrate bonded directly to the fiber surface or with an included air-gap, or rear-facing (lenslets facing the fiber vs. facing the lens) with an air gap and manufactured onto a substrate for structure.

Figure 40:
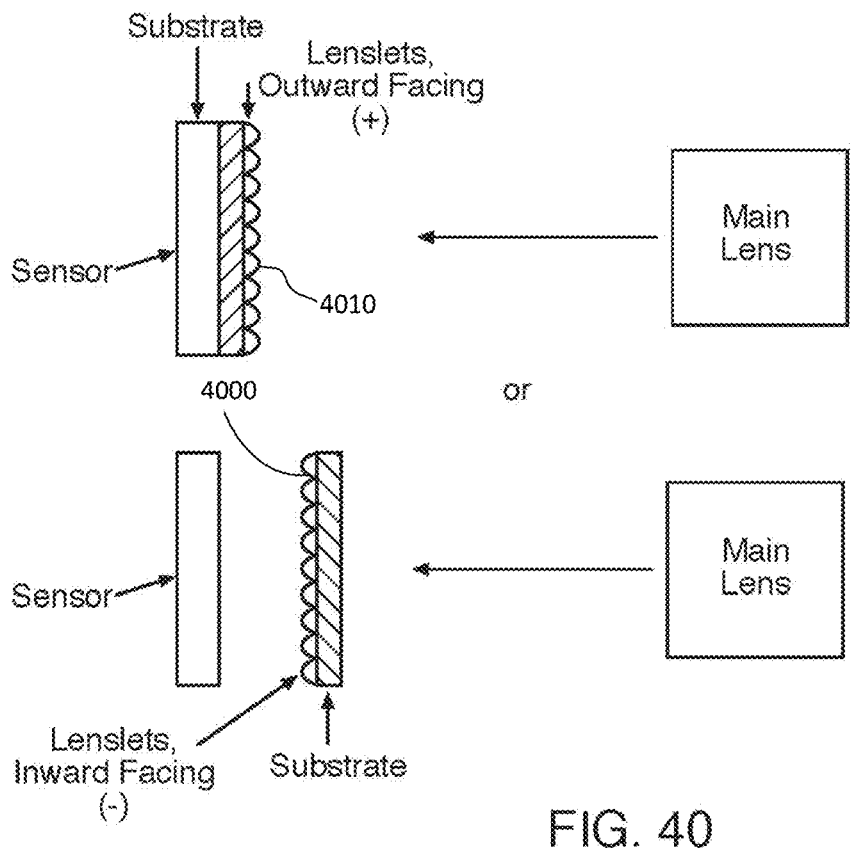
FIG. 40 depicts examples of inward and outward facing MLA's, according to certain embodiments.

FIG. 40 depicts examples of inward and outward facing MLA's 4000 and 4010, respectively, according to certain embodiments. In various embodiments, the MLA may be an identical structure throughout the array, or may vary in focal length per lenslet or per region.

Figure 41:
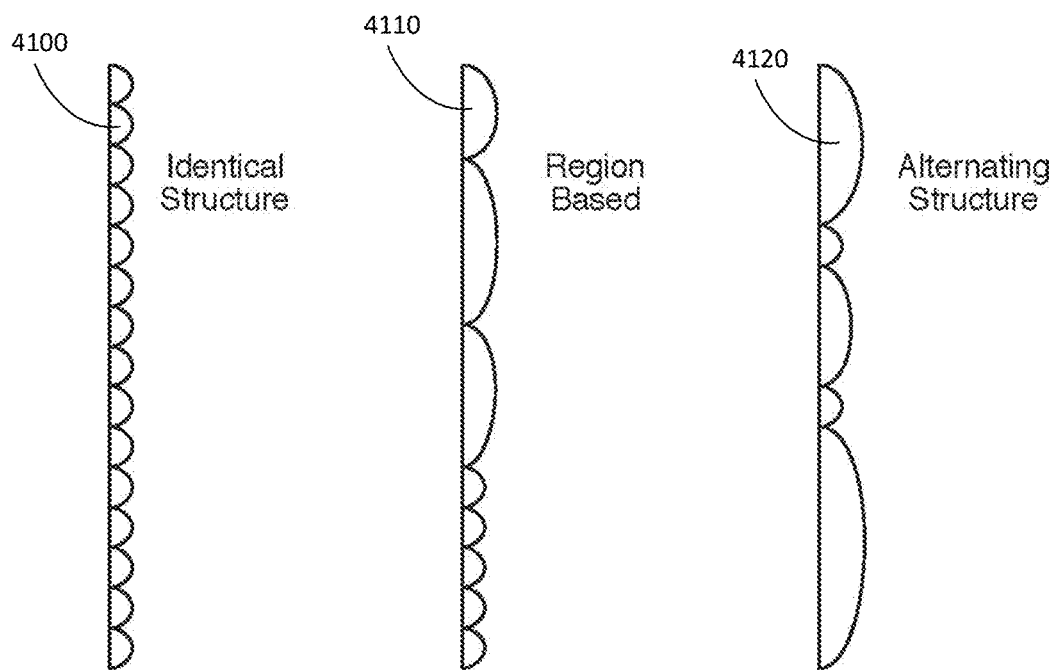
FIG. 41 is a series of side views depicting examples of different configurations of the microlens array, according to certain embodiments.

FIG. 41 is a series of side views depicting examples of different configurations of the microlens array, according to certain embodiments. These configurations may include one in which the MLA 4100 is an identical structure, one in which the MLA 4110 varies by region, and one in which the MLA 4120 varies in an alternating or random fashion. In at least one embodiment, the MLA may be constructed in such a way that every lenslet has separate parameters in order to optimize the imaging capability of the system.

Figure 42A:
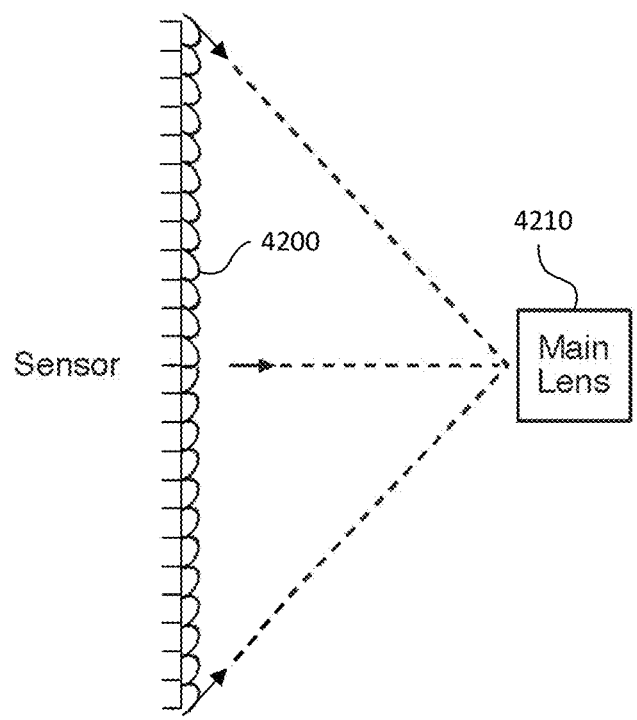
FIG. 42A is a side view depicting an example in which the MLA has tilted structures angled towards the optical center of the main lens across the entire imaging area, according to one embodiment.

FIG. 42A is a side view depicting an example in which the MLA 4200 has tilted structures angled towards the optical center of the main lens 4210 across the entire imaging area, according to one embodiment. If desired, the microlenses of the MLA 4200 may have variable tilt so that each microlens is oriented toward the optical center.

Figure 42B:
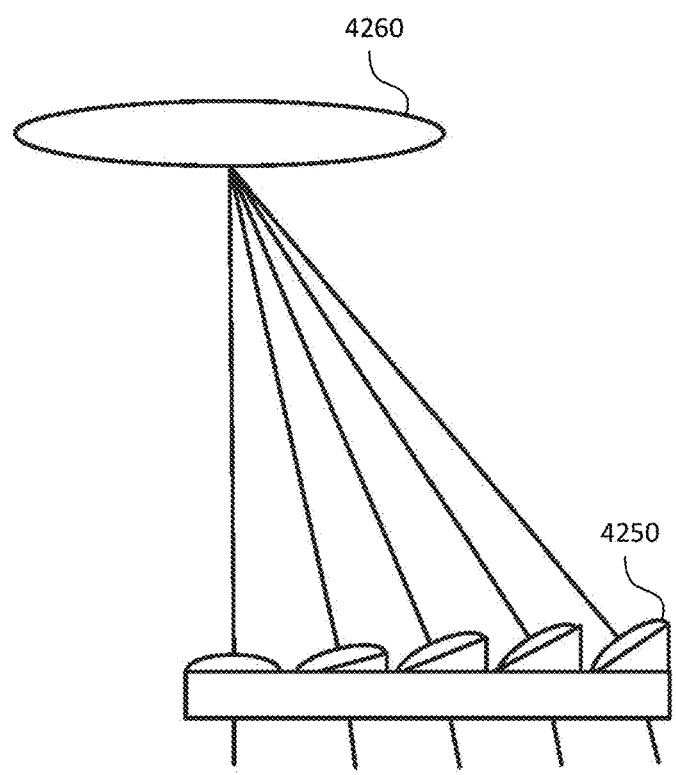
FIG. 42B is a side view depicting an example of an optimized MLA for a large chief ray angle (CFA) with tilted lenslets, according to one embodiment.

FIG. 42B is a side view depicting an example of an optimized MLA 4250 for a large chief ray angle (CFA) with tilted lenslets, according to one embodiment. The lenslets may be tilted such that each lenslet is oriented generally toward the optical center of the main lens 4260.

In at least one embodiment, the MLA may be constructed at the demagnified (i.e., trailing) end of the fiber optic bundles to help compensate for the increased exit angles. An example is shown in FIG. 43A.

Figure 43A:
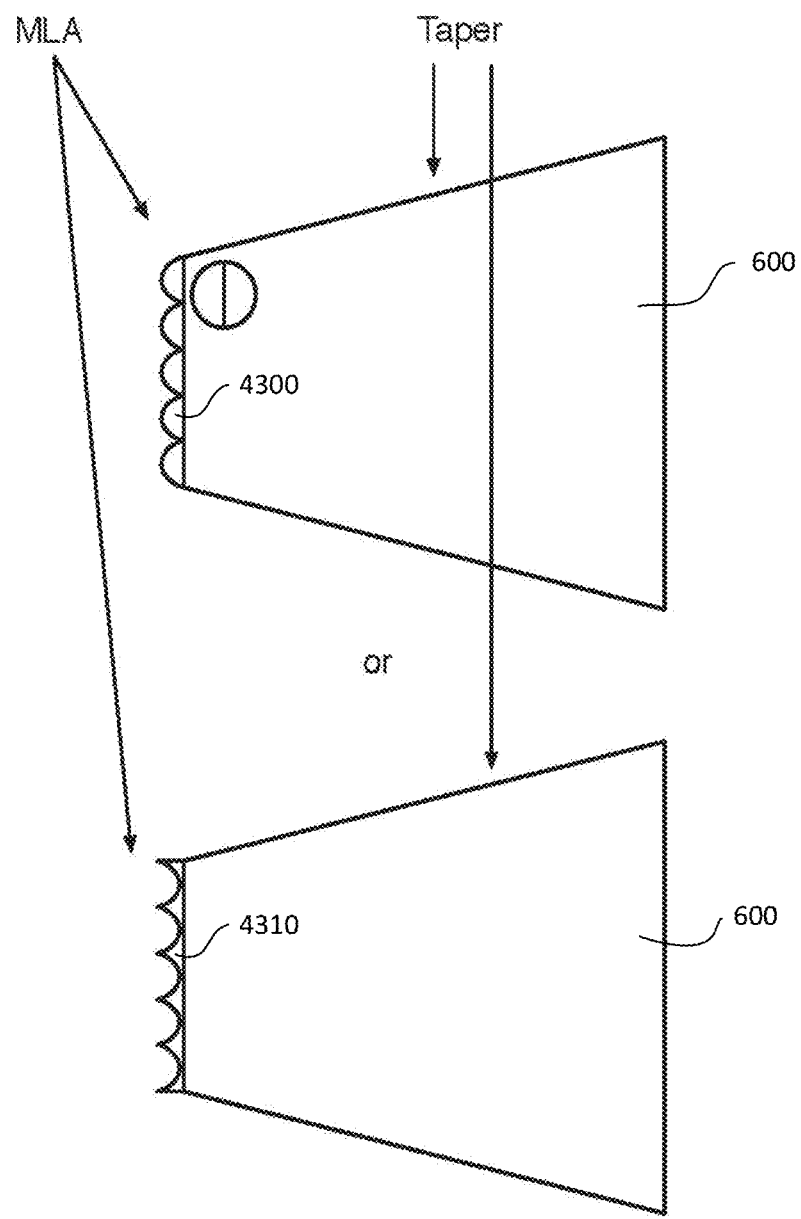
FIG. 43A is a side view depicting MLA structures secured to the trailing ends of fiber optic bundles, according to certain embodiments.

FIG. 43A is a side view depicting MLA structures 4300, 4310 secured to the trailing ends of fiber optic bundles 600, according to certain embodiments. The MLA structure 4300 provides convex microlenses, while the MLA structure 4310 provides convex microlenses.

In at least one embodiment, MLA structures (and/or other optical structures) may be used at both the entrance and exit of the tapered fiber optic bundle, with or without air gaps, and with or without manufacturing the MLA's on a substrate. An example is shown in FIG. 43B.

Figure 43B:
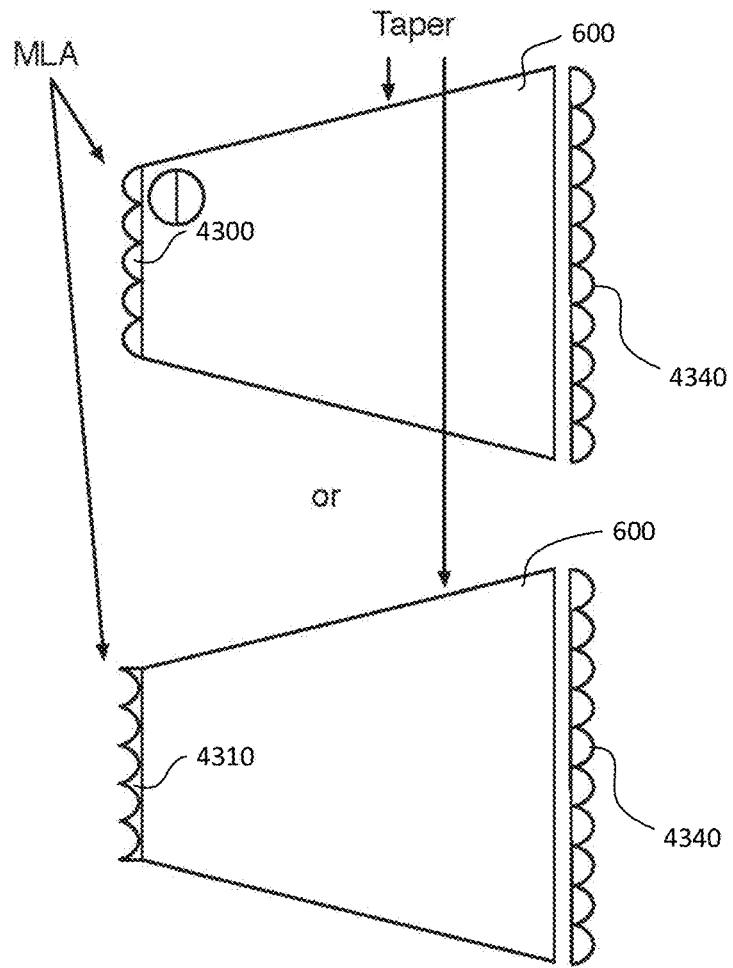
FIG. 43B is a side view depicting the MLA structures of FIG. 43A secured to the trailing ends, and an MLA structure secured to the leading ends, of the fiber optic bundles and MLA, according to certain embodiments.

FIG. 43B is a side view depicting the MLA structures 4300, 4310 of FIG. 43A secured to the trailing ends, and an MLA structure 4340 secured to the leading ends, of the of fiber optic bundles 600 and MLA, according to certain embodiments. An air gap may or may not be present between the fiber optic bundle 600 and the MLA structure 4300, the MLA structure 4310, or the MLA structure 4340.

In at least one embodiment, the MLA structure(s) may be manufactured into the surface of the fiber optic materials directly, with or without additional optics, and with or without a tapered design. An example is shown in FIG. 43C.

Figure 43C:
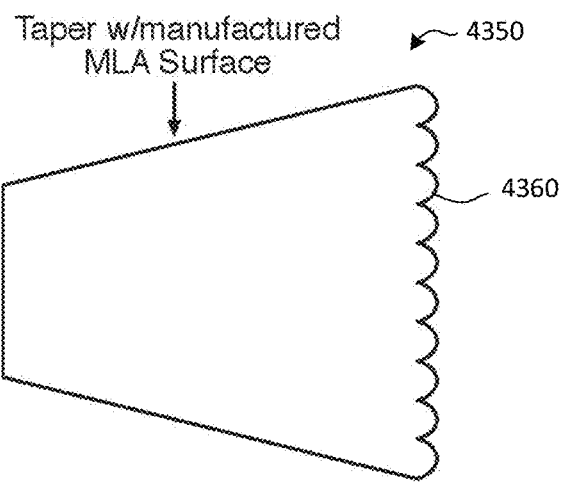
FIG. 43C is a side view depicting a fiber optic bundle with an integrated MLA, according to one embodiment.

FIG. 43C is a side view depicting a fiber optic bundle 4350 with an integrated MLA 4360, according to one embodiment. The MLA 4360 may be formed into the leading end of the fiber optic bundle 4350. Additionally or alternatively, an MLA (not shown) may be formed into the trailing end of the fiber optic bundle 4350.

In at least one embodiment, the MLA design may be multi-layered in order to provide more optimized structure for imaging. Such an approach may be used independently, or in combination with any of the other approaches.

Figure 44:
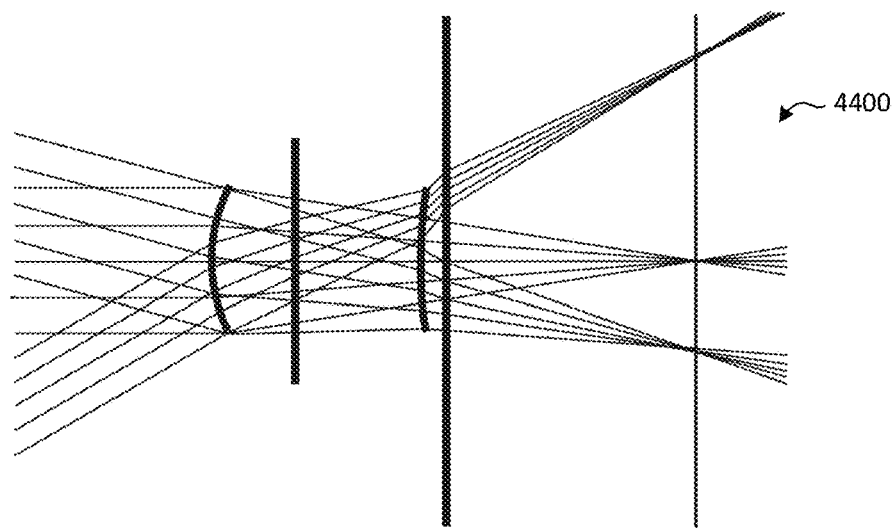
FIGS. 44 and 45 are side views depicting examples of a dual-layered MLA configuration, according to certain embodiments.
Figure 45:
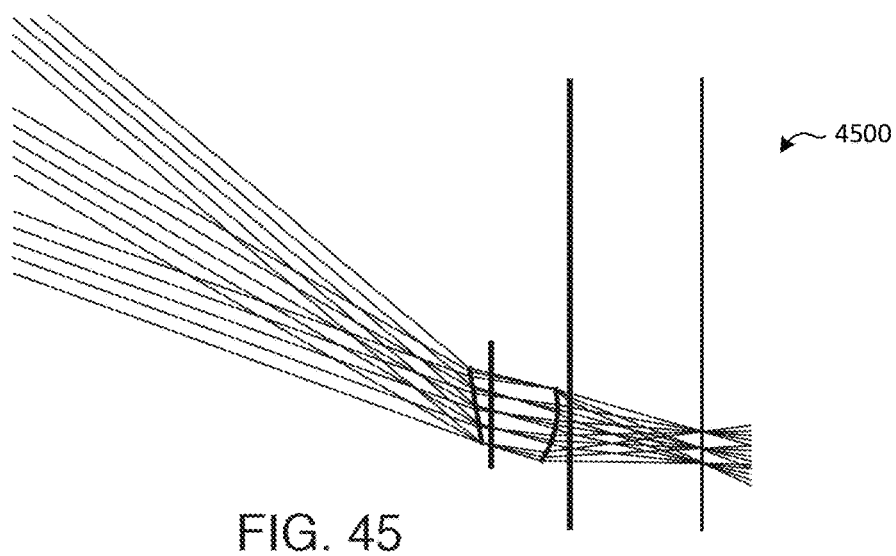

FIGS. 44 and 45 are side views depicting examples 4400, 4500, respectively, of a dual-layered MLA configuration, according to certain embodiments. A dual-layered MLA configuration may be used to increase off-axis performance and provide good collimation with a dual substrate approach (such as glass and polymer).

In some embodiments, the leading ends of fiber optic bundles may be combined to form a very wide fiber optic plane, for example, having a width of 10 cm, or even 1 m or larger. A microlens array may be secured to or formed on the leading ends. A set of cameras may be positioned to receive image data from the fiber optic bundles to image based on the resolution of the microlenses and the image sensor itself. A wide variety of alternative configurations may alternatively be used, as follows.

Figure 46A:
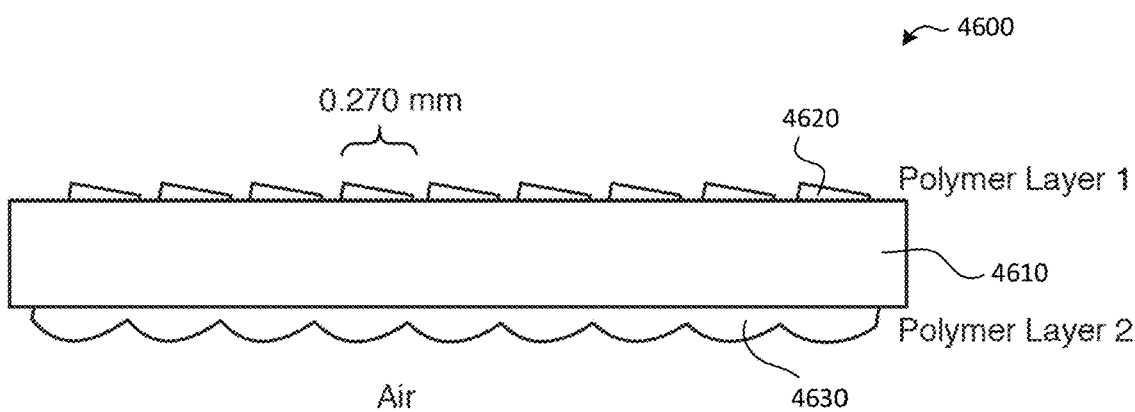
FIG. 46A is a side view depicting an example of a dual-layered MLA that can be used to increase off-axis performance using two polymer layers and one glass surface, according to one embodiment.

FIG. 46A is a side view depicting an example 4600 of a dual-layered MLA that can be used to increase off-axis performance using two polymer layers and one glass surface 4610, according to one embodiment. MLA's 4620 and 4630 may be formed in the polymer layers on either side of the glass surface 4610. In various embodiments, the MLA may be a single sheet, or tiled in a planar array.

FIG. 46B is a top-down view depicting an MLA 4640 as a single sheet and an MLA 4642 as a tiled, planar array, according to certain embodiments. The MLA 4642 has four components, but may have more or fewer in other embodiments. If desired, each component of the MLA 4642 may consist of only a single microlens.

Figure 46C:
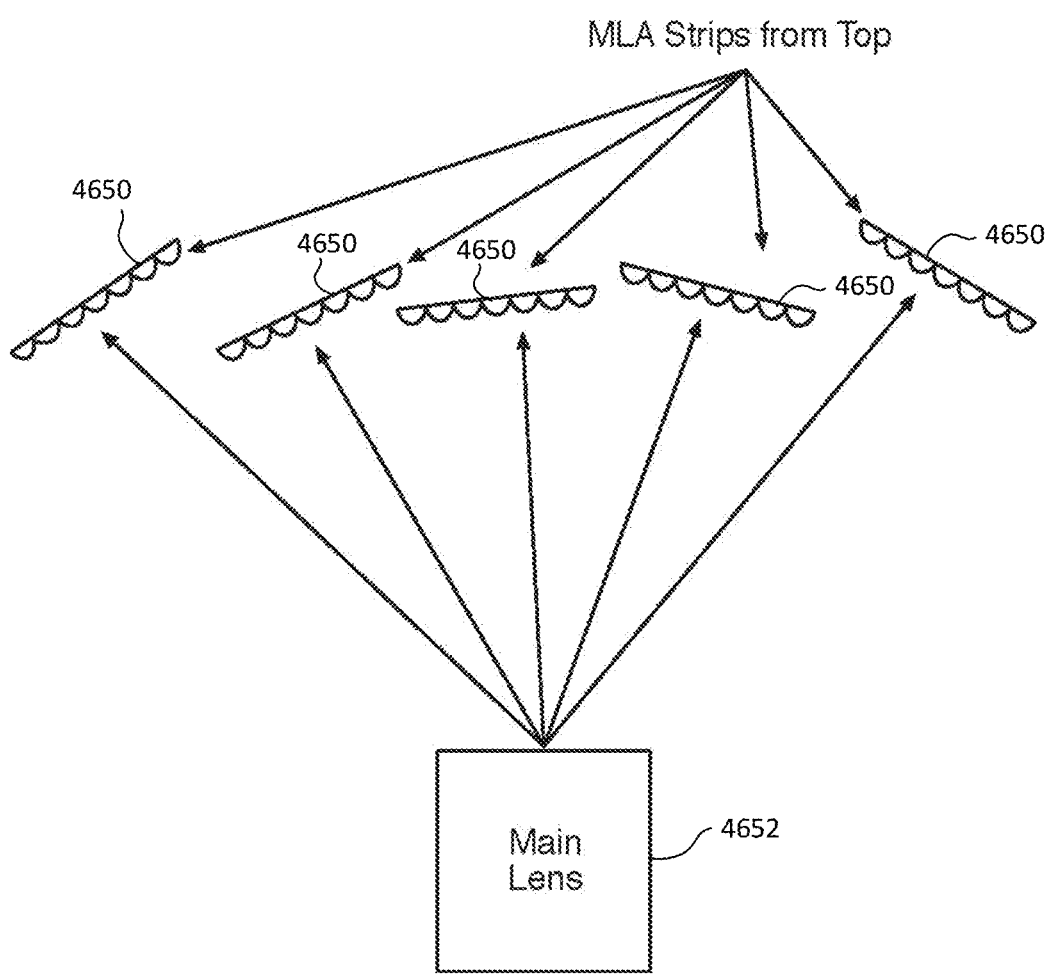
FIG. 46C is a top view depicting a plurality of MLA strips positioned at various orientations to face a main lens, according to one embodiment.

In at least one embodiment, if a beam splitter or other optically splitting element is used, the MLA may be provided in strips, with the active imaging area being aligned to either over-scan the lens/scene or lined with precision to avoid overlap. See, for example, FIGS. 15 and 18. In at least one embodiment, these strips in this configuration may be angled to optimize the transmission of light for a specified optical system. FIG. 46C depicts an example.

FIG. 46C is a top view depicting a plurality of MLA strips 4650 positioned at various orientations to face a main lens 4652, according to one embodiment. The MLA strips 4650 may be secured to fiber optic bundles and/or other components.

Figure 46D:
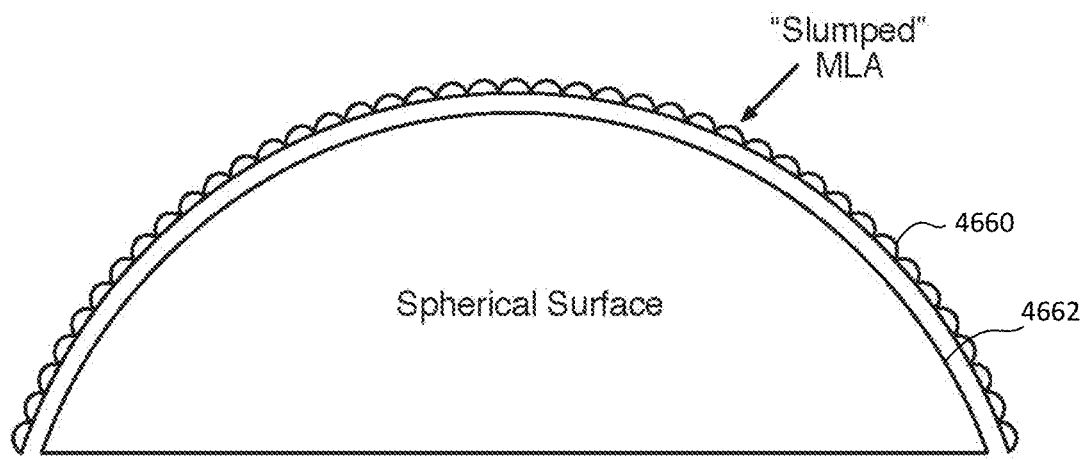
FIG. 46D is a top view depicting a spherical MLA mapped to a spherical surface, according to one embodiment.

In at least one embodiment wherein a spherical or cylindrical surface is used, the MLA may be "slumped" to map to this exact shape, or may be manufactured directly in this form. FIG. 46D depicts an example.

Figure 46E:
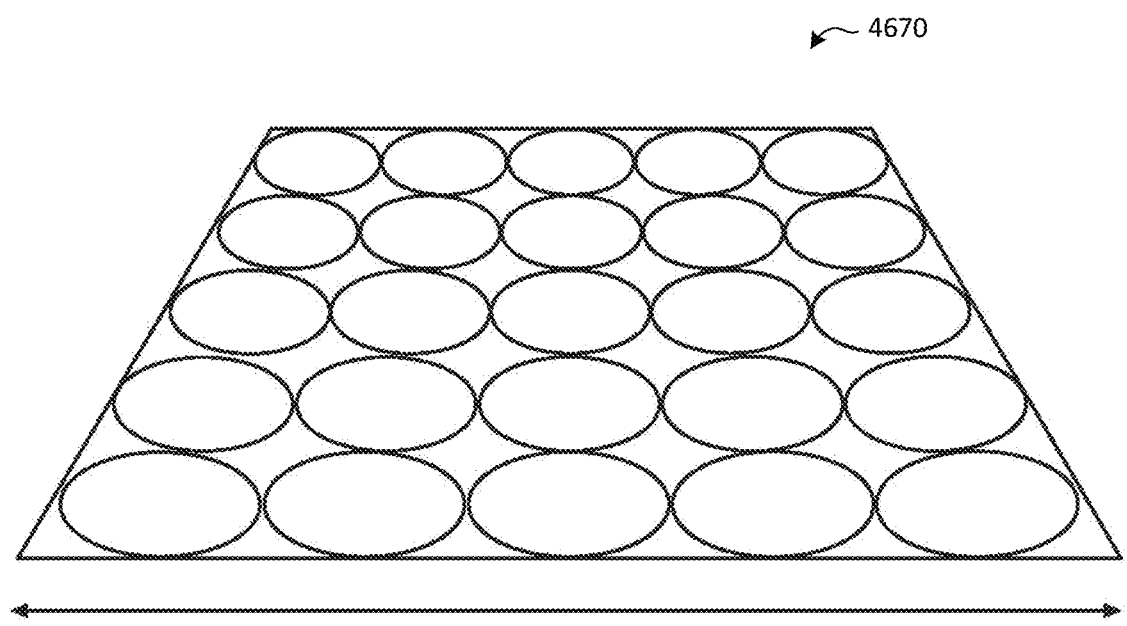
FIG. 46E is a perspective view depicting an MLA that has been formed in a trapezoidal shape, according to one embodiment.

FIG. 46D is a top view depicting a spherical MLA 4660 mapped to a spherical surface 4662, according to one embodiment. The MLA 4660 may be manufactured in a spherical form, or may be manufactured in planar form or in a different shape, and subsequently processed to provide the curvature of FIG. 46D. For a spherical surface, the MLA can be distorted such that the XY dimensions, when imaged, retain a rectilinear pixel structure (as the taper is trapezoidal). FIG. 46E depicts an example.

FIG. 46E is a perspective view depicting an MLA 4670 that has been formed in a trapezoidal shape, according to one embodiment. The trapezoidal shape may help provide a rectilinear pixel structure when mapped to a spherical surface.

Figure 46F:
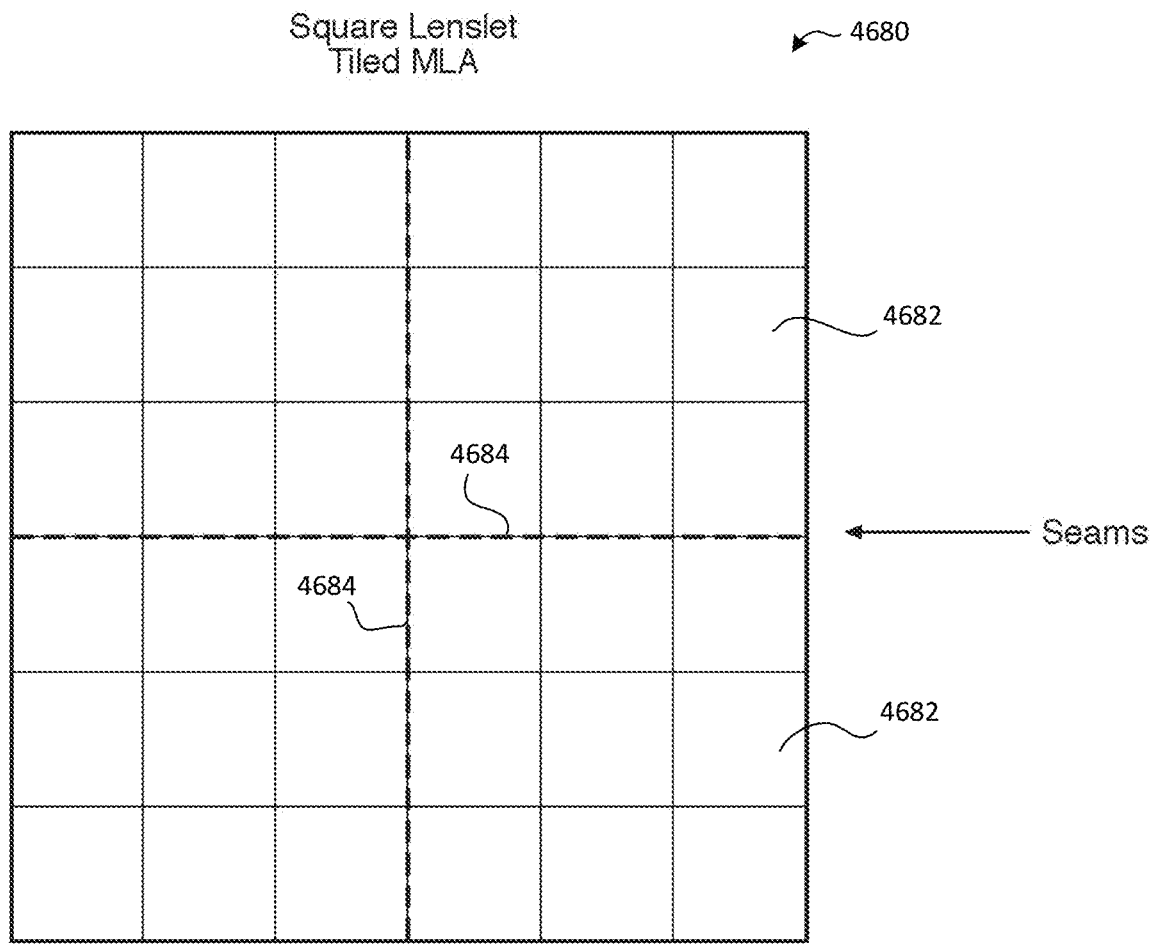
FIG. 46F is a top-down view depicting an MLA with square lenslets, according to one embodiment.

In at least one embodiment wherein tiles are used for the MLA, square lenslets may be used to provide higher seaming accuracy. This may allow the lenslets to be tiled together. FIG. 46F depicts an example.

FIG. 46F is a top-down view depicting an MLA 4680 with square lenslets 4682, according to one embodiment. The square lenslets 4682 may be tiled together at seams 4684.

Figure 46G:
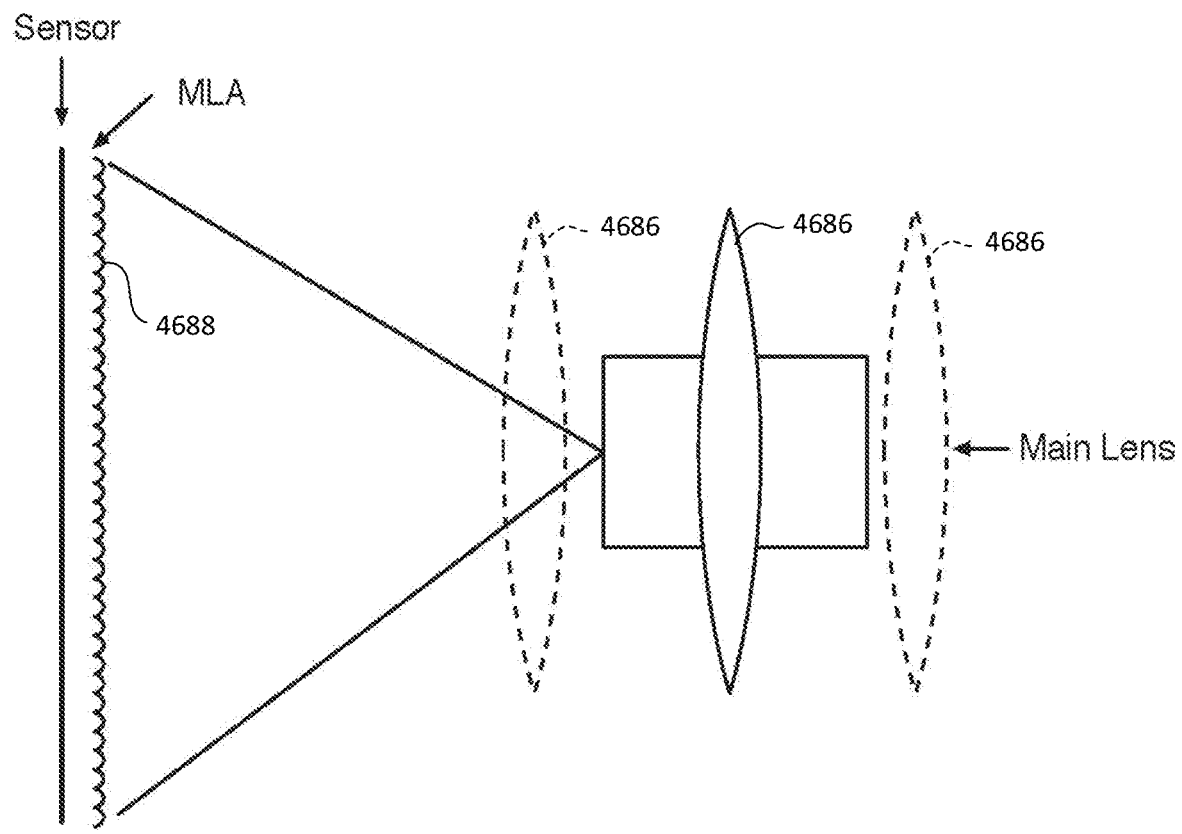
FIG. 46G is a side view depicting an example of a main lens that is movable relative to an MLA, according to one embodiment.

In another embodiment, an MLA can be created with a high-speed mechanical translation stage to provide alignment, or time-sequential focus sweeps during capture. In yet another embodiment, a variable lens structure can be created via liquid lenses, birefringent materials, polarized optics, and/or the like, so as to provide the ability to electronically vary focal length in a time-sequential method, or for alignment purposes. FIG. 46G depicts an example.

FIG. 46G is a side view depicting an example of a main lens 4686 that is movable relative to an MLA 4688, according to one embodiment. In addition or in the alternative, the MLA 4688 may translate relative to the main lens 4686. Motion of the main lens 4686 may additionally or alternatively be replaced with other mechanisms for altering main lens optics, such as liquid lenses, birefringent materials, polarized optics, and/or the like.

In another embodiment, multiple optical paths, which may include beam splitters, prisms, etc., are provided behind the main lens in order to generate multiple imaging planes that may be configured at identical focal distances from the main lens for the purposes of noise reduction. Alternatively or additionally, identical focal distances can be used with an XY sub-pixel offset for the purposes of noise reduction and super resolution. Alternatively or additionally, varied focus distances can be used so as to increase the refocusable range and decrease the "zero lambda" refocus issue. Any combination of the above-described strategies can be used, as depicted for example in FIG. 46H.

Figure 46H:
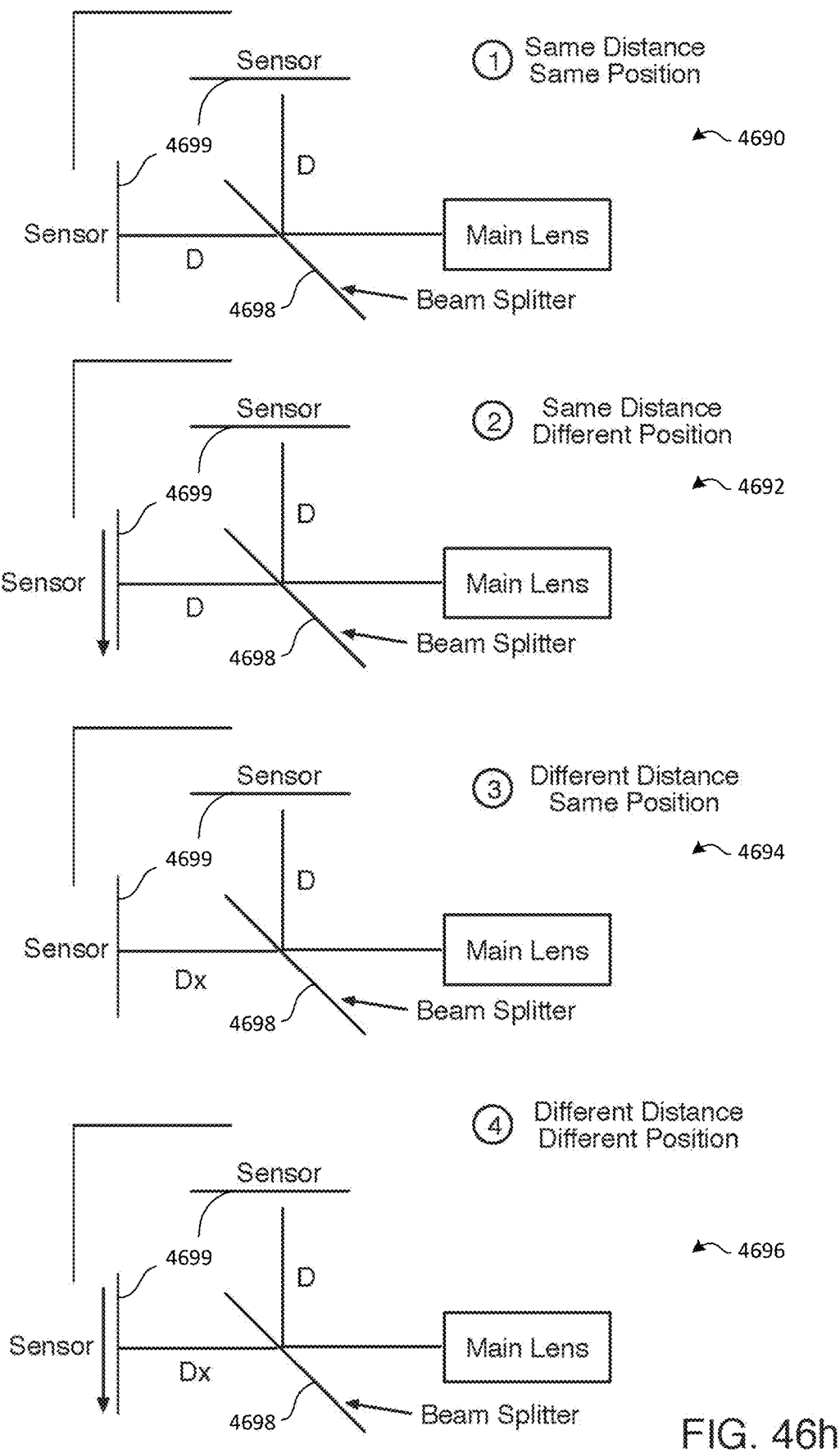
FIG. 46H includes a series of side views of examples depicting various ways in which a beam splitter may be used to divide incoming light between image sensors, according to one embodiment.

FIG. 46H includes a series of side views of examples 4690, 4692, 4694, and 4696 depicting various ways in which a beam splitter 4698 may be used to divide incoming light between image sensors 4699, according to one embodiment. The image sensors 4699 may be offset relative to each other, toward or away from the beam splitter 4698 and/or in a direction perpendicular to that of the approaching light, as shown.

Main Lens

In at least one embodiment, the main lens of the system is able to generate an image circle at or greater than the maximum dimensions of the image plane diameter. This lens may be fixed, or combined with a focus modification system including liquid lenses, birefringent materials, polarized optics, and/or the like, to provide the ability to electronically and/or mechanically vary focal length in a time-sequential manner (or for alignment purposes). By capturing light-field "focus sweeps" in a time-sequential manner, one is free to reconstruct the light-field with drastically increased refocusable range.

Figure 47A:
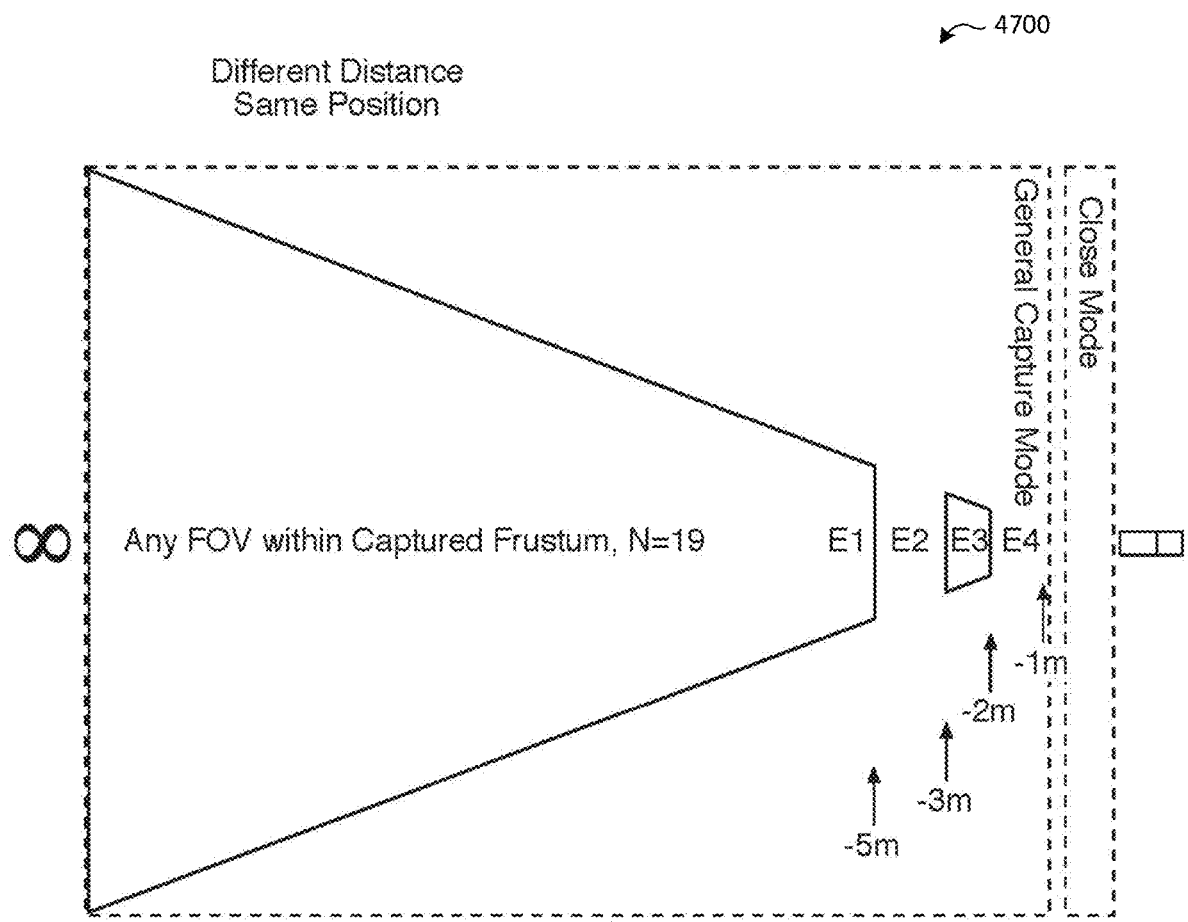
FIG. 47A is a side view depicting an example of refocusable ranges with a sequential exposure system as the distances decrease to camera with exponentially decreasing range, according to one embodiment.

FIG. 47A is a side view depicting an example 4700 of refocusable ranges with a sequential exposure system as the distances decrease to camera with exponentially decreasing range, according to one embodiment. Through computational processing, it is possible to reconstruct the desired focus plane with increased range of depth-of-field. The depicted example shows an architecture in which four exposures are considered; in other embodiments, any number of exposures can be considered.

In consideration of a desired 24 frame-per-second (FPS) output after computational processing, a repeating 5× exposure system may be ideal to produce 120 FPS capture, which may allow for reconstruction of 24, 30, 48 and 60 FPS playback. This additionally may provide the ability to generate synthetic shutter reconstruction, motion blur reconstruction, and/or increased depth estimation accuracy as well as increased motion vector accuracy to benefit the entire computational imaging ecosystem, at the expense of increased data rates. The FPS for actual capture may vary depending on application and may exceed 360 FPS for as long as any desired single exposure requires.

Data may be acquired at any bit depth and/or color space. In at least one embodiment, data is acquired at 10 bits at these higher frame rates and may be converted to log color space to increase color accuracy at these lower bit depths. Other implementations can provide 16 bit log or linear capture capabilities.

In at least one embodiment, any suitable additional technologies can be used to perform the functions described. Such additional technologies may include, but are not limited to: liquid lenses, birefringent and polarization technologies, acoustic/standing wave optical technologies, mechanical methods (such as moving the lens at high speeds), and/or any other technology that provides the ability to refocus the main lens, or refocus the MLA in any fashion to sequentially capture multiple focus positions to generate light-field acquisition.

In at least one embodiment, the system can also provide square wave control. In this manner, an interval can be provided between frames that is less than a predetermined threshold time value, with minimal or no variation in between the switching time to provide the highest quality exposure per frame.

Figure 47B:
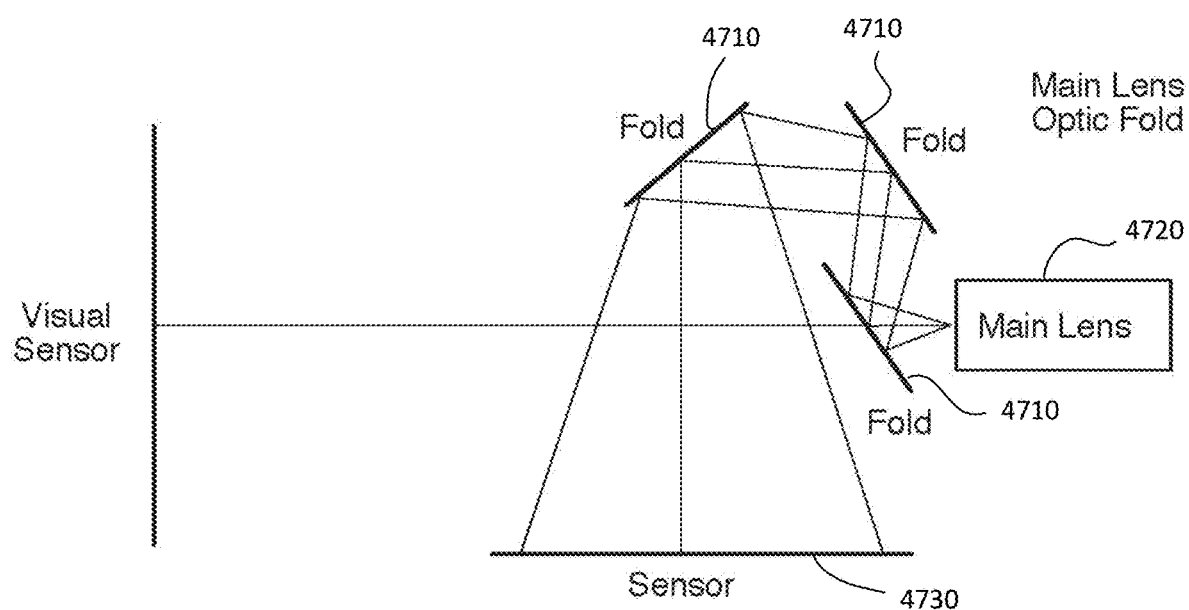
FIG. 47B is a side view depicting the use of optical folds, according to one embodiment.

In at least one embodiment, one or more optical folds can be added to the main lens/optical system in order to reduce the overall footprint of the imaging system. FIG. 47B depicts an example.

FIG. 47B is a side view depicting the use of optical folds 4710, according to one embodiment. The optical pathway between the main lens 4720 and the image sensor 4730 may thus be compacted to reduce the footprint of the camera in which it is implemented.

Figure 47C:
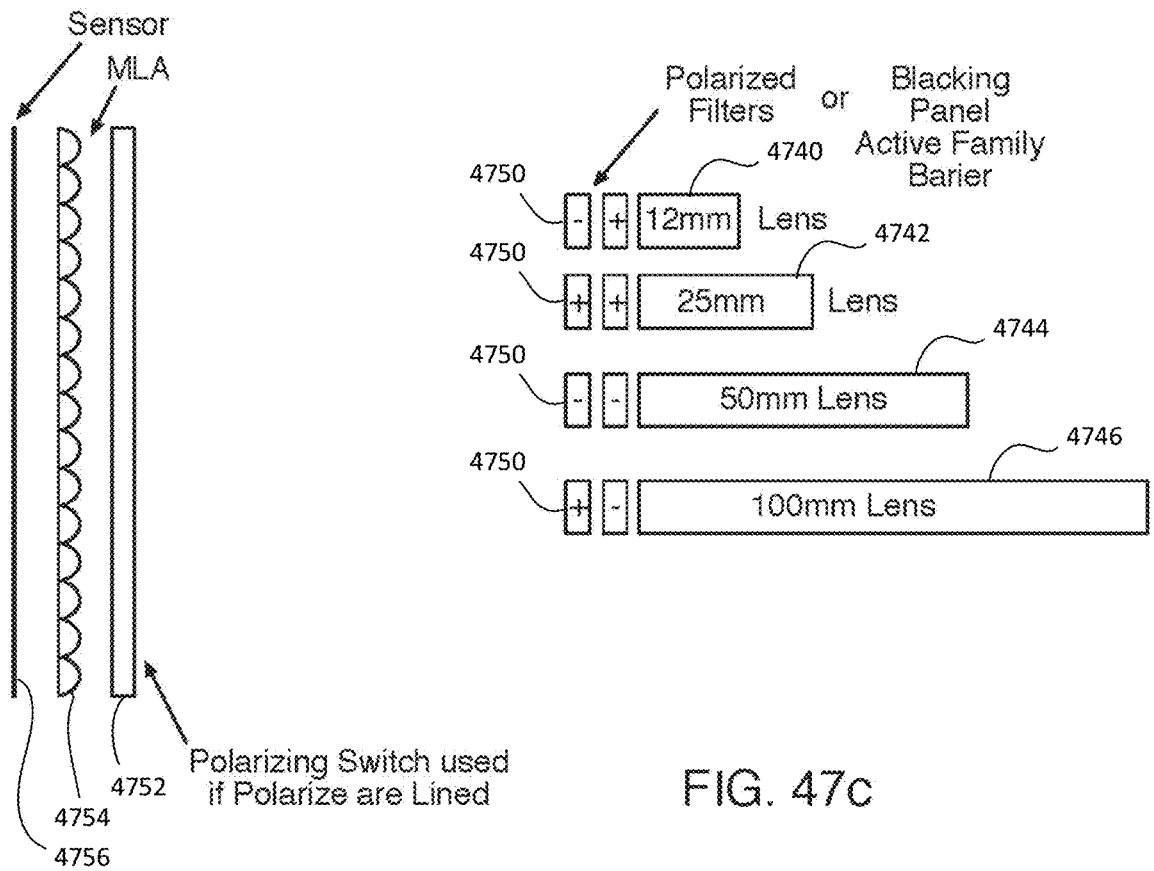
FIG. 47C is a side view depicting an example in which a plurality of main lenses are used in conjunction with polarized filters, according to one embodiment.

In at least one embodiment, a camera may include multiple main lenses with varied focal lengths (static, variable, and/or electronically switching) with polarization techniques used in the image sensors and within the lens design to temporally allow for sequential switching between multiple focal lengths and perspectives. The image sensors, depending on polarization state, may only see a certain lens (or different lens simultaneously depending on the polarization state of a particular image sensor or region of the imaging plane), resulting in the sequential capture of light-field data from the lenses. Polarization states may be switched electronically, or may be a static pattern. Alternatively, active barriers and/or variable masks may be implemented with or without polarization or other mechanical means, in order to selectively block light from lenses. FIG. 47C depicts an example.

FIG. 47C is a side view depicting an example in which a plurality of main lenses 4740, 4742, 4744, and 4746 are used in conjunction with polarized filters 4750, according to one embodiment. Each of the polarized filters 4750 may have a distinct polarization setting. A polarizing switch 4752 may be positioned between the MLA 4754 and the image sensor 4756. The polarizing switch 4752 may optionally be set to align with the polarity of any of the polarized filters 4750 in order to determine which of the main lenses 4740, 4742, 4744, and 4746 is able to convey light through the MLA 4754 to the image sensor 4756.

Figure 47D:
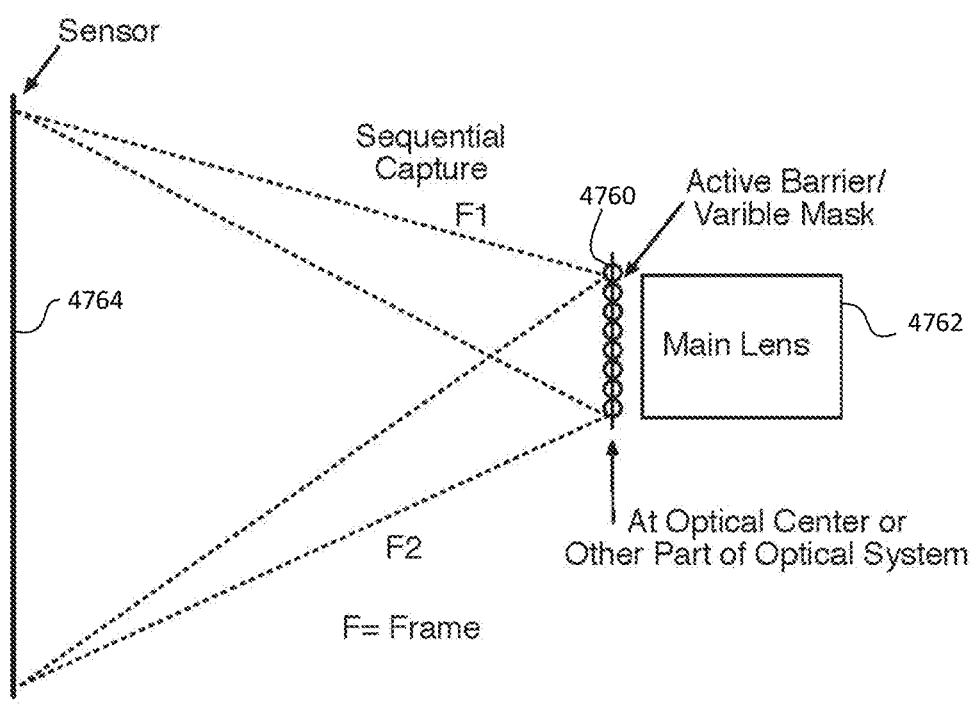
FIG. 47D is a side view depicting the use of an active barrier/variable mask to provide sequential capture of image data, according to one embodiment.

In alternative embodiments, steps may be taken to remove the MLA, modify the MLA, combine the MLA design with that of another component, or completely remove the MLA at the sensor plane. For example, the MLA may be replaced with a sequential capture apparatus. Alternatively, the MLA may be combined with a variable mask at the aperture stop, optical center, or some other location within the optical system. The effective aperture size can be set at the equivalent of the main lens F/number×the desired N number. The apparatus can be configured to electrically switch in position around the aperture and record image data sequentially on the image sensor. At high speeds, such an approach can be virtually seamless. In at least one embodiment, such an approach can be combined with a larger MLA and/or lower individual exposure resolution in exchange for temporal resolution as compared with a single image captured only per switching state within the aperture. FIG. 47D depicts an example.

FIG. 47D is a side view depicting the use of an active barrier/variable mask 4760 to provide sequential capture of image data, according to one embodiment. The active barrier/variable mask 4760 may be positioned in the optical pathway between the main lens 4762 and the image sensor 4764.

Figure 47E:
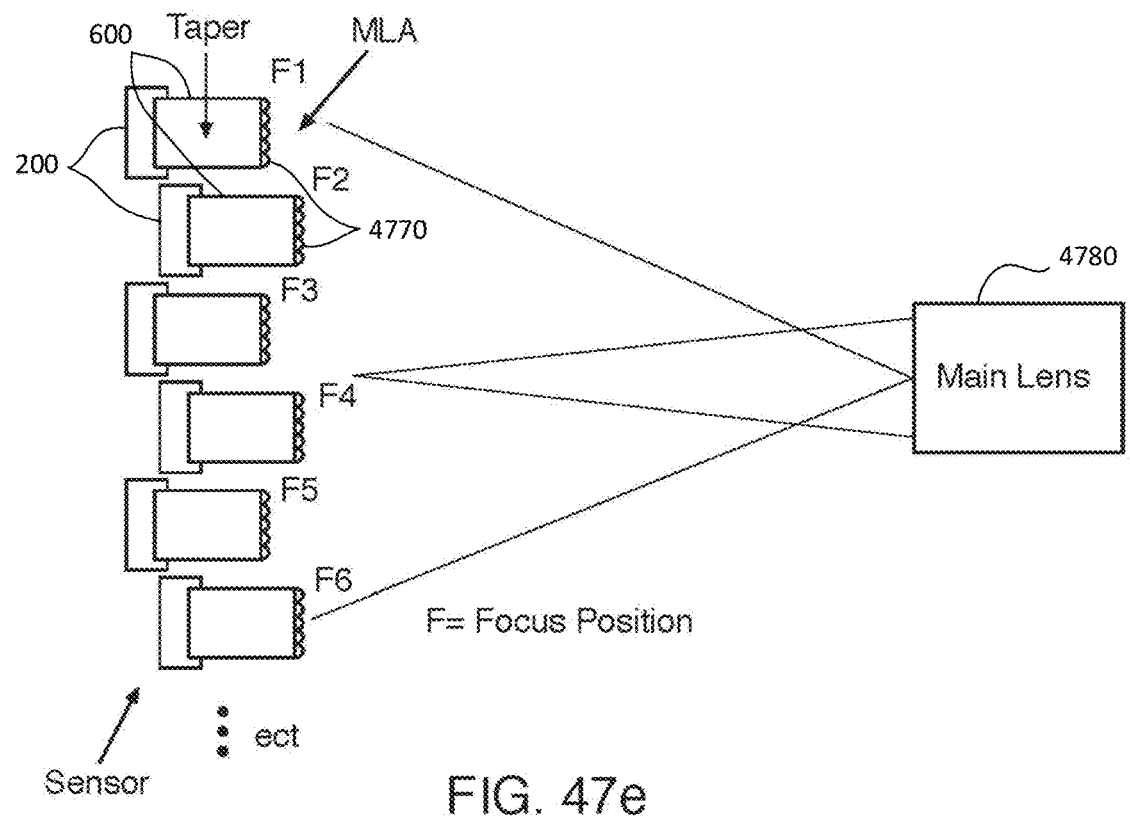
FIG. 47E is a side view depicting the use of modules, tapered fiber optic bundles, and MLA's positioned at variable displacements from a main lens, according to one embodiment.

In at least one embodiment, a method is implemented to allow the imaging plane tiles to exist at different distances from the main lens to produce interwoven varied focal lengths/focus positions within a single image. FIG. 47E depicts an example.

FIG. 47E is a side view depicting the use of modules 200, tapered fiber optic bundles 600, and MLA's 4770 positioned at variable displacements from a main lens 4780, according to one embodiment. The result may be the presence of multiple focal lengths and/or focus positions within a single captured image.

In at least one embodiment, a method is implemented to embed multiple focal lengths optically into a single lens and mask off regions to capture sequential or simultaneous multiple focus/focal length positions for the purposes of light-field imaging. Again, the captured image may have multiple focal lengths and/or focus positions.

Advantages

The systems and methods described herein may provide a number of advantages over known camera designs for conventional and/or light-field imaging. These advantages may include, but are not limited to:

High dynamic range;
Wide gamut;
Shutter reconstruction;

Motion blur reconstruction;
Automated 3D camera tracking; and/or
Post-capture optical stabilization.

In at least one embodiment, the system provides extremely high frame rates (such as 120 frames per second or more), so as to minimize total motion blur. This may result in increased accuracy for depth and motion blur analysis.

In at least one embodiment, the system uses light-field computation so as to provide an approximate effective aperture size of N (diameter of pixels behind each lenslet)× main lens F/number, resulting in extremely wide DOF. This can reduce or eliminate focal blur in the image for computational processing.

The addition of the high frame rate information in combination with the light-field array of information and wide depth of field may provide significant benefits. These benefits may include significantly increased accuracy for all motion vectors, photogrammetry, depth analysis, and numerous other computational processes.

In at least one embodiment, the system is implemented as a post-capture process performed on light-field imaging data, which may only include 2D capture at high frame rates. Such a process may be performed as follows, for example:

Compute wide depth of field image from light-field capture;

Compute multiple perspectives/rays of information from within the main lens exit pupil;

Compute disparity/depth vector triangulated correlations (spatial analysis, which may include additional temporal frames compared with motion vectors for statistical accuracy calculations);

Compute motion vector tracked correlations (temporal analysis, which may include two or more frames);

Analyze image; and

Average error from all calculated vectors and statistically calculate the highest accuracy between all calculated data points.

One skilled in the art will recognize that other approaches are possible in other implementations of the image processing technology. Such approaches may follow different logic.

With the dense and accurate collection of image analysis enabled by the systems and methods described herein, many features can be derived providing unprecedented post-acquisition image control. These features may include, but are not limited to:

Infinite refocus: Post-capture refocus that allows multiple focus positions to be retargeted to match a single temporal position and seamlessly move among all possible focus positions contained in the scene.

Variable frame rate: With the high frame rate information and known rays of angular entrance into the optical system, the exact integration time can be computed and reconstructed.

Live action "deep imaging": Deep imaging is a 3D image format traditionally used for computer generated materials. It is a format that allows a single XY pixel coordinate to store multiple RGBAZ pixels to reproject very complex scenes, including things like particle clouds. With the increased imaging data and vectors available, it is possible to generate live action deep image files where color and alpha are processed per pixel to generate a final image output with multiple RGBAZ pixels per XY coordinate.

"Bullet-Time" Effects: Multiple light-field units may be used with aligned entrance pupils to produce a seamless array of perspectives by virtue of the light-field imaging data.

Volumetrically Aware Effects: With the RGB, RGBZ, or RGBAZ computationally calculated pixels, it is possible to modify portions of the image selectively based upon volume. This additionally applies to green screen removal where traditional color keys (or screens in general) are no longer necessary with volumetric information.

Automated 3D Camera Tracking: With the computational analysis data and a known "zero" frame, an extremely accurate real-world camera representation of the camera's movement may be produced.

Automated Segmentation and Rotoscope: With accurate motion vectors, perspective data, and high quality imaging analysis, it may be possible to segment an image in much more accurate methods than those used for state-of-the-art segmentation algorithms. Further, if a user defines an object, the outline or splines can be automatically propagated throughout a clip as the vectors and perspective analysis retain high correlation to the objects contained within a scene. This can additionally apply to motion capture applications, and potentially remove the necessity of tracking markers from these technologies. Such features may be computed in real time.

Computational Lens Flare Removal: The lenslet structure may facilitate automation of removal of lens flares. Artistic tools can be leveraged to generate photo-real lens flares with much higher quality imagery than when a flare hits the lens/sensor.

Extreme Low Light Capture: Due to the fixed aperture design and multiple perspectives of imaging data involved, in exchange for decreased refocusable range, it is possible to increase sensitivity of the resulting output pixels and increase the signal-to-noise ratio (SNR) of a single perspective and focus position at extremely low light conditions by averaging and/or adding retargeted perspective information to a single viewpoint to statistically decrease noise while retaining extremely high dynamic range.

Artistic Lens Flavor: Due to the ability to understand the physics of light involved in the captured scene given the multiple vector analysis performed, it may be possible to characterize any other existing lens and reproject the rays of light as acquired through the light-field system to generate a near exact reconstruction of the characterized lens while simultaneously providing additional artistic controls over these parameters.

In addition, the system described herein can be combined with other features and tools for a light-field video system. Such combination may enable the implementation of other features, methods, and/or advantages.

Through a mechanism that produces a pattern of various integration time exposures repeating or randomized beyond a single integration time, it is possible to generate drastically increased dynamic range given the high frame rate capture and use of the disparity and motion vectors generated. This can be a repeating pattern of any value greater than one. For example, in at least one embodiment, a repeating pattern of three to five exposures is provided, wherein the exposures are retargeted to each frame center (retarget −2, −1, +1, +2 frames in reference to frame 0) to generate the centered frame with significantly increased dynamic range. Due to the high frame rates, edge error may be statistically low and can be weighted based upon error tolerances.

In the same fashion, other color filtration methodologies may be leveraged sequentially from any point within the optical system that provides sequential wide color gamut capabilities. This may be done in combination with the above-described vector analysis to provide the ability to increase color gamut dramatically for each frame of a sequence.

In at least one embodiment, a dynamic filter such as a polarized filter may be added to the system. Such a filter may dynamically increase or decrease the ND filtration percentage. Additionally or alternatively, a static ND filter may be added to the described system.

Other Sensor Modifications

In at least one embodiment, an ND mask can be added on a per-pixel or per-region basis, or in a random pattern, to increase dynamic range system potential, thereby increasing pixel resolution. In at least one embodiment, the mask can be computationally reconstructed based upon the known pattern of exposure per pixel to generate increased dynamic range with no loss of pixel resolution.

In at least one embodiment, the effective exposure of regions of pixels, individual pixels, and/or random patterns of pixels can be actively switched in a sequential manner. Further, in at least one embodiment, static per-pixel or per-region color filters can be provided to increase overall system color gamut. Yet further, in at least one embodiment, color filters may be actively switched in a sequential manner to allow for increased overall system color gamut.

Preview Lens/Mode

In at least one embodiment, an additional preview lens system can be included to allow users the ability to have visual feedback for the image they are producing. Any of a number of different implementations are possible, four of which are described below.

Retro Reflector Design with Internal Beam Splitter for the MLA

In at least one embodiment, the empty mechanical space between each of the strips of sensors is fitted with a retro reflector, producing an image that can be re-photographed with a separate image sensor. Further, in at least one embodiment, the lens and sensor of this preview lens are matched such that the photographed FOV and the captured DOF closely, if not identically, match what should be anticipated through the computational process of the light-field image processing results.

Figure 48:
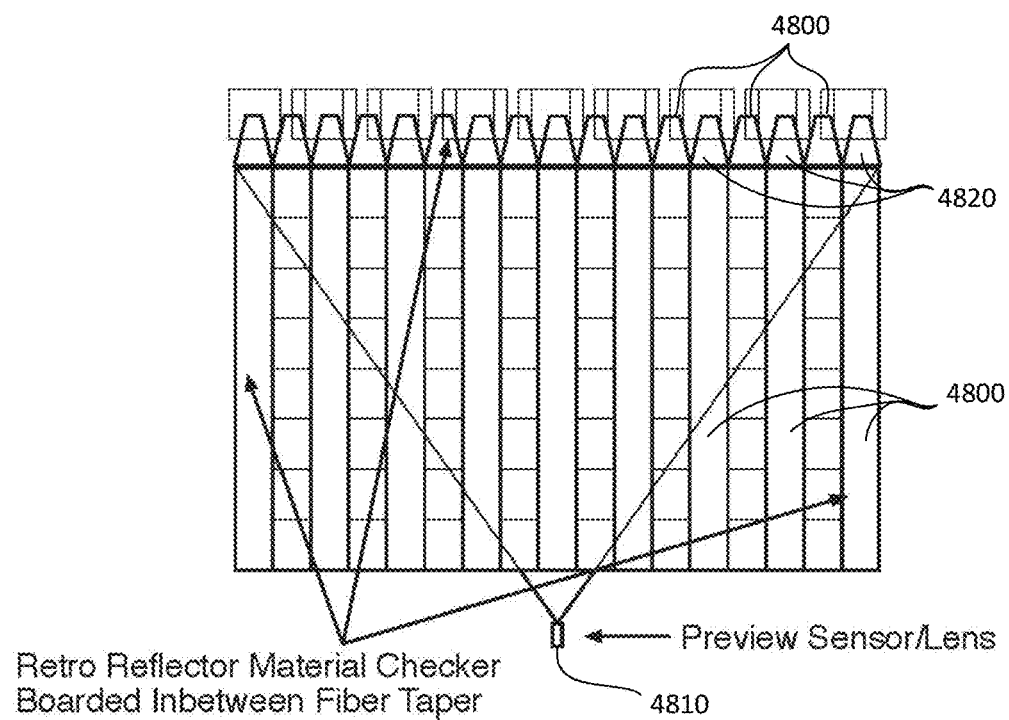
FIG. 48 is a front view depicting an exemplary arrangement of a main array with beam splitter (not shown) and retro-reflector at gaps designed to facilitate implementation of a preview sensor, according to one embodiment.

FIG. 48 is a front view depicting an exemplary arrangement of a main array with beam splitter (not shown) and retro-reflector at gaps 4800 design to facilitate implementation of a preview sensor 4810, according to one embodiment. The gaps 4800 may reside between the fiber optic bundles 4820 of the array.

Figure 49:
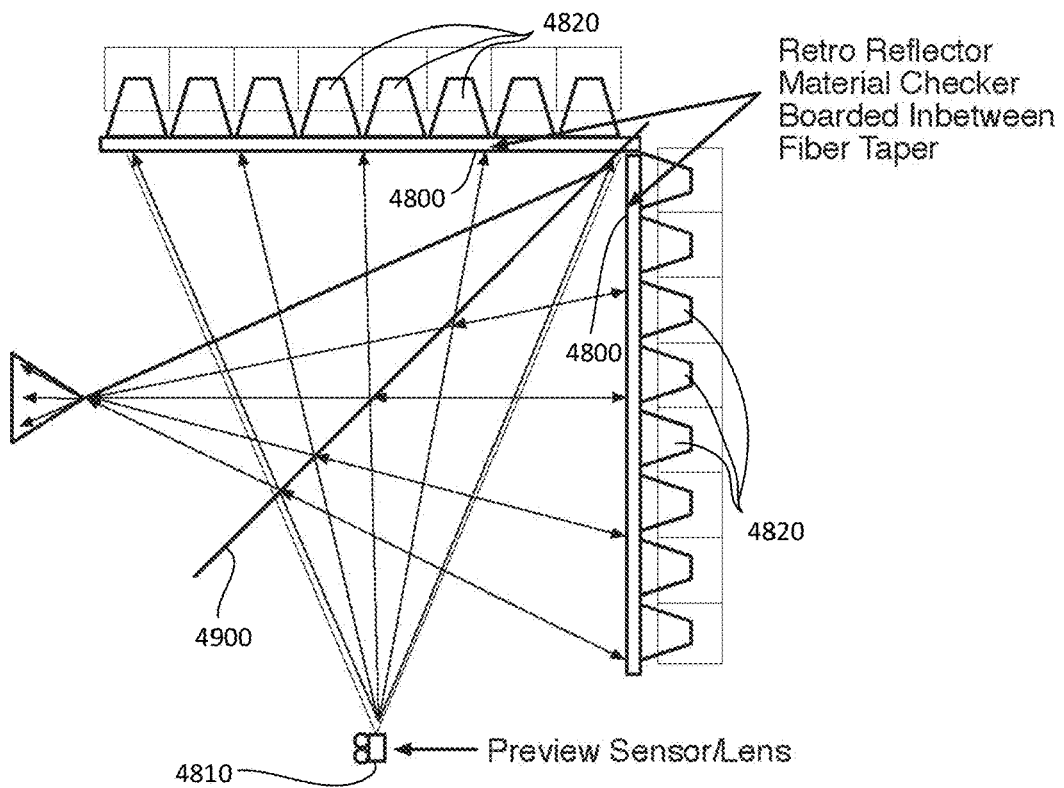
FIG. 49 is a side view illustrating how the preview sensor of FIG. 48 is able to re-photograph the larger imaging surface.

FIG. 49 is a side view illustrating how the preview sensor 4810 of FIG. 48 is able to re-photograph the larger imaging surface. The preview sensor 4810 may receive light from the beam splitter 4900 in conjunction with the retro-reflector design of FIG. 48.

In an alternative embodiment, a retro reflector can be included only at one of the two optical paths (such as at the top). A separate lens/image sensor may image that single plane alone. Alternatively, the system can leverage one of the two paths (such as the top), without a separate lens/sensor, and image both planes with varied image/optical parameters.

It should be noted that this structure can also be used for other image processing applications and is not necessarily specific to the preview lens concept. For example, the addition of this optical path can be used to increase dynamic range though capture of different integration time or increase color gamut through different color filters.

Internal Beam Splitter

In at least one embodiment, an internal beam splitter is used to split off a small percentage of light to an additional sensor. This may not require the use of a beam splitter for the main image sensor below.

Figure 50:
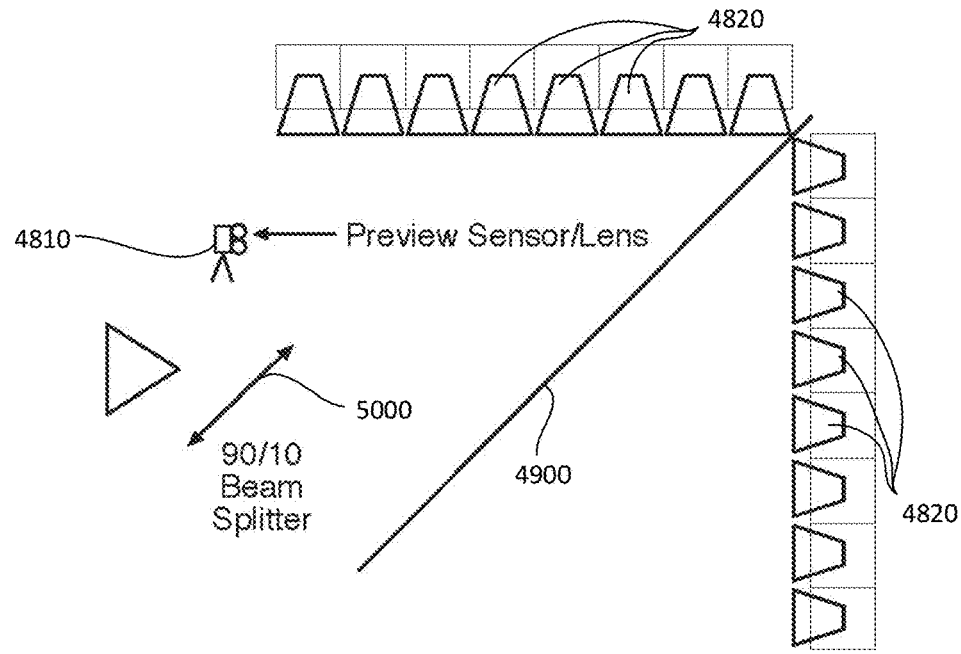
FIG. 50 is a top view depicting the use of a secondary beam splitter to redirect a small portion of light from the larger image plane in order to direct the light to a preview sensor, according to one embodiment.

FIG. 50 is a top view depicting the use of a secondary beam splitter 5000 to redirect a small portion of light from the larger image plane in order to direct the light to a preview sensor 4810, according to one embodiment. The preview sensor 4810 may then be used to display a real-time result of an exemplary set of lens/sensor variables. The secondary beam splitter 5000 may optionally be used on conjunction with a primary beam splitter such as the beam splitter 4900 of FIG. 49, as shown.

Range Finder Solution with an Offset Imager

In at least one embodiment, a range finder solution can be used with an offset imager and display windows commensurate with other electronic viewfinder or range finder technologies. Any known electronic viewfinder and/or range finder technology may be used.

Figure 51:
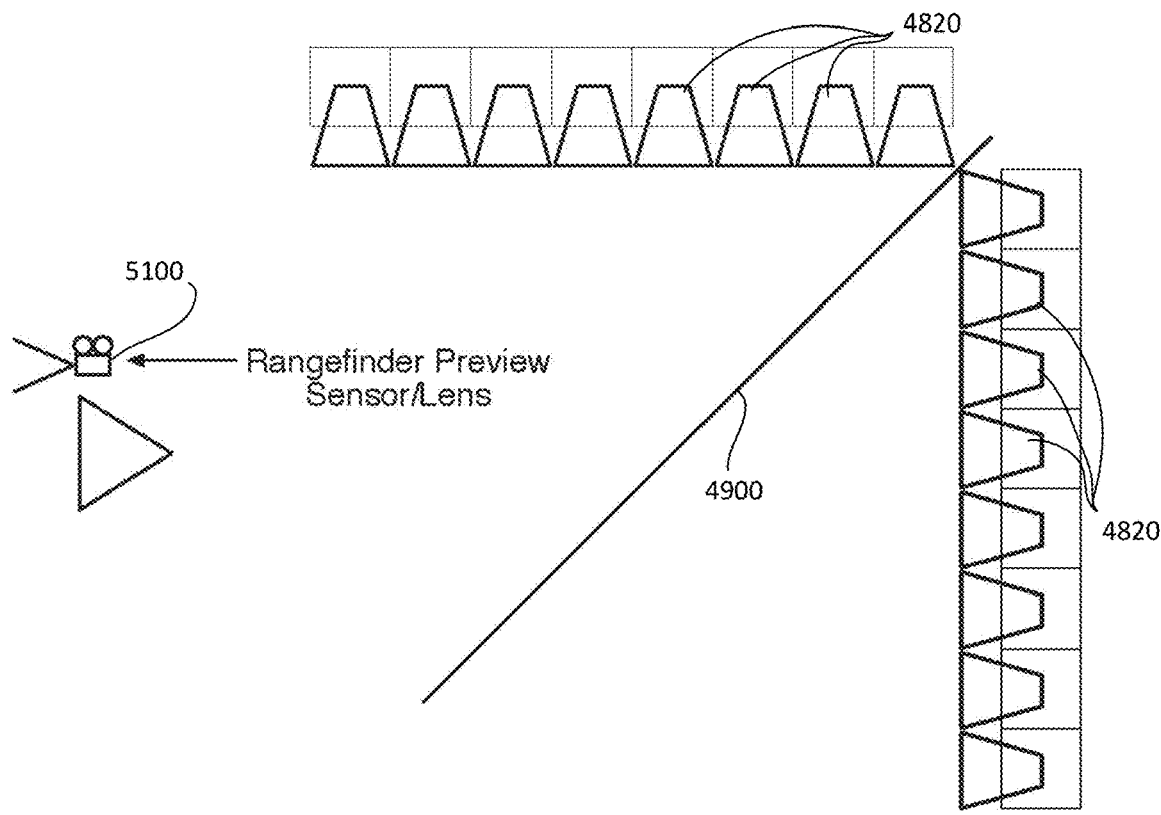
FIG. 51 is a top view depicting an example of a range finder configuration in which a completely separate lens/sensor system is leveraged to increase main sensor system light efficiency, according to one embodiment.

FIG. 51 is a top view depicting an example of a range finder configuration in which a completely separate lens/sensor system is leveraged to increase main sensor system light efficiency, according to one embodiment. Specifically, a rangefinder preview sensor 5100 may be used to retain light efficiency of a main image sensor, while still enabling production of a preview of the computational image.

Real-Time Processing or Sub-Sampling

In at least one embodiment, real-time processing or sub-sampling of the complete light-field can be provided. The result may be displayed for a given set of parameters. This can be saved as an image or as metadata for further processing.

In any of the above variations, the lens/sensor configurations used for the preview can be saved as an image sequence or video file for immediate review of the captured scene. Additionally or alternatively, the parameters can be saved as a metadata stream to be used and then possibly modified for the complete light-field processing/reconstruction. The rate of key frame/data points for this process can be the same as the frame rate of the capture system, or can be increased for additional smoothness/accuracy, or can be reduced for lower sampling and algorithmic curve control/analysis/reconstruction. Further, all data points may be reanalyzed through algorithmic processing and/or manual intervention.

Model/Volume Generation

In at least one embodiment, a high resolution light-field capture technology, such as those set forth herein, can be used to produce extremely high resolution images. With such imaging capability, customized mirrors and/or other optics may be used to capture up to a 360° view of an object.

In some embodiments, this may be done by orienting reflectors in a fashion that effectively redirects all rays of light to a central region of volume. The reflectors can be parabolic, or can be shaped according to any custom curve, surface shape, or the like, depending on the resolution requirements, or desired ray directionality of coverage. Flat mirror surfaces and/or other angled surfaces can be used. Any suitable number of facets can be used. Various methods and degrees of capture may be used, depending on the applicable scanning requirements.

Such a scheme may provide a single lens and single image capture technology solution for modeling, virtual reality (VR), and augmented reality (AR), as well as many other applications.

In at least one embodiment, each system is calibrated to determine the known directionality and positioning for each pixel's coordinate position in space. In one top-down approach, the system may include the main lens and optical technologies discussed above, and may include additional optics to redirect captured rays to a central volumetric region in which a first parabolic reflector has a focal length positioned at the optical center of the main lens, and second parabolic reflector has a different focal point at a distance that is predetermined based upon the size and shape of the object.

With this approach, the rays that pass through the optical center (the center sub-aperture) may reflect parallel to the lens. Rays that pass through other positions of the aperture may converge at differing locations to provide full volumetric coverage (parallax and/or depth).

As the focal point increases, the amount of captured volume may increase in width, but may also decreases in density per cubic mm. However, as the focal point decreases, the region of captured volume may decrease as well, as the density of acquired pixels increases.

In at least one embodiment, the system described herein provides a mechanism for using light-field data to ascertain physical volume, rather than just obtaining a single two-dimensional image. Light-field acquisition may provide the ability to computationally calculate the exact coordinates of a ray as it travels through space and strikes a surface. Every photon in this configuration must eventually terminate upon a surface and multiple reflections can be computationally interpreted.

Figure 52:
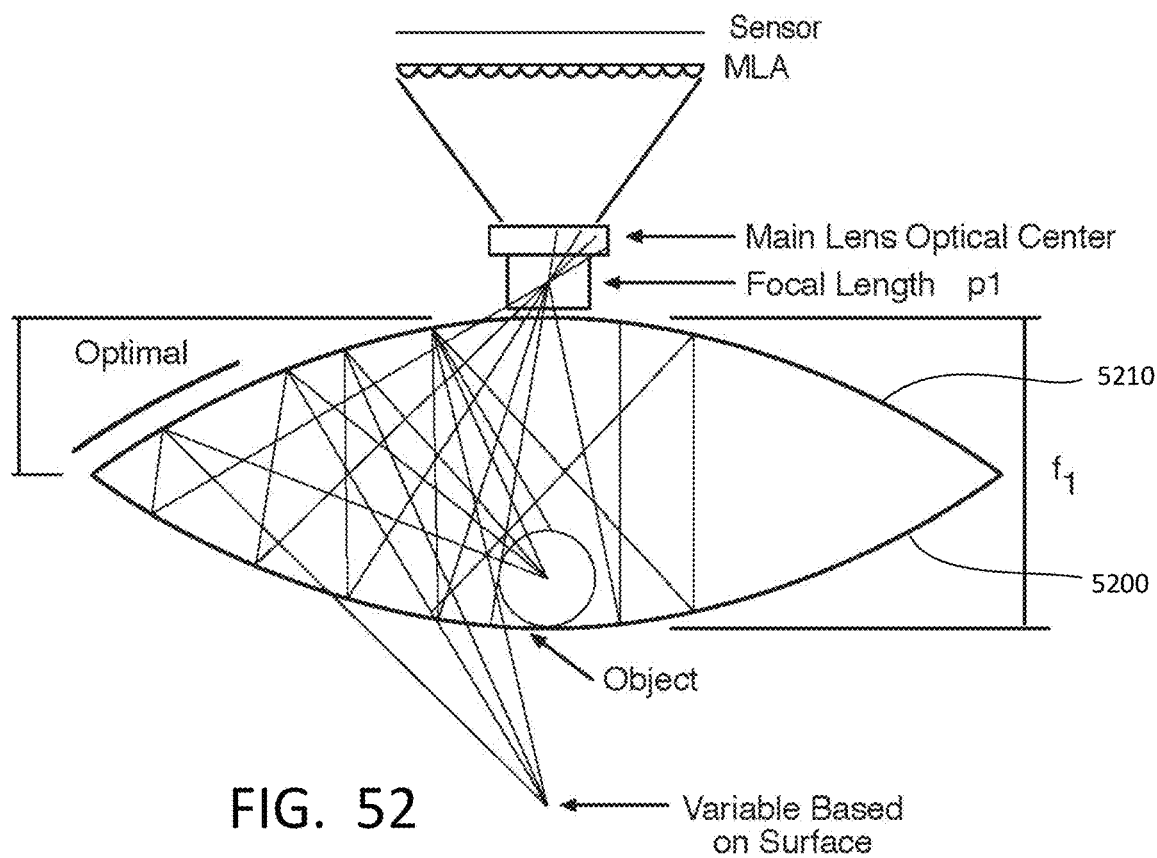
FIG. 52 is a side view depicting an example of an architecture employing a first parabolic reflector and a second parabolic reflector, according to one embodiment.

FIG. 52 is a side view depicting an example of an architecture employing a first parabolic reflector 5200 and a second parabolic reflector 5210, according to one embodiment. Parabolic and/or non-parabolic reflector structures may be used. In FIG. 52, the first parabolic reflector 5200 and the second parabolic reflector 5210 may each have a single focal point. The system may include faceted reflective structures and/or smooth parabolic forms. If a faceted structure is used, the center of each facet may be aimed at the respective angle as defined by the reflector curve.

In another embodiment, the system may alternatively include multiple focal lengths within the second reflector. The first reflector may maintain the same focus position at the optical center of the main lens. Each reflector may be broken into R regions, and each R may have its own focus position with the volumetric captured region. These regions can be considered similar (but inverse) to the N number of light-field capture where the larger region produces an increased volumetric scanning area for a single region focus point at higher potential resolution. Smaller and more varied regions with more focus positions may provide greater volumetric scanning potential with decreased resolution per focus region. The regions can be radial and/or faceted.

Figure 53:
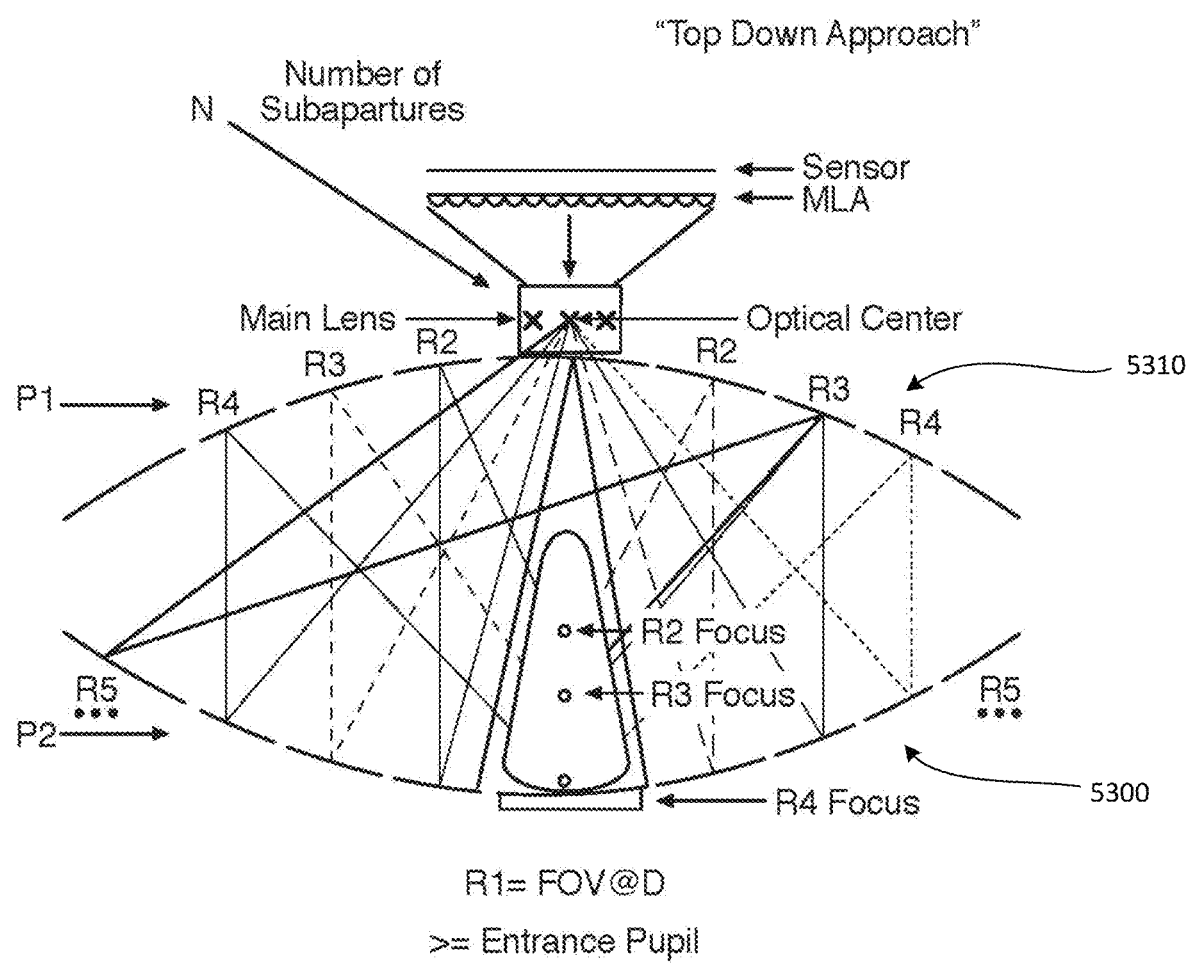
FIG. 53 is a side view depicting an example of architecture employing a first parabolic reflector and a second parabolic reflector, according to another embodiment.

FIG. 53 is a side view depicting an example of architecture employing a first parabolic reflector 5300 and a second parabolic reflector 5310, according to another embodiment. The first parabolic reflector 5300 may have a single focus position at the optical center of the main lens. The second parabolic reflector 5310 may have multiple focus positions that may facilitate proper focus on various portions of an object positioned in the space between the first parabolic reflector 5300 and the second parabolic reflector 5310. In this disclosure, "parabolic" refers to shapes that are generally paraboloid, but may include shapes that are not precisely parabolic (for example, due to the provision of multiple focal points on the reflector).

In another embodiment, the light-field capture system may be placed in a bottom-up configuration, wherein the first reflector contains a focus point matched to the optical center of the main lens and the second reflector may or may not include multiple regions and varied focal lengths. If the second reflector includes multiple focal lengths, they may be directed to capture rays above and below the object to allow for a complete captured environment including below the object itself. In at least one embodiment, a glass surface is provided on which the object rests, in order to allow the rays to pass through the surface of the floor of the environment.

Figure 54A:
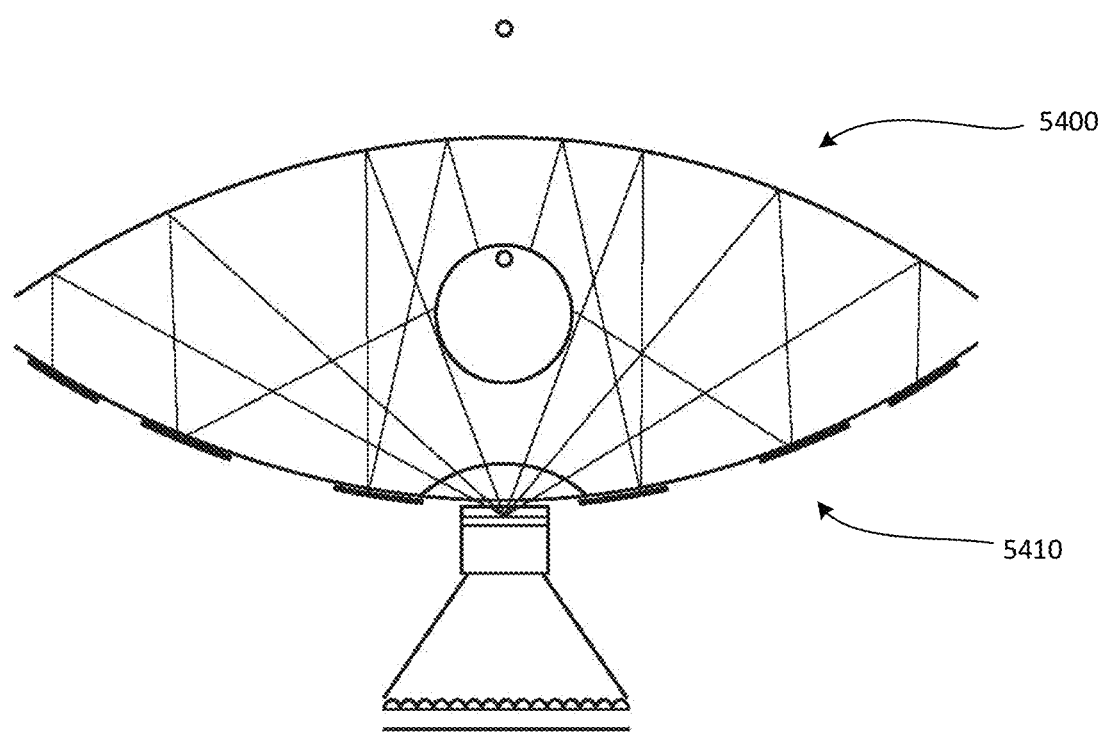
FIG. 54A is a side view depicting an example of a bottom-up configuration, with a first parabolic reflector and a second parabolic reflector, according to another embodiment.

FIG. 54A is a side view depicting an example of a bottom-up configuration, with a first parabolic reflector 5400 and a second parabolic reflector 5410, according to another embodiment. The first parabolic reflector 5400 may have a focal length matched to that of the main lens optical center, and the second parabolic reflector 5410 have multiple focus positions to capture rays around the entire surface of the object.

In general, the focus point of a parabolic reflector can be matched to the main lens optical center for additional volumetric capture flexibility. However, in some configurations, other focal points can be used, as in FIGS. 53 and 54A. In at least one embodiment, the field of view for the above-described embodiments can be matched to the widest desired and/or widest possible rays that can be directed within the volumetric captured shape.

In at least one embodiment, lighting may be introduced around the lens, from within the apparatus, and/or from just outside of the pair of reflectors at the seams as noted above. The resolution of the image sensors may be decreased at any position within the volumetric captured regions in order to optimize the captured object and reduce bandwidth when possible.

Figure 54B:
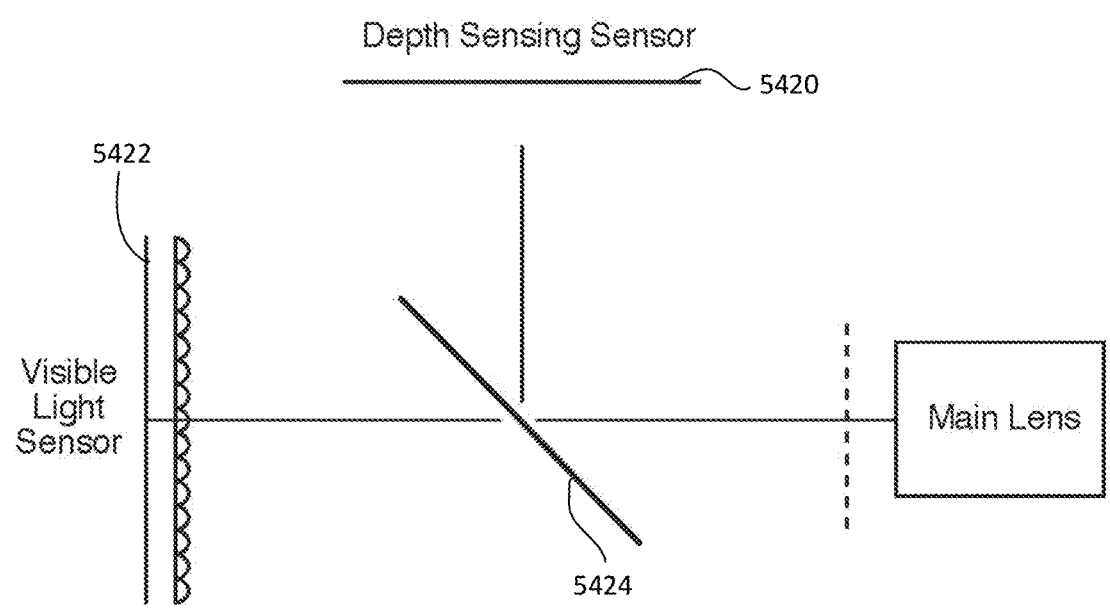
FIG. 54B is a side view depicting a camera with a depth sensing sensor separate from a visible light sensor, according to one embodiment.

In at least one embodiment, structured light, infrared (IR), laser, time-of-flight, and/or other depth sensing technologies can be added to emit light along the same optical path as the image sensor, along a split optical path, and/or along an intentionally off-axis path. This depth sensing light may optionally be produced sequentially from the same optical path and same image sensor with the coupling of an active filter that switches between accepting visible light and rejecting IR and/or other depth sensing frequencies, and a second state that accepts IR and/or other depth sensing frequencies and rejects visible light. The resulting light-field image can be captured, including light-field data for the volume alone and/or light-field data including imaging data as previously discussed. FIG. 54B depicts an example.

FIG. 54B is a side view depicting a camera with a depth sensing sensor 5420 separate from a visible light sensor 5422, according to one embodiment. A beam splitter 5424 may direct IR or other depth sensing light to the depth sensing sensor 5420, and direct visible light to be imaged to the visible light sensor 5422.

Figure 54C:
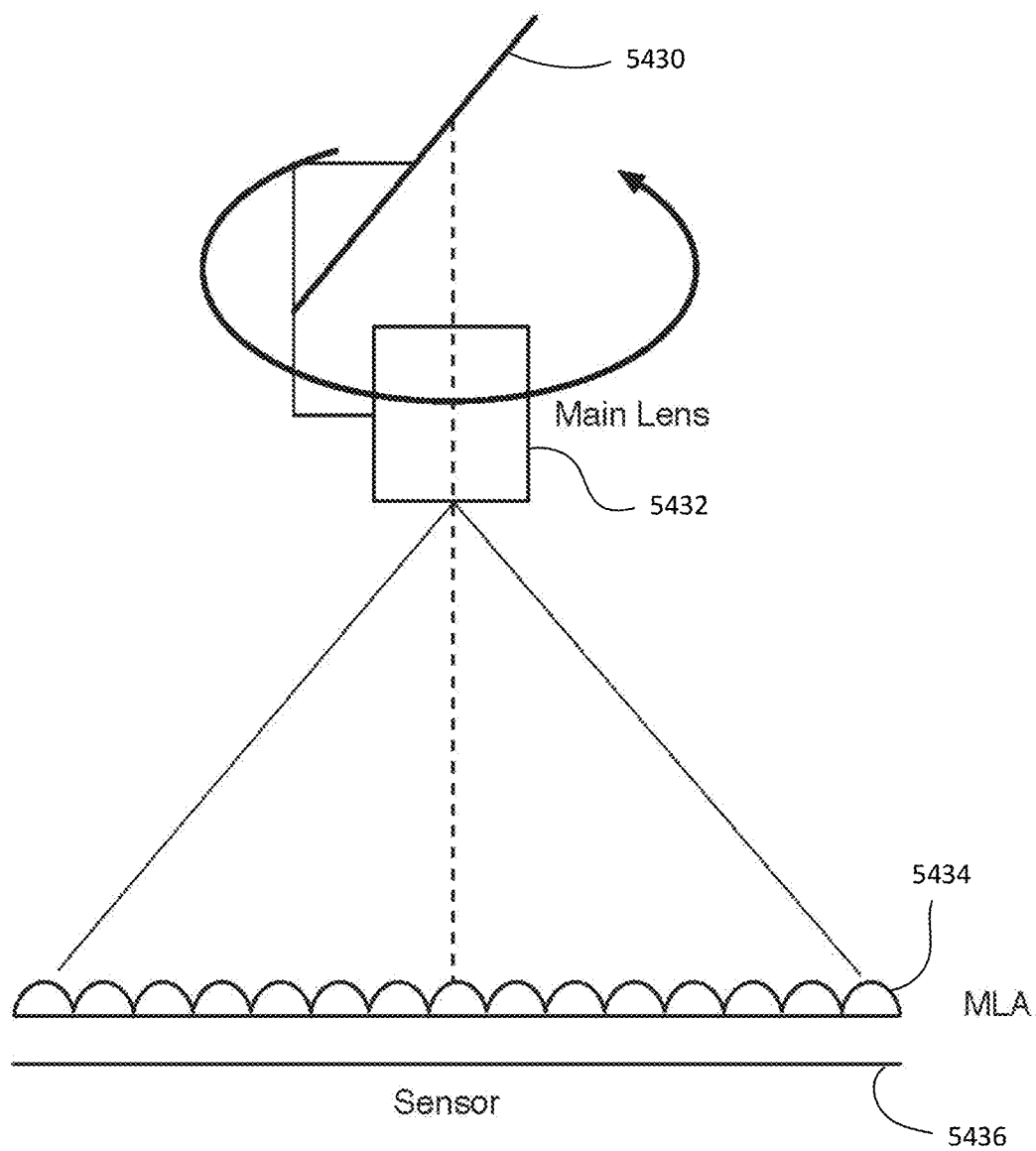
FIG. 54C is a side view illustrating a rotating reflector that may be used for sequential capture of image data, according to one embodiment.

In at least one embodiment, N value may or may not be decreased, and a time sequential capture system can be implemented, where the reflectors rotate over time to decrease the resolution requirement per slice. This may increase resolution per facet and decrease volume resolution. The sequential capture and rotating facets may provide the same, if not higher, theoretical resolution as the same system with infinite N and extremely high single system resolution. FIG. 54C depicts an example.

FIG. 54C is a side view illustrating a rotating reflector 5430 that may be used for sequential capture of image data, according to one embodiment. The rotating reflector may transmit light through a main lens 5432 and an MLA 5434 to an image sensor 5436.

The particular arrangements described and depicted herein are merely exemplary. In other embodiments, any suitable single lens and single image capture schemes can be included to produce point projections, models, meshes, depth maps, volume measurements, and/or the like for a given object.

In at least one embodiment, these environments may be extremely large. For example, the imaging environment may be large enough to cover a sound stage, or even a stadium. Multiple objects may be positioned within and imaged within the environment.

In at least one embodiment, the facets of each parabolic reflector are produced with square tiled reflectors. Further, in at least one embodiment, the facets are produced with round, square, hexagonal, or other polygonal packed reflectors. Yet further, in at least one embodiment, these facets are manufactured onto a flexible material such that the resulting surface becomes like a malleable reflective fabric to form to any structural design requirements and allow for simplified setup containing complex configurations. These structures may be magnetic, and may be permanently or temporarily adhered to a secondary mechanical design/interface (magnetically or via another attachment mechanism) for appropriate alignment, configuration, and construction.

Figure 54D:
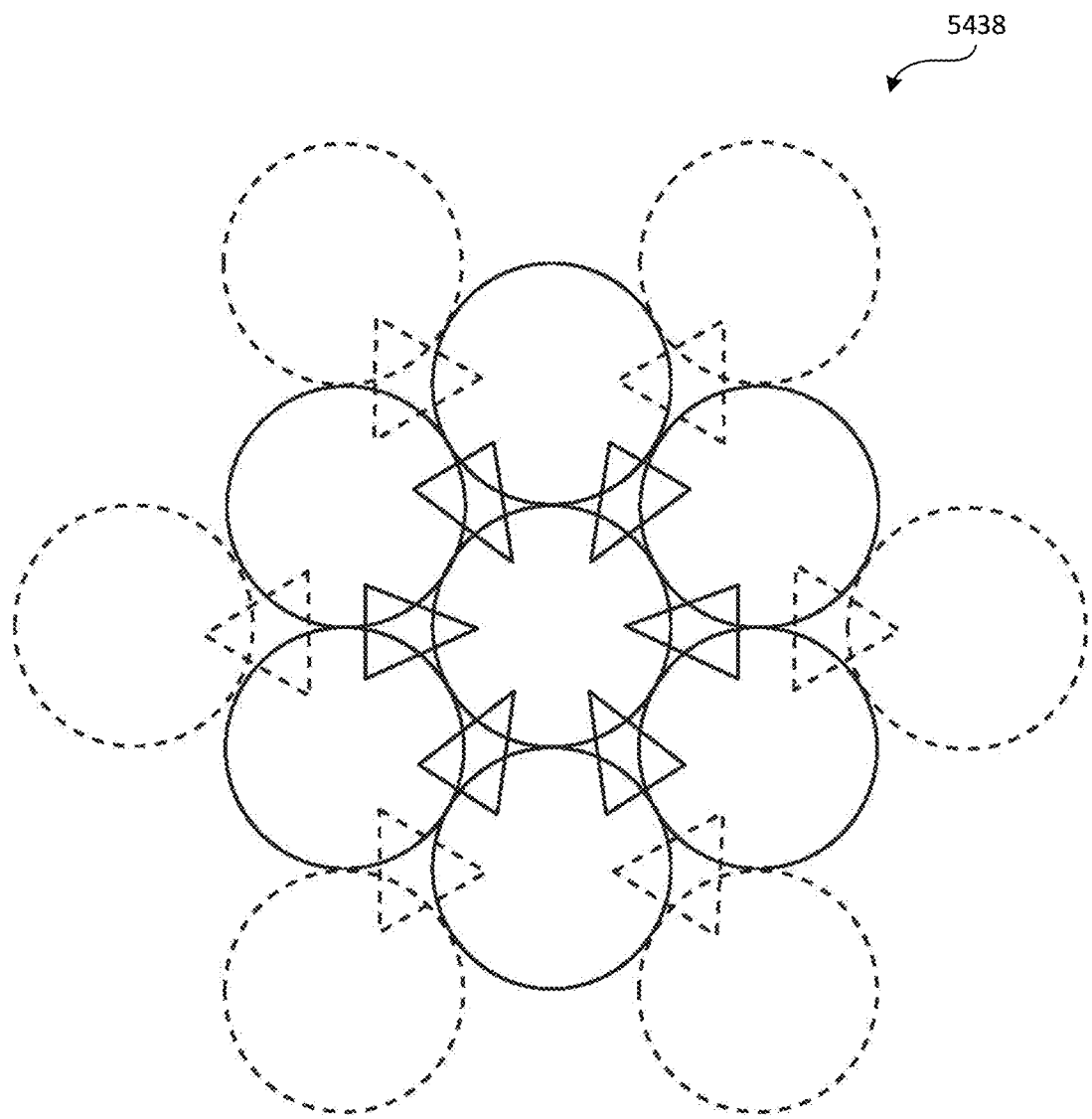
FIG. 54D is a top-down view depicting an example of a structure to generate a mesh of reflective surfaces, according to one embodiment.

FIG. 54D is a top-down view depicting an example of a structure 5438 to generate a mesh of reflective surfaces, according to one embodiment. The circles may be reflectors connected together by flexible connectors such as fabric or mesh patches. The smaller each facet is within a regular pattern, the more parabolic the resulting shape becomes while retaining the flexibility to alter focus and/or angular curvature of the surface.

In at least one embodiment, these facets are built onto a motorized structure that provides the ability to dynamically alter the respective focus position of each reflective surface, either individually or as part of a fabric or other flexible surface. Further, in at least one embodiment, there are gaps between the two parabolic reflectors to provide clearance for lighting and/or other production required materials.

In at least one embodiment, there are gaps between the sound stage and the reflectors in order to allow for eye contact between the production team and the sound stage. This space may additionally be used to provide additional equipment space and/or additional lighting. Gaps may exist at any point within the volume. The sound stage may be elevated above the reflective surface to provide adequate spacing for the production team to work. Further, in at least one embodiment, the sound stage is elevated above the reflectors to ensure that there is no direct vibration introduced between the sound stage and the mirrors. Yet further, in at least one embodiment, there are gaps between the main lens and the reflectors in order to allow for additional equipment space and/or additional lighting. Gaps may exist at any position within the volume.

In at least one embodiment, one or more additional reflectors are positioned on the perimeter of the sound stage, or just around the sound stage (or around the gap) to focus rays of light in desired configurations (for example, from underneath an actor or from very low angles). These reflectors may have parabolic or other shapes, and may also contain multiple facets and/or focal points as disclosed in above previous statements. The additional reflectors may exist at any position within the volume, including below, above and/or anywhere that additional angular information and/or lighting is desired and/or required. In at least one embodiment, a "door" may be introduced by segmenting the reflective surfaces into a separate region to allow for mechanical separation and ease of entry/exit into and out of the volume.

Figure 54E:
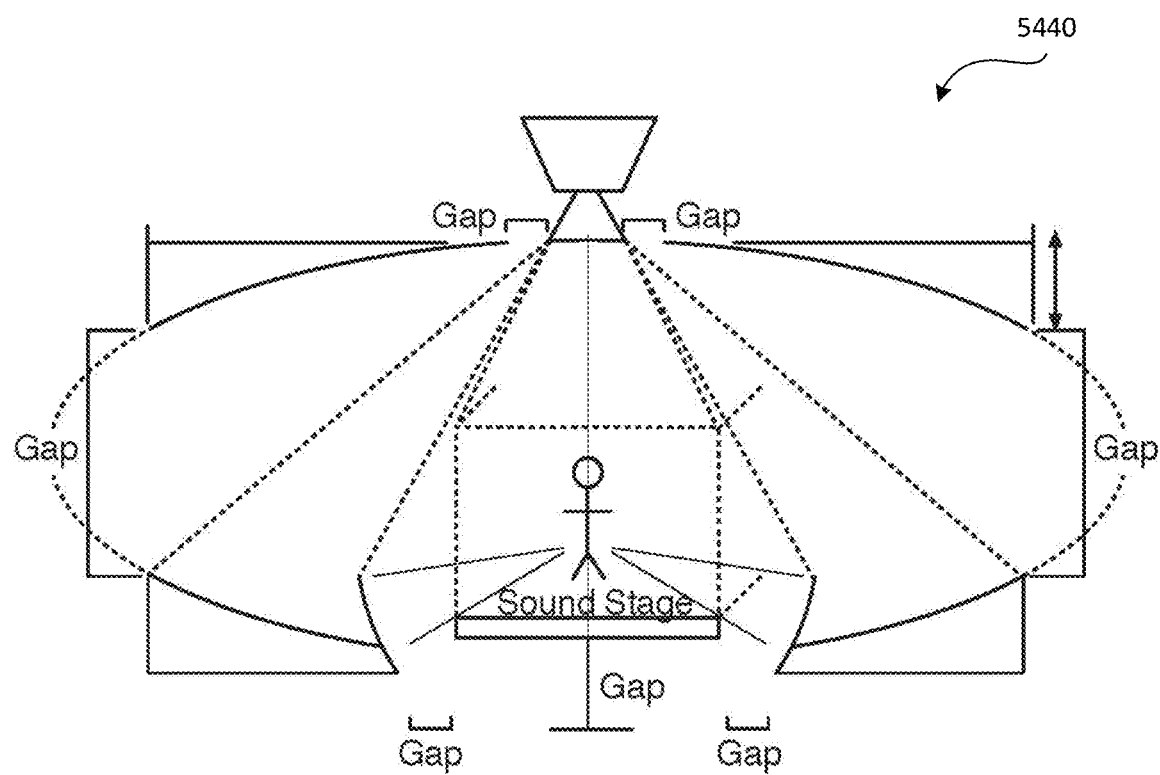
FIG. 54E is a side view depicting an example of a structure including several modifications, according to one embodiment.

FIG. 54E is a side view depicting an example of a structure 5440 including several modifications, according to one embodiment. Many of the above-described concepts are shown in combination with one another.

Figure 54F:
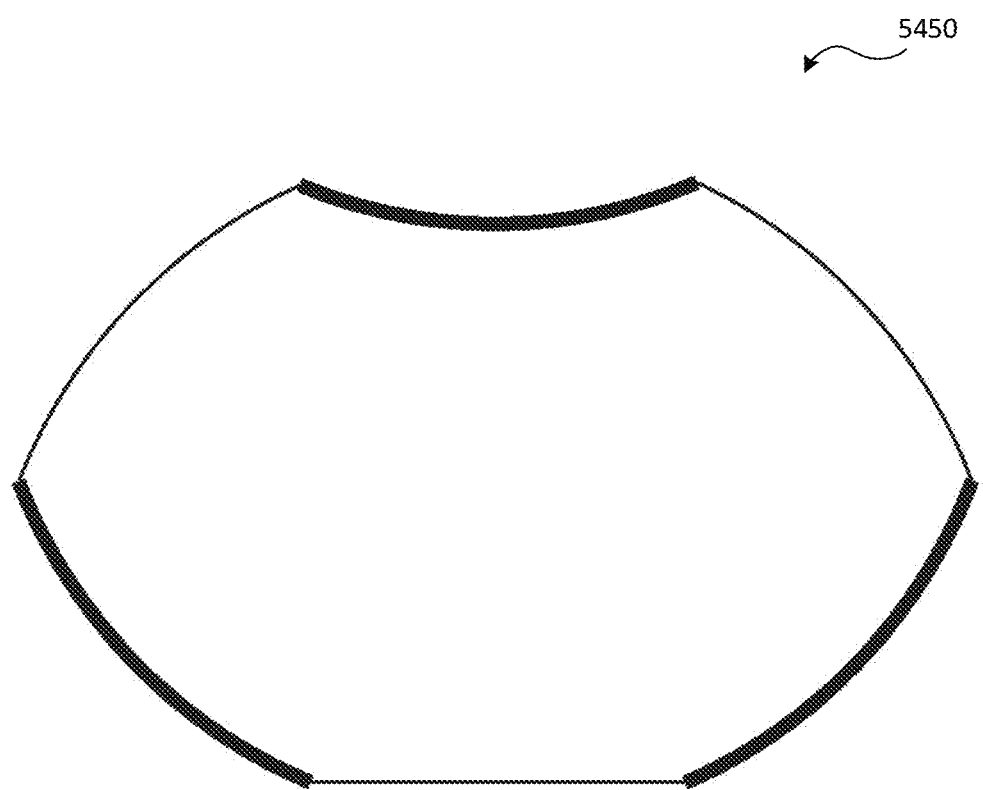
FIG. 54F is a side view depicting an example of a structure including a panoramic annular lens, or PAL, according to one embodiment.

FIG. 54F is a side view depicting an example of a structure including a panoramic annular lens, or PAL 5450, according to one embodiment. Dark lines represent reflective surfaces. A PAL may have one or more glass elements and two or more reflective surfaces, which may produce a flat disk-shaped image of the entire 360° that surround the optical axis. A virtual disk-shaped image of the surroundings may be formed inside the lens.

Figure 54G:
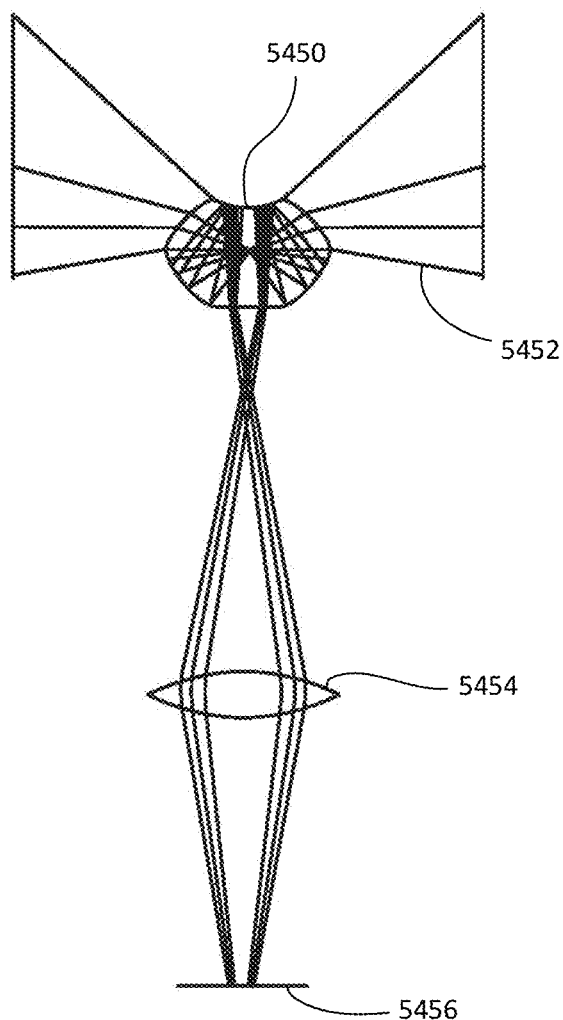
FIG. 54G is a side, cross-section view depicting the PAL of FIG. 54F, along with a cylindrical field of view, transfer optics, and an image sensor, according to one embodiment.

FIG. 54G is a side, cross-section view depicting the PAL 5450 of FIG. 54F, along with a cylindrical field of view 5452, transfer optics 5454, and an image sensor 5456, according to one embodiment. The transfer optics 5454 may transfer the virtual disk-shaped image of the surroundings from the PAL 5450 to the sensor plane imaged by the image sensor 5456.

In at least one embodiment, the reflector surface of a PAL may be replaced with a panoramic annular lens. Any or all variations of panoramic optics may be used in addition to or in place of a PAL.

In at least one embodiment, a subaperture reducer is used. A subaperture reducer may increase the depth-of-field (DOF) of each subaperture image captured by the light-field camera system.

Figure 54H:
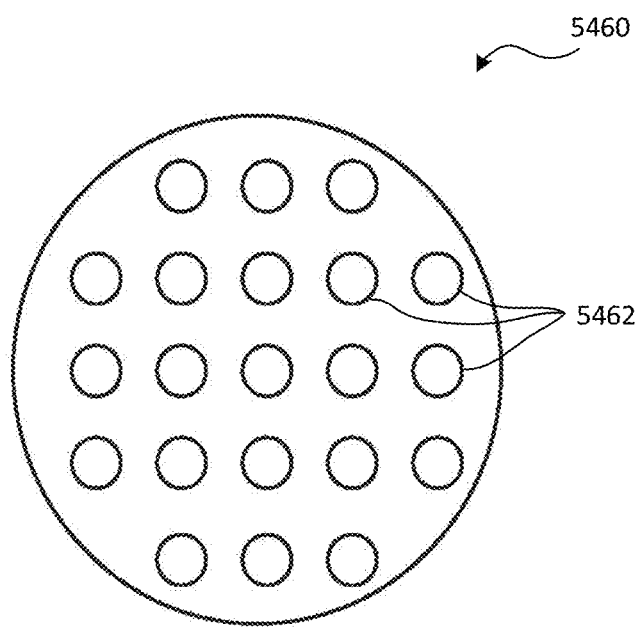
FIG. 54H is a conceptual diagram depicting a subaperture reducer for a light-field camera with a disk image diameter of five pixels, according to one embodiment.

FIG. 54H is a conceptual diagram depicting a subaperture reducer 5460 for a light-field camera with a disk image diameter of five pixels, according to one embodiment. The subaperture reducer 5460 may be placed at or near the aperture plane, and may reduce the diameter of each subaperture while maintaining approximately the overall dimensions of the complete aperture. For a light-field camera with N pixels across a disk image, the subaperture reducer may have N evenly-spaced transmissive areas 5462 across the diameter of its surface. The circular shape is arbitrary; any other shape may alternatively be used.

Figure 54J:
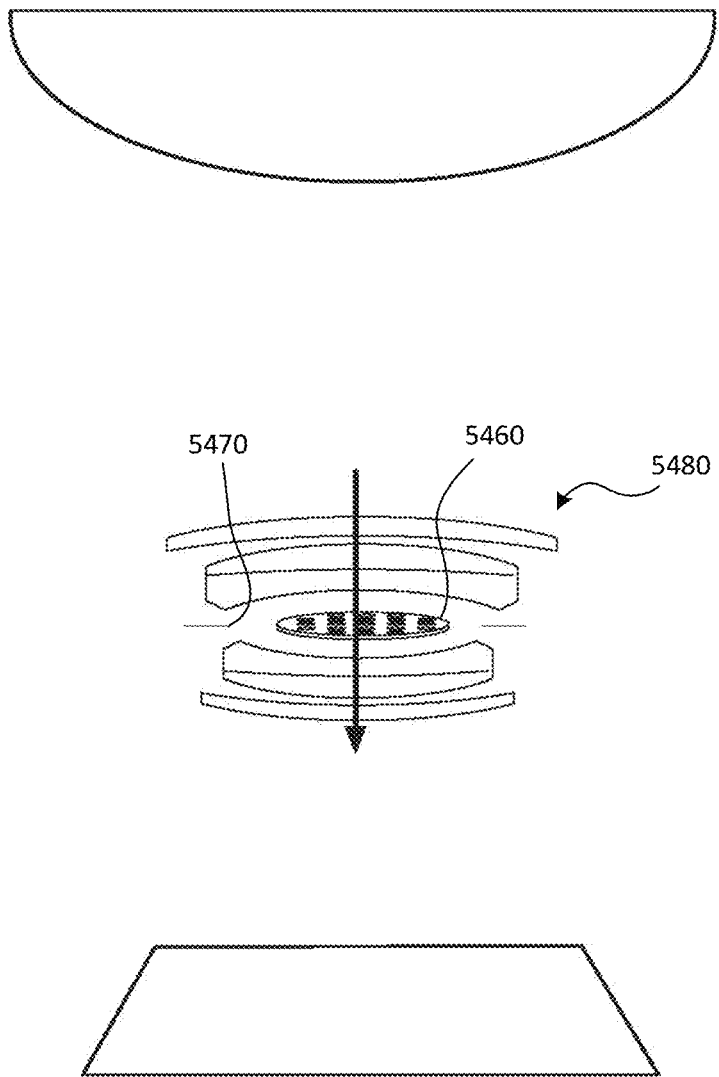
FIG. 54J is a side view depicting placement of the subaperture reducer, relative to a simplified schematic of the complete system, according to one embodiment.

FIG. 54J is a side view depicting placement of the subaperture reducer 5460, relative to a simplified schematic of the complete system, according to one embodiment. The subaperture reducer 5460 may be positioned in an aperture 5470, which may, in turn, reside in the lens array of a main lens 5480.

Environment Generation

In at least one embodiment, the stitched capture technology described herein is used to produce images of extremely high resolution. This may result in the ability, with customized mirrors and/or other optical elements, to capture up to a 360° view of an environment.

Any or all of the variations described above in connection with model generation can be used in connection with environment generation, including for example N facet values, computational engine, and sequential capture. In at least one embodiment, the system is implemented in an outward-facing fashion, wherein reflectors are provided on the outside of the surface as opposed to the inside. As described, reflectors can be of any suitable shape.

As indicated previously, "parabolic" does not require adherence to a precise, mathematical parabolic shape. This description references parabolic reflectors in many instances in which other reflector shapes may be used, as needed for the particular application.

In at least one embodiment, the system includes additional optics positioned to capture vertically above the capture system. This may facilitate the capture of up to a 360° effective field-of-view.

Figure 55A:
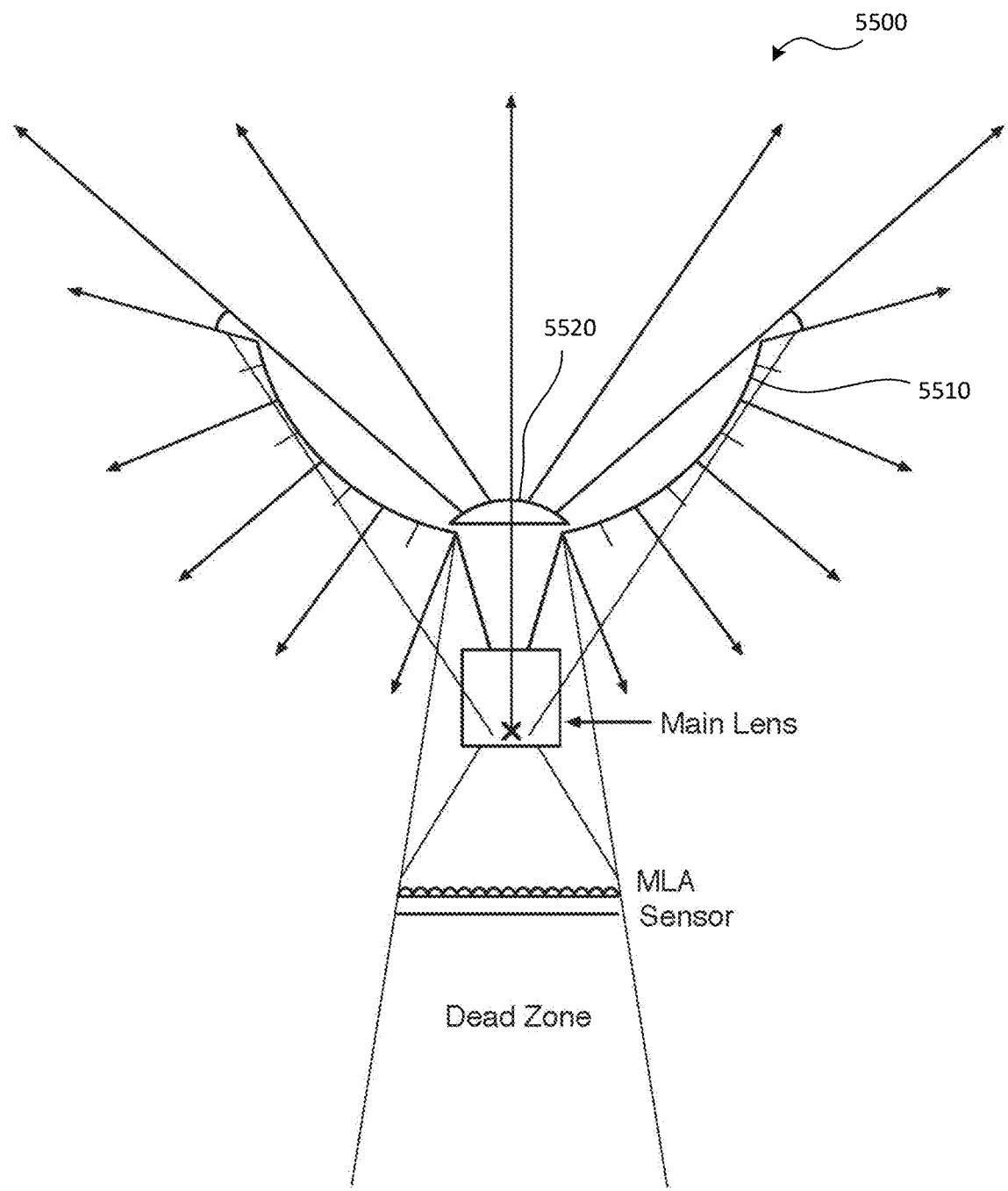
FIG. 55A is a side view depicting an example of a structure that provides a 360° scan of an environment, according to one embodiment.

FIG. 55A is a side view depicting an example of a structure 5500 that provides a 360° scan of an environment, according to one embodiment. The structure 5500 may leverage a reflector 5510 and secondary lens 5520 with an upward facing light-field capture system.

In at least one embodiment, the system is able to employ image processing technology to generate high resolution environments from a light-field image captured through a single lens, or from a series of sequentially-captured light-field images. In at least one embodiment, as depicted in FIG. 55B, one or more rotating optical elements may be used.

Figure 55B:
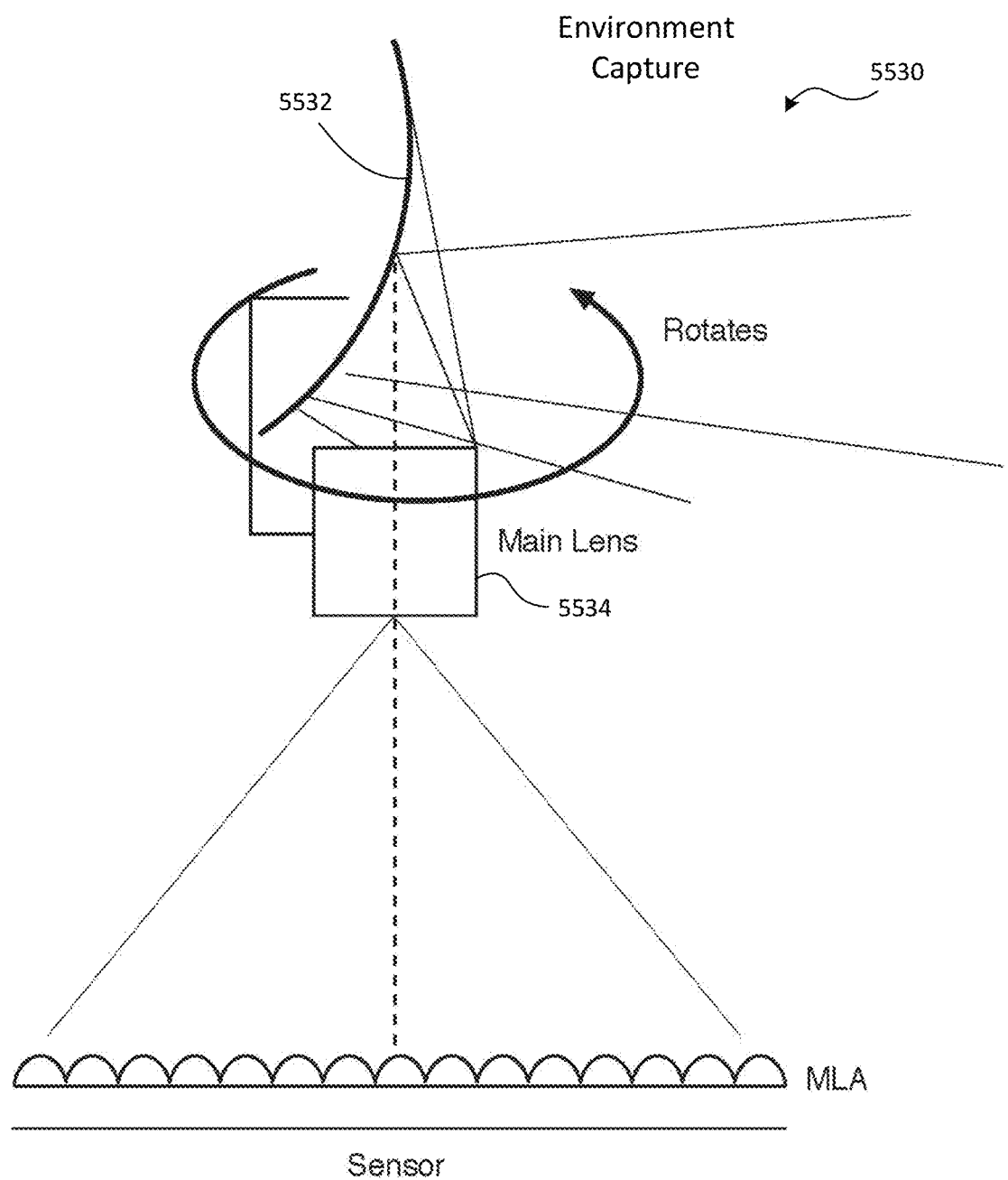
FIG. 55B is side view depicting an example of a structure that captures a complete 360° spherical capture environment through the use of a rotating reflector, according to one embodiment.

FIG. 55B is side view depicting an example of a structure 5530 that captures a complete 360° spherical capture environment through the use of a rotating reflector 5532, according to one embodiment. The rotating reflector 5532 may be positioned above the main lens 5534. The rotating reflector 5532 may or may not be planar depending on the angles of coverage desired. The rotating reflector 5532 may have a cylindrical, spherical, or parabolic shape.

Figure 55C:
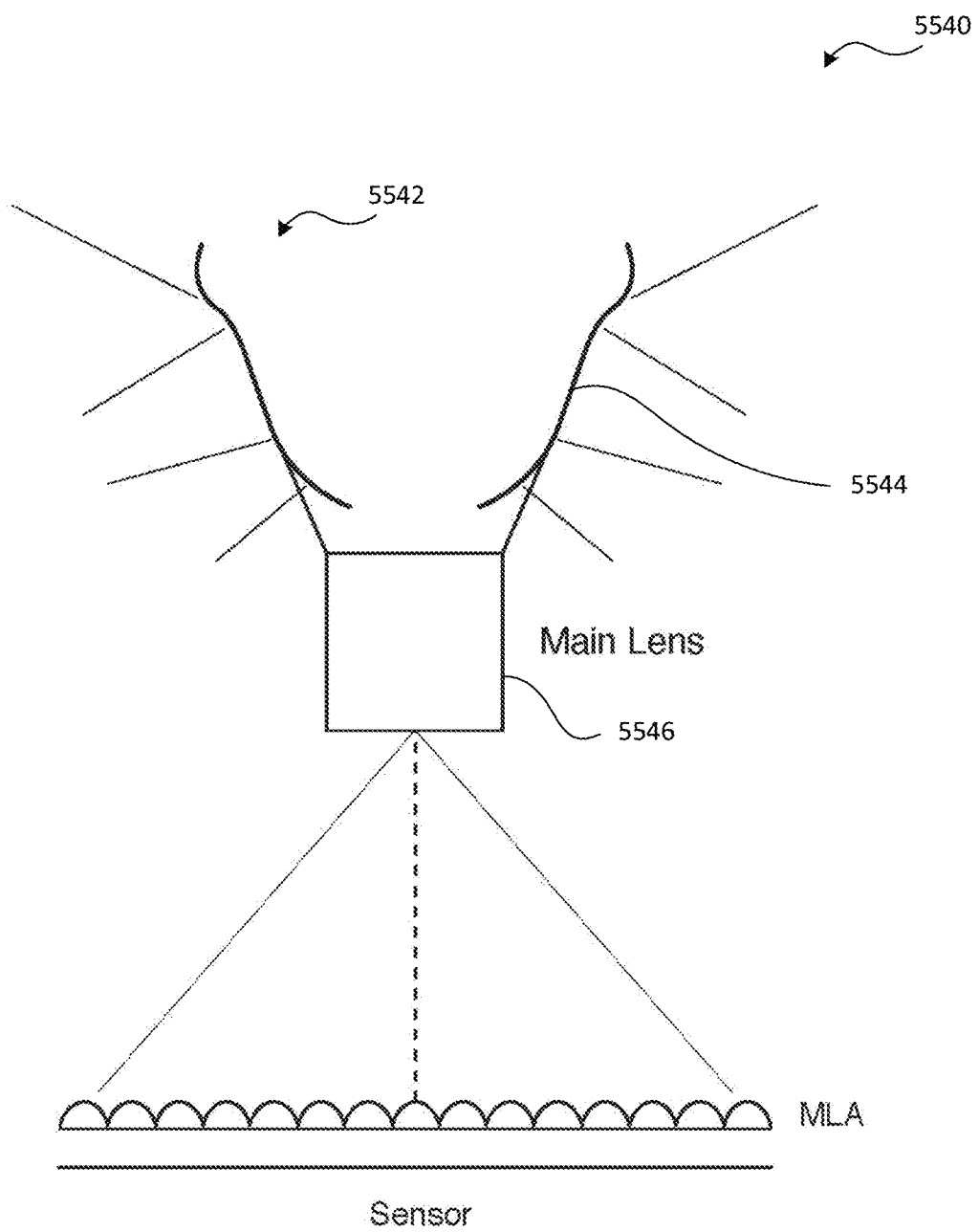
FIG. 55C is a side view depicting an example of a structure having a reflector with an irregular shape, according to one embodiment.

In other embodiments, the surface of a stationary or rotating reflector can be any shape. Optical compression can be employed by providing additional rays to regions of interest. For example, if overhead resolution is of less importance, more rays can be acquired between +45° and −45° by altering the reflective surface shape to optimize the imaging of such an environment. FIG. 55C depicts an example.

FIG. 55C is a side view depicting an example of a structure 5540 having a reflector 5542 with an irregular shape, according to one embodiment. The reflector 5542 may have relatively flat portions 5544 that optimize direction of light from between +45° and −45° into a main lens 5546. The resulting image may thus have more detail in these areas. Alternative reflector shapes may be used to alter the direction along which the most detail is captured.

In at least one embodiment, line scanners can be used to capture a high resolution scene using a system designed for environment capture. Such an embodiment may utilize any type of scanners, including for example flatbed scanners, which may optionally be combined with any of the environment capture optics disclosed herein.

Figure 55D:
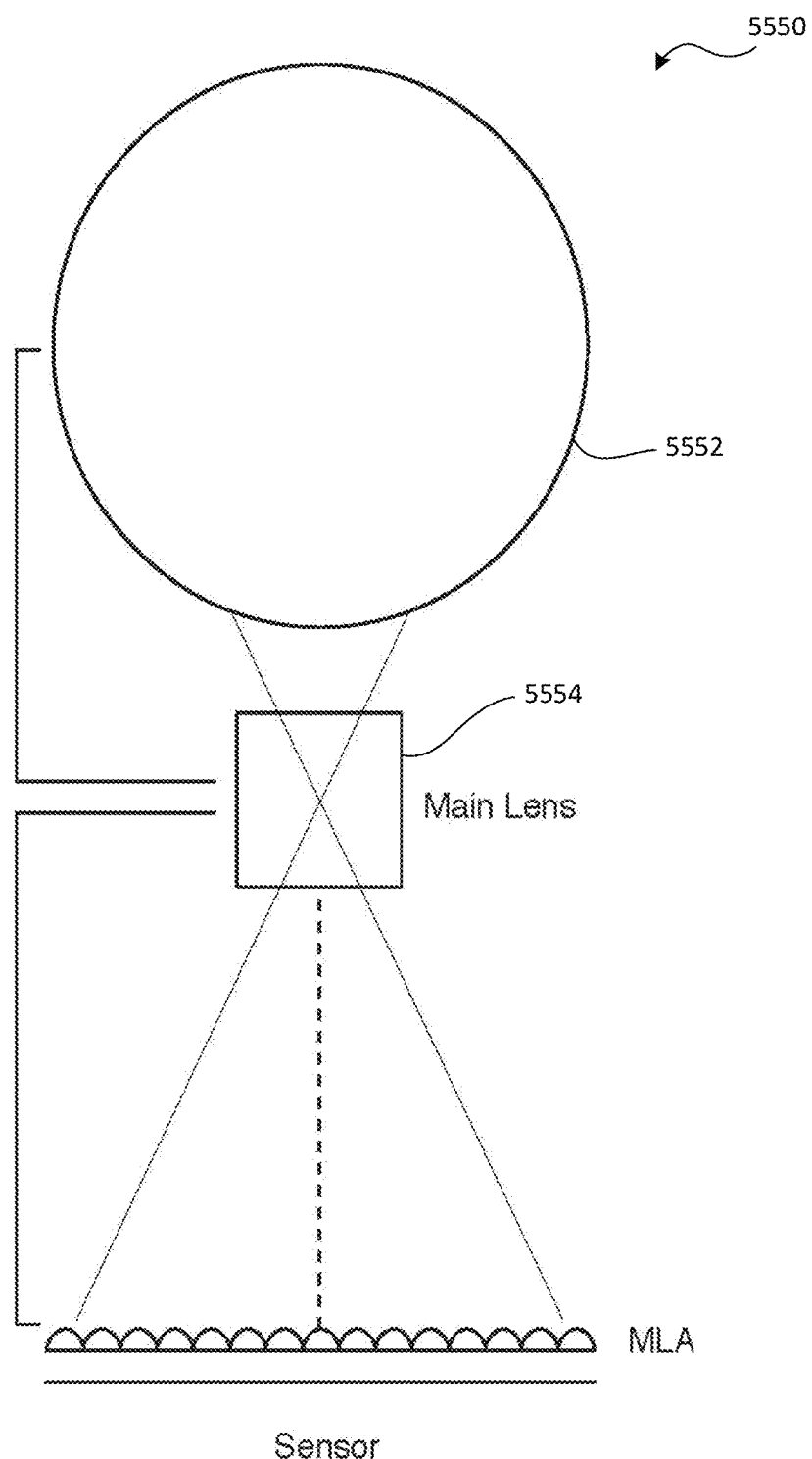
FIG. 55D is a side view depicting an example of a structure in which a spherical lens is used to image an environment, according to one embodiment.

In at least one embodiment, a spherical, semispherical, oblong, egg-shaped, or other unconventional lens, may be used. Such a lens may be made of any optical materials, and may be positioned above a main lens to image an environment. FIG. 55D depicts an example.

FIG. 55D is a side view depicting an example of a structure 5550 in which a spherical lens 5552 is used to image an environment, according to one embodiment. The spherical lens 5552 may be positioned above a main lens 5554, and may gather and direct light from the environment to the main lens 5554.

In at least one embodiment, the reflector includes multiple facets. Additionally or alternatively, in at least one embodiment, a system may be configured to use multiple light-field capture devices distributed inward (facing into a volume), outward (from a central location), or both simultaneously, so as to generate the required rays to define a particular object or space.

Figure 55E:
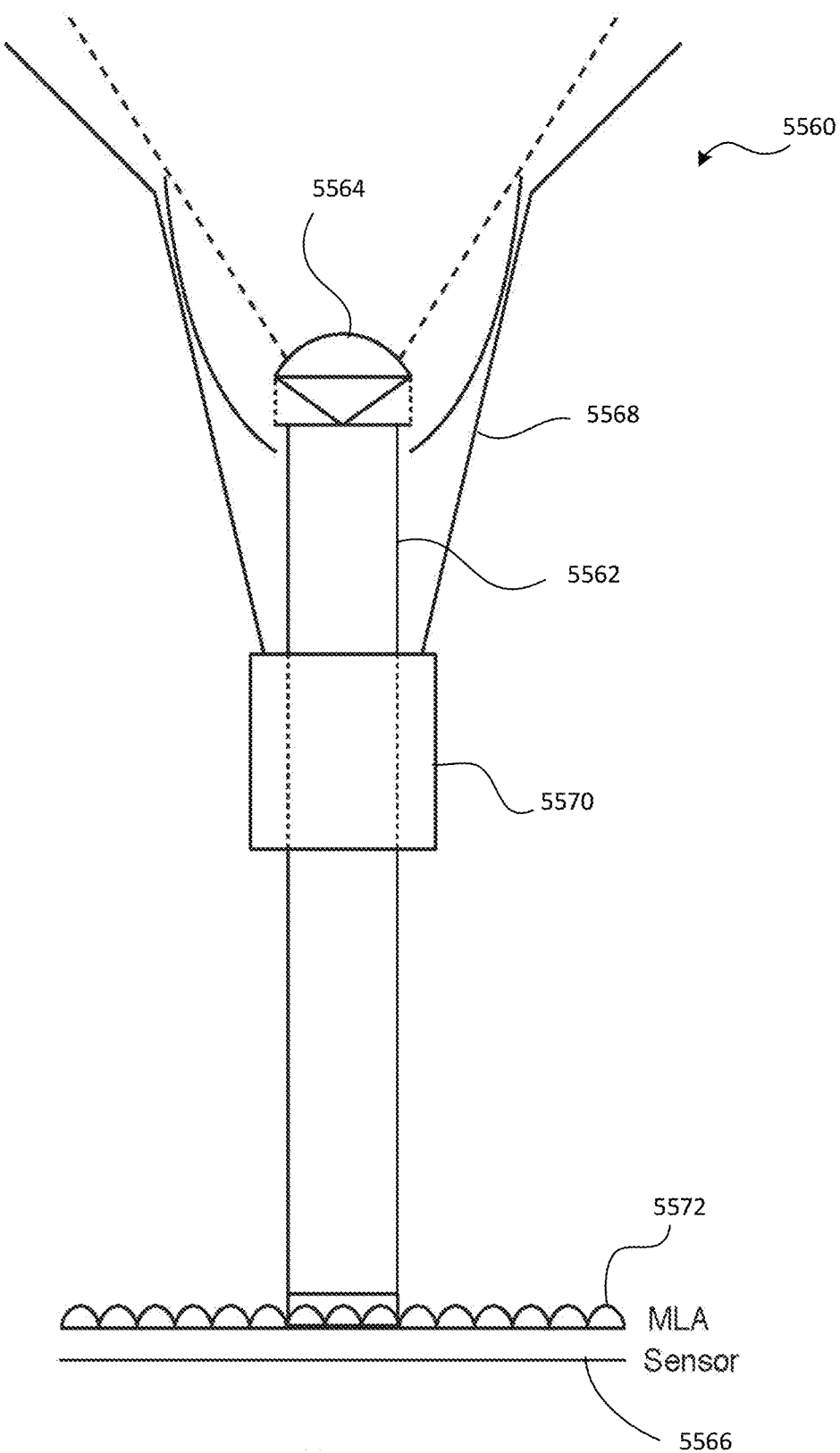
FIG. 55E is a side view depicting an example of a structure in which a fiber optic bundle is used to convey light from a secondary lens to an image sensor, according to one embodiment.

In at least one embodiment, the additional optical elements introduced into such an environment capture design may leverage dense fiber optic bundles to relay light from a secondary lens directly to an image sensor. FIG. 55E depicts an example.

FIG. 55E is a side view depicting an example of a structure 5560 in which a fiber optic bundle 5562 is used to convey light from a secondary lens 5564 to an image sensor 5566, according to one embodiment. The light may be collected in the secondary lens 5564 via a reflector 5568, and may pass through the main lens 5570 and a microlens array, or MLA 5572, en route to the image sensor 5566.

Figure 55F:
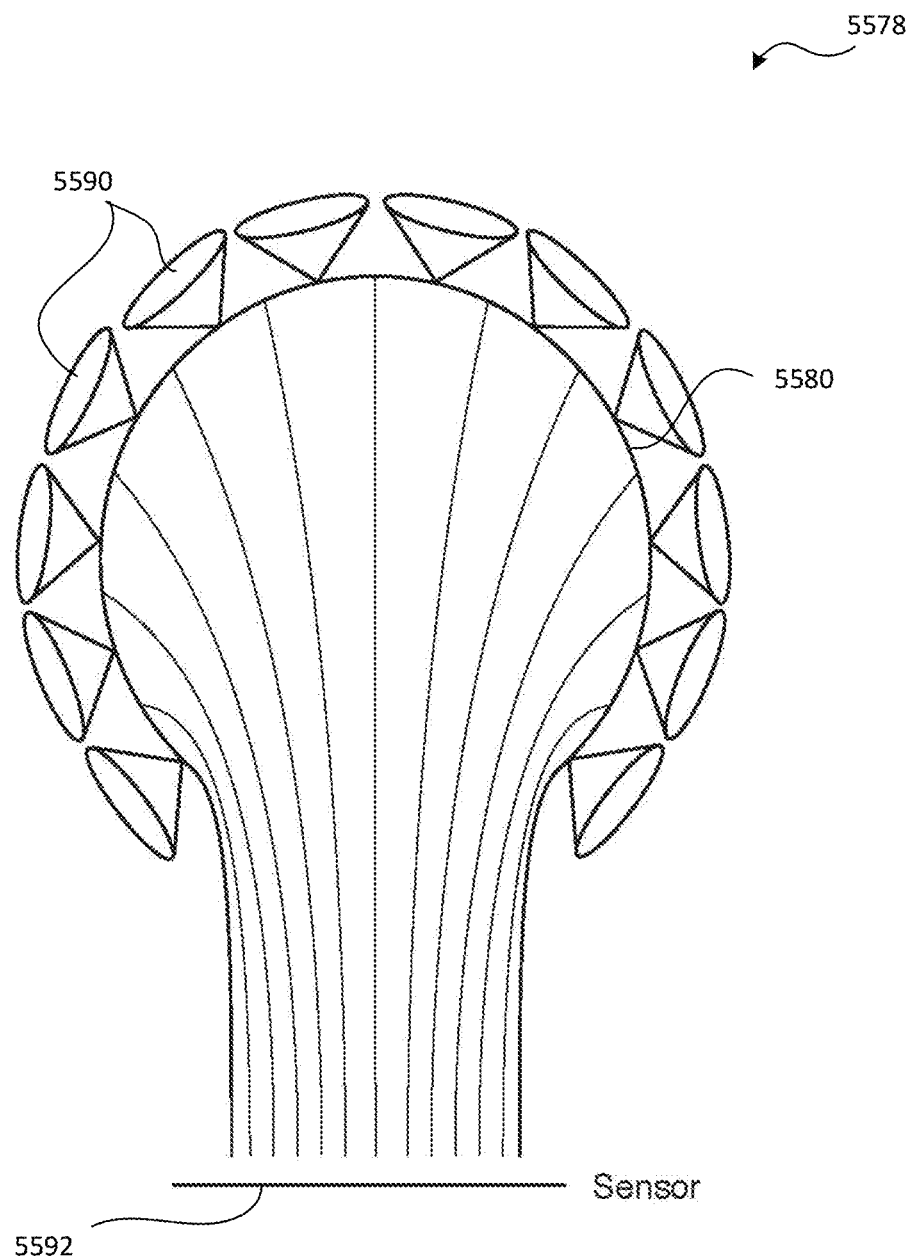
FIG. 55F is a side view depicting the use of a combined tapered fiber optic bundle and microlens array, or combined structure, according to one embodiment.

In at least one embodiment, the MLA is placed at the front of a tapered fiber optic bundle arrangement that includes a polished round surface and an array of lenslets in a 360-degree capture configuration. In this manner, light may be relayed directly to the sensor without a separate main lens or other MLA structures. FIG. 55F depicts an example.

FIG. 55F is a side view depicting the use of a combined tapered fiber optic bundle and microlens array, or combined structure 5578, according to one embodiment. The combined structure 5578 may have a polished round surface 5580 on which an array of lenslets 5590 are arranged. The lenslets 5590 may cooperate to act as a microlens array (MLA) by directing light into the remainder of the combined structure 5578 in a manner that preserves vector information regarding the origin of light entering the lenslets 5590. The vector information, along with color and intensity information, may be encoded on a sensor 5592. The lenslets 5590 may be integrally formed into the fiber structure of the combined structure 5578, or formed separately and attached.

Non-Planar Imaging Planes

Traditionally, the shape of the imaging plane of a camera is matched to that of the image sensor. The configuration of the image sensor may be limited by the planar processes used in silicon wafer fabrication. Accordingly, imaging planes have traditionally been planar as well. However, in some instances, it may be advantageous to have a non-planar continuous imaging surface.

The use of fiber optic bundles may facilitate the use of non-planar imaging planes. In at least one embodiment, one or more fiber optic bundles may be machined or otherwise formed into the desired imaging plane shape. For example, the leading end(s) of one or more fiber optic bundles may be machined into a cylindrical, spherical, faceted, elliptical, parabolic, or other shape. The light gathered from the non-planar imaging plane may be conducted by the fiber optic bundle(s) to one or more planar image sensors of any known type. The imaging plane may have any concave, convex, or concave/convex shape. Thus, the shape of the imaging plane may be decoupled from that of the image sensor.

Use of a non-planar imaging plane may be applied to cameras employing only a single image sensor. The shape of the imaging plane may be controlled in a manner that modifies the resulting image to resolves and/or obviate various software processing steps that may otherwise need to be performed on the light-field data.

Back-End Systems Design

In at least one embodiment, the system described herein uses existing interfaces and technologies. For example, 1 GP capture at 300 fps 10 bit requires approximately 350 GB/s. Such a data transfer rate may be challenging to obtain with existing technologies. However, with the tiled technologies proposed herein, handling $1/50^{th}$ or $1/100^{th}$ of the resolution (or any percentage depending on configuration) may be significantly easier on a per-module basis.

In at least one embodiment, the system is fragmented into multiple tiled streams for simplified data management, and the data streams from the individual image sensors are multiplexed or further fragmented. For example, four individual modules can be connected into a single stream, or a single module can be further broken down into four separate streams, depending on available bandwidth. In addition, the resulting captured data can be multiplexed into a single image from multiple individual files or streams. Alternatively, a single image file can be generated to include multiplexing, for example, as one tile from four tiles or one tile from all tiles. The larger image (or whatever portion has been tiled or presented) can then be refragmented for image processing requirements and/or display.

In at least one embodiment, raw light-field data can be taken in either a tiled or single image form. The raw light-field data may be distributed across a networked rendering (processor) infrastructure to further increase (wall-clock) render time speeds.

In at least one embodiment, pre-rendered aspects of the process can be automated, for example by allowing a user to identify captured sequences to pre-process, which are then automatically processed in the background. Pre-processing can be performed based on the computational requirements for the light-field excluding the final desired render. In at least one embodiment, the two-dimensional output and/or all other processing requirements may be performed in an automated fashion, or precomputed for model generation. This can additionally include automation of camera tracking and vector analysis as noted in the feature discussions.

In at least one embodiment, fiber optic transceivers can be included in order to extend the length of separation between the camera head and the back end systems. Further, in at least one embodiment, on-board storage can be provided for each device. Stationary and/or removable storage or any other storage method can be used, to tether a portable storage array in the same fashion as disclosed above for the back-end systems. Any storage mechanism can be used in connection with the described system, including for example, RAM-based storage, flash memory, solid-state drives, magnetic drives, optical drives, spinning disc arrays, and/or the like.

In at least one embodiment, the system can store the preview lens capture in any file/video format and or save a real-time computational preview of the captured image. Further, the system can store metadata in any form, including the choices made with the preview lens during capture and/or any other capture decisions made that would benefit from storage as a metadata stream.

In at least one embodiment, the system also implements a process to compress the file size of light-field data. Such compression may use any suitable compression technologies. Compression can also be based upon further analysis of the vectors in the scene and more intelligent light-field temporal compression technologies. Any suitable method can be used to compress the light-field data, including through the use of spatial and/or temporal algorithms.

Computational Focal Length and Data Management

In at least one embodiment, the system can use lossless digital ("computational") zoom and focal length (FL) automation, with an increase in overall system resolution by the ratio of the zoom factor (e.g. 2× zoom=4× resolution increase (2×W and 2×H=4×), where pixel density at the center of the fiber stack is greater (with commensurate MLA structure) and every array ring around a given center array stack can provide decreased resolution. The capture mechanism may reduce the pixel density recorded appropriately such that the center array stack captures at the same angular and pixel resolution, and the same consideration for each ring about this N+1 ring, where FL adjustments may be performed with no loss in captured resolution as the FL is adjusted. The image plane may increase in size and pixel density may scale accordingly in such fashion that the transmitted data is the same given that the pixel pitch scales to compensate for the FL digital zoom.

Figure 56:
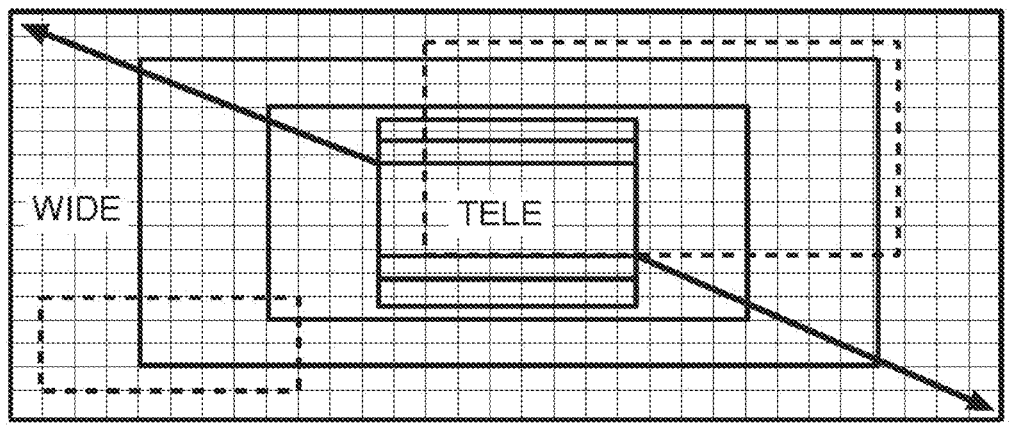
FIG. 56 is an image diagram depicting an example of how the imaging plane can be divided into multiple FOV segments, according to one embodiment.

FIG. 56 is an image diagram depicting an example 5600 of how the imaging plane can be divided into multiple FOV segments, according to one embodiment. At full resolution (meaning no decrease in image sensor pixel density and no reduction of pixels), the system may provide the ability to freely look around the image with the additional crop factors, which results in the ability to alter the computational focal length.

Figure 57:
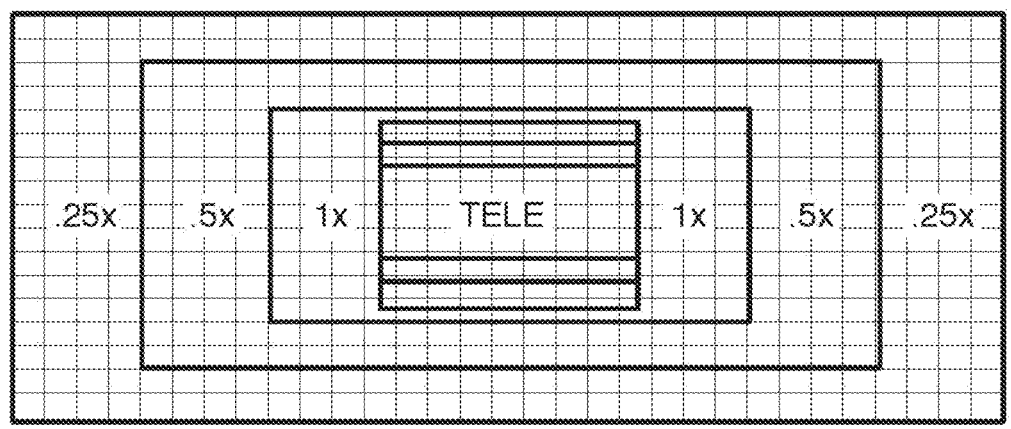
FIG. 57 is an image diagram depicting an example of an alternative approach for dividing an imaging plane into FOV segments, according to one embodiment.

FIG. 57 is an image diagram depicting an example 5700 of an alternative approach for dividing an imaging plane in to FOV segments, according to one embodiment. The sample rectangles designate examples of how the sensors may decrease in pixel density, or maintain the same density with a smaller imaging area and increase the magnification factor of the tapered fiber optic bundles by the respective factor required to maintain the same area. For example, 4× resolution reduction may require a 4× magnification increase to the existing magnification at the center of the array; if the center has a 3× magnification factor, this may result in a 12× magnification requirement. Alternatively, the system can maintain full resolution at the sensor level and perform data reduction depending on the final output desired resolution for the purpose of providing the capability of computational focal length adjustments with a single lens.

The particular rectangles and methods of FIGS. 56 and 57 are examples only. The techniques described above may be applied in different ways, or a variety of other focal length and/or data management techniques may be used.

In some alternative embodiments, identical pixel structures can be provided throughout the array to provide the ability to compress the raw data losslessly based upon a predetermined final output resolution requirement, where the entire FOV imaged will exceed the actual imaging requirements. In at least one embodiment, this may additionally be performed in a non-region based approach. For example, this compression may be applied in a radial fashion where each pixel sampled increases in pitch the further it is located from the center of the image sensor, across the imaging plane. The significance of this is that a single prime lens with extremely wide angle of view (AOV) and high resolution at the center image of the lens may allow all focal length (FL) functions to be performed digitally, with no loss in recorded resolution or modulation transfer function (MTF).

Variations in Redirecting Optical Elements

In at least one embodiment, a system according to the present disclosure may use a mirror in order to provide a larger effective field-of-view, in a manner similar to that of FIG. 55A. Such a mirror may serve as a redirecting optical element, and may have any of a wide variety of shapes, including but not limited to spherical, elliptical, hyperbolic, and conical shapes. Such mirrors may provide a field-of-view that extends substantially full-circle about an axis.

Referring to FIGS. 62A through 62D, various systems depict the use of shaped mirrors, as mentioned above. These embodiments are merely exemplary; in other embodiments, different redirecting optical elements and/or configurations may be used.

FIG. 62A depicts a system 6200 with a spherical mirror 6210. By leveraging an entrance pupil of a certain diameter and a microlens array (not shown), the spherical mirror 6210 may be placed at a specified distance from the field-of-view of the main lens 6215 to distribute the rays captured by the light-field subapertures to capture an effective field-of-view greater than 180°. The system 6200 may optionally have a second (or greater) optical path that passes through the surface of the spherical mirror 6210 in order to capture greater fields-of-view. This may be done, for example, by making the surface of the spherical mirror 6210 partially reflective, and partially transparent. Thus, light from behind the spherical mirror 6210 may be received by the main lens 6215 and imaged by the system 6200.

FIG. 62B depicts a system 6220 with an elliptical mirror 6230. FIG. 62C depicts a system 6240 with a hyperbolic mirror 6250. FIG. 62D depicts a system 6260 with a conical mirror 6270.

Figure 63A:
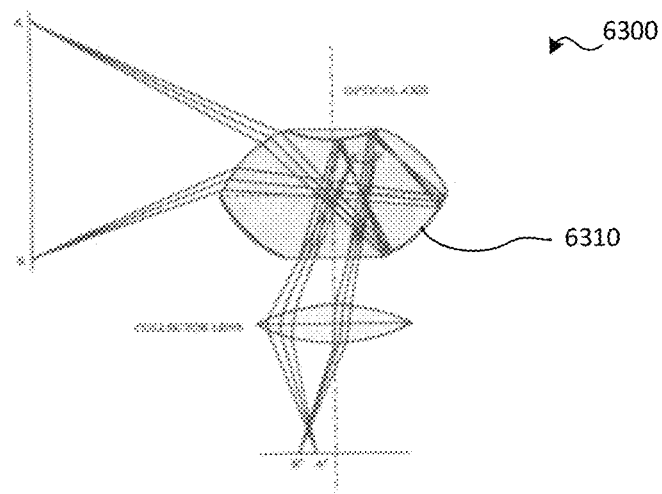
FIGS. 63A through 63C depict various systems that use redirecting optical elements with other configurations, according to certain embodiments.
Figure 63B:
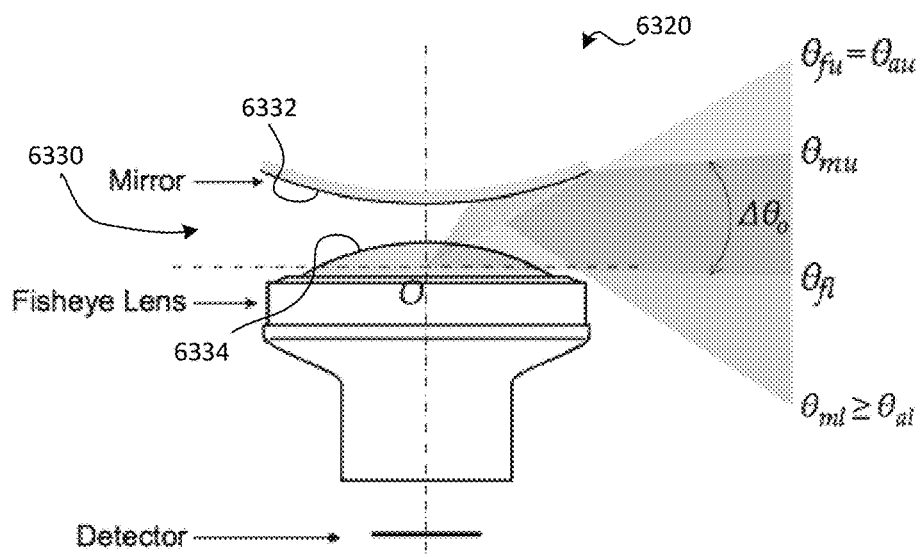
Figure 63C:
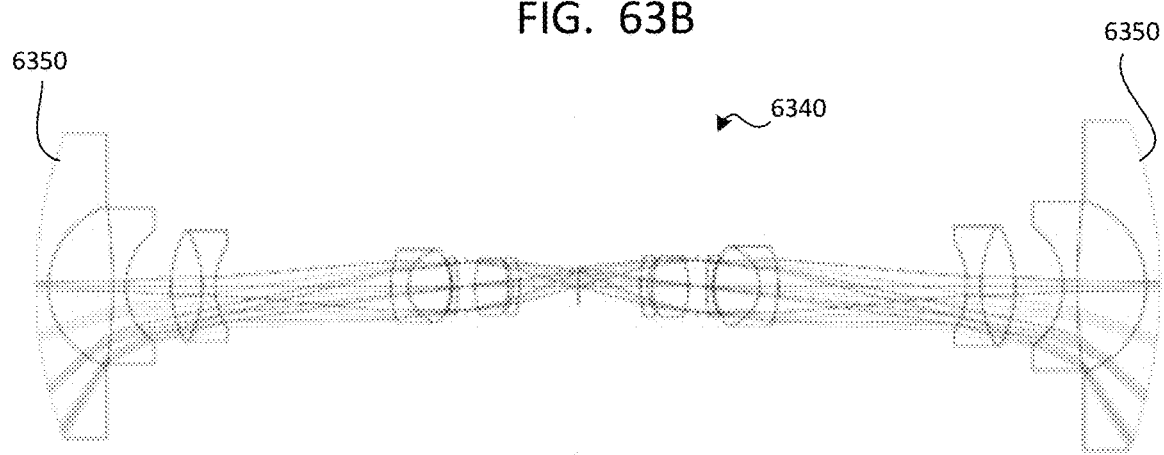

Referring to FIGS. 63A through 63C, various systems depict the use of redirecting optical elements with other configurations. Such configurations may include panoramic annular, catadioptric, and multiple fisheye elements, which are also merely exemplary.

FIG. 63A depicts a system 6300 with a panoramic annular element 6310. The panoramic annular element 6310 may have an optical design consisting of up to a singular piece of glass with spherically reflecting surfaces to produce a 360° annular virtual image of the environment about the optical axis of the system 6300. With these optics and a microlens array (not shown) with an EP with a diameter D, the subapertures of the light-field can reconstruct a greater field of view for immersive content.

FIG. 63B depicts a system 6320 with a catadioptric element 6330, which may include a curved mirror 6332 and a fisheye lens 6334. The combination of reflective and refractive optics may form high angle of view capture. Leveraging this approach with a microlens array (not shown) and an EP with a diameter D, the subapertures of the light-field can reconstruct greater fields of view.

FIG. 63C depicts a system 6340 with multiple fisheye elements 6350. The system 6340 may have multiple light-field sensors and wide angle optics in the form of the fisheye elements 6350. The system 6340 may leverage these components to produce wide subaperture angles of coverage for full 360° light-field reconstruction.

Mechanical Scanning

In some embodiments, one or more optical elements may be moved during the image capture process to provide a large effective field-of-view. Various combinations of optical elements may be used in connection with linear and/or rotary motion.

By leveraging a smaller field-of-view optical system, with and without a microlens array, one can trade off temporal resolution with spatial resolution (perspective/area). With high frame rate capture, one or more mechanical, optical, or opto-mechanical devices may be coupled to increase the effective field-of-view without the tradeoff of size of optics. This approach may include, but is not limited to, singular rotational mirrors, multi-stage rotational mirrors, rotational prisms, and other optical elements that alter the imaged field-of-view from the overall area in which capture is desired.

Figure 64A:
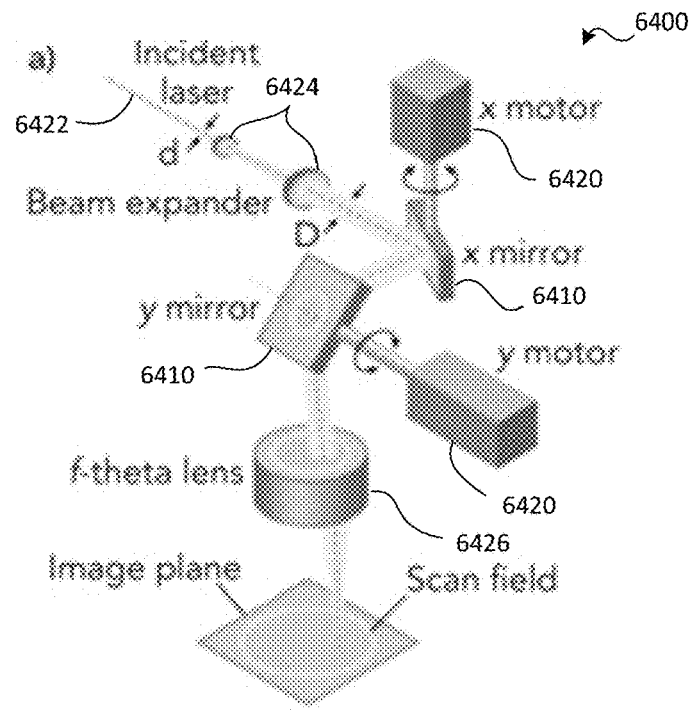
FIGS. 64A through 64C depict various systems that use a variety of mechanically movable optical elements in order to capture a large field-of-view, according to certain embodiments.
Figure 64B:
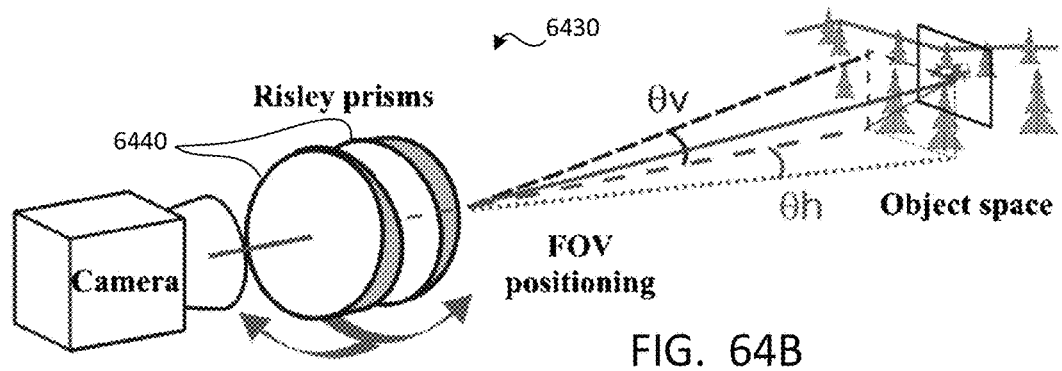
Figure 64C:
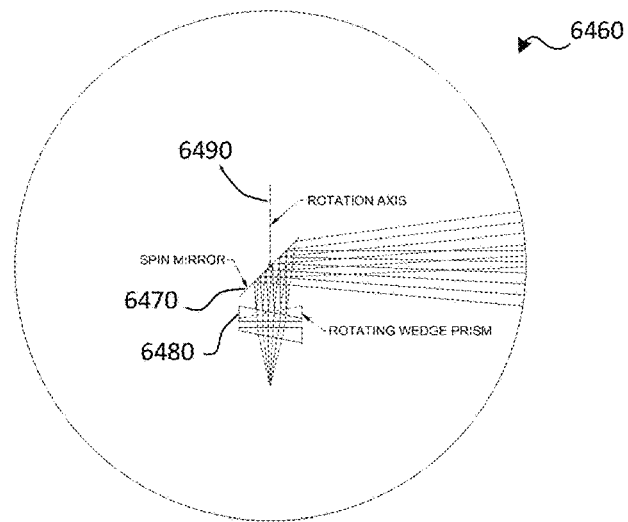

Referring to FIGS. 64A through 64C, various systems may use a variety of mechanically movable optical elements in order to capture a large field-of-view. The optical elements may include mirrors, Risley prisms, and/or wedge prisms, by way of example.

FIG. 64A depicts a system 6400 with mirrors 6410 that are rotated by motors 6420. The mirrors 6410 and motors 6420 may be used in conjunction with an incident laser 6422, one or more beam expanders 6424, and/or anf-theta lens 6426.

FIG. 64B depicts a system 6430 with Risley prisms 6440 that are rotated by one or more motors (not shown). The Risley prisms 6440 may be rotated in opposite directions, as indicated by the arrows.

FIG. 64C depicts a system 6460 with a spin mirror 6470 and a rotating wedge prism 6480. The spin mirror 6470 and the rotating wedge prism 6480 may rotate about an axis 6490 as shown to provide an effectively large field-of-view, which may extend substantially full-circle around the axis 6490.

Coherent Fiber Arrays

In some embodiments, coherent fiber arrays may be used to provide a larger field-of-view. In some embodiments, conventional imaging, rather than light-field imaging, may be used in connection with coherent fiber arrays.

By leveraging dense or flexible fiber optic elements, it is possible to accurately mechanically align coherent fiber surfaces to capture an external image that is relayed to a single or multiple offset imaging sensors. With this approach, the optical elements for focusing light (for example, the leading ends of optical fibers or fiber optic bundles) may be placed on the external surface of the outer sphere, or any desired shape for area capture. These shapes may include planar, conical, cylindrical, and/or any geometric or irregular shape/surface for desired applications.

The trailing ends of the optical fibers or bundles may be attached to the silicon and/or imaging surface, and may accurately map to a specified angle in space depending on the lenses used. The lenses may be mechanically aligned though a calibration process to ensure that angles of light are captured with accuracy. Additionally or alternatively, such a system may be calibrated though the use of a software imaging process. With flexible optical elements, it may also be possible to change the size and/or shape of the mechanical apparatus dynamically to provide multiple capture options depending on the desired area coverage. For example, the leading ends of the optical fibers may be secured to a flexible sheet, which may be movable between different shapes to provide different fields-of-view.

Figure 65:
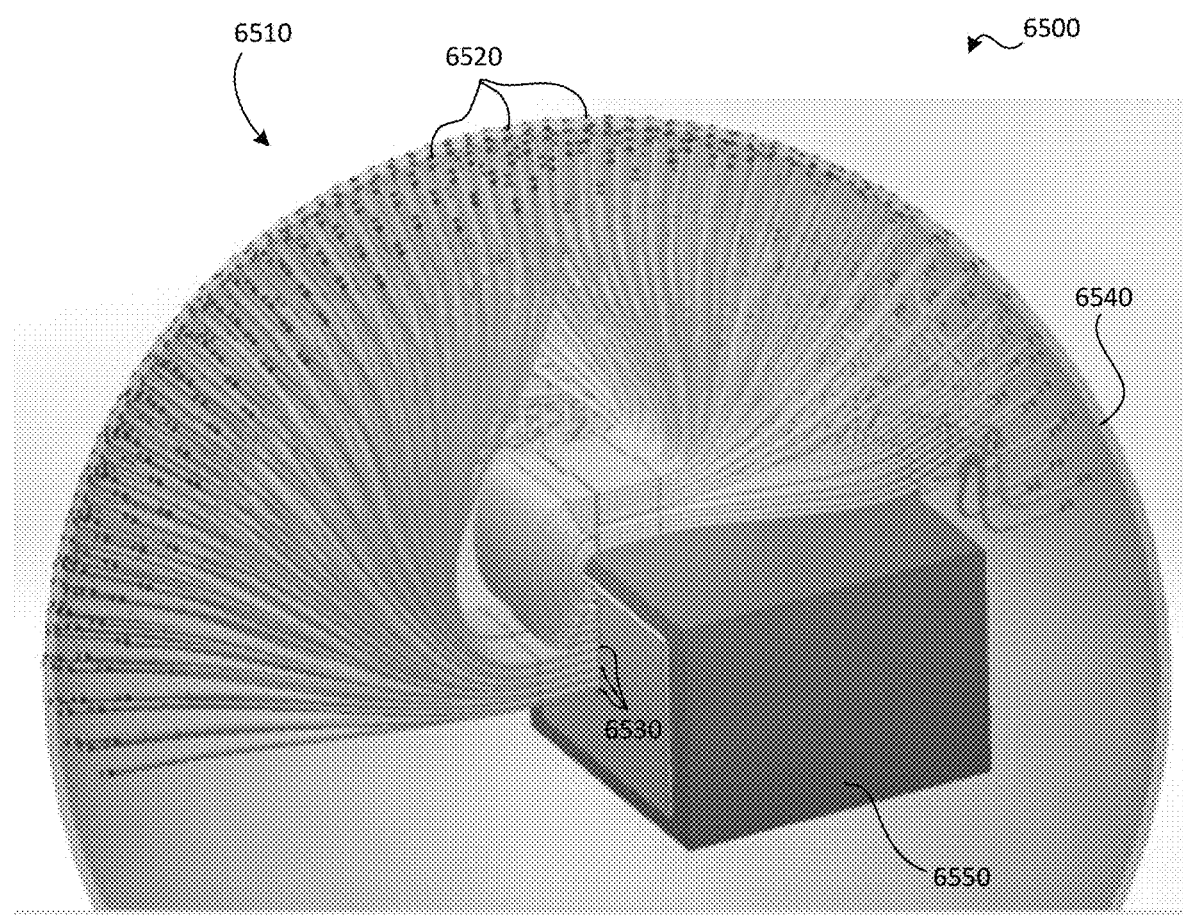
FIG. 65 depicts a system having a coherent fiber array comprising many optical fibers, according to one embodiment.

Referring to FIG. 65, a system 6500 may have a coherent fiber array 6510 comprising many optical fibers, each of which has a leading end 6520 and a trailing end 6530. The leading ends 6520 may be secured to a spherical shape 6540, and the trailing ends 6530 may be secured to an image sensor 6550. The system 6500 may provide a wide field-of-view, which may be semispherical in shape.

LiDAR

Scanning devices can be used to measure the depth profile of objects that are close by. Their use can add to the accuracy of the depth measurement derived from a light-field camera. This is especially true for imaging regions that are monochromatic and featureless. The scanning device can help add detail to the depth map generated by the light-field camera alone. One example of a scanning device is the LiDAR (light detector and ranging) scanning device, which uses a beam of light and time-of-flight timing information to measure distance to objects.

Many commercially available scanning devices make measurements over a field-of-view (FOV) that is much larger than a typical field-of-view for a light-field camera. For example, the Velodyne VLP-16 device scans with sixteen lasers in a circular 360° field-of-view in the plane of rotation (the "azimuthal coordinate") of the device, and +/−15° in the plane perpendicular to the plane of rotation (the "polar coordinate"). The field-of-view for the fiber taper sensor used in a light-field camera with a 560 mm by 316 mm sensor and a 1210 mm focal length lens may only be about 26° in the horizontal direction, and 15° in the vertical direction.

To measure depth of objects from a camera, it is advantageous to reflect the beams of light from a scanning device so that they are projected into a smaller angular region that more closely matches the field-of-view of the camera. This technique may be used to avoid projecting the beams of light into places the camera cannot image, and instead redirect them to be more concentrated so the spatial sampling of the scanning device within the field-of-view of the camera is increased.

Figure 66:
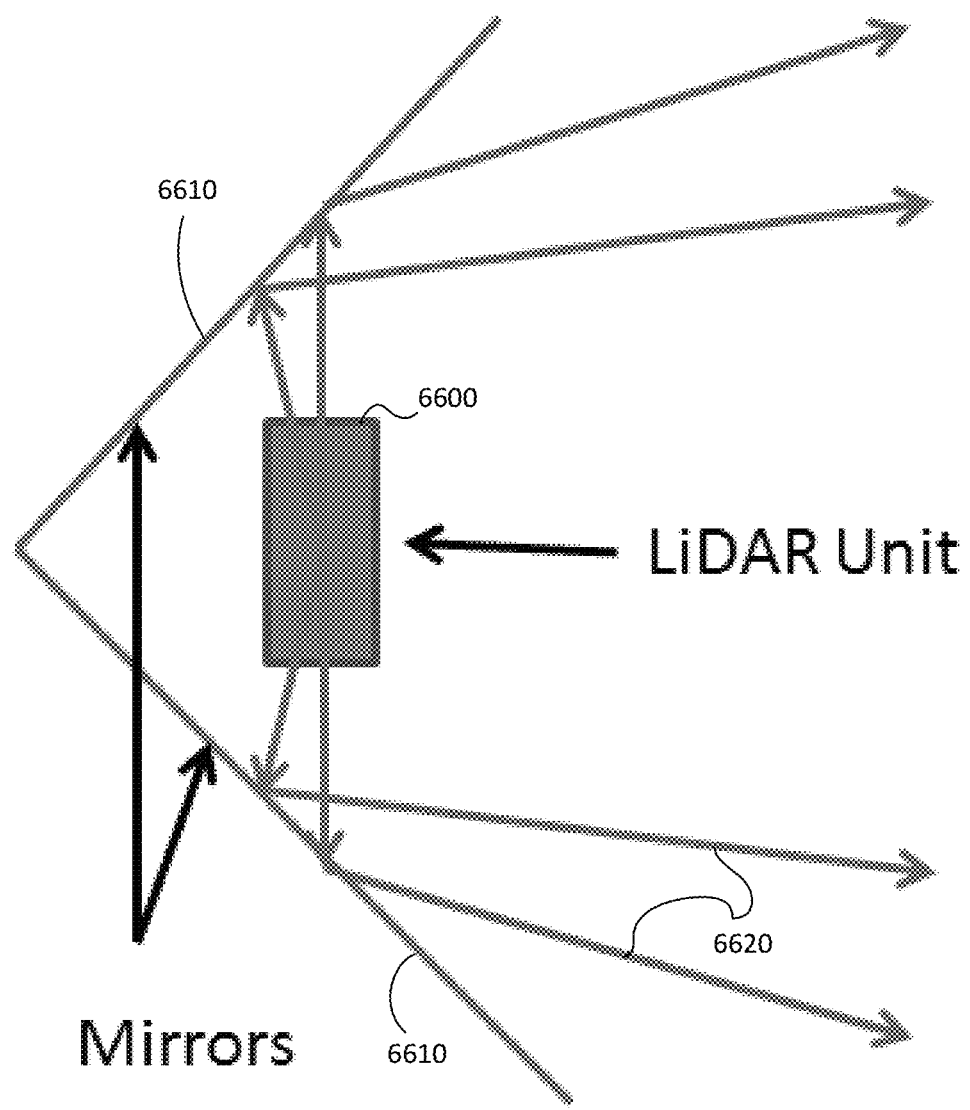
FIG. 66 depicts a side view of a scanning device placed between two mirrors placed at a 90° angle relative to one another, with the scanning device centered between them, projecting light beams radially such that the light beams are reflected by the mirrors, according to one embodiment.

FIG. 66 shows a side view of a scanning device 6600 placed between two mirrors 6610. The two mirrors 6610 may be placed at a 90° angle relative to one another, with the scanning device 6600 centered between them, projecting light beams 6620 radially. In at least one embodiment, the scanning device 6600 may be a Velodyne VLP-16 LiDAR disk that projects 16 lasers radially with various angles (for example, −15°, −13°, −11°, −9°, −7°, −5°, −3°, −1°, 1°, 3°, 5°, 7°, 9°, 11°, 13°, and 15°) relative to the plane of rotation. In this configuration, all the light beams projected from the LiDAR may be reflected by the mirrors into the opening defined by these mirrors. The light beams may be projected with an angular spread that can overlap with the camera's field-of-view.

Figure 67A:
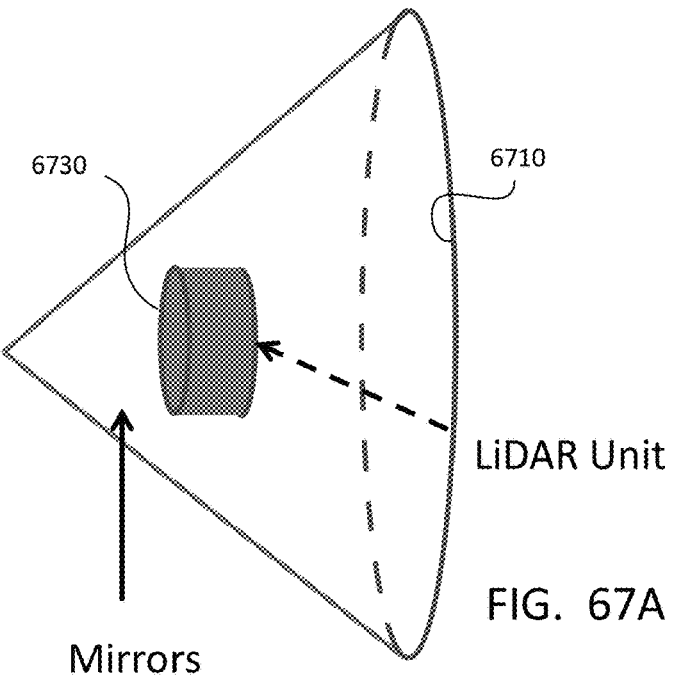
FIGS. 67A and 67B depict two different mirror reflector designs with a reflective surface that is, respectively, cone-shaped on the inside, with a circular opening, and pyramidal with four mirrors placed in a pyramid formation with a square opening, according to certain embodiments.
Figure 67B:
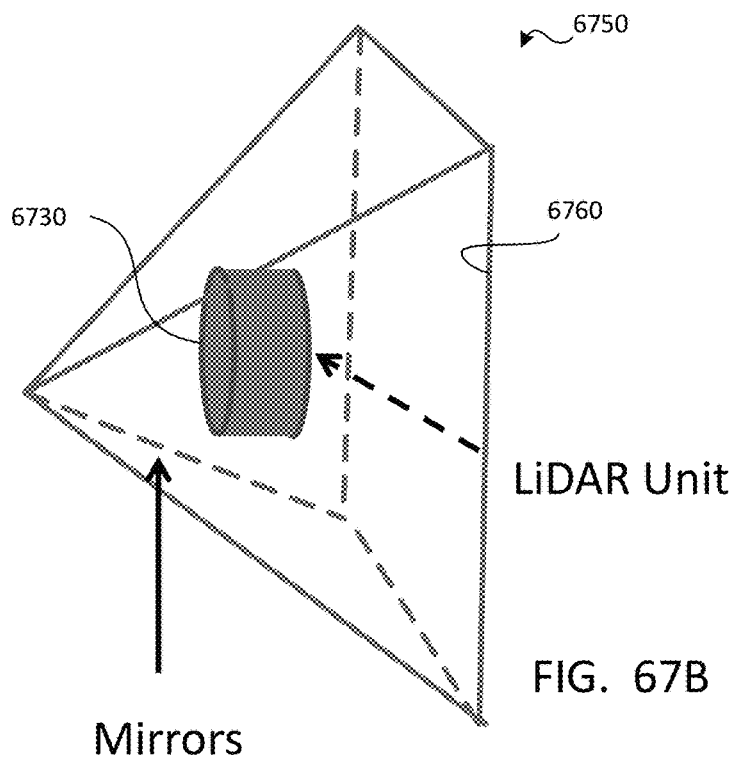

In three dimensions, it may be advantageous for the mirrored surfaces of the reflector to be arranged so they surround the scanning device in such a way as to reflect all the beams from the scanning device toward the opening in those mirrors. As shown in FIGS. 67A and 67B, two basic designs for a reflector for a scanning device may include conical and pyramidal reflectors. In FIG. 67A, a cone-shaped reflector 6700 has a surface that is cone-shaped on the inside, with a circular opening 6710. In FIG. 67B, a square pyramidal reflector 6750 may have four mirrors placed in a pyramid formation with a square opening 6760. The square pyramidal reflector 6750 may be composed of three or more mirrored sides, with an opening that has the shape of a regular or irregular polygon.

Figure 68A:
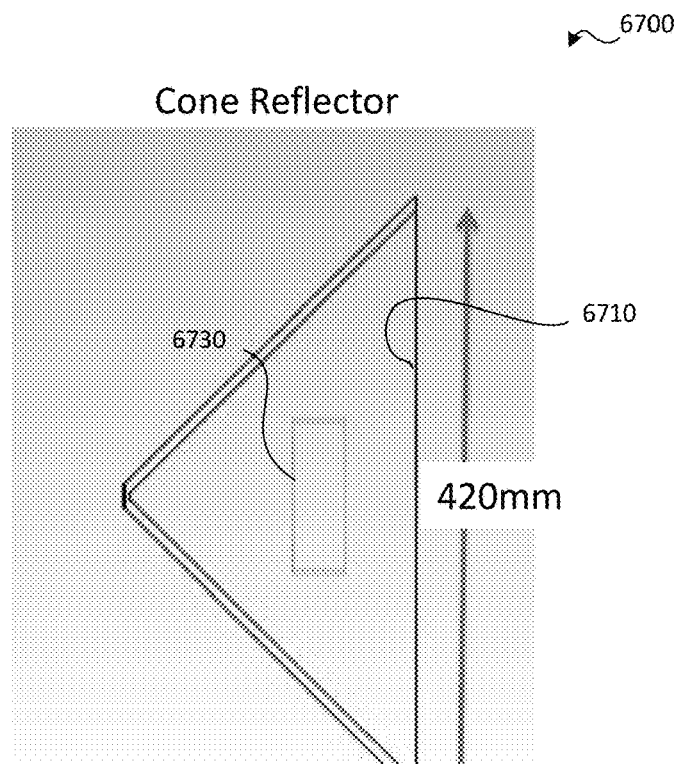
FIGS. 68A and 68B depict the dimension of the opening for the reflected beams of light from, respectively, a scanning device utilizing the cone-shaped mirror reflector of FIG. 67A, and a scanning device using the pyramidal mirror reflector of FIG. 67B, according to certain embodiments.
Figure 68B:
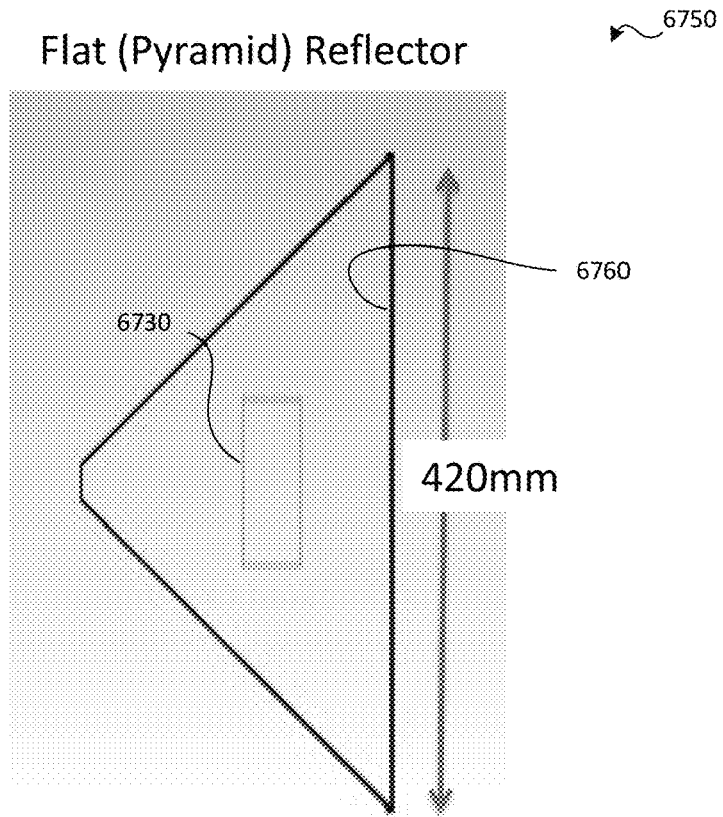

In at least one embodiment, the non-mirrored opening 6710 in the cone-shaped reflector 6700 has a diameter of 420 mm, as shown in FIG. 68A. Further, in at least one embodiment, the non-mirrored opening 6760 in the square pyramidal reflector 6750 is a square with a side 420 mm in length, as shown in FIG. 68B. Further, in at least one embodiment, the non-mirrored opening 6760 is a regular 13-sided polygon called a tridecagon, and the design contains 13 mirrors.

Figure 69A:
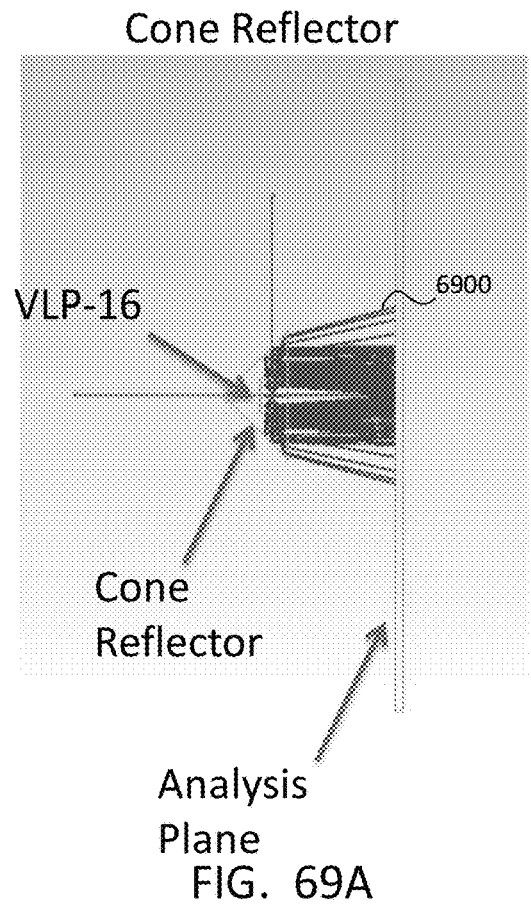
FIGS. 69A and 69B depict laser beams from a LiDAR VLP-16 centered in, respectively, the cone-shaped mirror reflector of FIG. 67A, and a scanning device using the pyramidal mirror reflector of FIG. 67B, according to certain embodiments.
Figure 69B:
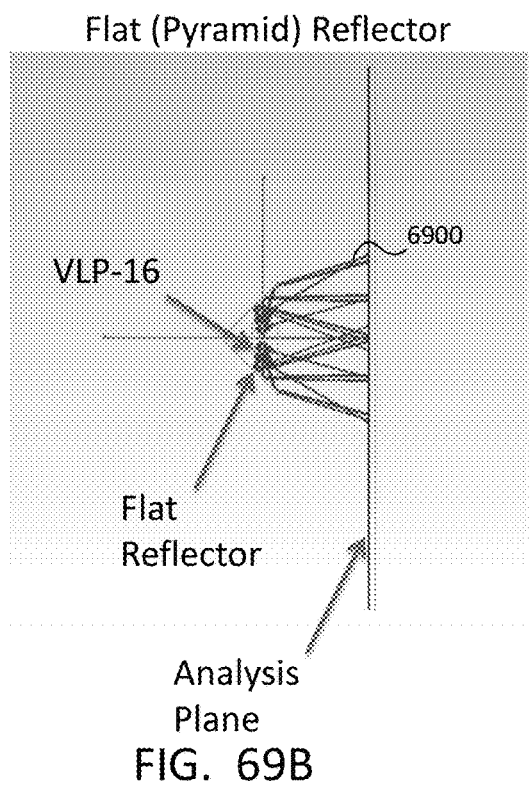

Centered between the mirrors in either the pyramid or conical configuration, the scanning device 6730 may project rays 6900 that are reflected by the walls of the mirror cavity and focused onto a plane perpendicular to the axis of rotation of the scanning device 6730 as shown in FIGS. 69A and 69B, for the cone-shaped reflector 6700 and the square pyramidal reflector 6750, respectively. This plane perpendicular to axis of rotation of the scanning device 6730 may advantageously correspond to the field-of-view of the light-field camera with which the scanning device 6730 is to be used.

Figure 70:
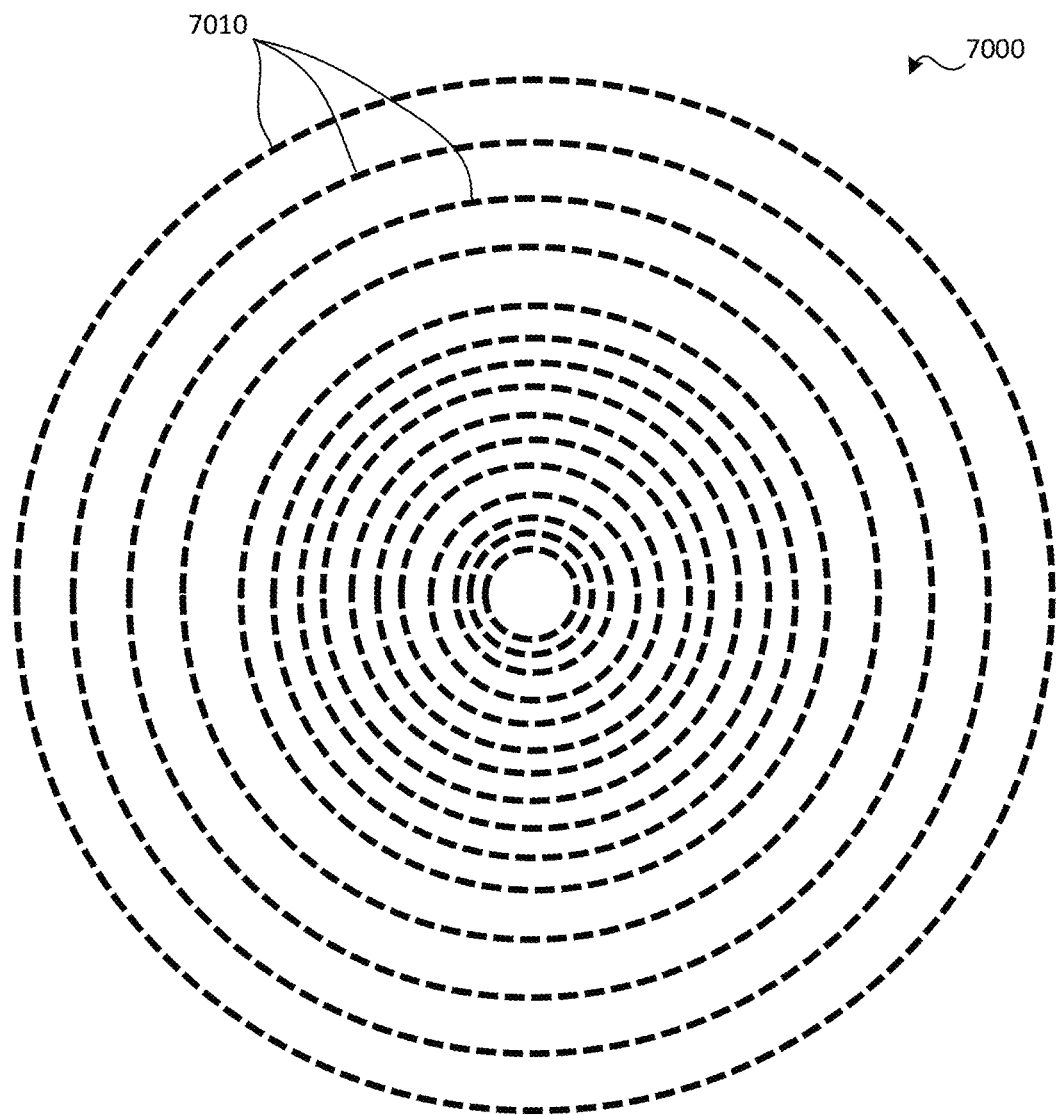
FIG. 70 depicts the sampling points in an imaging plane perpendicular to the axis of rotation of a Velodyne VLP-16 LiDAR device and a conical mirror reflector design such as the cone-shaped mirror reflector of FIG. 67A, in which the sampling points form a group of 16 concentric circles, with the LiDAR laser beams projected into a field-of-view of 30°, according to one embodiment.
Figure 71:
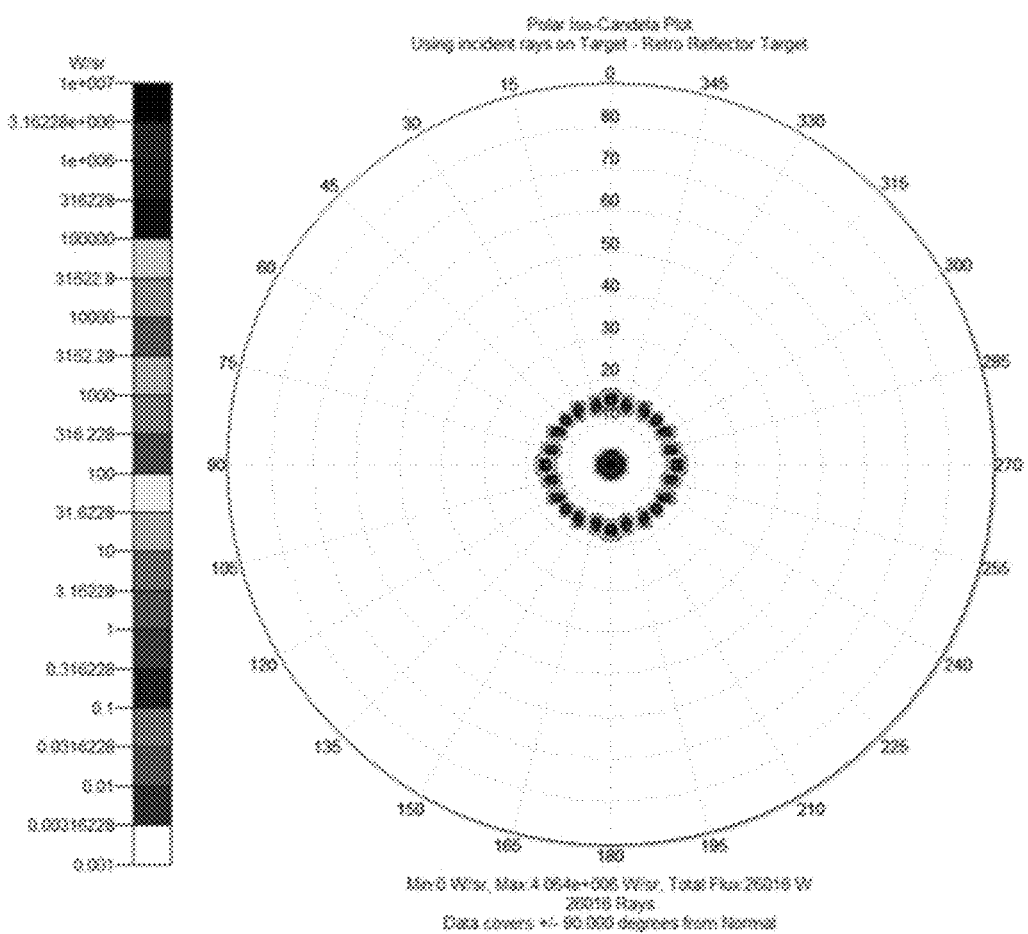
FIG. 71 depicts a polar plot for the projected energy vs. angle distribution, in units of watts/steradians (W/sr), for a Velodyne VLP-16 LiDAR device used with a conical mirror reflector design such as the cone-shaped mirror reflector of FIG. 67A, according to one embodiment.

The pattern of sampling points gathered by the scanning device 6730 may be dependent on the mirror configuration. In at least one embodiment, corresponding to a conical mirror reflector design, and using the Velodyne VLP-16 LiDAR device, the sampling points in an imaging plane perpendicular to the axis of rotation of the LiDAR form a group 7000 of sixteen concentric circles 7010, as shown in FIG. 70. The LiDAR laser beams may be projected into a field-of-view of 30°. A polar plot 7100 showing the resulting projected energy vs. angle distribution, in units of watts/steradians (W/sr), is shown in FIG. 71.

Figure 72:
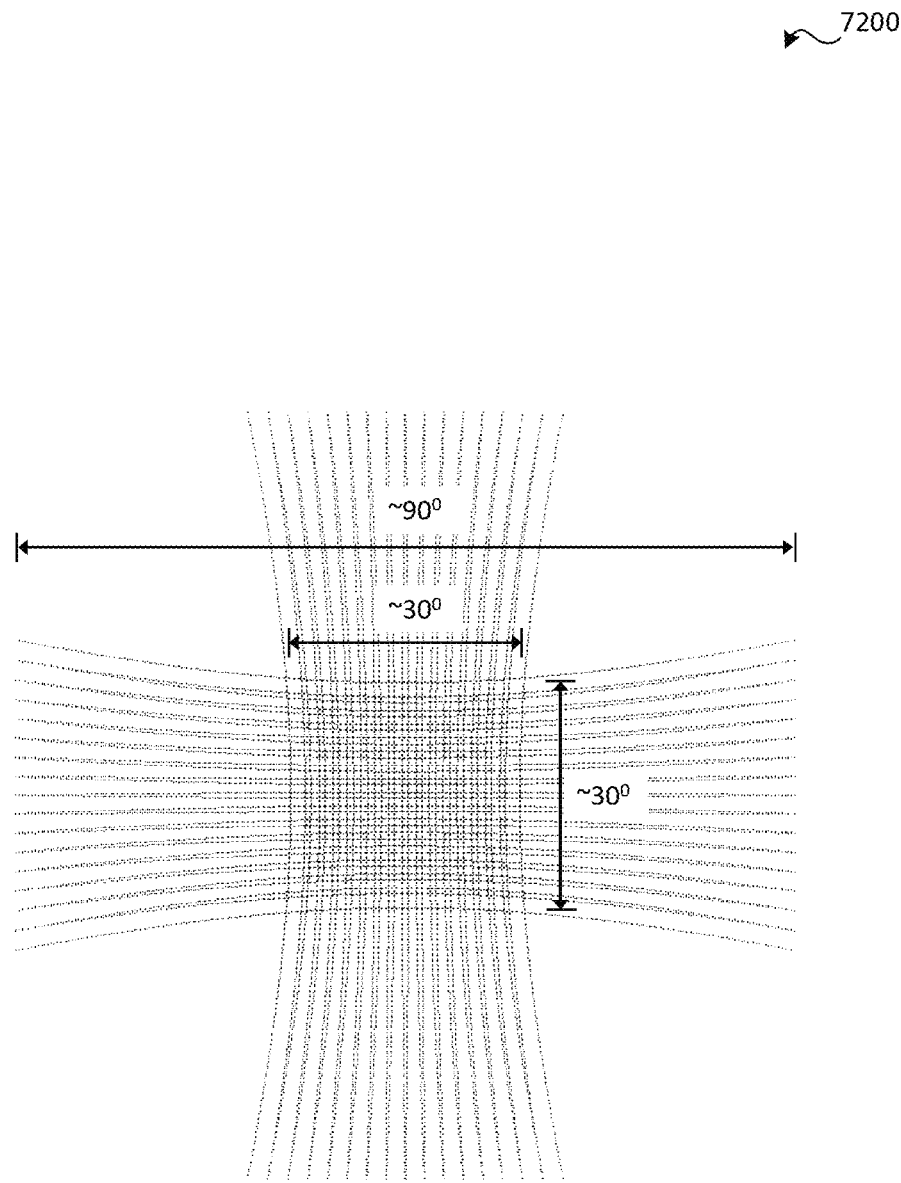
FIG. 72 depicts the sampling points in an imaging plane perpendicular to the axis of rotation of a Velodyne VLP-16 LiDAR device and a pyramidal mirror reflector design such as the pyramidal mirror reflector of FIG. 67B, in which the sampling points form two rectangular grids, with the LiDAR laser beams projected into a total field-of-view that is approximately 90° in each dimension, with the overlap between vertical and horizontal scans contained within an approximately 30° field of view, according to one embodiment.
Figure 73A:
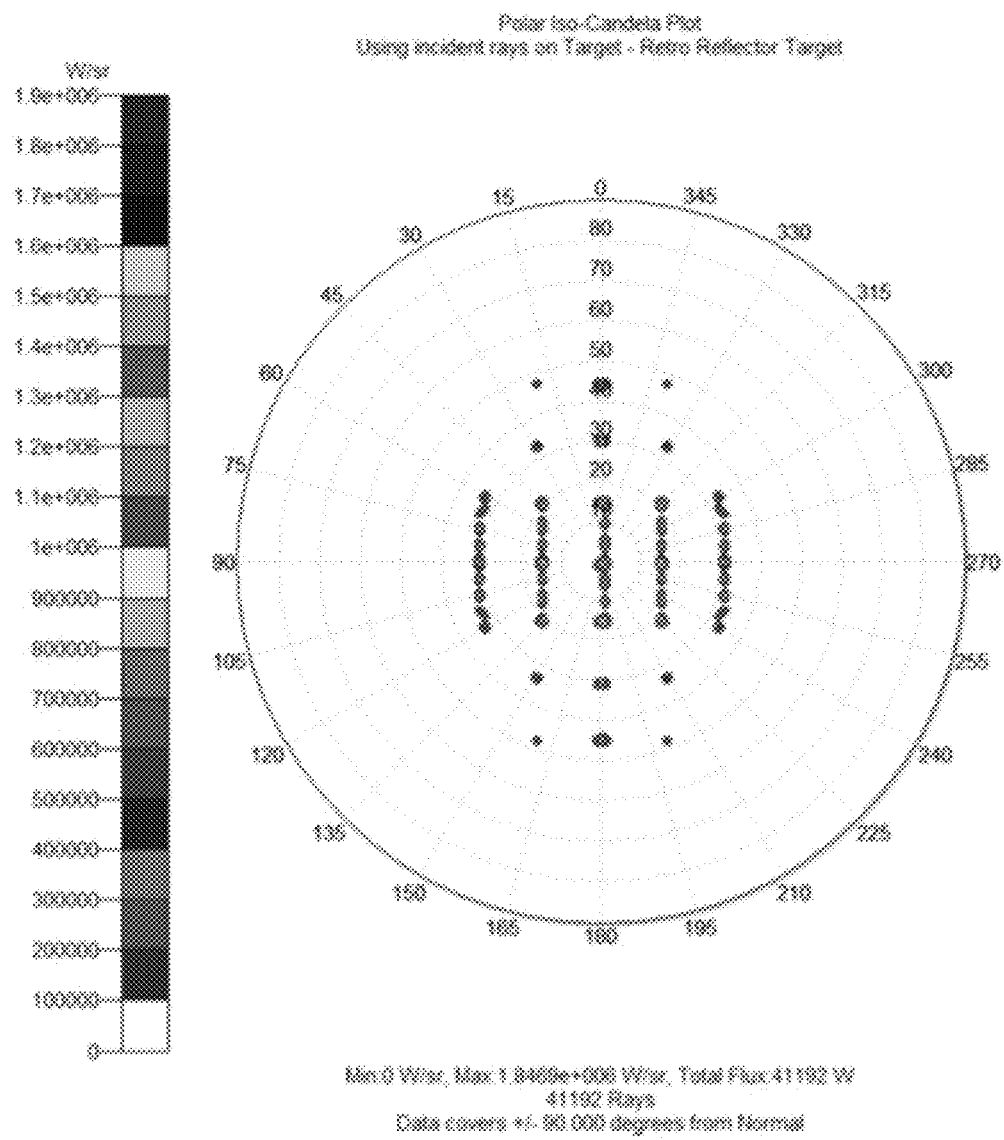
FIG. 73A depicts a polar plot for the projected energy vs. angle distribution, in units of watts/steradians (W/sr) for a Velodyne VLP-16 LiDAR device used with a pyramidal mirror reflector design such as the pyramidal mirror reflector of FIG. 67B in which the opening is slightly rectangular, according to one embodiment.

In at least one other embodiment, corresponding to a pyramidal mirror reflector design in which the non-mirrored opening is slightly rectangular in shape and using the Velodyne VLP-16 LiDAR device, the sampling points in an imaging plane perpendicular to the axis of rotation of the LiDAR may form a grid 7200 with a field-of-view of 90° in one direction and 30° in the orthogonal direction, as shown in FIG. 72. A polar plot 7300 showing the resulting projected energy vs. angle distribution, in units of watts/steradians (W/sr), is shown in FIG. 73A.

Figure 73B:
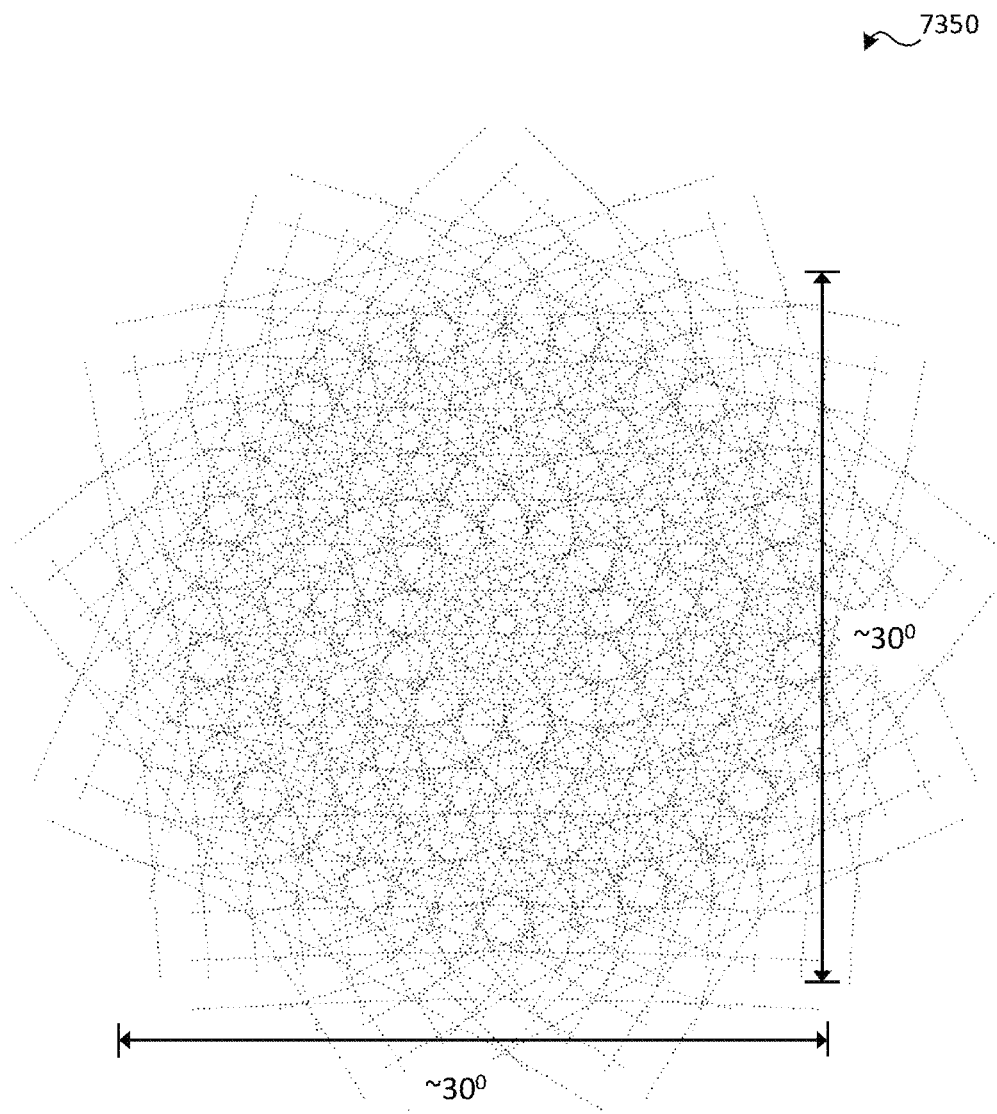
FIG. 73B depicts the sampling points in an imaging plane perpendicular to the axis of rotation of a Velodyne VLP-16 LiDAR device placed within a pyramid reflector design with 13 mirrors and a 13-sided regular polygon opening (tridecagon), in which the LiDAR laser beams are projected into a dense sampling pattern that is mostly contained within a field-of-view that is approximately 30° in each dimension, according to one embodiment.

In at least one other embodiment, corresponding to a regular 13-sided tridecagon pyramidal mirror reflector design, containing 13 mirrors, and using the Velodyne VLP-16 LiDAR device, the sampling points in an imaging plane perpendicular to the axis of rotation of the LiDAR may form a grid A00 with a field-of-view of 30° in the orthogonal direction. The sampling pattern from the tridecagon pyramidal configuration is shown in a polar plot 7350 in FIG. 73B.

One advantage of using a configuration with a number of mirrors that is much higher than 4 is that the pattern of sampling points is more evenly distributed across a field of view that is more narrow (in the case of the 13-sided mirror design, the field-of-view is 30° as compared with a 90° field-of-view for the 4-sided mirror design). This narrow field of view may better match the camera field of view, and result in more samples for objects that appear in the captured image.

Figure 74:
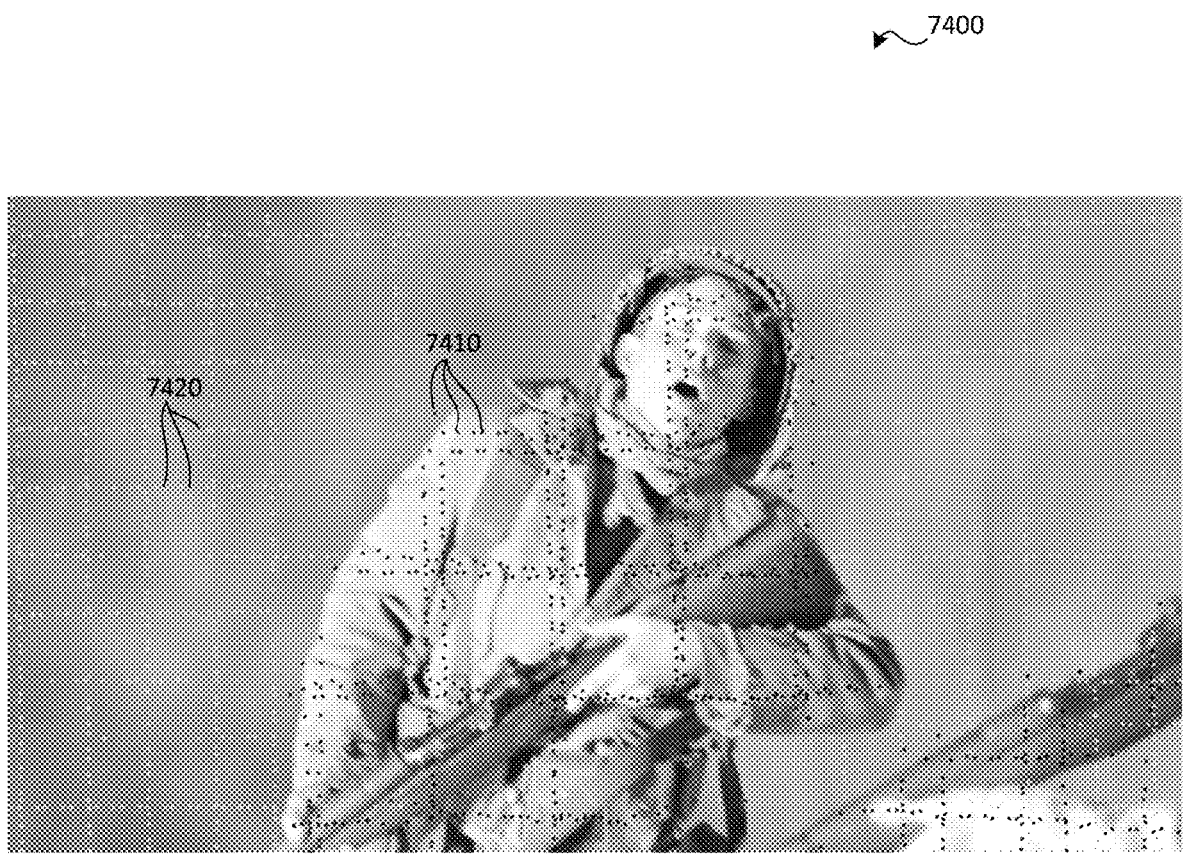
FIG. 74 depicts an image of a soldier with spots that represent LiDAR sampling measurement points, with the black spots designating an intersection of the scanning beam with the foreground object (the soldier), and the white spots designating the intersection of the scanning beam with the plane in the background, according to one embodiment.

An example of the LiDAR measurement points for objects in an imaging plane is shown in an image 7400 in FIG. 74, in which the spots 7410 and the spots 7420 on the image 7400 of the soldier represent LiDAR sampling measurement points. Each of the black spots 7410 may designate an intersection of the scanning beam with the foreground object (the soldier), while each of the white spots 7420 may designate the intersection of the scanning beam with the plane in the background.

Network Architecture

The capture, processing, and/or storage of high-resolution light-field data can strain the limits of conventional systems. Accordingly, various improvements to the hardware and software used to capture, process, and/or store high-resolution light-field data are proposed herein. In at least one embodiment, capture and processing of data are carried out on the same data network.

Figure 75:
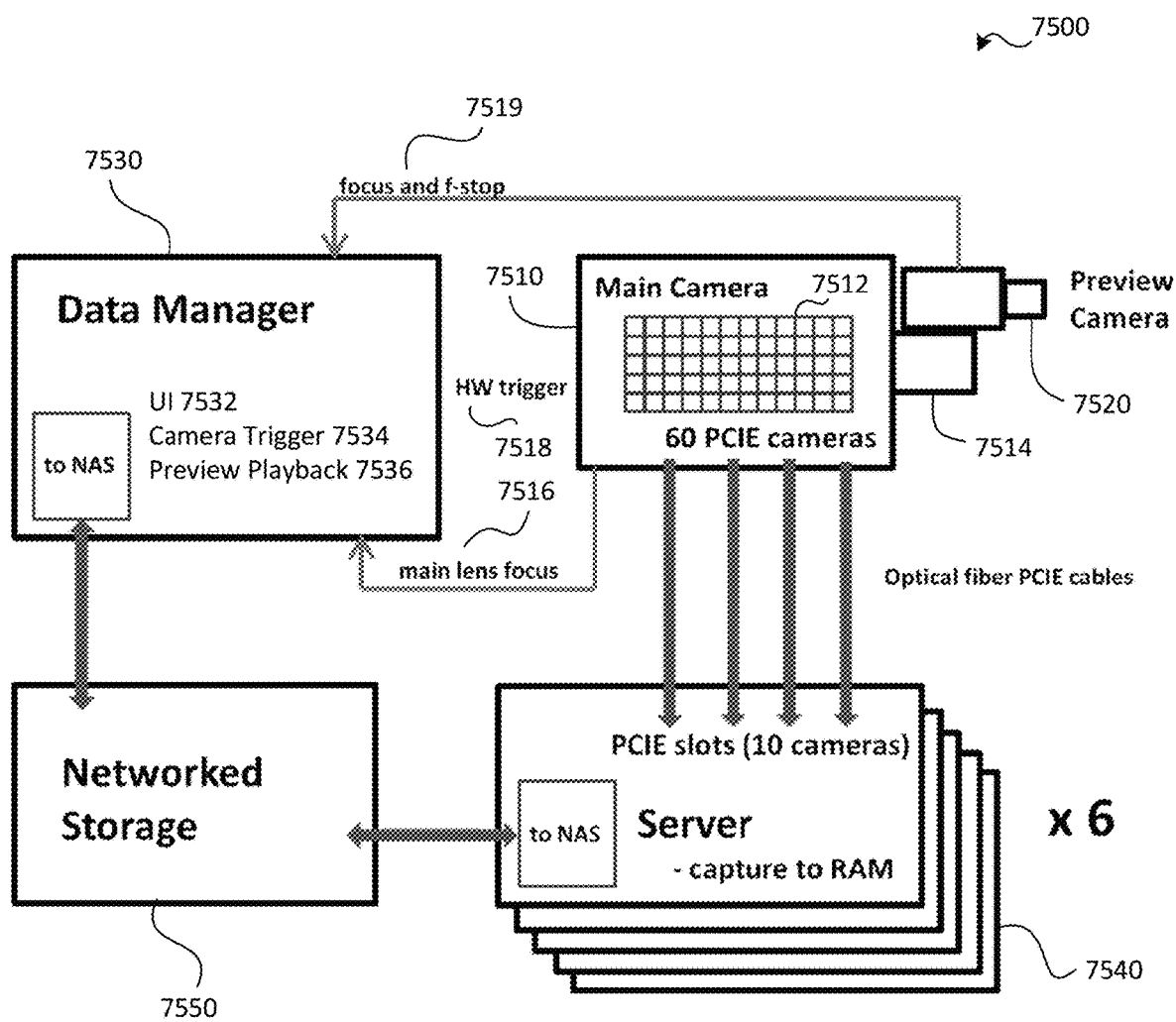
FIG. 75 is a block diagram of a system depicting primary components for data capture, according to one embodiment.

FIG. 75 is a block diagram of a system 7500 depicting primary components for data capture, according to one embodiment. The architecture shown in FIG. 75 represents one possible infrastructure for file management of high frame rate and/or high resolution data capture. The values and structures provided in FIG. 75 are merely exemplary. According to the block diagram, the system 7500 may include a main camera 7510, a preview camera 7520, a data manager 7530, servers 7540, and networked storage 7550. These components will be described, in exemplary form, as follows.

Main Camera

The main camera 7510 may include an array of image sensors as set forth previously, and may also use tapered fiber optic bundles to achieve high resolution through simultaneous image capture in all of the sensors. Thus, for example, the main camera 7510 may include 60 cameras 7512 as shown in FIG. 75.

In at least one embodiment, the main camera includes a main lens 7514, which is an ultra large format lens with an image circle that covers the entire imaging surface with sufficient image quality. Other arrangements are possible. In at least one embodiment, the aperture of the main lens 7514 is adjusted to f/n=14, although other values can be used. In at least one embodiment, the focus position 7516 of the main lens 7514 is fed back to the data manager 7530.

The main camera can also include a microlens array (MLA, as shown and described previously). The MLA may have calibration geometry, in the image plane, that changes as a function of the focus position 7516 of the main lens 7514. Accordingly, in at least one embodiment, reference calibration data can be stored for a number of focus positions 7516 of the main lens 7514.

In at least one embodiment, the aperture of the main lens 7514 is controlled by a mechanical system such as a hardware trigger 7518 to provide a constant effective f/n based upon the focus position 7516. For example, the aperture can be automatically increased in size to compensate for relative f/n at close focus. In at least one embodiment, focus is controlled by mechanical systems and/or with a metadata recording system that tracks data such as lens position, aperture size, and focal length. Thus, data 7519 such as focus and f-stop may be transmitted by the main camera 7510 to the data manager 7530.

In at least one embodiment, the cameras 7512 include 12 MP CMOS sensors such as, for example, part # CMV12000 provided by CMOSIS. These may be read out using high-speed PCI Express cameras, such as, for example, model CB120CG-CM provided by Ximea.

In at least one embodiment, the cameras 7512 can be implemented with a 4-lane Gent interface, although in other embodiments, a Gen3 PCIE interface or other non-PCIE interface can be used. In at least one embodiment, the interface is used to achieve at least 120 frames per second (fps) capture rate for a 10-bit readout. In at least one embodiment, images may be cropped to increase fps and to compensate for regions of the imaging plane where the fibers do not relay light. Higher or lower frame rates and higher or lower bit depths can be achieved.

As mentioned previously, in order to use multiple sensors for the image plane with full optical coverage, the signal may be routed from the image plane to the sensors using fiber optics such as tapered fiber optic bundles. Each sensor may be bonded to a straight fiber optic bundle (face plate), and then a tapered fiber optic bundle that serves to compress the image between the image plane and the sensor. This may enable the sensors to have gaps between them, and may also effectively magnify the image plane by a ratio of, for example, 3:1.

Figure 76:
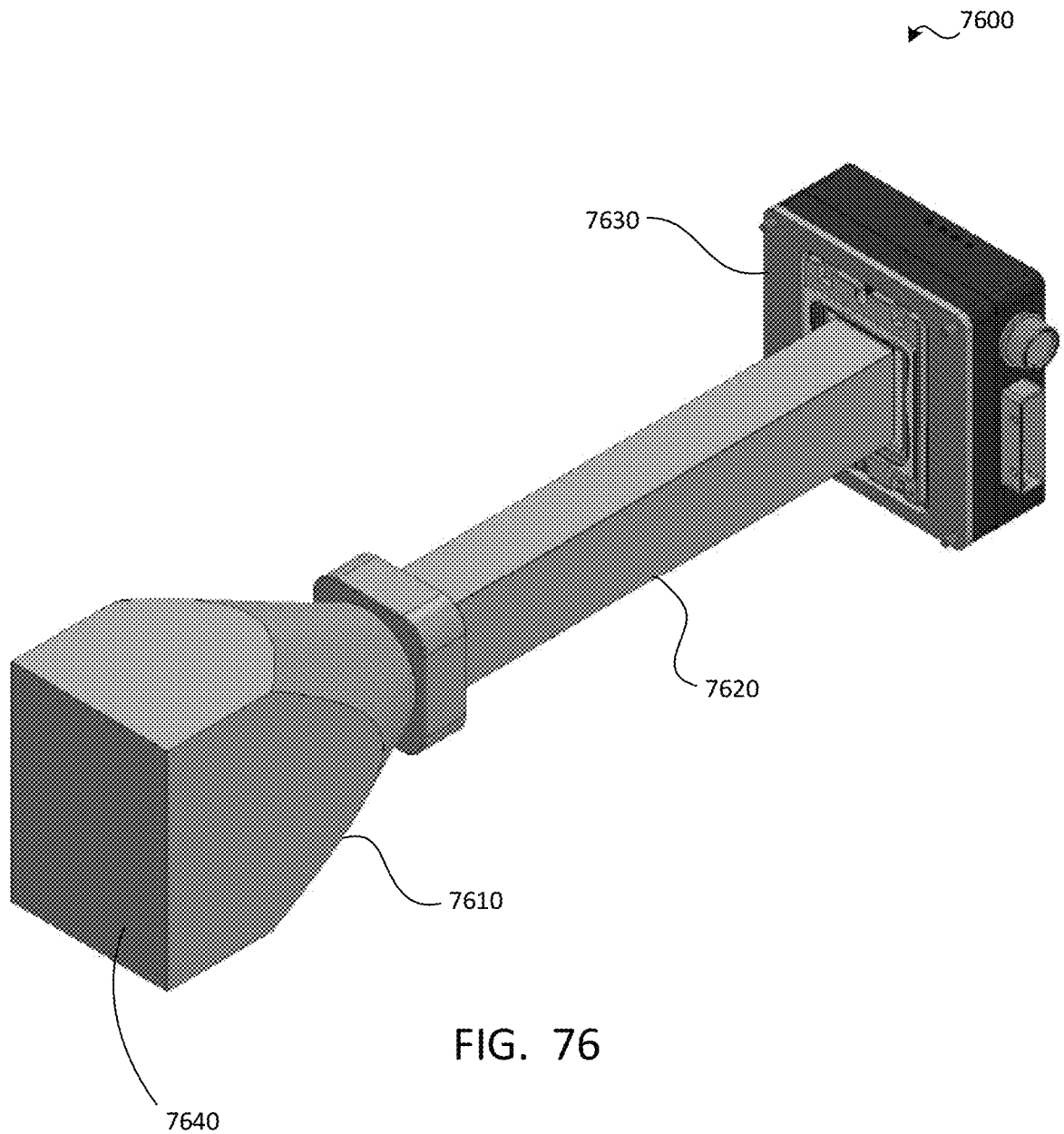
FIG. 76 is a diagram depicting an example of a tapered fiber optic bundle bonded to a fiber face plate and further bonded to an image sensor and camera electronics, according to one embodiment.

Referring to FIG. 76, there is shown an example 7600 of a tapered fiber optic bundle 7610 bonded to a fiber face plate 7620 and further bonded to an image sensor and camera electronics 7630, according to one embodiment. The Image data may be received in the tapered fiber optic bundle at an image plane 7640, and then conveyed to the sensor and camera electronics 7630 via the tapered fiber optic bundle 7610 and the fiber face plate 7620.

Preview Camera

In at least one embodiment, live feedback can be provided to the camera operator during a video shoot. Either of the following approaches can be used:

Preview Camera—A preview camera 7520 such as a standard rangefinder camera can be included, which acts as viewfinder for the scene. The cinematographer may use the preview camera 7520 to frame the scene, set the f-stop, and/or adjust the focus of the main lens 7514 of the main camera 7510. The focus of the main lens 7514 may or may not change while an entire scene is filmed. The lens parameters, sensor image data, and the metadata from the preview camera may all be recorded by the data manager 7530; after processing of the images, the scene may be rendered according to the lens settings on the preview camera 7520.

Live View—In another embodiment, fast feedback can be provided via live view by downsampling the images front the main camera 7510, aggregating the results from multiple servers, and displaying them for the cinematographer in real time. In such embodiments, the preview camera 7520 may be omitted.

Data Manager

The data manager 7530 may act as the control center for the capture of images. In at least one embodiment, it includes the following components:

User Interface 7532: this may be used by the user (cinematographer) for the following:
Start and stop recording;
Monitor the signal from the Preview Camera 7520 to adjust focus and f-stop real time or monitor live view, as applicable;
Preview a recording after it is made; and/or
Decide whether to save the recording from memory or disk or discard it by previewing the recording. In at least one embodiment all images from a recording are kept in RAM until the cinematographer has made this decision.

Camera Trigger 7534: In at least one embodiment, frame capture for all cameras 7512 is coordinated using a common global synchronization trigger for all the sensors in the system 7500.

Preview Playback 7536: After image capture, the cinematographer can preview the images. In at least one embodiment, the data manager 7530 provides functionality for viewing the images from the main camera 7510.

Servers

Figure 77:
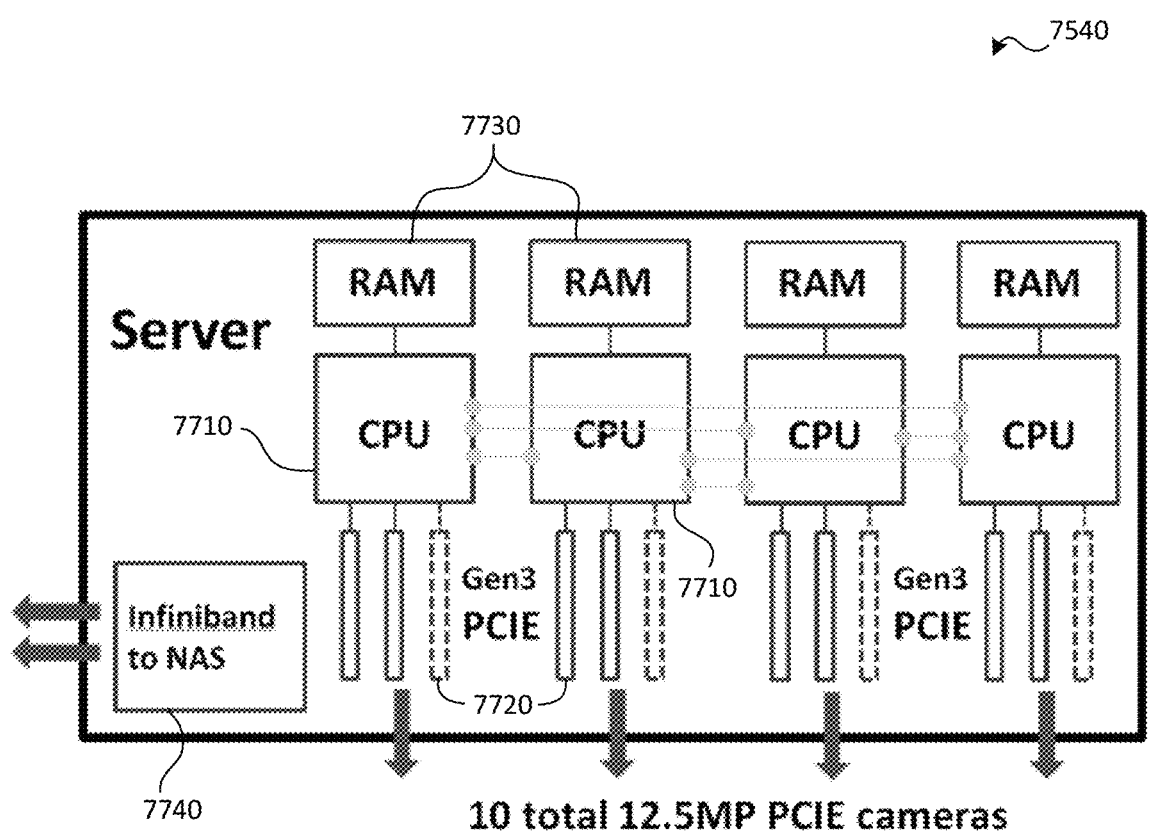
FIG. 77 is a diagram depicting one of the servers, according to one embodiment.

Referring to FIG. 77, there is shown one of the servers 7540, according to one embodiment. FIG. 77 depicts an example of PCIe architecture on data/processing servers, with exemplary values as shown. In at least one embodiment, each server 7540 may be an enterprise grade server that can be used for camera readout. Exemplary specifications for each of the servers 7540 are as follows:

4 CPU's 7710, each with 15 cores;
At least two dedicated Gen3 PCI Express slots 7720 for each CPU 7710, at least one of which has 16 lanes;
3 TB of DDR3 RAM 7730; and
Optical interconnects 7740 for a remote storage network such as the networked storage 7550, which may be shared by other servers 7540.

In at least one embodiment, each server 7540 supports at least ten cameras 7512. Performance of the cameras 7512 can be optimized, for example, by adjusting any or all of following parameters:

Maximum packet payload size (MPS). A PCI Express system may transfer data in the payload of Transaction Layer Packets (TLP's). In at least one embodiment, the software is configured to ensure that each packet does not exceed the maximum payload size parameter of any system element along the packet's path. For example an MPS of 256 or 512 bytes can be used, although any suitable value can instead be used.

Optimization of camera readout software and/or processor affinity. In at least one embodiment, the camera readout application can be assigned to run on the processor that corresponds to the PCIE slots attached to that processor.

Networked Storage

In at least one embodiment, the networked storage 7550 may be network-attached storage (NAS) that can be shared on a network to serve as a temporary location for downsampled images used for scene previews or live view. The networked storage 7550 can also be used for storage of images once the cinematographer elects to save a video recording. The networked storage 7550 may be replaced with direct attached storage or a storage area network (SAN).

Optical Calibration

Sensor Calibration

In at least one embodiment, the cameras 7512 of the main camera 7510 may be calibrated by performing the following steps:

Apply a uniform gain setting to yield a uniform response to light across the cameras 7512;
Characterize dark current as a function of exposure, clock speed, and temperature; and
Record lists of defective pixels for further processing.

Calibration for Fiber Defects

Figure 78:
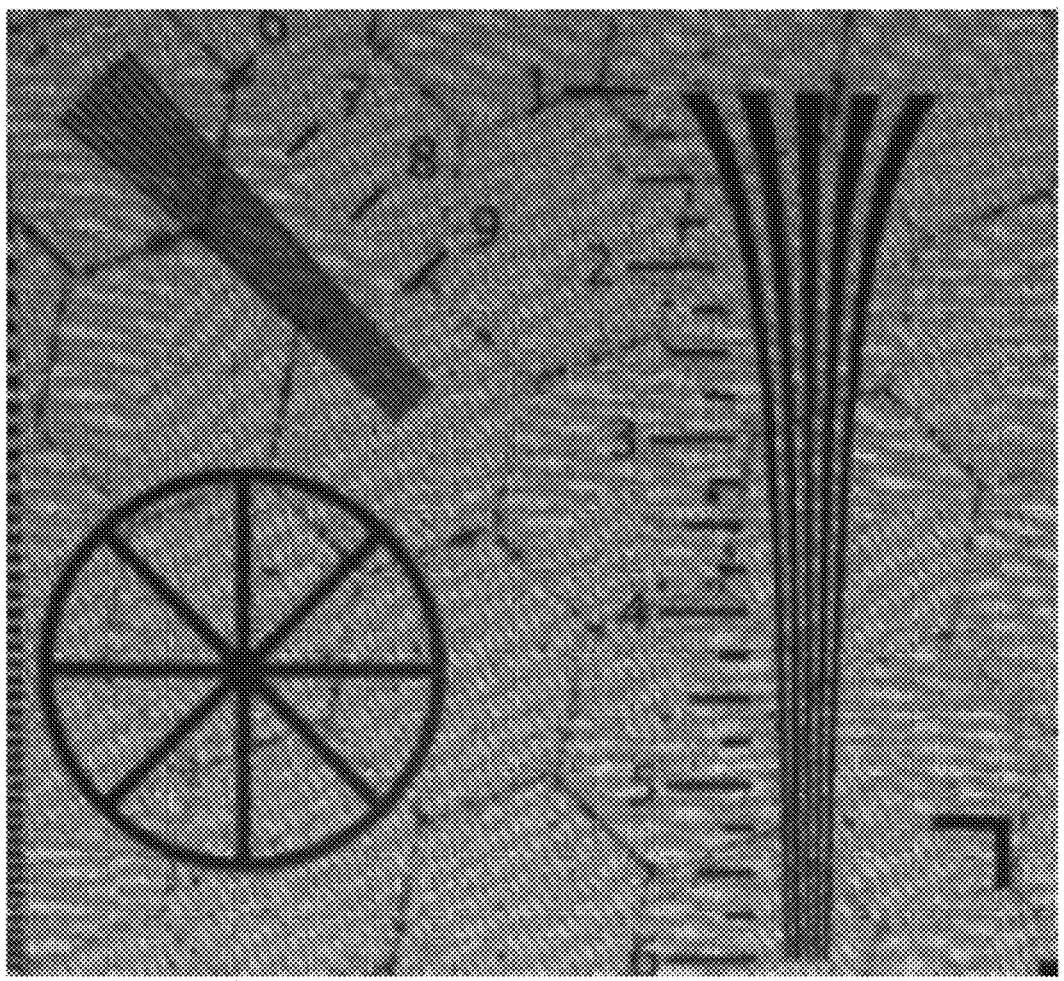
FIG. 78 is a diagram depicting an example of hexagonal fiber artifacts and fiber noise, according to one embodiment.

As depicted in FIG. 76, in some embodiments, each sensor and camera electronics 7630 may be bonded to a straight fiber bundle (fiber face plate 7620) and to a tapered fiber optic bundle 7610, which may serve to compress the image from the image plane 7640 at the tapered fiber optic bundle to the sensor and camera electronics 7630 by any suitable ratio, such as for example 3:1. In many cases, the tapered fiber optic bundle 7610 and the fiber face plate 7620 both contain hex-pattern artifacts by virtue of the fiber optic manufacturing process. These hex patterns may arise from smaller bundles of fiber that are incorporated into the tapered fiber optic bundle 7610 or fiber face plate 7620. Two types of artifacts may appear:

Hex and fiber wise patterns can arise from smaller bundles of fiber that compose the tapered fiber optic bundle 7610 and the fiber face plate 7620 or from fiber non-uniformity. FIG. 78 depicts an example 7800 of hexagonal fiber artifacts and fiber noise, according to one embodiment, shown before artifact removal.

Figure 79:
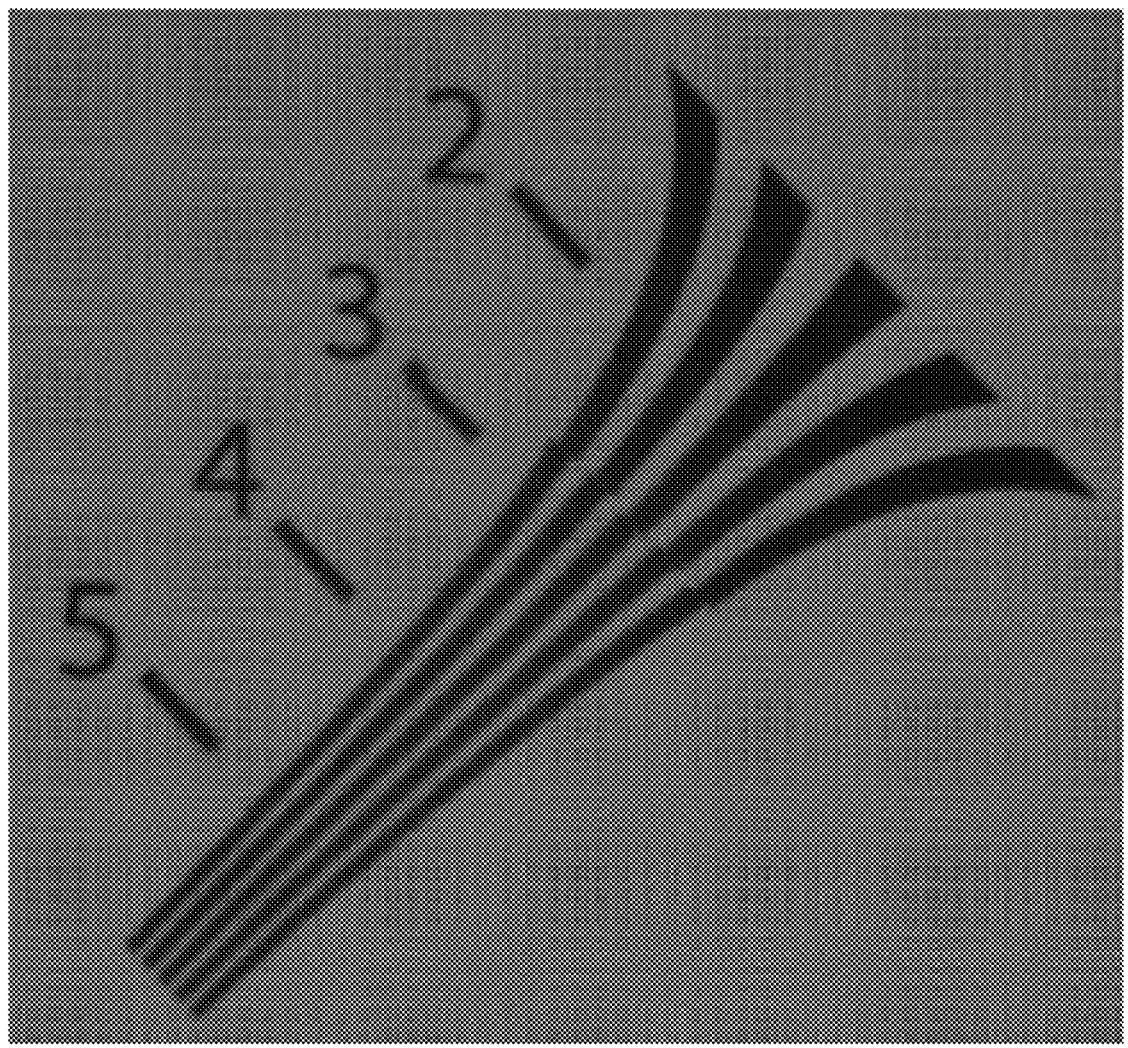
FIG. 79 is a diagram depicting an example of fault line discontinuity, according to one embodiment.

Fault line defects can arise where the fibers shift along their bundled boundaries. FIG. 79 depicts an example 7900 of fault line discontinuity, according to one embodiment, shown before artifact removal.

In at least one embodiment, the calibration for the fiber tapers is performed using the following steps:

1. Remove dark regions by imaging a uniformly-lit planar light source. Determine a per-pixel gain map to apply to the image in order to normalize the response across each taper image plane. Generate a mask of the pixels that are directly attached to the fiber, as opposed to boundary sensor pixels that do not receive light.
2. Map large dark regions that are completely occluded by defects, and perform interpolation from neighboring pixels.
3. Remove optical warping caused by fiber optic deformation by imaging an optical chart with a rectilinear reference grid that forms a reference pattern over the entire imaging surface of the taper array. Unwarp each image to match the reference grid.
4. Remove fiber fault line artifacts for all tapers by imaging a Ronchi ruling. Record a series of images in which this Ronchi ruling is offset at regular intervals spaced by a subpixel or greater. This is done both for horizontal lines offset in the vertical direction, and vertical lines offset in the horizontal direction. Adjust each image to match the reference Ronchi ruling, and aggregate the required displacements together to produce one vector displacement map to apply to the original image.
5. Use the rectilinear grid pattern image to align adjacent tapers and determine their relative and global positioning in the array, forming a singular image.
6. Apply all of the above processing steps to the mask generated in Step 1. When aligned in Step 5, the mask forms a map of seam boundaries between adjacent tapered fiber optic bundles. These seams are used for further processing.
7. Record images using multiple color transparencies with varying color coordinates placed in front of a uniform planar light source. Assign one taper to be the master, and determine the color correction required for each of the other tapers to match the master using a 3-D lookup table. Apply this correction to form a uniform response between all tapers.

In at least one embodiment, calibration is performed in a manner that depends on the focus position of the main lens. Additionally or alternatively, it may be illuminant dependent. Accordingly, calibration may be carried out across multiple focus positions and/or illuminants.

Single Frame Image Processing

Figure 80:
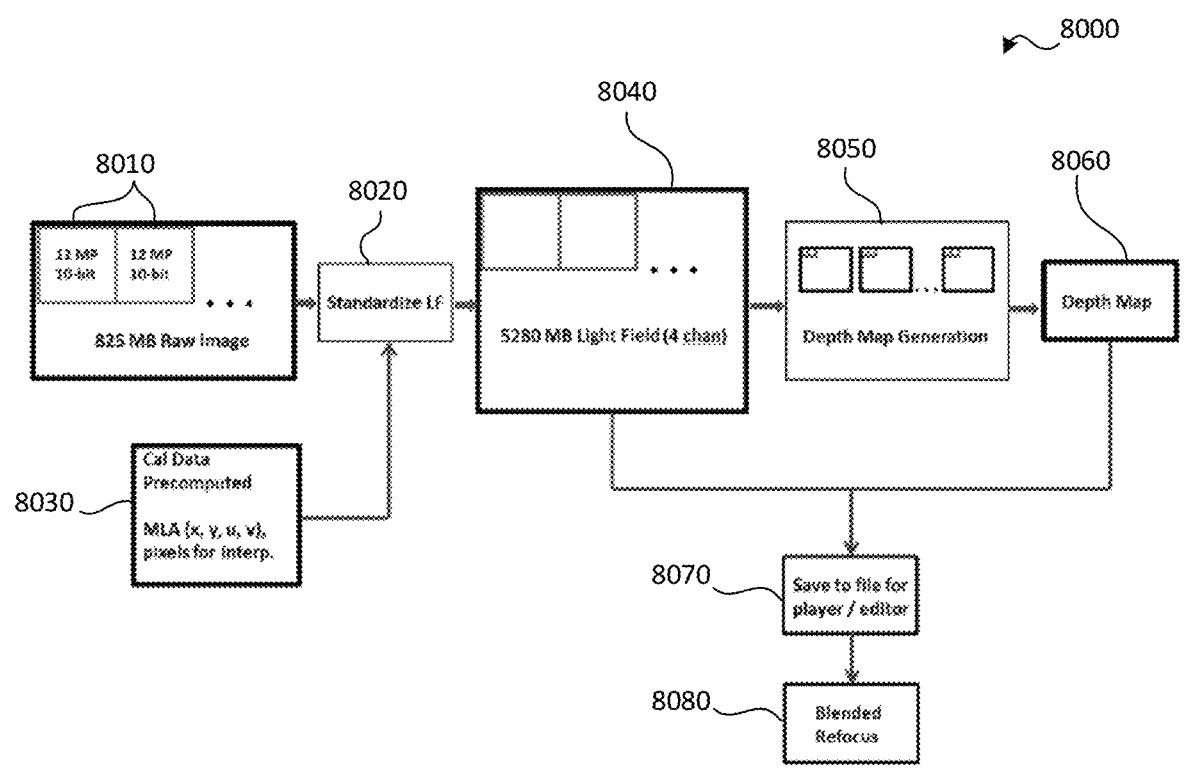
FIG. 80 is a diagram depicting the primary processing steps for a single frame of light-field video, according to one embodiment.

Referring to FIG. 80, a flow diagram 8000 depicts the primary processing steps for a single frame of light-field video, according to one embodiment. In at least one embodiment, at the start of processing, the images 8010 for each individual sensor have been saved into a hard disk. These may be assembled into a single image at some point in the pipeline. A tiled approach to processing through Standardize LF process 8020 is possible if small (roughly 15-20 pixel) boundaries are included with the tiles. This may involve the use of calculation data 8030, and may result in the generation of a light-field 8040. However, in at least one embodiment, the entire image is kept in memory so as to enable efficient depth map generation. Depth map generation 8050 may be applied to the light-field 8040 to generate a depth map 8060. The light-field 8040 and/or the depth map 8060 may be saved, in a save process 8070, to a file that can be read for playback and/or editing. A blended refocus procedure 8080 may optionally be carried out to further modify the light-field 8040 and/or the depth map 8060.

The techniques depicted herein may provide several differences from conventional light-field processing. Such differences may include, but are not limited to:

Standardized light-field data is modified to use already-computed disk geometry values appropriate for the focus position of the main lens;
After depth map generation, there is no Extended Depth-of-Field (EDOF) generation; and
The RGB values of the light-field are saved along with the depth map, so that the playback software can perform projection using the blended refocus method as fast as computationally possible.

Image Sequence Processing—Render Farm Architecture

Figure 81:
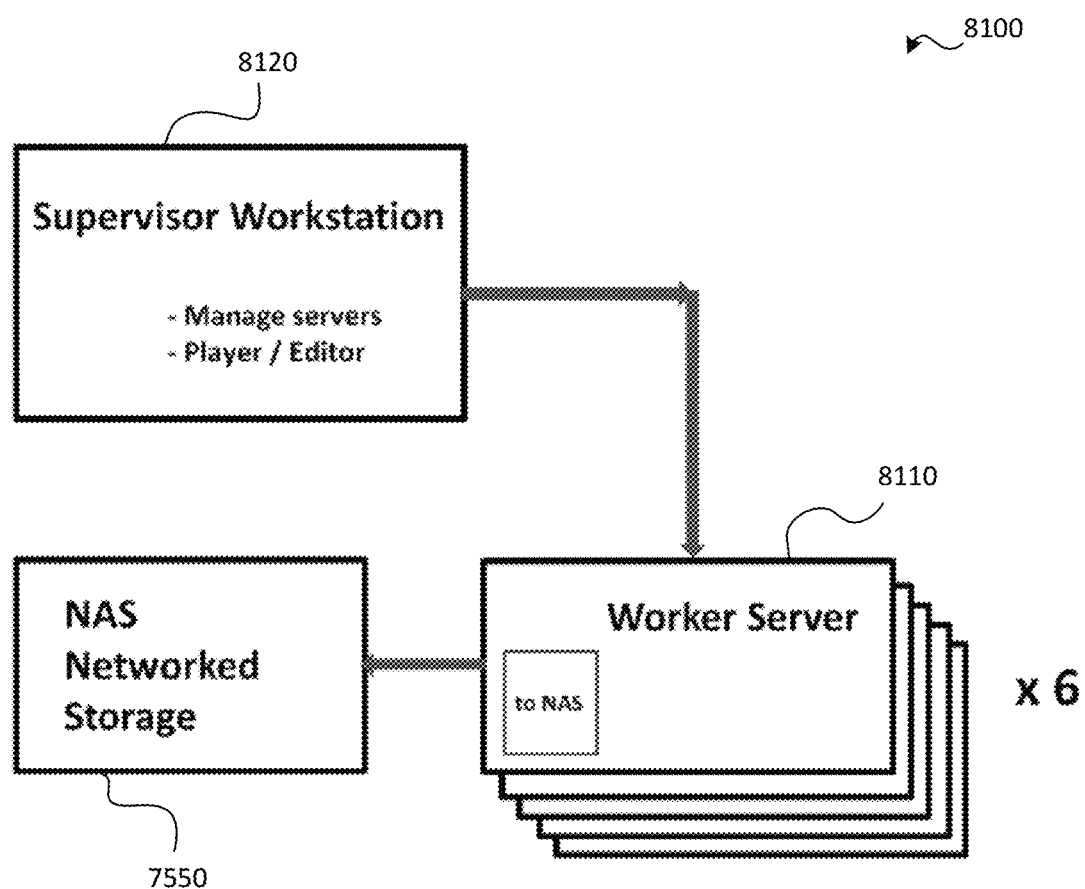
FIG. 81 is a diagram depicting an image processing architecture according to one embodiment.

Referring to FIG. 81, a flow diagram 8100 depicts an image processing architecture according to one embodiment. Six servers 8110 may be used, as depicted in FIG. 81, although one skilled in the art will recognize that any number of servers 8110 can be used. In at least one embodiment, the servers 8110 are used to capture video, and are also used as worker servers within a render farm management system. The raw data from the sensors (for example, the cameras 7512 of the system 7500 of FIG. 75) may be distributed across the servers 8110 and combined to form a full image.

A supervisor workstation 8120 may point at the raw images on disk and may initiate processing of the images. Software may be used for video playback and editing. In at least one embodiment, the supervisor workstation 8120 may be the same computer as the data manager 7530 used for image capture in FIG. 75; alternatively, it may be implemented as a separate component.

Figure 82:
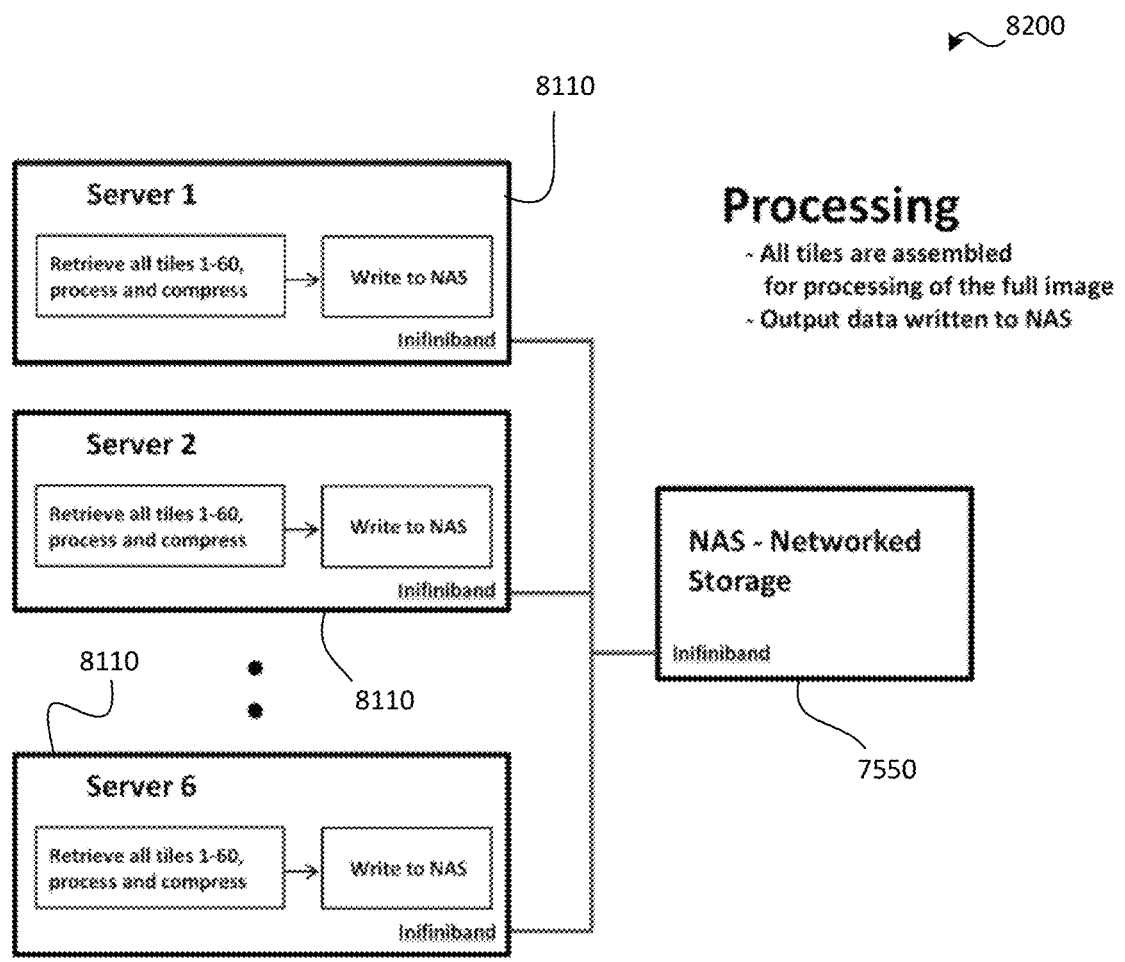
FIG. 82 is a diagram depicting an example of an architecture for the servers shown in FIG. 81, according to one embodiment.

Referring to FIG. 82, a flow diagram 8200 depicts an example of an architecture for the servers 8110 shown in FIG. 81, according to one embodiment. In at least one embodiment, all tiles are assembled before processing begins for the full image. In at least one embodiment, output data may be written to a NAS such as the networked storage 7550 of the system 7500 of FIG. 75.

Camera Calibration Procedure

Calibration for the Full Array, Before MLA Attachment

Various types of calibration can be used for the full array of cameras 7512, either singly or in any suitable combination. Examples of such calibration are set forth below.

ISO Calibration

In at least one embodiment, ISO calibration is performed using an image from a uniform planar light source, to ensure that each camera 7512 is matched with its neighbors. This may compensate for vignetting from the main lens 7514 on the main camera 7510. In at least one embodiment, the fiber+sensor response is non-linear.

Sensor Dark Current

In at least one embodiment, the sensor dark current can be represented as a single number that can be recorded at the beginning and/or at the end of capture. Some systems, such as Ximea, include such a calibration. In at least one embodiment, the system 7500 performs further verification that there is no significant fixed pattern noise, so that such calibration will be effective.

Dark Fiber Artifact Removal Calibration

In at least one embodiment, this calibration is performed using a white image. It may be dependent on the illuminant. In at least one embodiment, this calibration is performed as a function of the focus setting of the main lens 7514.

Sensor Crop

In at least one embodiment, the intersection of the tapered fiber optic bundle 7610 and/or the fiber face plate 7620 with the sensor portion of the sensor and camera electronics 7630 may have an area of approximately 90% of the total active area of the sensor. For example, unused areas may include 100 rows on the top and bottom of a sensor of height 3072, and 100 columns on the right and left of a sensor of width 4096. In at least one embodiment, to achieve the fastest frame rate, this crop for each of the 60 sensors is stored as configuration data, and the system 7500 may then capture cropped frames.

Grid Warp Calibration

In at least one embodiment, this calibration is performed using a checkerboard chart. The chart can include, for example, 30×24 blocks per sensor.

Fault Line Artifact Removal

In at least one embodiment, this calibration is performed using two charts with closely spaced horizontal and vertical lines. Any suitable line spacing can be used. Examples include, but are not limited to:

Horizontal line spacing: 130 lines per tapered fiber optic bundle height, with line thickness of about 20 pixels; and Vertical line spacing: 170 lines per tapered fiber optic bundle width, with a line thickness of about 20 pixels.

Preview Camera ISO vs. Main Camera ISO

In at least one embodiment, if the DP (director of photography) selects a low ISO for the feed from the preview camera 7520, the settings of the main camera 7510 may follows this ISO setting. Other settings of the preview camera 7520 may also be automatically followed by the main camera 7510.

A variable neutral density (ND) filter can be used between the lens and the sensor of the preview camera 7520 to help ensure that the same amount of light reaches the sensor of the preview camera 7520 and the sensors of the main camera 7510. In at least one embodiment, this ND filter is adjusted to attenuate more light as the aperture on the lens of the preview camera 7520 is made larger, while the aperture on the main lens 7514 of the main camera 7510 remains constant. Appropriate calibration can be performed, for example, by checking that the histograms match for the preview camera 7520 and the main camera 7510. In at least one embodiment, the range of the ND filter is 1.6 to 8 stops of light.

Preview Camera Focus and Zoom vs. Main Camera Focus

In at least one embodiment, a calibration is performed to ensure that, if the lens focus setting of the preview camera 7520 is adjusted, then the main lens 7514 follows this focus. In at least one embodiment, it is possible to display the refocus range of the main camera 7510, and allow the cinematographer to select the location of this refocus range relative to the focus position of the lens of the preview camera 7520. For example, it is possible to set the front, middle, or back of the refocus range of the main lens 7514 to correspond to the focus of the lens of the preview camera 7520.

Preview Camera Crop

In at least one embodiment, the image generated by the preview camera 7520 is cropped in size to represent the field of view that the main camera 7510 is capturing. This crop can change for a number of reasons. For example, it can change along the Y-axis depending on where the lens of the preview camera 7520 is focused, given that the lens of the preview camera 7520 is located a short distance away from the main lens 7514 of the main camera 7510 and has an angled line of convergence with the main lens 7514. A keystone correction to the image from the preview lens may be performed.

Calibration for the Full Camera, after MLA Attach

Various types of calibration can be used for the full camera, either singly or in any suitable combination. Examples of such calibration are set forth below.

Main Lens Aperture vs. Focal Length

In at least one embodiment, to illuminate the area of the sensor under each MLA lens in an optimal way, the system 7500 adjusts the aperture of the main lens 7514 of the main camera 7510 as the focal length is adjusted, using motors to do so. For objects at infinity, the main lens 7514 is closest to the sensor, and its aperture is adjusted so that the F-Number of the main lens 7514 is slightly higher than that of the MLA (for example, an F-Number of 14 for the main lens vs. 13 for the MLA). To focus on closer objects, the main lens 7514 moves away from the sensor, and the aperture opens in order to keep the effective F-Number constant so that the disk sizes under each MLA remain unchanged.

In at least one embodiment, both the aperture and the focus of the main lens 7514 are controlled by servo motors, although stepper motors can also work. Calibration can be performed using a table of aperture step vs. focus step.

Modulation Images

This calibration can be performed using a white image captured for the purpose of demodulation. The white image may be averaged over some number of frames, such as 16 frames, for example.

2D Geometry Distortion Correction

In at least one embodiment, the system performs 2D geometry distortion correction. For various reasons, captured images may include several types of geometry distortion. Each of these will be described in turn.

Optical Distortion Correction Method 1

Distortion is any deviation from rectilinear projection (a projection in which straight lines in a scene remain straight in an image). Such distortion can be introduced by 1) main lens distortion and/or 2) distortion caused by fiber optic deformation.

In at least one embodiment, the system 7500 models optical distortion as follows:

Input: 2D RGB image array with checkerboard pattern; and

Output: A 2D per-pixel correction map (or UV map).

In at least one embodiment, calibration is performed as follows:

1. Define input parameters. These may include, for example, block size, grid rotation, and top left corner offset. These parameters are used as initial guesses for the grid fitting routine.
2. Run corner detection algorithm. Checkerboard corners are detected.
3. Run grid fitting algorithm. A global optimization routine is applied to find a set of parameters which defines a reference grid that fits the detected corners best. The output of this tool is a set of positional vectors that maps each corner point in the undistorted image coordinates to the corresponding corner point in the distorted image coordinates.
4. Manual Adjustment. Mismatched corner points can be adjusted.
5. Save Correction Map.

In at least one embodiment, the system uses a test chart such as a checkerboard pattern with ~130×130 block size in captured images. Initially, the system may ignore fault line artifacts, which may be corrected by fault line artifact removal techniques, as described in more detail below.

Figure 83:
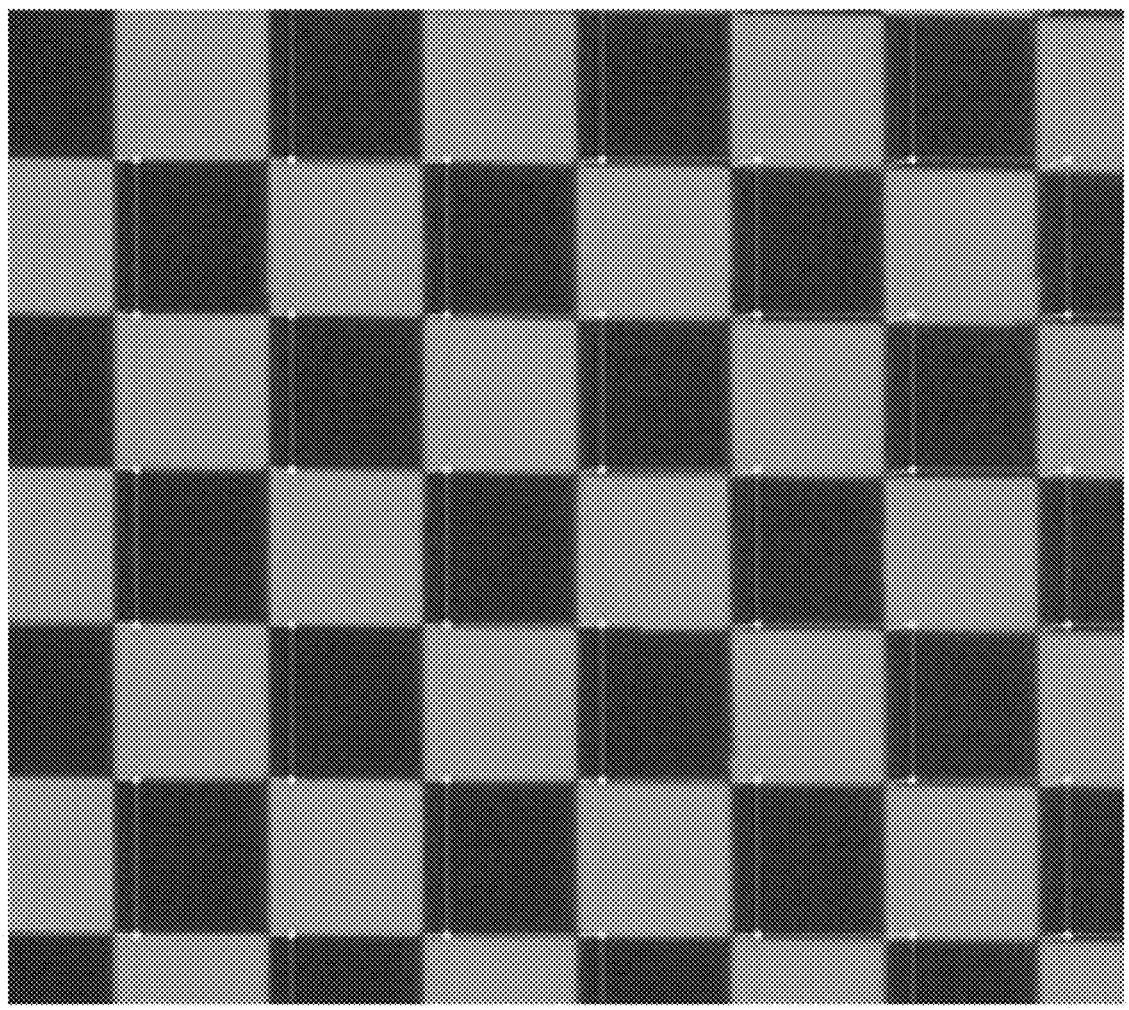
FIG. 83 is a diagram depicting an example of a visualization of source image vs. auto detection for an actual target grid pattern, according to one embodiment.
Figure 84:
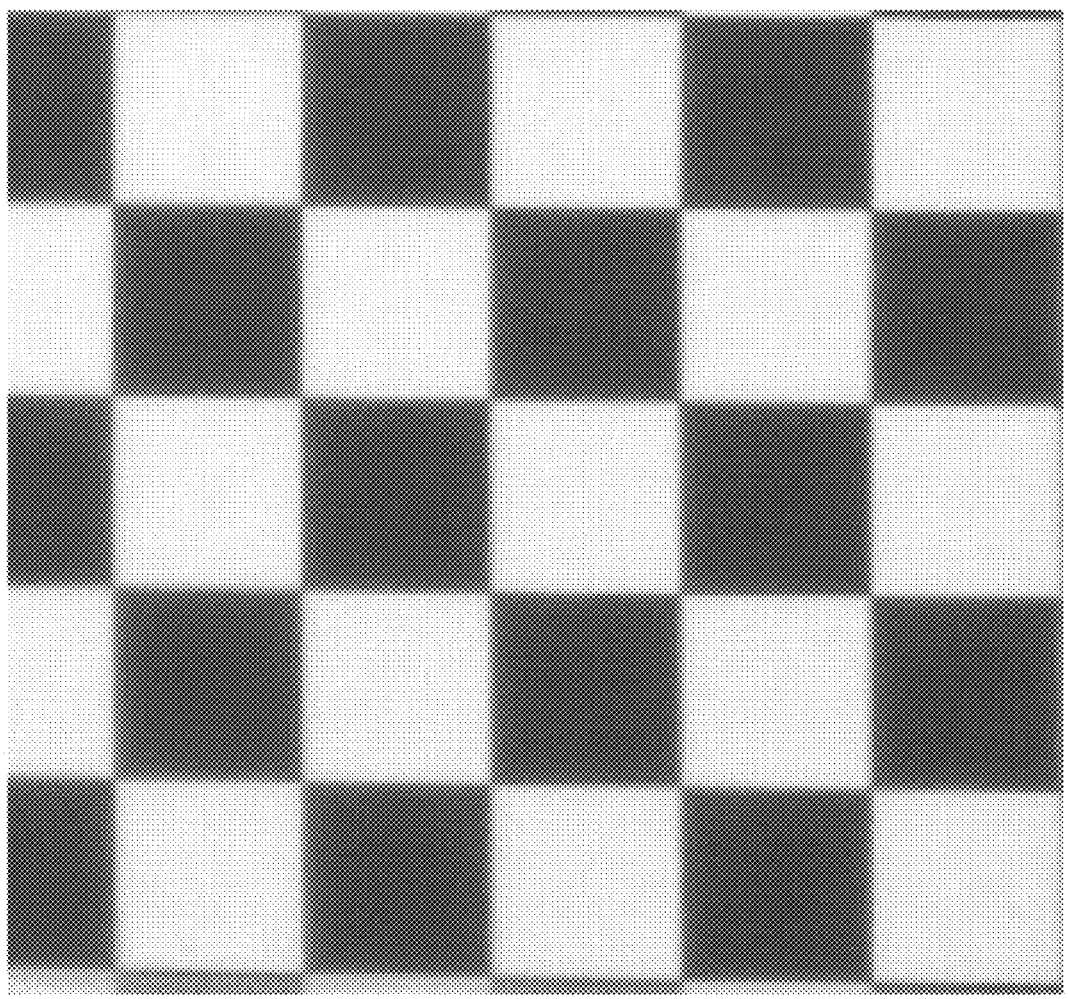
FIG. 84 is a diagram depicting an example of a grid before correction, according to one embodiment.
Figure 85:
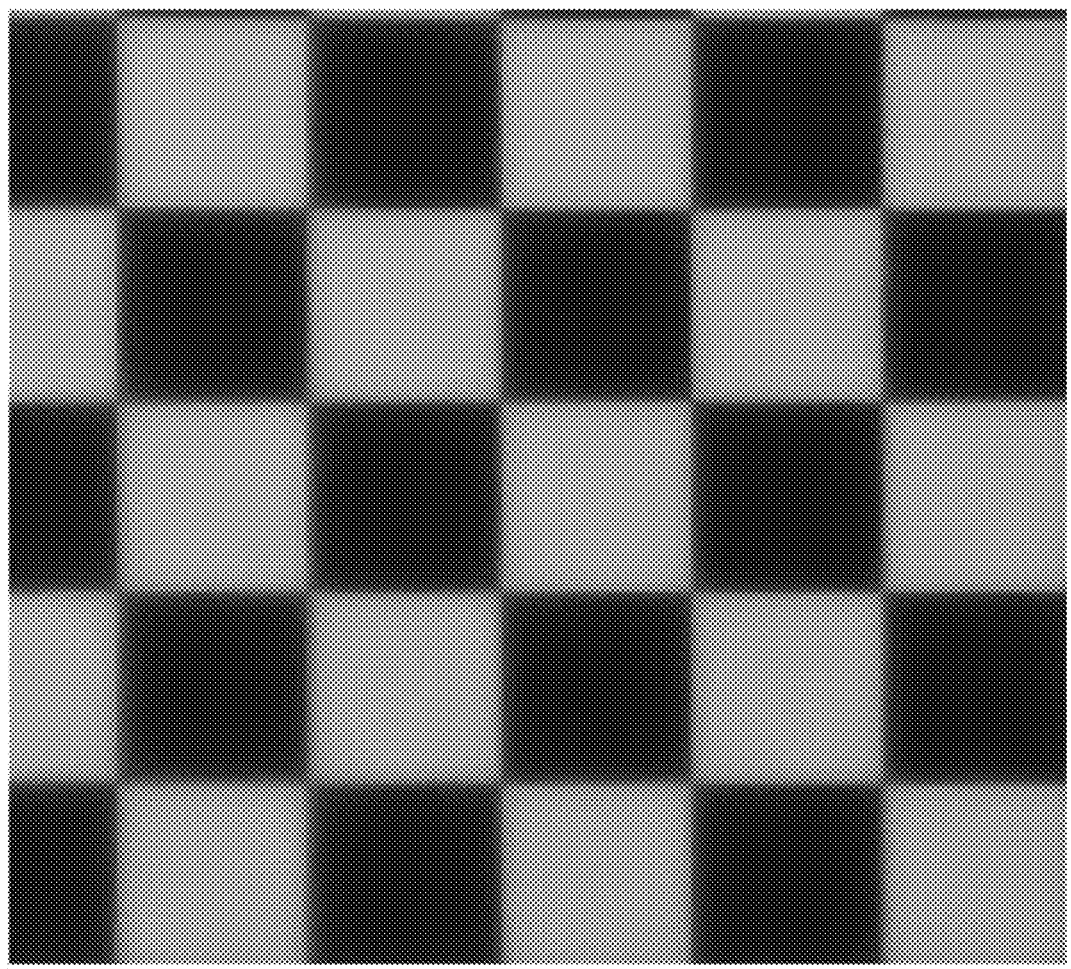
FIG. 85 is a diagram depicting an example of the grid after distortion correction has been applied, according to one embodiment.

Referring to FIG. 83, there is shown an example of a visualization 8300 of source image vs. auto detection for an actual target grid pattern, according to one embodiment. Referring to FIG. 84, there is shown an example of a grid 8400 before correction, according to one embodiment. Referring to FIG. 85, there is shown an example of the grid 8400 after distortion correction has been applied, according to one embodiment.

Optical Distortion Correction Method 2

In addition to or in the alternative to the foregoing, test charts containing horizontal and vertical Ronchi ruling lines can be used to perform 2D distortion correction. In at least one embodiment, the system 7500 uses test charts such the following:

A chart with 65 horizontal line pairs per individual tapered fiber optic bundle height, with about 20 pixel widths for each line.

A chart with 85 vertical line pairs per individual tapered fiber optic bundle height, with about 20 pixel widths for each line.

Alternatively, different line spacings and thicknesses can be used. Calibration may then be performed, for example, through the use of the following steps:

1. For each chart, take a series of images (for example, ten images, such that N=10) in which all the line patterns in the image plane are shifted by ~5 pixels vertically/horizontally. In at least one embodiment, the data can be captured by moving the line charts sequentially, which can be programmed by fine stepper motor controllers.
2. Multiple images can be formed by performing a pixel-by-pixel multiplication of one vertical line image and one horizontal line image recorded in the previous step. These are called product images. If N vertical line and M horizontal line images are recorded, then there are N×M possible product images. These product images will each contain a grid pattern of white box-shaped areas, surrounded by dark borders formed by the vertical and horizontal lines in the source images.
3. For each of the product images, the center-of-mass of each of the light box-shaped areas can be calculated. This forms a grid.
4. For each of the product image grids, a global optimization routine is applied to find a set of parameters which defines a reference grid that fits the observed grid best. The output of this tool is to generate a set of positional vectors that map between each of the white box center points in the undistorted image coordinates and to the corresponding white box center point in the distorted image coordinates. This forms a correction map for each product image.
5. The set of all of the correction maps from the product images can be combined to achieve a high-density correction map, which is then saved.

Fault Line Artifact Removal

Figure 86:
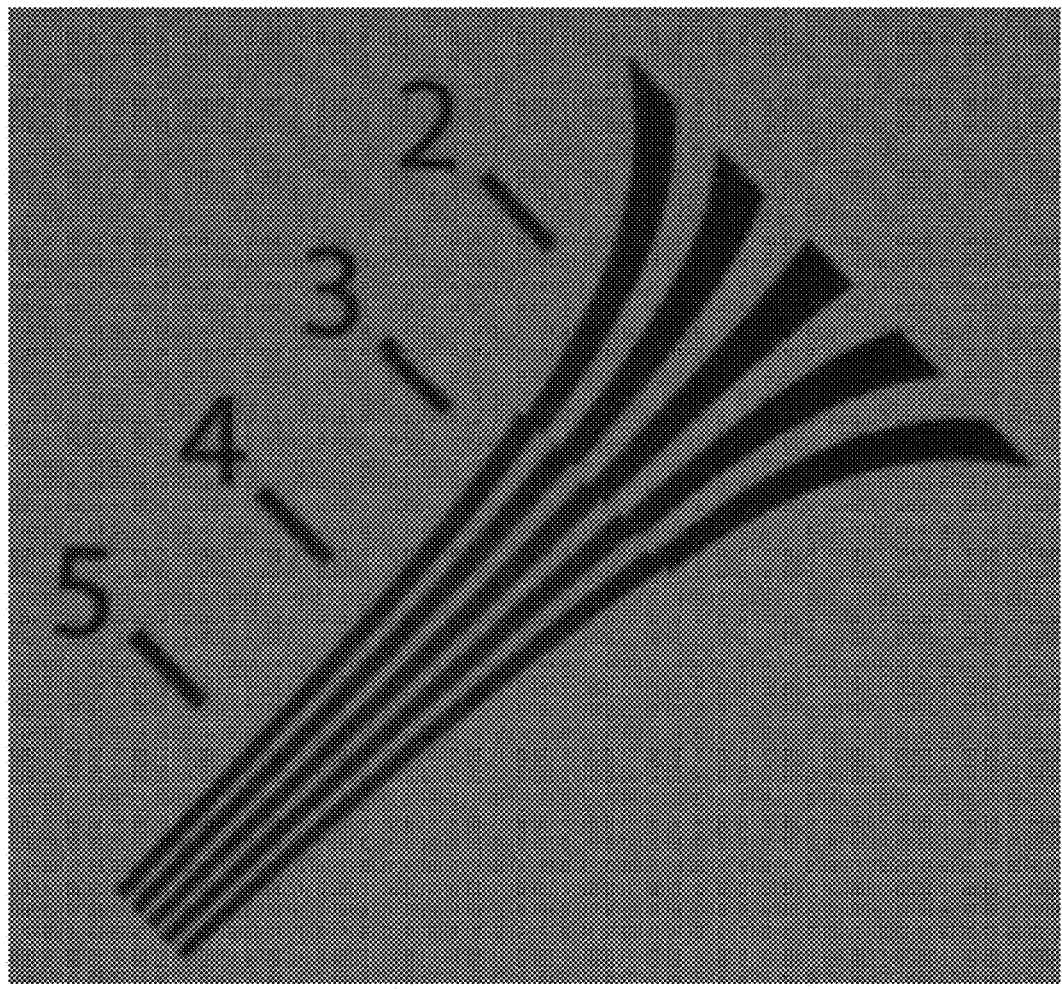
FIG. 86 is a diagram depicting an example of a fault line artifact, also referred to as a sheer or discontinuity, according to one embodiment.

Referring to FIG. 86, there is shown an example of a fault line artifact 8600, also referred to as a sheer or discontinuity, according to one embodiment. In this example, there are some unnatural non-smooth pixels in areas between '2' and '3'. Such artifacts can occur along the edges between hexagonal patterns.

In at least one embodiment, the system 7500 models fault line artifacts as follows:

Input: 2D RGB image array. In at least one embodiment, these images are taken with no MLA pattern, but after applying noise artifact removal to remove noise, hexagon patterns, and dark spots.

Output: A 2D correction map array.

In at least one embodiment, such artifacts are removed by applying an algorithm that generates a projection in which straight lines from a Ronchi ruling chart remain straight in an image. A sampled straight line pattern is used as the test chart. If any kind of warping or discontinuity is detected, these points are fit to a straight-line model.

In at least one embodiment, the system 7500 uses test charts such the following:

A chart with 65 horizontal ti e pairs per individual tapered fiber optic bundle height, with about 20 pixel widths for each line.

A chart with 85 vertical line pairs per individual tapered fiber optic bundle height, with about 20 pixel widths for each line.

Alternatively, different line thickness can be used in both charts. The system 7500 may assume that the line patterns are straight in the real world. Calibration may be performed by performing the following steps:

1. Data Capture. For each chart, take a series of images (for example, forty images, such that N=40) in which all the line patterns in the image plane are shifted by ~1 pixel vertically/horizontally. In at least one embodiment, the data can be captured by moving the line charts sequentially, which can be programmed by fine stepper motor controllers.
2. Line Detection. Given N line chart images taken from different phases (1 pixel offset in either horizontal or vertical), find all of the distorted line patterns. Ideally, the system 7500 finds all of line patterns in the chart, which requires that the straight line separation is larger than the largest fault line separation.
3. Coarse Straight Line Fitting. For all points in Line i, fit them into $A_i*x+B_i*y+C_i=0$.
4. Fine Straight Line Fitting. For each line, fit it into $A*x+y+C_i=0$ (horizontal), $x+B*y+C_i=0$ (vertical), where $C_i=C_0+i*delta(C)$, $delta(C)=C_1-C_0=C_2-C_1=\ldots=C_n-C_{n-1}$. In at least one embodiment, even spacing line patterns can be used. Both of the two steps can be modeled as non-linear optimization problems.
5. Calculate Correction Map. An offset vector can be formed by calculating the distance between a point on the detected line and its correspondence on the fitted line model. The offset vectors are splatted and aggregated in order to generate a per-pixel correction map.
6. Post Processing. To fill in some gaps due to extremely bad fault line artifacts or missing samples, a hole-filling routine can be applied.

In at least one embodiment, backward mapping may be used to apply the correction map. This can be combined with correction maps created in the grid warp routine.

Figure 87:
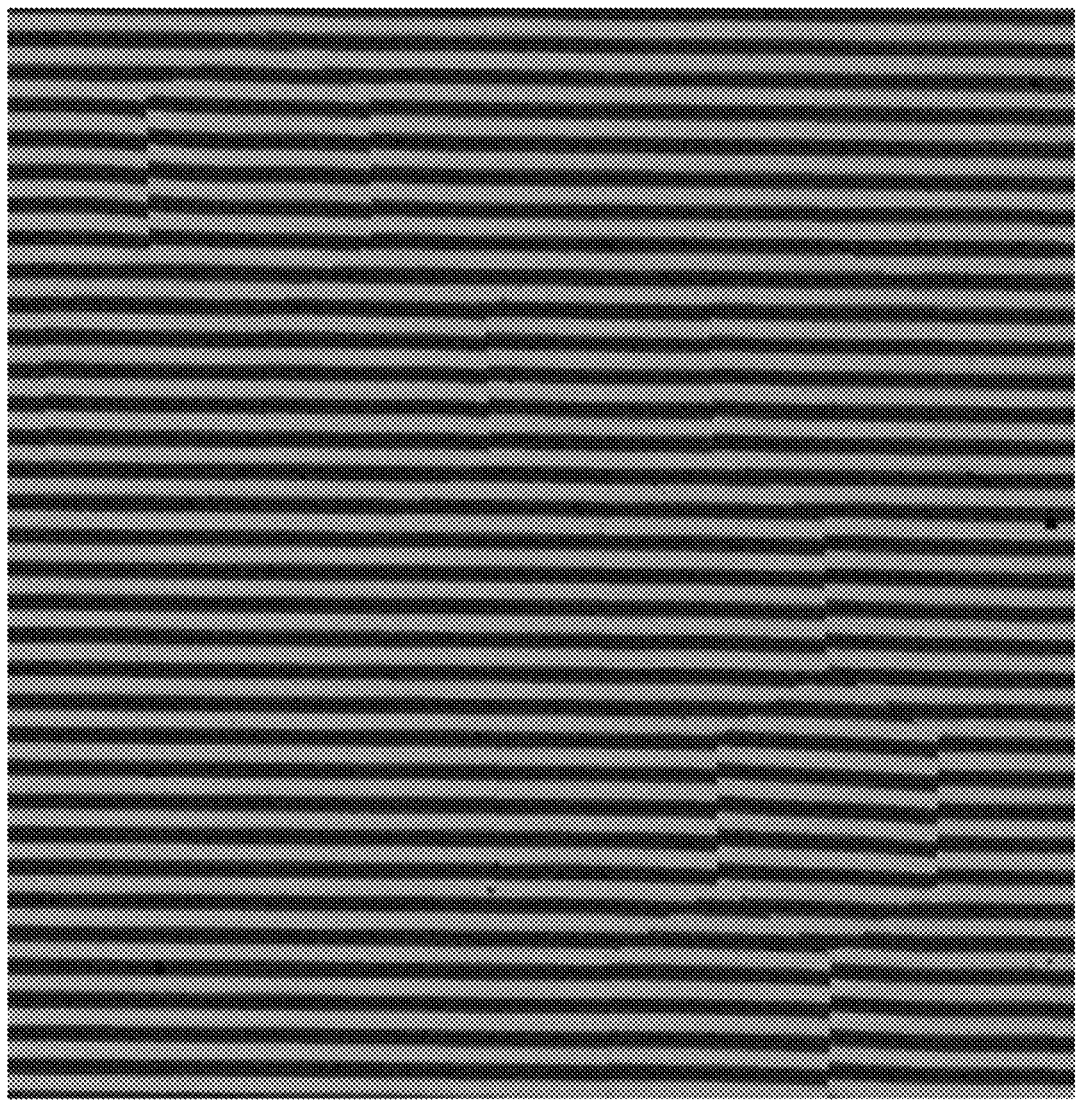
Figure 88:
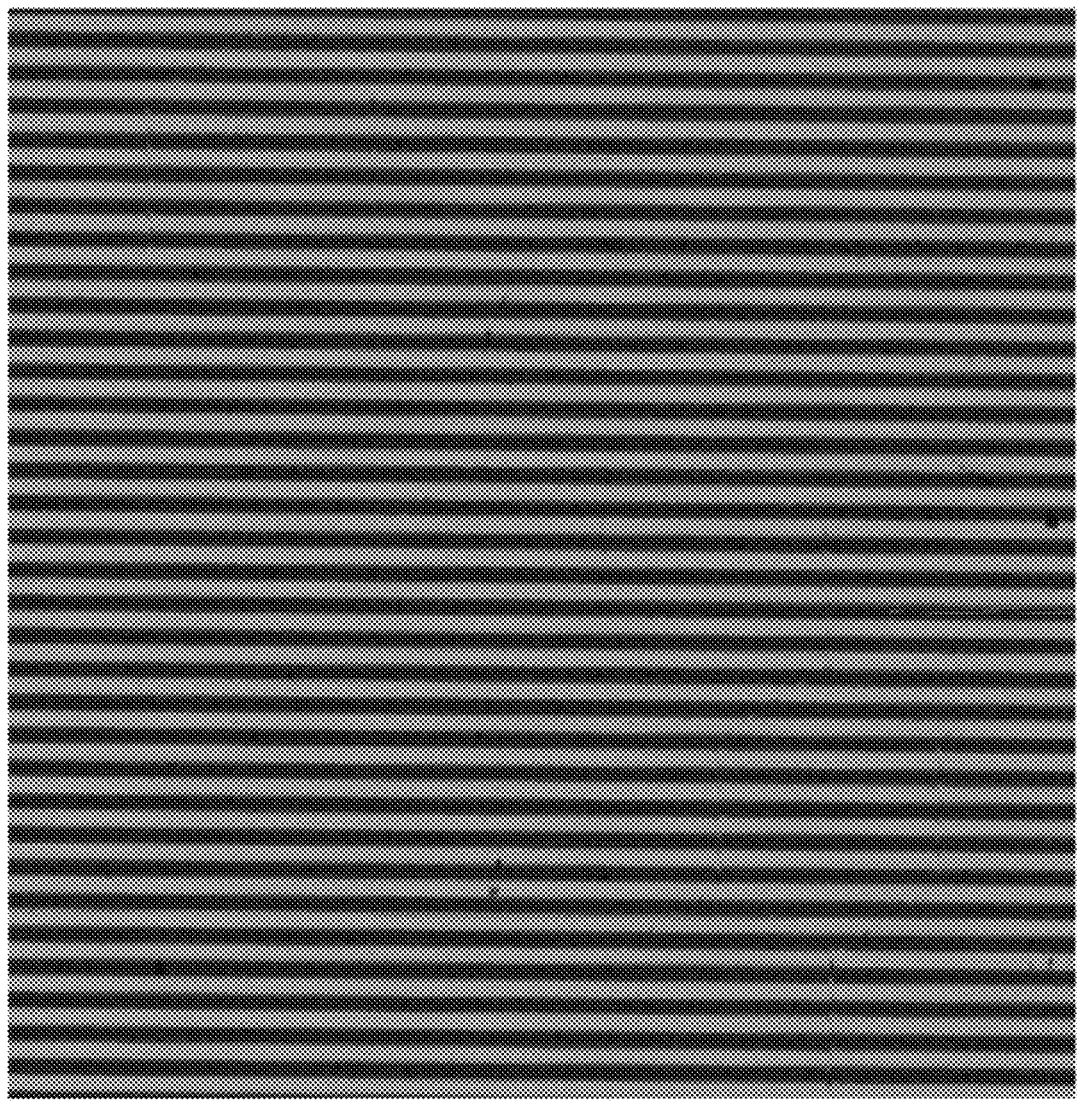

Referring to FIG. 87, there is shown an example of a line chart 8700 before fault line correction, according to one embodiment. Referring to FIG. 88, there is shown an example of line chart 8700 after application of the automated fault line correction process, according to one embodiment.

Tapered Fiber Optic Bundle Array Image Alignment

In at least one embodiment, the system 7500 performs tapered fiber optic bundle image alignment to generate geometry transform data. The geometry transform data may be used to stitch images from different individual tapered fiber optic bundles into one single image.

Figure 89:
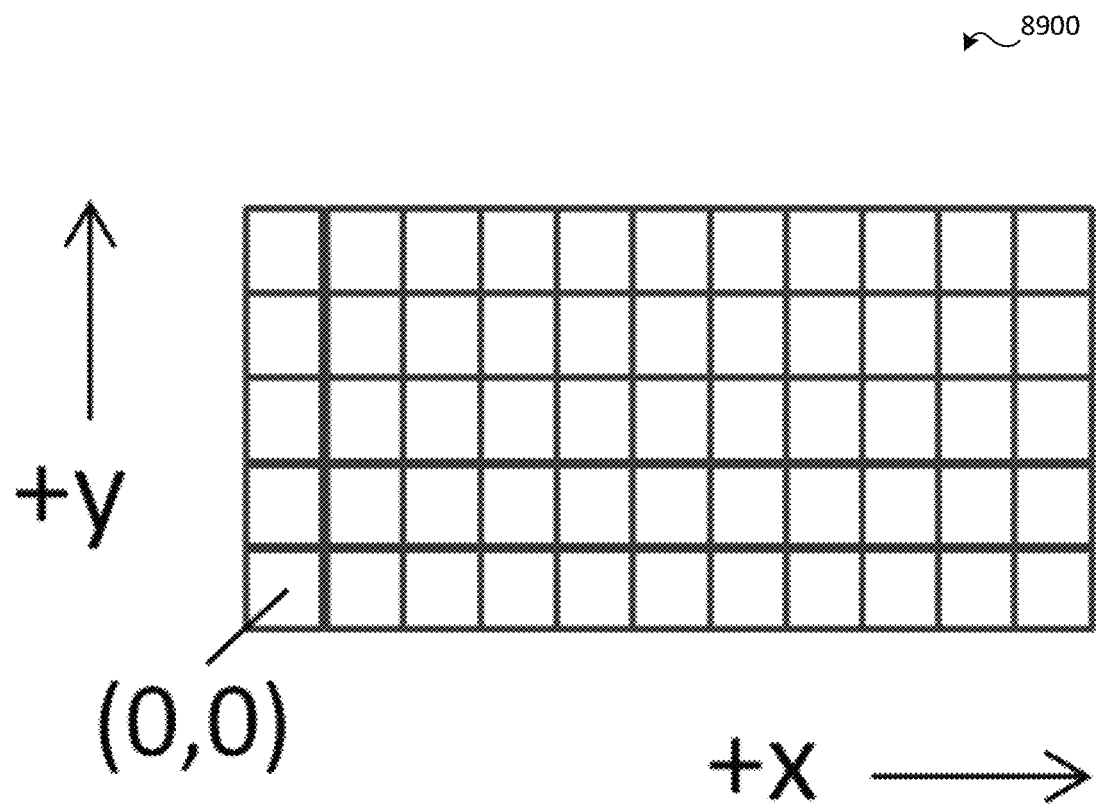

Referring to FIG. 89, there is shown an example of a coordinate system 8900 for a fiber mosaic array, according to one embodiment. The tapered fiber optic bundle coordinates are shown in X, Y space as viewed from behind the lens.

Method

Figure 90:
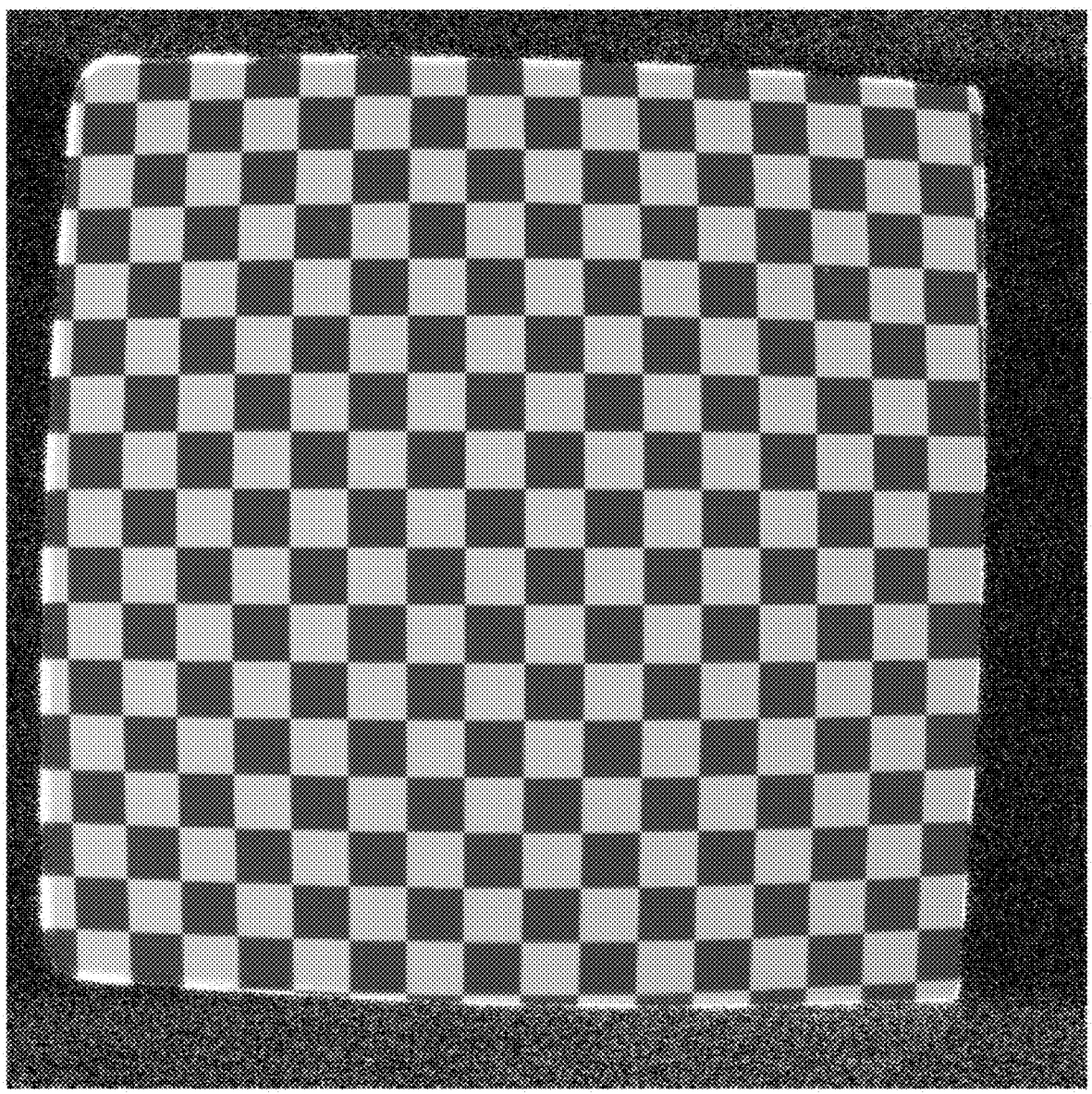

In at least one embodiment, an offline method is applied. First, camera calibration may be performed. Then, a checkerboard chart may be used. The checkerboard chart may be placed perpendicular to the optical axis of the lens, parallel to the sensor plane. The checkerboard chart may be assumed to be flat. FIG. 90 depicts a checkerboard chart 9000 according to one embodiment.

The calibration process may take a set of checkerboard images as input, wherein the image from each of the cameras 7512 is a subset of the checkerboard chart. For each image, the following steps may be performed:

1. Identify the active area. This may be done manually or automatically.
2. Each checkerboard pattern image may be processed using calibration steps 1-4 described above. Then, a global reference grid may be used to determine the global positioning in the array, in which the transform is represented as a 2D rotation matrix and translation vector for the image from each of the cameras 7512.

Image Seam Removal

In at least one embodiment, a seam removal method is applied to detect and remove seams between two adjacent cameras 7512. Masks generated from the calibration technique described above may be aligned using the data from alignment of the tapered fiber optic bundles. The seams may be detected by finding the center lines of each overlapped sub region between masks of two adjacent tapers. In at least one embodiment, the pixels around the seams are then blended with appropriate weights, which are assigned according to the spatial distance between the pixel and the seam.

Light-Field Video Pipeline

In at least one embodiment, each camera 7512 of the multi-camera array provides a raw-Bayer tile of the light-field that has been distorted by the optical fiber and the main lens. The current light-field video pipeline may process the data from each camera 7512 independently up to a "merge" stage, where each tile (i.e., the light-field data provided by each of the cameras 7512) is un-distorted and the images are combined into one large light-field. Subsequent processing steps (e.g., depth map and projection) can then use the single, large light-field as input and remain unchanged from the single-camera pipeline. Raw pipeline processing may also be performed, including removing black-level, lens-shading, white-balance, demosaic, and/or the like.

Figure 91:
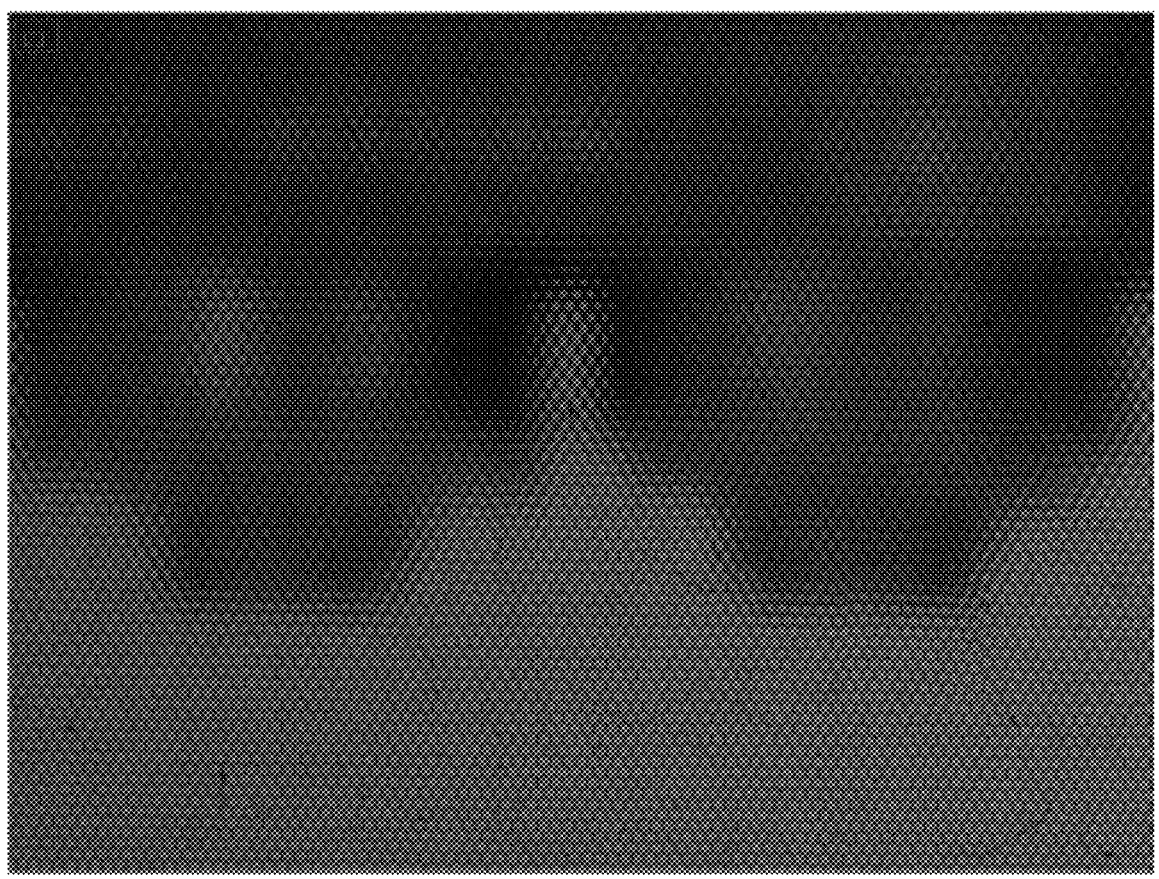
Figure 92:
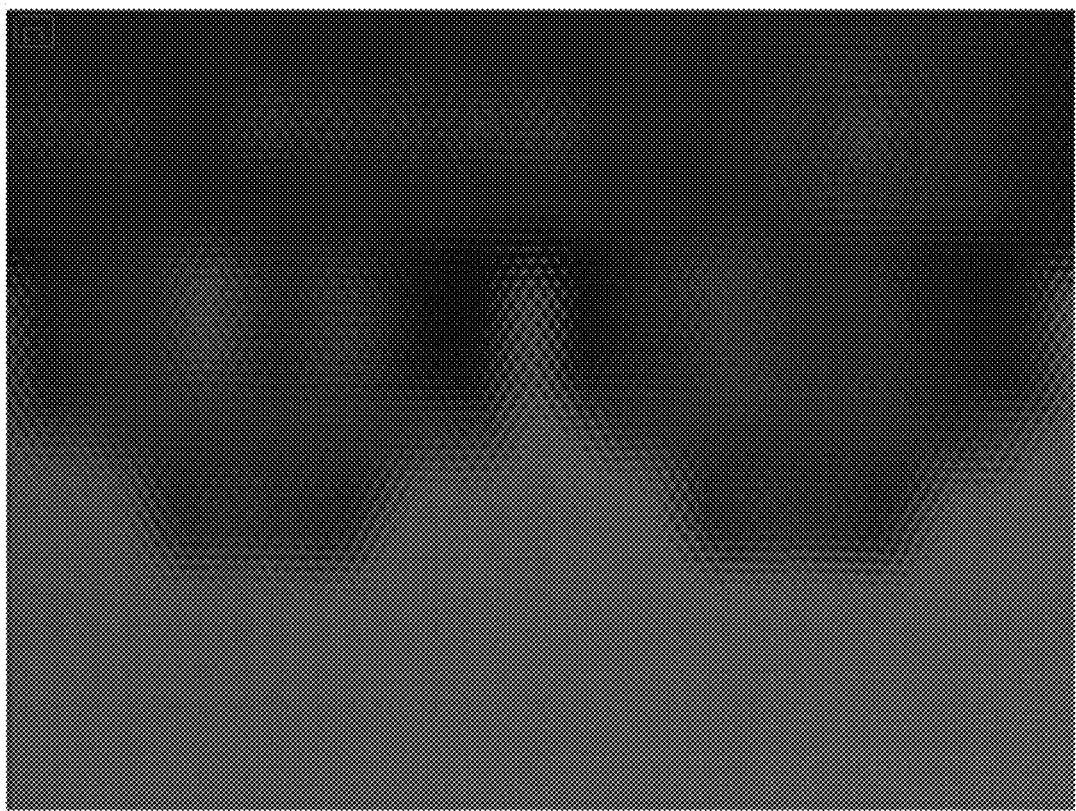

In at least one embodiment, a micro lens array (MLA) is used on the surface of the tapered fiber optic bundles 7610 to perform the following operations:

1. Subtract Black Frame. Each camera 7512 may have its own dark current characteristics; accordingly, a separate dark frame calibration may be used for each camera 7512. Each camera 7512, along with the corresponding tapered fiber optic bundle 7610 and/or fiber face plate 7620, may be processed independently. Input and output may both be raw-Bayer data.
2. Carry Out Lens Shading. Each camera 7512 may have its own PRNU (photo-response non-uniformity); accordingly, a separate flat-field calibration may be used for each camera 7512. This flat-field correction may include the effect of both the MLA pattern and the fiber artifacts. Each camera 7512, along with the corresponding tapered fiber optic bundle 7610 and/or fiber face plate 7620, may be processed independently. Input and output may both be raw-Bayer data. FIG. 91 depicts an example of a light-field image 9100 before lens shading is applied, according to one embodiment. FIG. 92 depicts an example of the light-field image 9100 after lens shading is applied, according to one embodiment.
3. Balance Cameras. Each camera 7512, along with the corresponding tapered fiber optic bundle 7610 and/or fiber face plate 7620, may respond to light slightly differently than the others. This step attempts to correct for the differences, and map all cameras 7512 to one reference camera. In at least one embodiment, this can be performed using a Bayer channel gain and offset;

additionally or alternatively, other techniques can be used. In at least one embodiment, each camera 7512, along with the corresponding tapered fiber optic bundle 7610 and/or fiber face plate 7620, may be processed independently. Input and output may both be raw-Bayer data.

Figure 93:
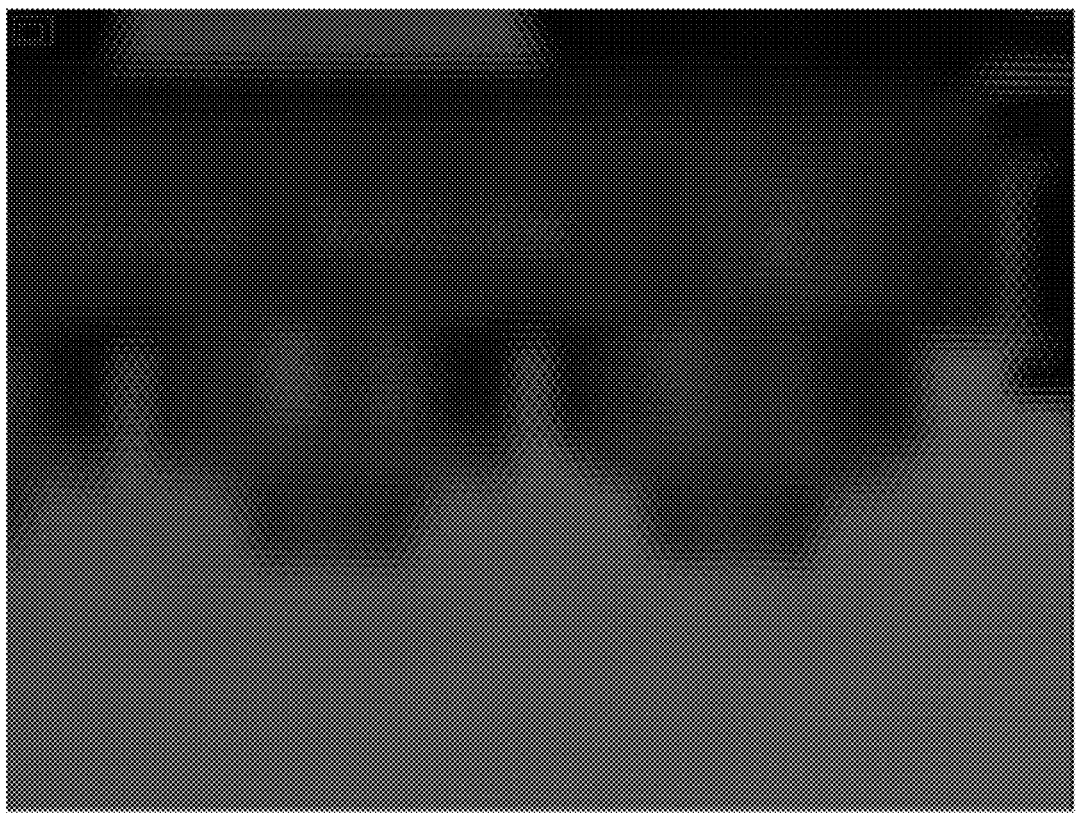
Figure 94:
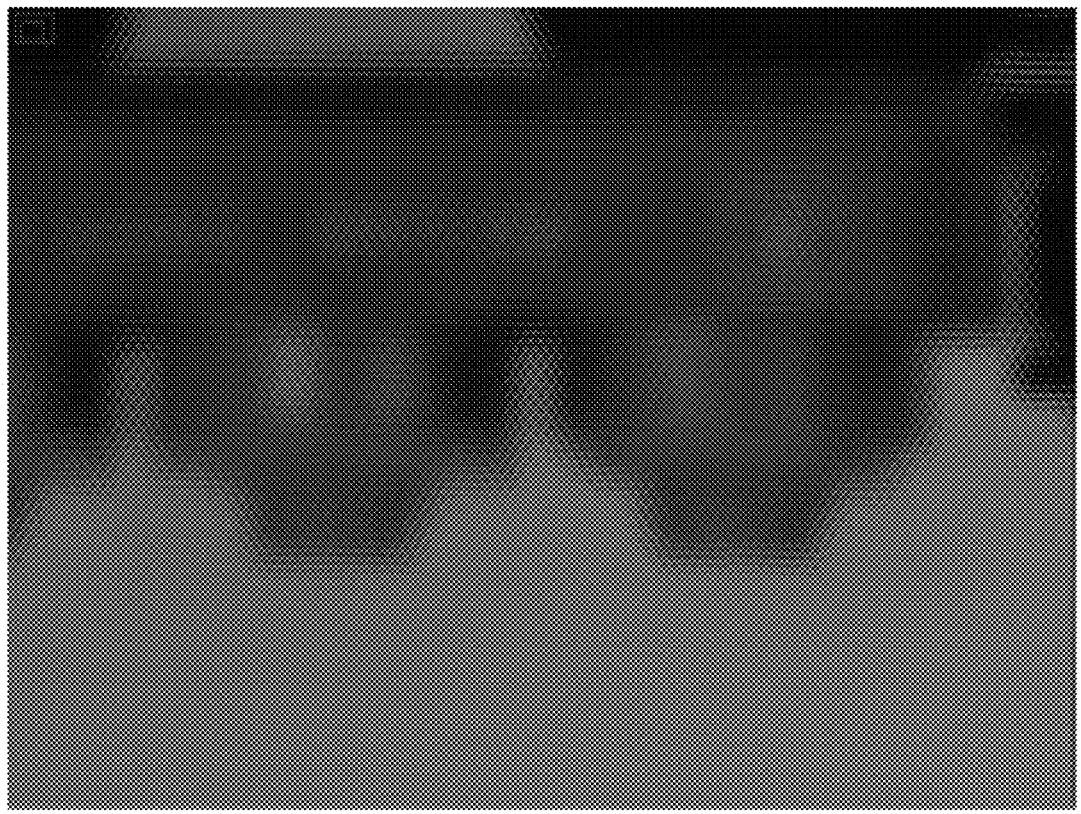

4. Standardize. This step includes, for example, white-balance, demosaicing, chroma-suppression, and other operations that are known in Light-Field Engine (LFE) processing. In at least one embodiment, each camera 7512, along with the corresponding tapered fiber optic bundle 7610 and/or fiber face plate 7620, may be processed independently. Input and output may both be raw-Bayer data. FIG. 93 depicts an example of a light-field image 9300 before standardization, after lens shading has been applied, according to one embodiment. FIG. 94 is an example of the light-field image 9300 after standardization, according to one embodiment.

5. Merge (Fiber artifact removal). This step may take all of the tiles generated by the cameras 7512 and merge them to one large image. The mapping table may include (1) the lens warp+grid warp+fault-line warp, and (2) tapered fiber optic bundle alignment warp, which can be collapsed into one lookup table mapping. This process is described in the above sections describing fiber artifact removal. The multiple tiles are considered the "source" (input) and the merged image is considered the "destination" (output).

Figure 95:
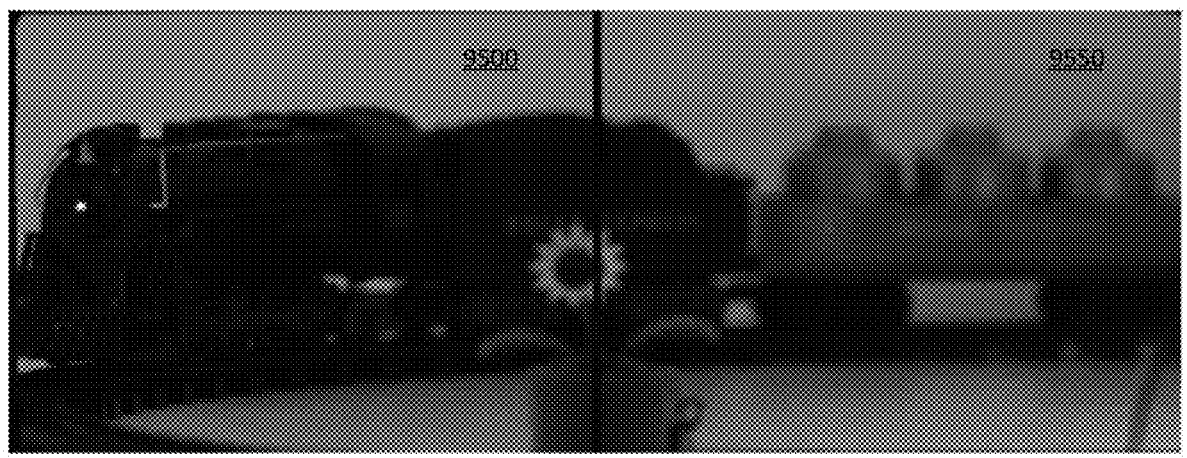
Figure 96:
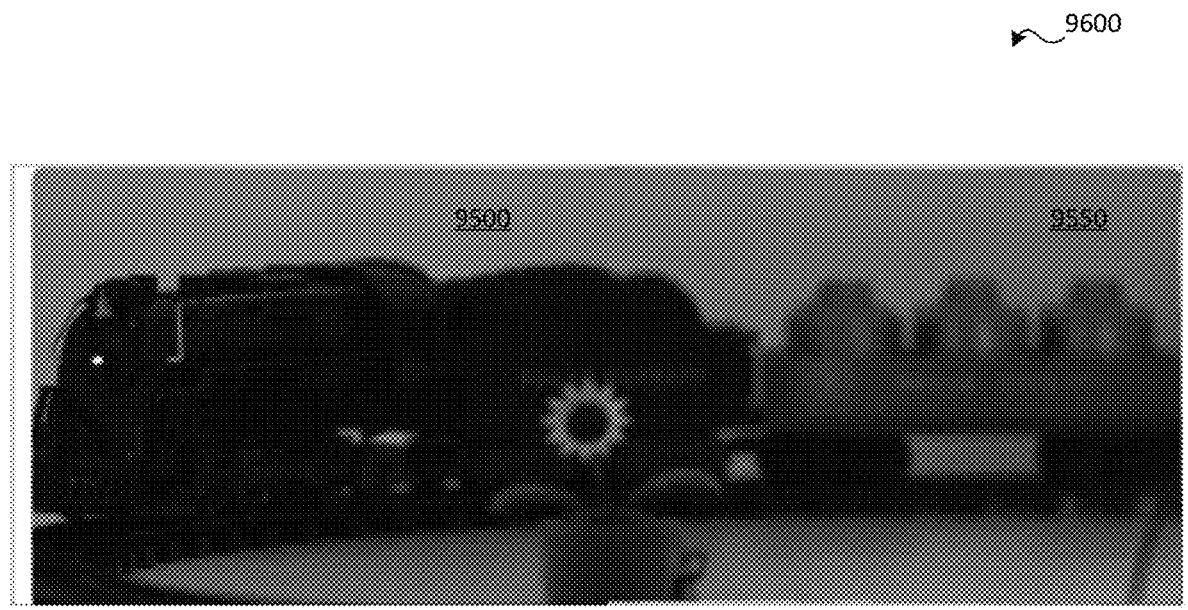

6. Blend camera images. For each pixel of the destination, the system 7500 may keep track of which camera 7512 to sample from and the x,y index (floating-point) of the location to sample at. By using a lookup table per camera 7512, the system 7500 may be able to blend the data from the cameras 7512; for example, for a given pixel of the destination image, the system 7500 may take a weighted average of the data from all cameras 7512. This can help in the seam-region, which is often noisy and unreliable. With this approach, there are multiple mapping tables (one for each camera 7512) and each table may include an x,y index and weight. FIG. 95 is an example depicting tiles 9500 and 9550 before the merge operation, according to one embodiment. FIG. 96 is an example depicting tiles 9500 and 9550 after the merge operation to define a single image 9600, according to one embodiment.

Figure 97:
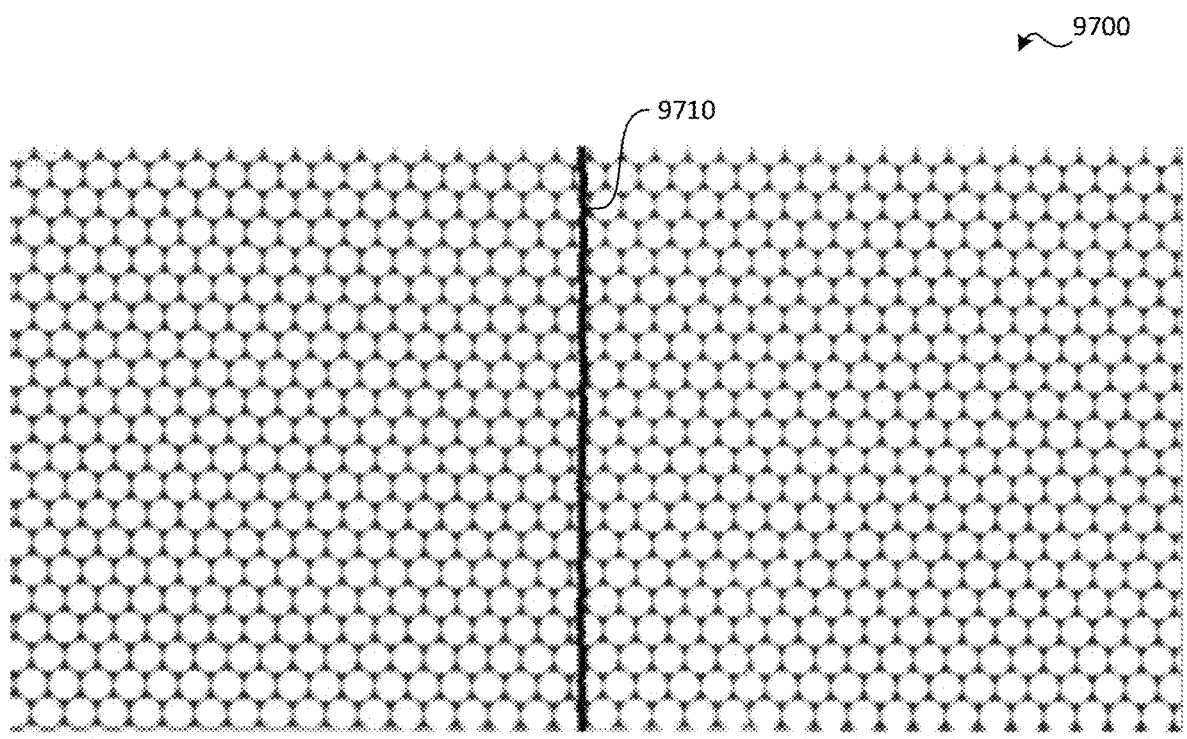

7. Apply Influence (Seam artifact removal). In at least one embodiment, each pixel is given a weight that is used in projection. In this stage, that weight is pre-multiplied. Each pixel can be weighted according to its associated demodulation value (more specifically, 1/demodValue^2). In order to perform such weighting, in at least one embodiment, a second flat-field image (non-MLA) is applied to the flat-field image (MLA) used in step #2 (lens shading) above, in order to remove the effects of the optical fiber. This is done for the flat-field image generated by each of the cameras 7512. Then, these multiple flat-field images are merged into one large image to yield one large influence map. A per-pixel "confidence map" can also be used to set any unreliable pixels to zero weight. FIG. 97 depicts an exemplary close-up view 9700 of the influence map, according to one embodiment. Note that interstitials receive low weight (as expected), and the seam 9710 between two cameras 7512 receives and gets zero weight.

Figure 98:
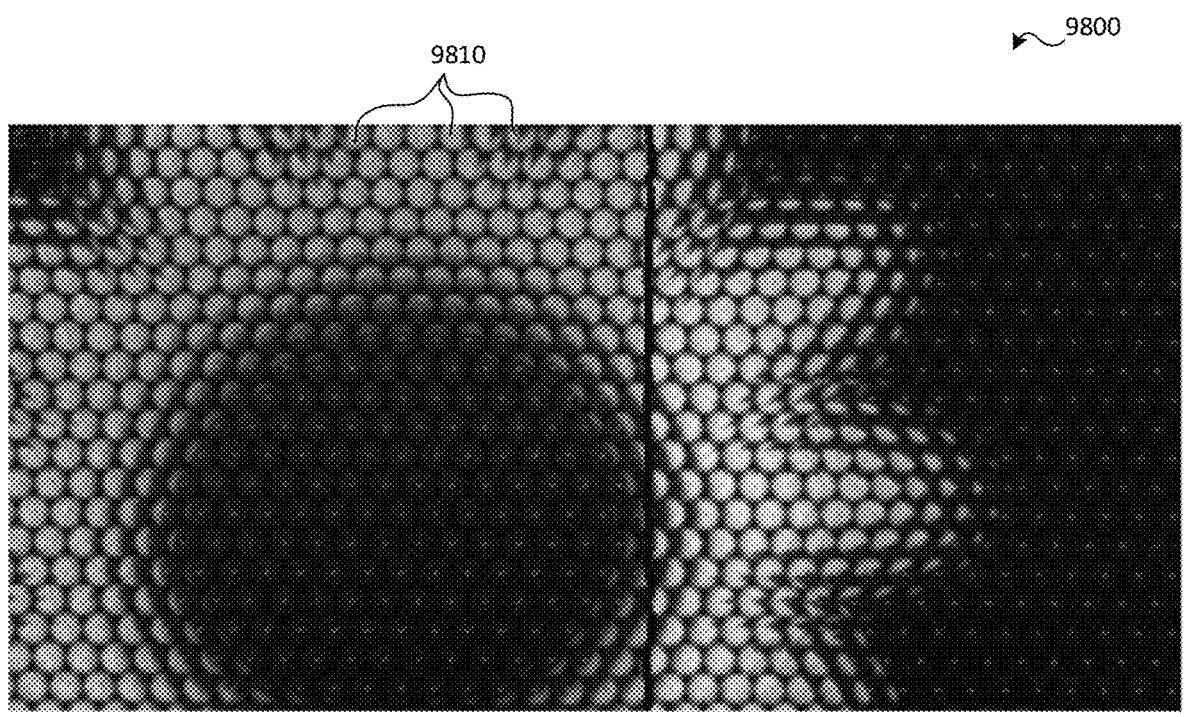

8. Create light-field. In at least one embodiment, the system 7500 pairs the merged image along with the appropriate geometry model, so that it can be treated as one large light-field that can be used for projection. The geometry may consist of a global model and a local per-pixel LUT for geometry correction. FIG. 98 depicts an example 9800 showing a set of disk-centers 9810, according to one embodiment. Dots are shown in the disk-centers 9810, with one set of dots from the global model only, and another set, distinct from those of the global model, using geometry correction.

9. Estimate depth and reconstruct. In at least one embodiment, for the final 2D reconstruction from the light-field, depth and projection may be processed according to known light-field image processing techniques.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for capturing and processing image data, the method comprising:
receiving incoming light along an optical path in an image capture device, the image capture device comprising:
a plurality of image sensors arranged in a pattern such that gaps exist between adjacent image sensors of the plurality of image sensors, wherein the plurality of image sensors includes a first image sensor and a second image sensor;
a main lens;
a microlens array;
a plurality of tapered fiber optic bundles, each of which comprises a leading end positioned within the optical path, and a trailing end positioned proximate one of the plurality of image sensors, the leading end having a larger cross-sectional area than the trailing end, wherein the plurality of tapered fiber optic bundles includes:

a first tapered fiber optic bundle of a first length positioned proximate the first image sensor;
a second tapered fiber optic bundle of a second length longer than the first length positioned proximate the second image sensor; and
a beam splitter to direct light from the main lens to the plurality of tapered fiber optic bundles, and wherein the tapered fiber optic bundles are arranged along a first plane and a second plane;
with the main lens, directing the incoming light along the optical path;
directing the incoming light through the microlens array;
directing at least some of the incoming light through the tapered fiber optic bundles including the first and second tapered fiber optic bundles to the image sensors;
with the image sensors including the first and second image sensors, receiving the incoming light to generate image sensor data; and
combining the image sensor data generated by the image sensors including the first and second image sensors to define a single light-field image such that the single light-field image is substantially unaffected by the gaps.

2. The method of claim 1, further comprising:
directing some of the incoming light to a preview camera; and:
with the preview camera, generating a preview image representative of the single light-field image.

3. The method of claim 2, further comprising, prior to directing the incoming light along the optical path, calibrating at least one of the image capture device and the preview camera to align an attribute of the preview camera with a corresponding attribute of the image capture device, wherein the attribute is selected from:
an ISO setting;
a focus setting;
a zoom setting; and
an image crop setting.

4. The method of claim 1, further comprising, prior to directing the incoming light along the optical path, calibrating the image capture device to mitigate differences in sensitivity between the image sensors.

5. The method of claim 1, further comprising, prior to directing the incoming light along the optical path, calibrating the image capture device to mitigate at least one of:
hex noise patterns existing within the tapered fiber optic bundles;
fiber noise patterns existing within the tapered fiber optic bundles; and
fault line defects existing within the tapered fiber optic bundles.

6. The method of claim 1, further comprising, prior to combining the image sensor data to define the single light-field image, transmitting the image sensor data to a plurality of servers;
wherein combining the image sensor data to define the single light-field image comprises combining the image sensor data at the plurality of servers.

7. The method of claim 1, further comprising, after combining the image sensor data to define the single light-field image, performing one or more light-field image processing steps on the single light-field image.

8. The method of claim 1, further comprising, prior to directing the incoming light along the optical path:
calibrating the image capture device to perform at least one of:
ISO calibration;
sensor dark current calibration;
dark fiber artifact removal;
sensor cropping;
grid warp calibration;
fault line artifact removal; and
after calibration of the image capture device, securing the microlens array relative to the image sensors.

9. The method of claim 1, further comprising, prior to directing the incoming light along the optical path, calibrating the image capture device to perform at least one of:
calibrating an aperture versus a focal length of the main lens; and
capturing a white image for demodulation.

10. The method of claim 1, further comprising, prior to directing the incoming light along the optical path, calibrating the image capture device to perform 2D geometry distortion correction by:
with the image capture device, capturing a calibration image of a checkerboard;
running a corner detection algorithm to detect corners of the checkerboard in the calibration image; and
running a grid fitting algorithm to define a reference grid fitted to the corners to generate vectors that can be used to generate an undistorted image from a distorted image.

11. The method of claim 1, further comprising, prior to directing the incoming light along the optical path, calibrating the image capture device to perform 2D geometry distortion correction by:
with the image capture device, capturing a plurality of calibration images of a checkerboard, with the checkerboard incrementally offset in each successive image;
generating a plurality of product images by performing a pixel-by-pixel multiplication of one vertical line image and one horizontal line on each of the plurality of calibration images;
for each of the product images, calculating a center-of-mass of each of a plurality of box-shaped areas to generate a grid; and
for each of the grids, applying a global optimization routine to identify a reference grid that fits the grid to generate vectors that can be used to generate an undistorted image from a distorted image.

12. The method of claim 1, further comprising, prior to directing the incoming light along the optical path, calibrating the image capture device by carrying out fault line artifact removal.

13. The method of claim 1, further comprising, prior to directing the incoming light along the optical path, calibrating the image capture device by performing tapered fiber optic bundle image alignment to generate geometry transform data;
wherein combining the image sensor data generated by the image sensors to define the single light-field image comprises using the geometry transform data to stitch images of the image sensor data together.

14. The method of claim 1, further comprising, prior to directing the incoming light along the optical path, calibrating the image capture device by generating a plurality of masks;
wherein combining the image sensor data generated by the image sensors to define the single light-field image comprises:
detecting seams between images of the image sensor data by finding center lines of each overlapping subregion between masks of adjacent image sensors; and
blending pixels proximate the seams.

15. The method of claim 1, further comprising, prior to directing the incoming light along the optical path, calibrating the image capture device by performing dark frame calibration for each of the image sensors.

16. The method of claim 1, further comprising, prior to directing the incoming light along the optical path, calibrating the image capture device by performing flat-field calibration for each of the image sensors.

17. The method of claim 1, further comprising, prior to combining the image sensor data generated by the image sensors to define the single light-field image, processing the image sensor data by applying at least one of white balancing, demosaicing, and chroma suppression.

18. The method of claim 1, wherein combining the image sensor data generated by the image sensors to define the single light-field image comprises carrying out fiber artifact removal on the image sensor data.

19. The method of claim 1, wherein combining the image sensor data generated by the image sensors to define the single light-field image comprises blending images of the sensor image data together.

20. The method of claim 1, wherein combining the image sensor data generated by the image sensors to define the single light-field image comprises conducting seams artifact removal on the image sensor data.

21. The method of claim 1, wherein combining the image sensor data generated by the image sensors to define the single light-field image comprises:
using the image sensor data to generate a single light-field; and
projecting the single light-field to generate the single light-field image.

22. The method of claim 1, wherein combining the image sensor data generated by the image sensors to define the single light-field image comprises processing depth and projection.

23. A non-transitory computer-readable medium with instructions for capturing and processing image data through use of an image capture device configured to receive incoming light, the image capture device comprising:
a plurality of image sensors arranged in a pattern such that gaps exist between adjacent image sensors of the plurality of image sensors, wherein the plurality of image sensors includes a first image sensor and a second image sensor;
a main lens configured to direct incoming light along an optical path;
a microlens array positioned in the optical path to receive the incoming light;
a plurality of tapered fiber optic bundles configured to direct at least some of the incoming light to the plurality of image sensors, each tapered fiber optic bundle comprising a leading end positioned within the optical path, and a trailing end positioned proximate one of the plurality of image sensors, the leading end having a larger cross-sectional area than the trailing end, wherein the plurality of tapered fiber optic bundles includes:
a first tapered fiber optic bundle of a first length positioned proximate the first image sensor; and
a second tapered fiber optic bundle of a second length longer than the first length positioned proximate the second image sensor; and
a beam splitter to direct light from the main lens to the plurality of tapered fiber optic bundles, and wherein the tapered fiber optic bundles are arranged along a first plane and a second plane;
wherein the image sensors are configured to receive, through at least the first and second tapered fiber optic bundles, the incoming light to generate image sensor data; and
wherein the non-transitory computer-readable medium comprises instructions stored thereon, that when executed by a processor, combine the image sensor data generated by the image sensors including the first and second image sensors to define a single light-field image such that the single light-field image is substantially unaffected by the gaps.

24. The non-transitory computer-readable medium of claim 23, wherein the image capture device further comprises a preview camera into which some of the incoming light is directed;
wherein the preview camera generates a preview image representative of the single light-field image;
and wherein the non-transitory computer-readable medium further comprises instructions stored thereon, that when executed by a processor, prior to directing the incoming light along the optical path, calibrate at least one of the image capture device and the preview camera to align an attribute of the preview camera with a corresponding attribute of the image capture device, wherein the attribute is selected from:
an ISO setting;
a focus setting;
a zoom setting; and
an image crop setting.

25. The non-transitory computer-readable medium of claim 23, further comprising instructions stored thereon, that when executed by a processor, prior to directing the incoming light along the optical path, perform at least one of:
calibrating the image capture device to mitigate differences in sensitivity between the image sensors; and
calibrating the image capture device to mitigate at least one of:
hex noise patterns existing within the tapered fiber optic bundles;
fiber noise patterns existing within the tapered fiber optic bundles; and
fault line defects existing within the tapered fiber optic bundles.

26. The non-transitory computer-readable medium of claim 23, further comprising instructions stored thereon, that when executed by a processor, prior to directing the incoming light along the optical path and prior to securing the microlens array relative to the image sensors, calibrate the image capture device to perform at least one of:
ISO calibration;
sensor dark current calibration;
dark fiber artifact removal;
sensor cropping;
grid warp calibration; and
fault line artifact removal.

27. The non-transitory computer-readable medium of claim 23, further comprising instructions stored thereon, that when executed by a processor, prior to directing the incoming light along the optical path, calibrate the image capture device to perform at least one of:
calibrating an aperture versus a focal length of the main lens; and
capturing a white image for demodulation.

28. The non-transitory computer-readable medium of claim 23, further comprising instructions stored thereon, that when executed by a processor, prior to directing the incoming light along the optical path, calibrate the image capture device to perform 2D geometry distortion correction by:
    with the image capture device, capturing a calibration image of a checkerboard;
    running a corner detection algorithm to detect corners of the checkerboard in the calibration image; and
    running a grid fitting algorithm to define a reference grid fitted to the corners to generate vectors that can be used to generate an undistorted image from a distorted image.

29. The non-transitory computer-readable medium of claim 23, further comprising instructions stored thereon, that when executed by a processor, prior to directing the incoming light along the optical path, calibrate the image capture device to perform 2D geometry distortion correction by:
    with the image capture device, capturing a plurality of calibration images of a checkerboard, with the checkerboard incrementally offset in each successive image;
    generating a plurality of product images by performing a pixel-by-pixel multiplication of one vertical line image and one horizontal line on each of the plurality of calibration images;
    for each of the product images, calculating a center-of-mass of each of a plurality of box-shaped areas to generate a grid; and
    for each of the grids, applying a global optimization routine to identify a reference grid that fits the grid to generate vectors that can be used to generate an undistorted image from a distorted image.

30. The non-transitory computer-readable medium of claim 23, further comprising instructions stored thereon, that when executed by a processor, prior to directing the incoming light along the optical path, calibrate the image capture device by carrying out fault line artifact removal.

31. The non-transitory computer-readable medium of claim 23, further comprising instructions stored thereon, that when executed by a processor, prior to directing the incoming light along the optical path, calibrate the image capture device by performing tapered fiber optic bundle image alignment to generate geometry transform data;
    wherein combining the image sensor data generated by the image sensors to define the single light-field image comprises using the geometry transform data to stitch images of the image sensor data together.

32. The non-transitory computer-readable medium of claim 23, further comprising instructions stored thereon, that when executed by a processor, prior to directing the incoming light along the optical path, calibrate the image capture device by generating a plurality of masks;
    wherein combining the image sensor data generated by the image sensors to define the single light-field image comprises:
        detecting seams between images of the image sensor data by finding center lines of each overlapping subregion between masks of adjacent image sensors; and
        blending pixels proximate the seams.

33. The non-transitory computer-readable medium of claim 23, further comprising instructions stored thereon, that when executed by a processor, prior to directing the incoming light along the optical path, calibrate the image capture device by performing at least one of:
    dark frame calibration for each of the image sensors; and
    flat-field calibration for each of the image sensors.

34. The non-transitory computer-readable medium of claim 23, further comprising instructions stored thereon, that when executed by a processor, prior to combining the image sensor data generated by the image sensors to define the single light-field image, process the image sensor data by applying at least one of white balancing, demosaicing, and chroma suppression.

35. The non-transitory computer-readable medium of claim 23, wherein combining the image sensor data generated by the image sensors to define the single light-field image comprises at least one of:
    carrying out fiber artifact removal on the image sensor data;
    blending images of the sensor image data together; and
    conducting seams artifact removal on the image sensor data.

36. The non-transitory computer-readable medium of claim 23, wherein combining the image sensor data generated by the image sensors to define the single light-field image comprises:
    using the image sensor data to generate a single light-field; and
    projecting the single light-field to generate the single light-field image.

37. The method of claim 1, wherein the image capture device further comprises a face plate having a first face plate length and a second face plate length different from the first face plate length, and wherein a leading end of the first tapered fiber optic bundle is positioned proximate a portion of the face plate having the first face plate length and a leading end of the second tapered fiber optic bundle is positioned proximate a portion of the face plate having the second face plate length.

38. The method of claim 1, wherein the microlens array is divided into at least two strips and is secured relative to the plurality of tapered fiber optic bundles.

39. The method of claim 1, wherein the tapered fiber optic bundles are bonded together and polished to provide a polished fiber face plate surface.

40. A device for capturing and processing image data, the device comprising:
    a plurality of image sensors arranged in a pattern such that gaps exist between adjacent image sensors of the plurality of image sensors, wherein the plurality of image sensors includes a first image sensor and a second image sensor;
    a main lens;
    a microlens array;
    a plurality of tapered fiber optic bundles, each of which includes a leading end positioned within an optical path, and a trailing end positioned proximate one of the plurality of image sensors, the leading end having a larger cross-sectional area than the trailing end, wherein the plurality of tapered fiber optic bundles includes:
        a first tapered fiber optic bundle of a first length positioned proximate the first image sensor;
        a second tapered fiber optic bundle of a second length longer than the first length positioned proximate the second image sensor; and
    a beam splitter to direct light from the main lens to the plurality of tapered fiber optic bundles, and wherein the tapered fiber optic bundles are arranged along a first plane and a second plane; and
    wherein:
        the main lens directs incoming light along the optical path through the microlens array and through the tapered fiber optic bundles including the first and second tapered fiber optic bundles to the image sensors;

the first image sensor and the second image sensor generate image sensor data; and the device combines the image sensor data generated by the first and second image sensors to define a single light-field image such that the single light-field image is substantially unaffected by the gaps between adjacent image sensors.

41. The device of claim 40, wherein combining the image sensor data generated by the first and second image sensors includes carrying out fiber artifact removal on the image sensor data.

42. The device of claim 40, wherein combining the image sensor data generated by the first and second image sensors includes blending images of the sensor image data together.

43. The device of claim 40, wherein combining the image sensor data generated by the first and second image sensors includes conducting seams artifact removal on the image sensor data.

* * * * *